US011952495B1

(12) United States Patent
Hu et al.

(10) Patent No.: US 11,952,495 B1
(45) Date of Patent: Apr. 9, 2024

(54) FLUOROGENIC PH-SENSITIVE COMPOUNDS AND THEIR METHODS OF USE

(71) Applicant: LIFE TECHNOLOGIES CORPORATION, Carlsbad, CA (US)

(72) Inventors: Yi-Zhen Hu, Eugene, OR (US); Aimei Chen, Eugene, OR (US); Daniel Beacham, Eugene, OR (US); Chrisgen Vonnegut, Springfield, OR (US); Krishnamurthy Nacharaju, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 113 days.

(21) Appl. No.: 17/498,377

(22) Filed: Oct. 11, 2021

Related U.S. Application Data

(60) Provisional application No. 63/091,156, filed on Oct. 13, 2020.

(51) Int. Cl.
*C09B 11/24* (2006.01)
*G01N 21/64* (2006.01)

(52) U.S. Cl.
CPC .......... *C09B 11/24* (2013.01); *G01N 21/6428* (2013.01); *G01N 2021/6439* (2013.01)

(58) Field of Classification Search
CPC .......... C09B 11/24
USPC .......... 546/28
See application file for complete search history.

(56) References Cited

U.S. PATENT DOCUMENTS 10,047,282 B2 8/2018 Szczepanik et al.

FOREIGN PATENT DOCUMENTS

KR 101416750 B1 7/2014
WO WO-2018151949 A1 8/2018

OTHER PUBLICATIONS

Bae S., et al., "Rhodamine-Hydroxamate-Based Fluorescent Chemosensor for FeIll," Tetrahedron Letters, 2007, vol. 48, No. 31, pp. 5389-5392.
Bordwell F. G., et al., "Acidities of Carboxamides, Hydroxamic Acids, Carbohydrazides, Benzenesulfonamides, and Benzenesulfonohydrazides in DMSO Solution," The Journal of Organic Chemistry, 1990, vol. 55, No. 10, pp. 3330-3336.
Chen X., et al., "Characterization of Rhodamine B Hydroxylamide as a Hightly Selective and Sensitive Fluorescence Probe for Copper(II)," Analytica Chimica Acta, 2009, vol. 632, No. 1, pp. 9-14.
Chen X., et al., "Fluorescent Chemosensors Based on Spiroring-Opening of Xanthenes and Related Derivatives," Chemical Reviews, 2012, vol. 112, No. 3, pp. 1910-1956.
Czaplyski W. L., et al., "Substituent Effects on the Turn-on Kinetics of Rhodamine-based Fluorescent pH Probes," Organic and Biomolecular Chemistry, 2014, vol. 12, No. 3, pp. 526-533.
Kim H., et al., "Rhodamine Triazole-Based Fluorescent Probe for the Detection of Pt2+," Organic Letters, 2010, vol. 12, No. 22, pp. 5342-5345.
Li H., et al., "Two Rhodamine Lactam Modulated Lysosome-Targetable Fluorescence Probes for Sensitively and Selectively Monitoring Subcellular Organelle pH Change," Analytica Chimica Acta 900, Nov. 5, 2015, pp. 97-102.
Minoshima M., et al., "In Vivo Multicolor Imaging with Fluorescent Probes Revealed the Dynamics and Function of Osteoclast Proton Pumps," American Chemical Society Central Science, 2019, vol. 5, No. 6, pp. 1059-1066.
Montenegro H., et al., "The Mechanism of the Photochromic Transformation of Spirorhodamines," Photochemical and Photobiological Sciences, 2012, vol. 11, No. 6, pp. 1081-1086.
Moon K.S., et al., "Aminoxy-linked Rhodamine Hydroxamate as a Fluorescent Chemosensor for Fe3+ in Aqueous Media," Tetrahedron Letters, 2010, vol. 51, pp. 3290-3293.
Niu G., et al., "Near-Infrared Probe Based on Rhodamine Derivative for Highly Sensitive and Selective Lysosomal pH Tracking," Analytical Chemistry, 2017, vol. 89, No. 3, 18 Pages (with Supplementary Material).
Stratton S.G., et al., "Tuning the pKa of Fluorescent Rhodamine pH Probes through Substituent Effects," Chemistry A European Journal, 2017, vol. 23, No. 56, pp. 14064-14072.
Yang Y.K., et al., "A Rhodamine-Hydroxamic Acid-Based Fluorescent Probe for Hypochlorous Acid and Its Applications to Biological Imagings," Organic Letters, 2009, vol. 11, No. 4, pp. 859-861.
Yuan L., et al., "A Rational Approach to Tuning the pKa Values of Rhodamines for Living Cell Fluorescence Imaging," Organic and Biomolecular Chemistry, 2011, vol. 9, No. 6, pp. 1723-1726 (With Supplementary Material).

*Primary Examiner* — Taofiq A Solola

(57) ABSTRACT

The present disclosure provides for compounds of Formula (I), (I)

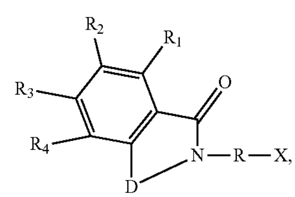

its corresponding compounds of Formula (II)

(II)

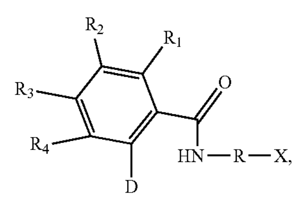

or salts thereof and their use as fluorogenic pH sensors.

15 Claims, 48 Drawing Sheets

| | MR5 | MR10 | MR20 | MR40 |
|---|---|---|---|---|
| log(agonist) vs. response | | | | |
| Best-fit values | | | | |
| Bottom | 68.45 | 52.20 | 102.3 | 236.8 |
| Top | 0.9898 | 1.695 | 1.816 | 1.721 |
| LogEC50 | 4.120 | 4.187 | 3.934 | 3.882 |
| EC50 | 13172 | 15383 | 8600 | 7614 |
| Span | -67.46 | -50.50 | -100.5 | -235.1 |

| | MR5 | MR10 | MR20 | MR40 |
|---|---|---|---|---|
| log(agonist) vs. response | | | | |
| Best-fit values | | | | |
| Bottom | 3.598 | 2.742 | 1.211 | 0.4556 |
| Top | 0.5924 | 0.4802 | 0.3000 | 0.1250 |
| LogEC50 | 5.779 | 6.270 | 6.505 | 6.597 |
| EC50 | 601826 | 1.864e+006 | 3.202e+006 | 3.957e+006 |
| Span | -3.006 | -2.261 | -0.9112 | -0.3307 |

| | 250 uM | 500 uM | 1 mM |
|---|---|---|---|
| log(agonist) vs. response | | | |
| Best-fit values | | | |
| Bottom | 15.50 | 32.68 | 83.28 |
| Top | 0.2577 | 0.3621 | 0.2521 |
| LogEC50 | 4.256 | 4.087 | 4.099 |
| EC50 | 18038 | 12214 | 12567 |
| Span | -15.24 | -32.32 | -83.03 |

| | MR5 | MR10 | MR15 | MR20 |
|---|---|---|---|---|
| log(agonist) vs. response | | | | |
| Best-fit values | | | | |
| Bottom | 1.171 | 0.9946 | 1.167 | 1.088 |
| Top | 0.07440 | 0.1104 | 0.1202 | 0.1120 |
| LogEC50 | 5.124 | 4.370 | 4.242 | 4.220 |
| EC50 | 133118 | 23444 | 17470 | 16606 |
| Span | -1.096 | -0.8842 | -1.046 | -0.9762 |

| | Cmpd D MR2 | Cmpd D MR4 | Cmpd D MR8 | Cmpd C MR2 | Cmpd C MR4 | Cmpd C MR8 |
|---|---|---|---|---|---|---|
| log(agonist) vs. response | | | | | | |
| Best-fit values | | | | | | |
| Bottom | 0.6349 | 0.7996 | 1.012 | 2.429 | 2.930 | 3.333 |
| Top | 0.07683 | 0.1140 | 0.07146 | 0.1224 | 0.1261 | 0.1776 |
| LogEC50 | 3.735 | 3.393 | 3.639 | 4.824 | 4.842 | 4.570 |
| EC50 | 5433 | 2471 | 4358 | 66691 | 69570 | 37130 |
| Span | -0.5581 | -0.6856 | -0.9408 | -2.307 | -2.804 | -3.156 |

| | DOL 5.5 | DOL 10.2 | DOL 12.7 |
|---|---|---|---|
| log(agonist) vs. response | | | |
| Best-fit values | | | |
| Bottom | 1.015 | 0.9258 | 1.077 |
| Top | 0.02570 | 0.03410 | 0.03672 |
| LogEC50 | 4.054 | 4.160 | 3.947 |
| EC50 | 11330 | 14460 | 8847 |
| Span | -0.9896 | -0.8917 | -1.041 |

| | DOL 4.4 | DOL 8.2 | DOL 11.6 |
|---|---|---|---|
| log(agonist) vs. response | | | |
| Best-fit values | | | |
| Bottom | 1.227 | 1.349 | 1.323 |
| Top | 0.05815 | 0.06073 | 0.07065 |
| LogEC50 | 4.394 | 4.511 | 4.352 |
| EC50 | 24795 | 32459 | 22488 |
| Span | -1.169 | -1.288 | -1.252 |

| | MR 15 | MR 30 |
|---|---|---|
| log(agonist) vs. response | | |
| Best-fit values | | |
| Bottom | 21.38 | 22.54 |
| Top | 3.977 | 3.265 |
| LogEC50 | 0.2915 | -0.8643 |
| EC50 | 1.957 | 0.1367 |

| | MR 5 | MR 10 | MR 15 | MR20 |
|---|---|---|---|---|
| log(agonist) vs. response | | | | |
| Best-fit values | | | | |
| Bottom | 60.73 | 29.38 | 24.22 | 28.32 |
| Top | 56.58 | 11.14 | 4.784 | 8.372 |
| LogEC50 | 0.7395 | 0.1286 | -0.3620 | -0.6956 |
| EC50 | 5.489 | 1.344 | 0.4345 | 0.2015 |
| Span | -4.159 | -18.25 | -19.44 | -19.95 |

| | MR 5 | MR 10 | MR 15 | MR20 |
|---|---|---|---|---|
| log(agonist) vs. response | | | | |
| Best-fit values | | | | |
| Bottom | 140.3 | 98.75 | 97.54 | 91.99 |
| Top | 179.2 | 122.7 | 124.1 | 116.6 |
| LogEC50 | 0.6313 | 0.7590 | 0.6795 | 0.3432 |
| EC50 | 4.279 | 5.742 | 4.780 | 2.204 |
| Span | 38.84 | 23.98 | 26.54 | 24.60 |

| | MR2 | MR4 | MR8 | MR10 |
|---|---|---|---|---|
| log(agonist) vs. response | | | | |
| Best-fit values | | | | |
| Bottom | 2.275 | 11.40 | 22.85 | 14.60 |
| Top | -0.08662 | -0.2056 | -0.5275 | -0.1808 |
| LogEC50 | -0.1386 | -0.3444 | -0.03376 | -0.7898 |
| EC50 | 0.7267 | 0.4525 | 0.9252 | 0.1622 |
| Span | -2.361 | -11.61 | -23.37 | -14.78 |

| Sample | MFI |
|---|---|
| Unstained | 88 |
| 1 | 118 |
| 2 | 2554 |

| Sample | MFI |
|---|---|
| Unstained | 88 |
| 3 | 208 |
| 4 | 7399 |

| Sample | MFI |
|---|---|
| Unstained | 88 |
| 5 | 203 |
| 6 | 23784 |

| Sample | MFI |
|---|---|
| Unstained | 88 |
| 7 | 249 |
| 8 | 41301 |

| *Fold difference* | Control | Bafilomycin |
|---|---|---|
| Control | 946 | 406 |
| OCC Occluded | 25 | 9.8 |

FLUOROGENIC PH-SENSITIVE COMPOUNDS AND THEIR METHODS OF USE

CROSS-REFERENCE TO RELATED APPLICATIONS

This U.S. Non-Provisional application claims the benefit under 35 U.S.C. § 119(e) of U.S. Provisional Application No. 63/091,156, filed Oct. 13, 2020. The entire contents of the aforementioned application are incorporated by reference herein.

FIELD

The present disclosure relates to novel rhodamine compounds and their use as pH sensors in which the spirolactam to ring-opened amide process is utilized for sensing pH.

BACKGROUND

Acidic pH sensor dyes do not produce a signal at a neutral pH, but fluoresce brightly in acidic environments, making them useful as pH indicators for a variety of applications. The acidic pH sensor dye will begin to signal through fluorescence when the pH of its environment is within a few pH units above the pKa of the dye and when exposed to light at an excitation wavelength. At a pH equal to the pKa of the dye, half of the dye molecules will become fluorescent.

Endocytosis is the process of taking matter into a cell through its membrane to form an endosome. As the endosome travels through the cell, the pH of the environment inside the endosome changes and becomes more acidic. An early endosome has a pH of approximately 6.3, a late endosome has a pH of approximately 5.5, and a lysosome has a pH of approximately 4.7. See *Nature Reviews: Molecular Cell Biology* [Casey et al, *Nat. Rev. Mol. Cell. Biol.* 11:50-61 (2010)]. As such, pH sensor dyes that can be taken up into a cell might allow for time and concentration dependent measurements of the internalization of matter into a cell. However, to be useful, such a sensor must be water-soluble, have a pKa that relates to the pH being tested for (for example, higher than 4.0), and exhibit fast response to a change in pH. Other changes in pH, whether inside or outside a cell or in a sample, are also in need of monitoring.

Provided herein are novel rhodamine compounds in which the spirolactam to ring-opened amide process is utilized for sensing pH that address one or more of the problems described above. Methods and uses of such compounds are further provided.

SUMMARY

In one aspect, the present disclosure provides a compound chosen from a compound of Formula (I):

(I)

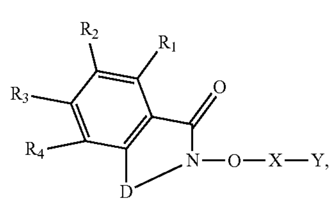

its corresponding compound of Formula (II)

(II)

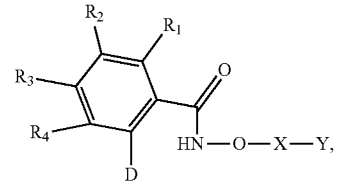

wherein,

X is a $C_1$-$C_6$ alkyl or substituted alkyl;

Y is chosen from Z, L-$R_x$ and L-$S_c$;

Z is absent or chosen from polyethylene glycol (PEG), alkyl, substituted alkyl, alkenyl, substituted alkenyl, alkynyl, substituted alkynyl, carbonyl, aryl, substituted aryl, heteroaryl and substituted aryl;

L is a linker chosen from a single covalent bond, and a moiety comprising a series of covalent bonds and incorporating at least one atom chosen from C, N, O, S and P;

$R_x$ is a reactive group;

$S_c$ is a conjugated substance;

$R_1$, $R_2$, $R_3$, and $R_4$ are each independently chosen from H, alkyl, substituted alkyl, alkenyl, substituted alkenyl, alkynyl, substituted alkynyl, cyano, halo, hydroxy, nitro, sulfo, sulfonyl, sulfonyloxy, thioacyl, thiol, alkylthio, substituted alkylthio, acyl, aryl, substituted aryl, heteroaryl, substituted heteroaryl, cycloalkyl, substituted cycloalkyl, heterocyclyl, substituted heterocyclyl, L-$R_x$ and L-$S_c$; and D is chosen from a xanthene ring and a xanthene ring analog, and salts thereof.

In certain embodiments, L is chosen from polyethylene glycol (PEG), alkyl, substituted alkyl, alkenyl, substituted alkenyl, alkynyl, substituted alkynyl, carbonyl, aryl, substituted aryl, heteroaryl, and substituted aryl.

In certain embodiments, D is a xanthene ring analog chosen from fluoresceins, eosins, rhodamines, Boron-rhodamines (B-rhodamines), Carbon-rhodamines (C-rhodamines), Silicon-rhodamines (Si-rhodamines), Germanium-rhodamines (Ge-rhodamines), Tin-rhodamines (Sn-rhodamines), Nitrogen-rhodamines (N-rhodamines), Phosphorous-rhodamines (P-rhodamines), Sulfur-rhodamines (S-rhodamines), Selenium-rhodamines (Se-rhodamines), Tellurium-rhodamines (Te-rhodamines), hybrid rhodamines, and asymmetrical rhodamines.

In certain embodiments, D is chosen from

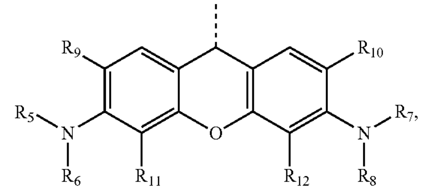

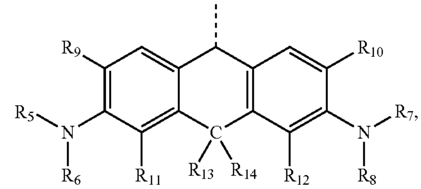

-continued

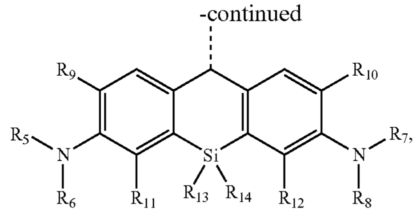

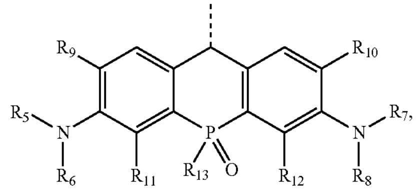

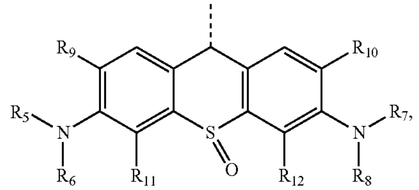

and

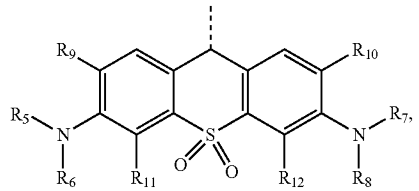

wherein $R_5$, $R_6$, $R_7$ and $R_8$ are each independently chosen from H, alkyl, substituted alkyl, alkenyl, substituted alkenyl, alkynyl, substituted alkynyl, aryl, substituted aryl, heteroaryl, substituted heteroaryl, cycloalkyl, substituted cycloalkyl, heterocyclyl, substituted heterocyclyl, L-$R_x$ and L-$S_c$; and $R_9$, $R_{10}$, $R_{11}$, $R_{12}$, $R_{13}$ and $R_{14}$ are each independently chosen from H, alkyl, substituted alkyl, alkenyl, substituted alkenyl, alkynyl, substituted alkynyl, alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, carboxyl, carboxyl ester, (carboxyl ester)amino, (carboxyl ester)oxy, cyano, halo, hydroxy, nitro, sulfo, sulfonyl, sulfonyloxy, thioacyl, thiol, alkylthio, substituted alkylthio, aryl, substituted aryl, heteroaryl, substituted heteroaryl, cycloalkyl, substituted cycloalkyl, heterocyclyl, substituted heterocyclyl, L-$R_x$ and L-$S_c$; or $R_8$ is taken together with $R_{12}$ and the atoms to which they are attached to form an optionally substituted fused ring;

or $R_9$ is taken together with $R_5$ and the atoms to which they are attached to form an optionally substituted fused ring;

or $R_{10}$ is taken together with $R_7$ and the atoms to which they are attached to form an optionally substituted fused ring;

or $R_{11}$ is taken together with $R_6$ and the atoms to which they are attached to form an optionally substituted fused ring.

In certain embodiments, D is chosen from

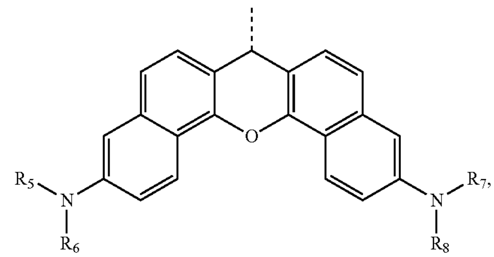

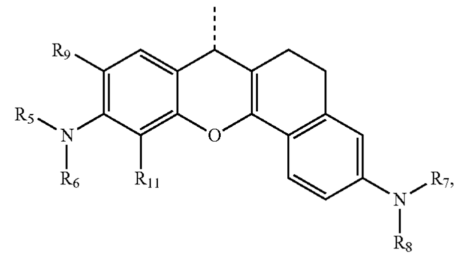

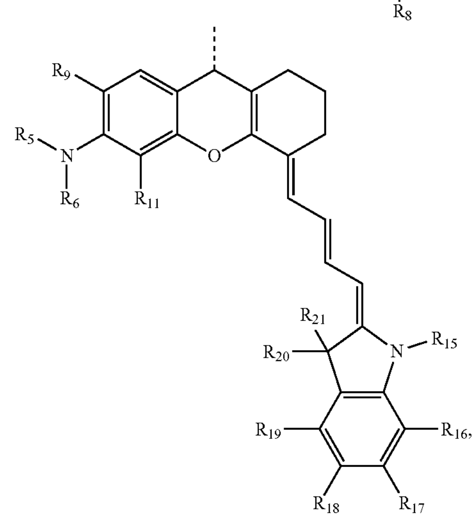

and

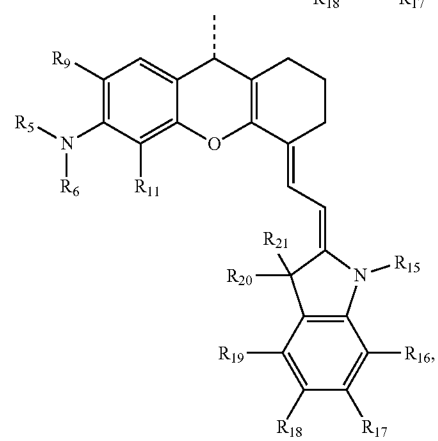

wherein $R_5$, $R_6$, $R_7$ and $R_8$ are each independently chosen from H, alkyl, substituted alkyl, alkenyl, substituted alkenyl, alkynyl, substituted alkynyl, aryl, substituted aryl, heteroaryl, substituted heteroaryl, cycloalkyl, substituted cycloalkyl, heterocyclyl, substituted heterocyclyl, L-$R_x$ and L-$S_c$; and $R_9$, $R_{11}$, $R_{15}$, $R_{16}$, $R_{17}$, $R_{18}$, $R_{19}$, $R_{20}$ and $R_{21}$ are each independently chosen from H, alkyl, substituted alkyl, alkenyl, substituted alkenyl, alkynyl, substituted alkynyl, alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, carboxyl, carboxyl ester, (carboxyl ester)amino, (carboxyl ester)oxy, cyano, halo, hydroxy, nitro, sulfo, sulfonyl, sulfonyloxy, thioacyl, thiol, alkylthio, substituted alkylthio, aryl, substituted aryl, heteroaryl, substituted heteroaryl, cycloalkyl, substituted cycloalkyl, heterocyclyl, substituted heterocyclyl, L-$R_x$ and L-$S_c$.

In certain embodiments, the compound is chosen from

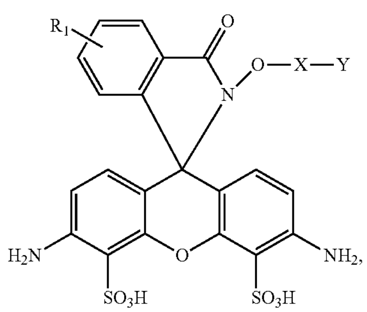

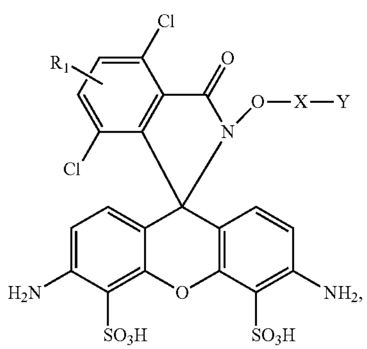

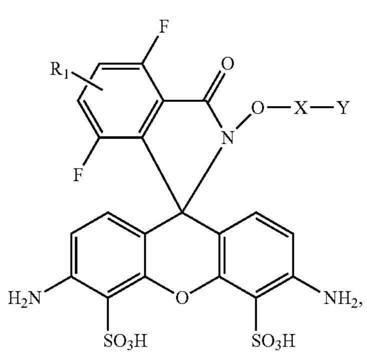

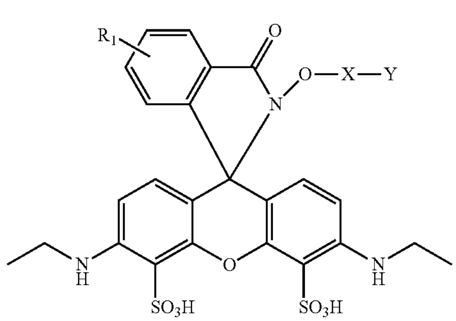
,

-continued

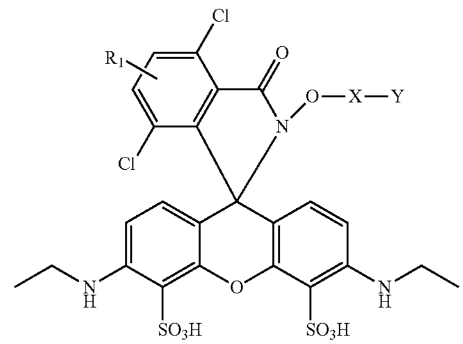
,

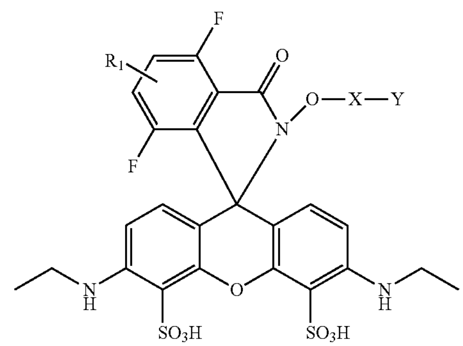
,

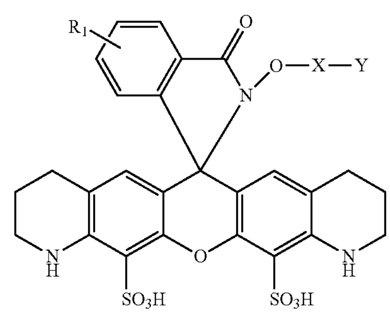
,

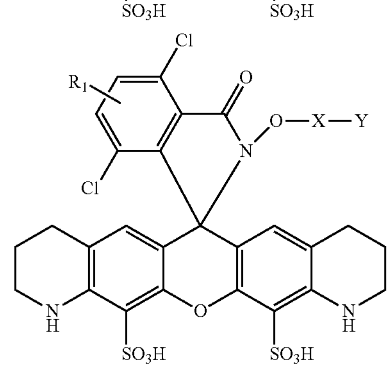
,

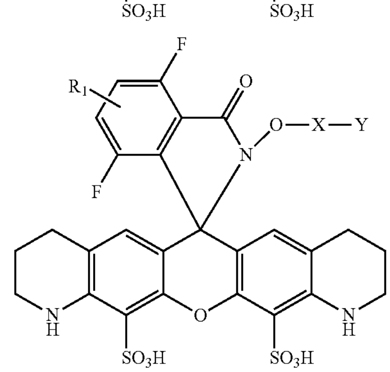
,

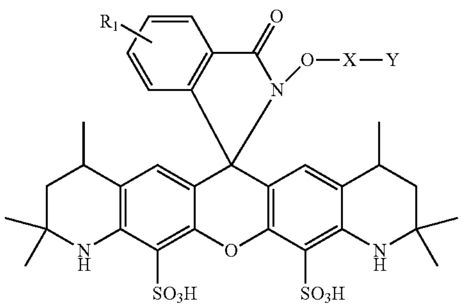
,
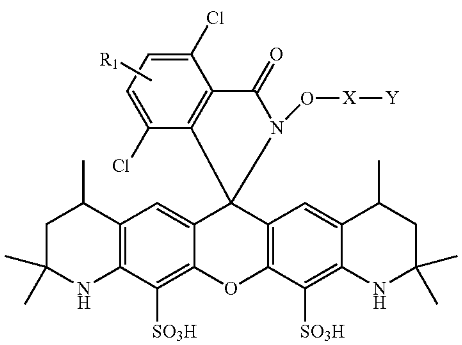
,
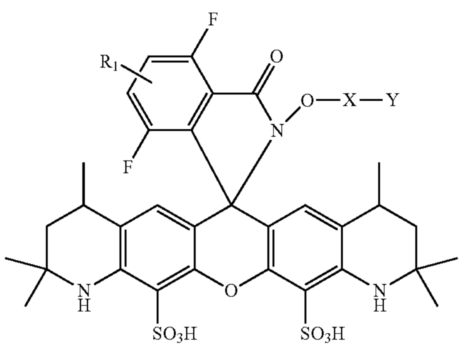
,
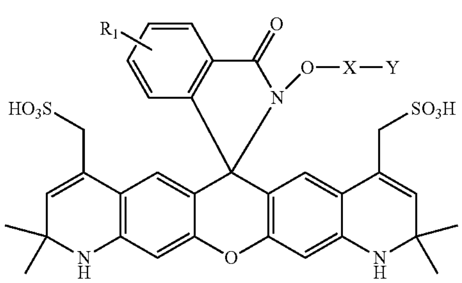
,
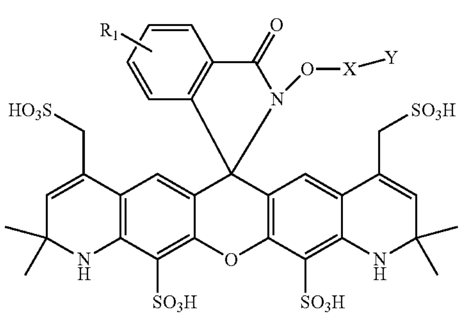
,
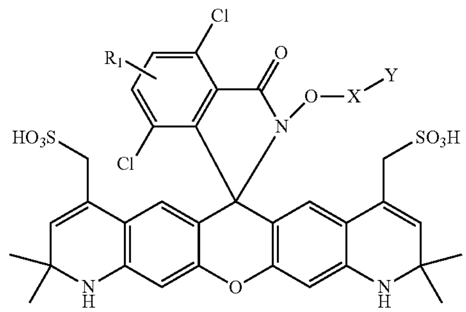
,
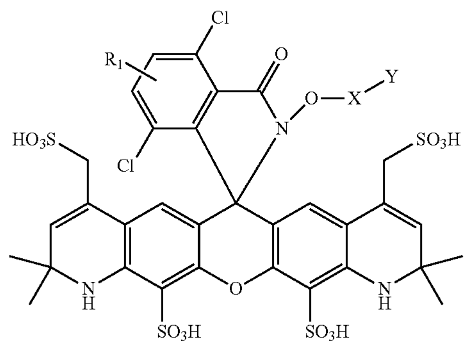
,
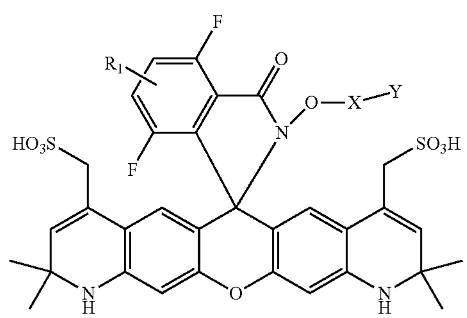
,
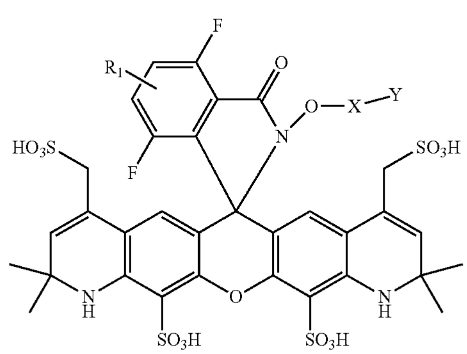
,
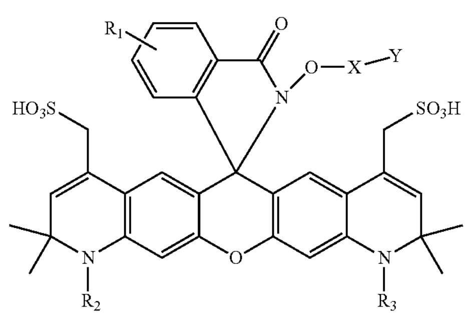
, -continued
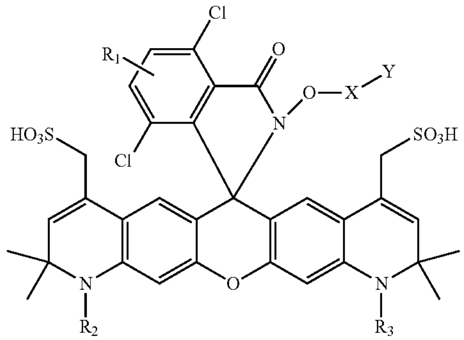
,
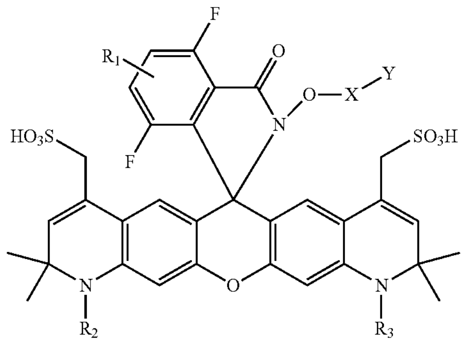
,
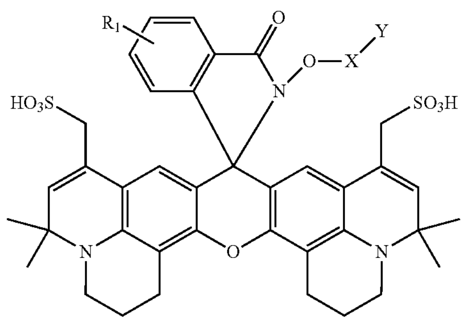
,
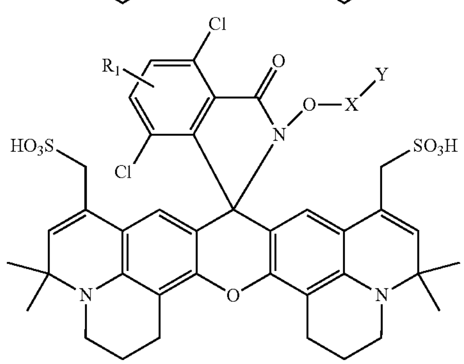
,
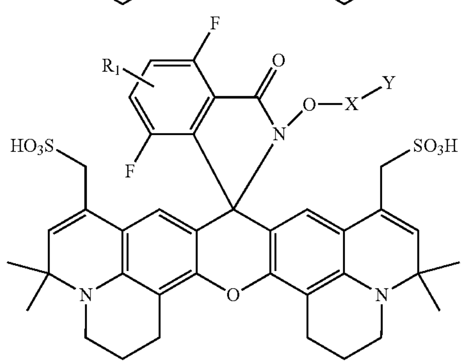
,
-continued
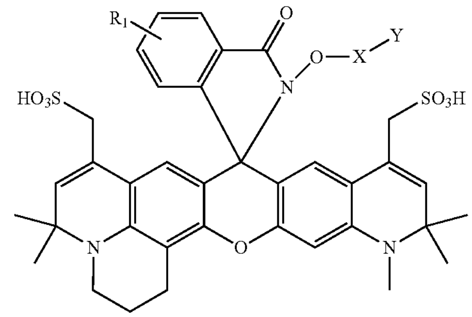
,
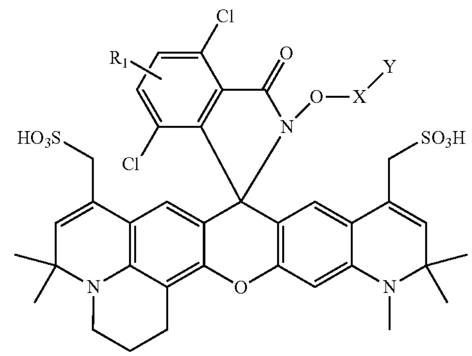
,
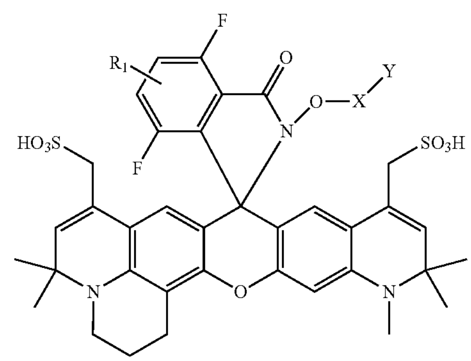
,
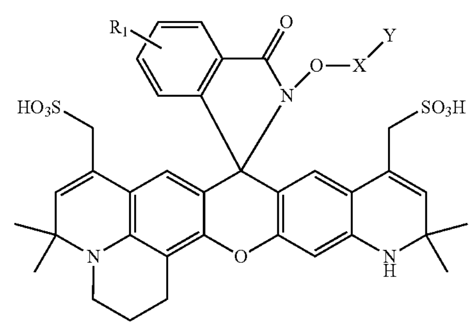
,
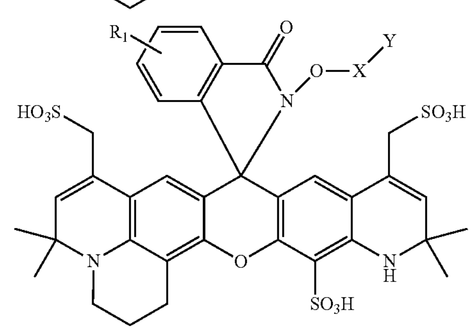
, -continued
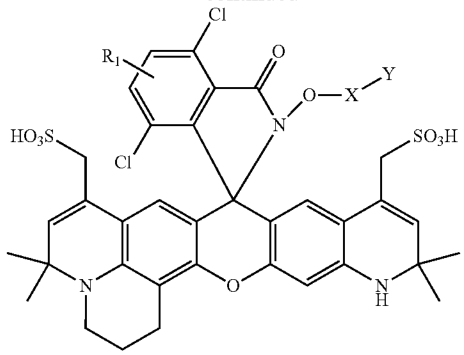
,
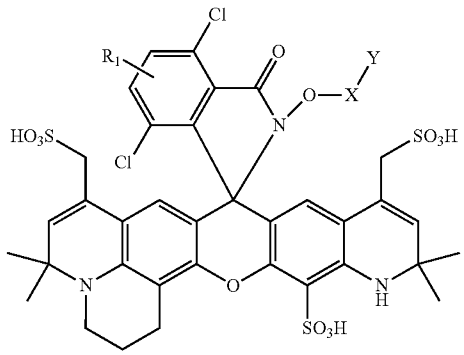
,
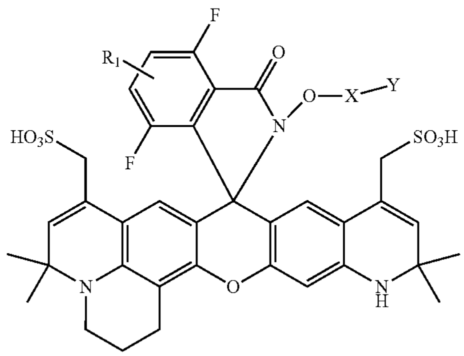
,
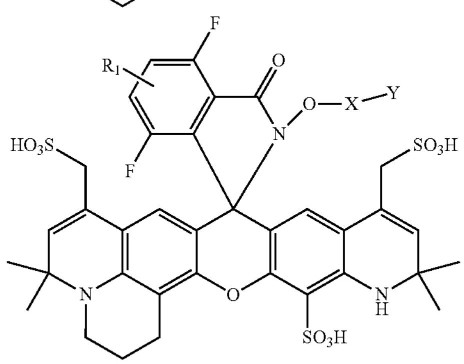
,
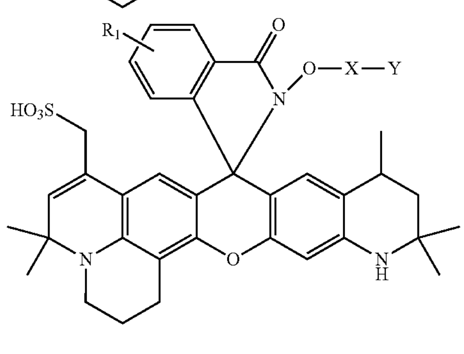
,
-continued
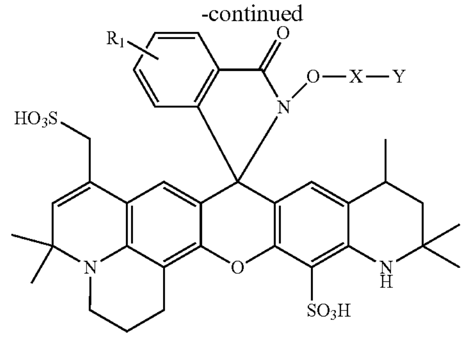
,
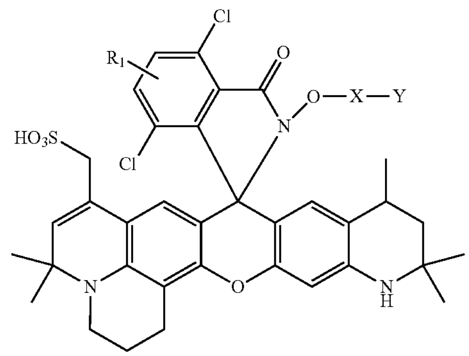
,
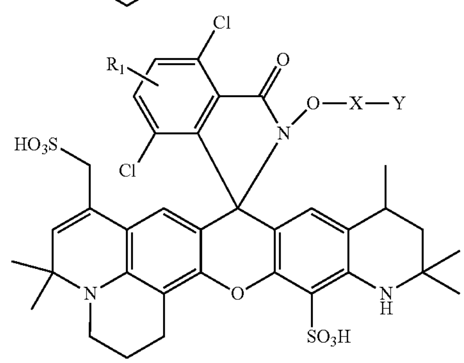
,
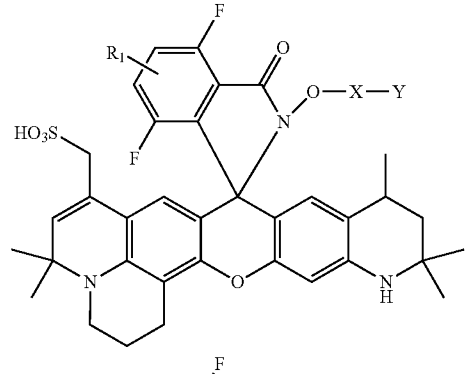
,
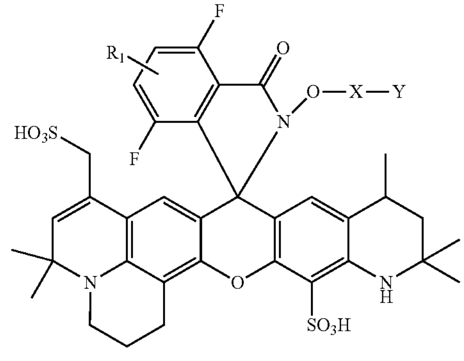
, -continued
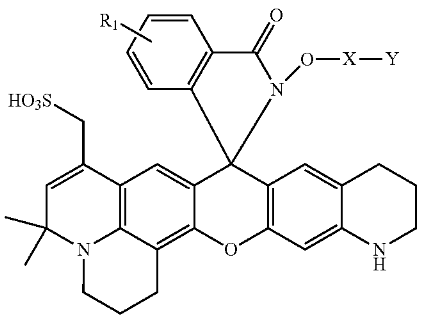
,
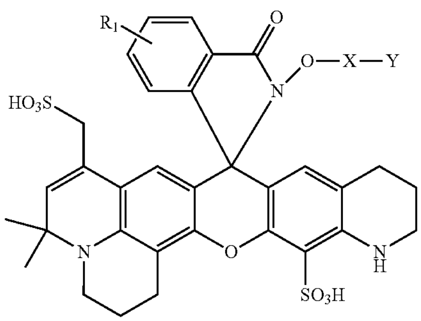
,
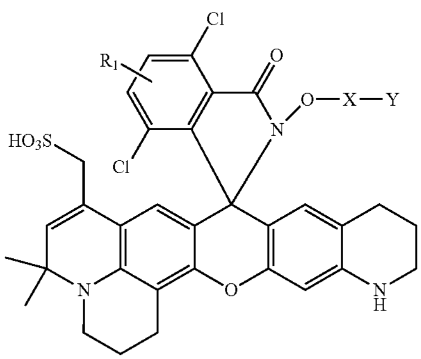
,
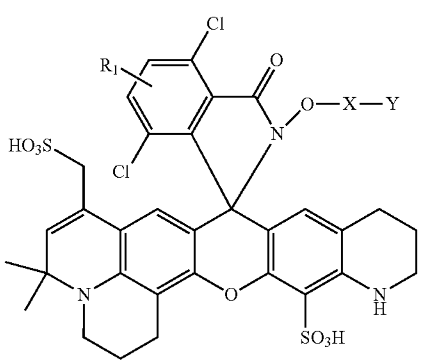
,
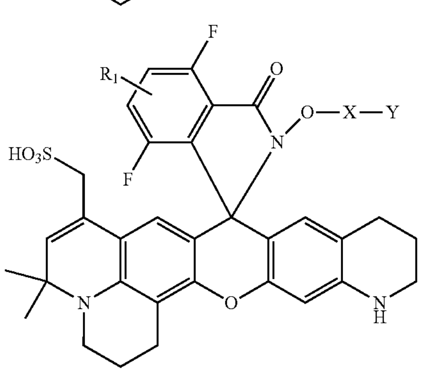
,
-continued
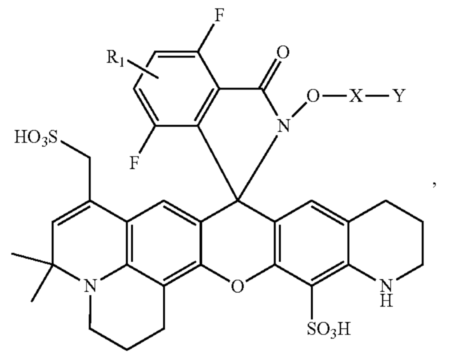
,
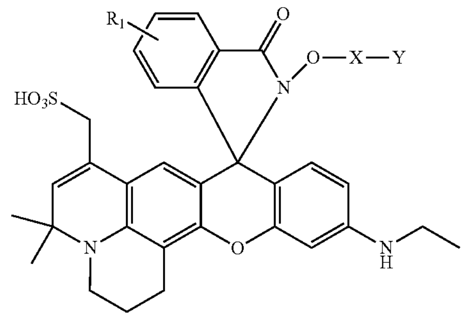
,
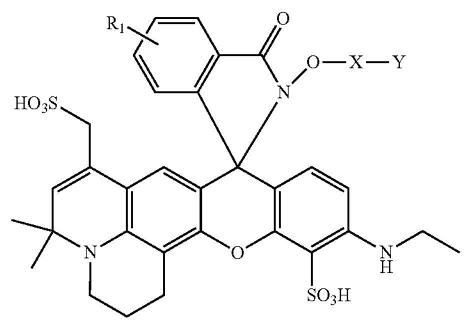
,
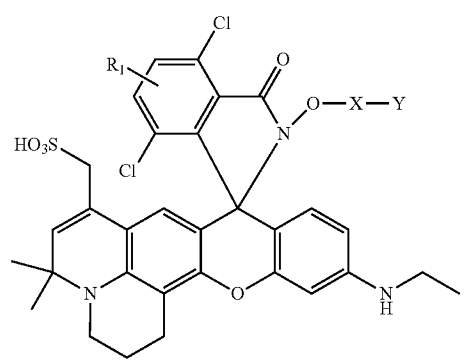
,
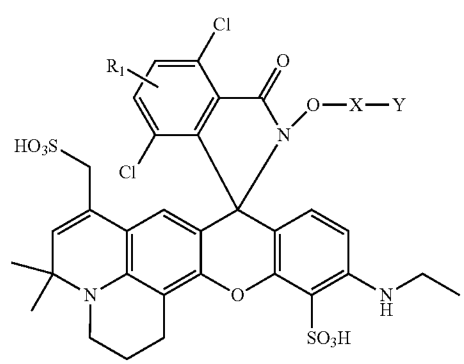
, -continued
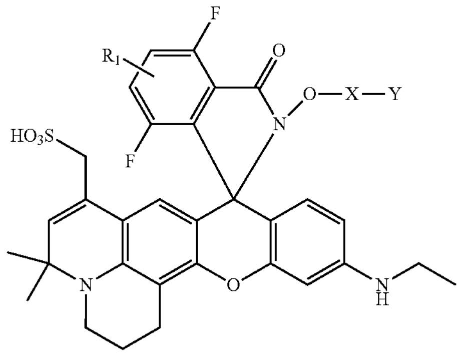
,
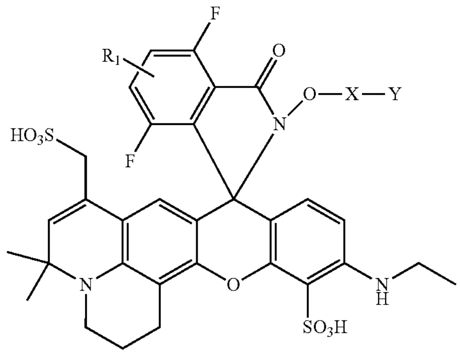
,
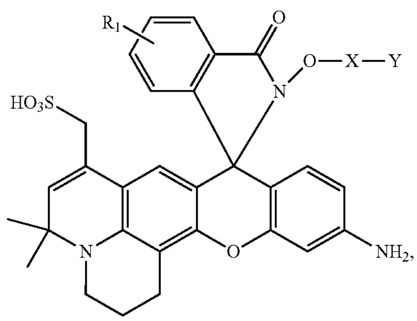
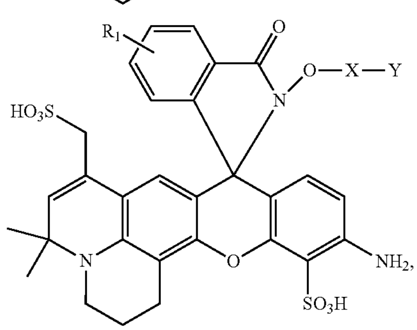
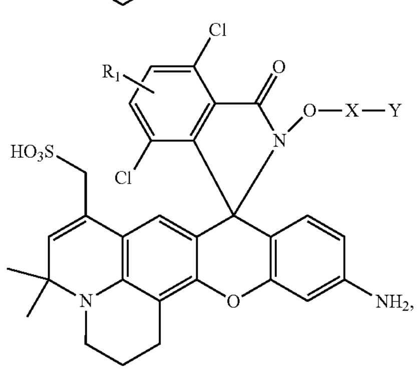
-continued
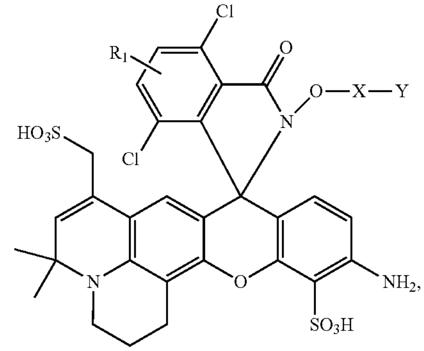
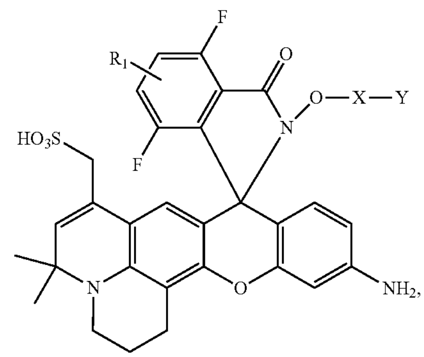
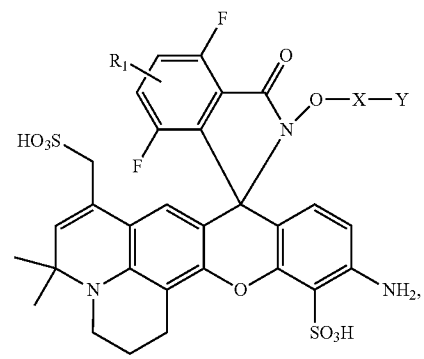
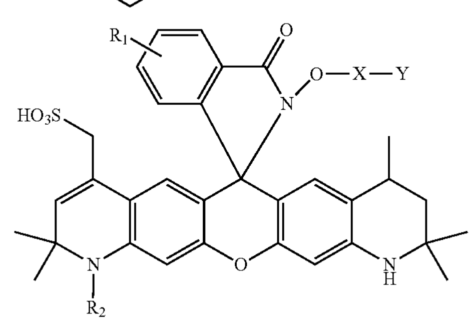
,
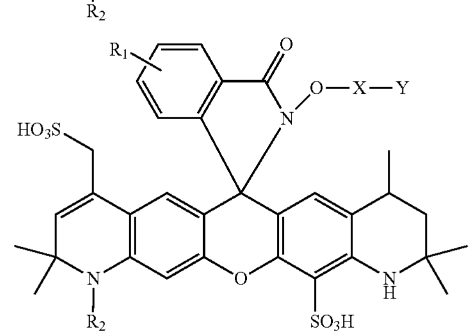
, -continued
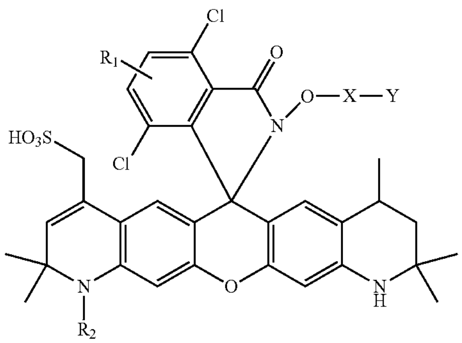,
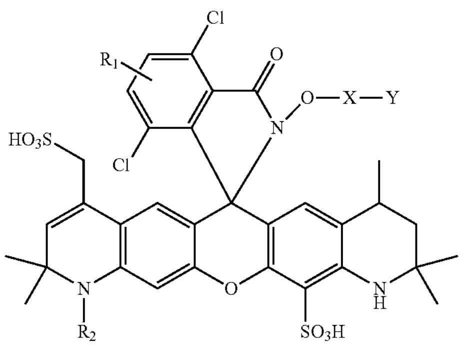,
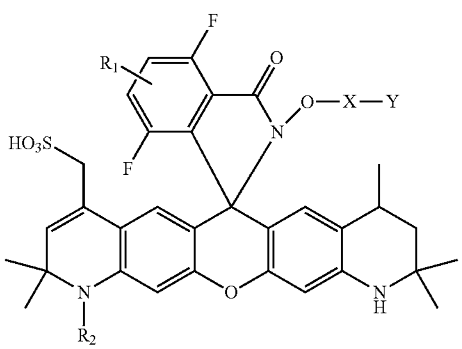,
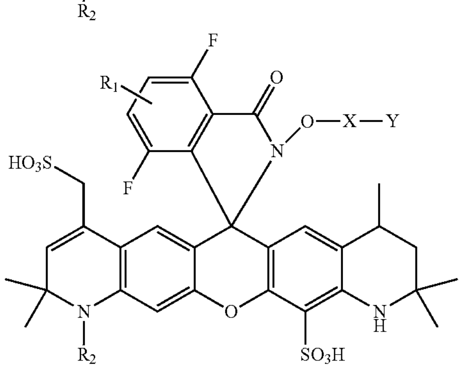,
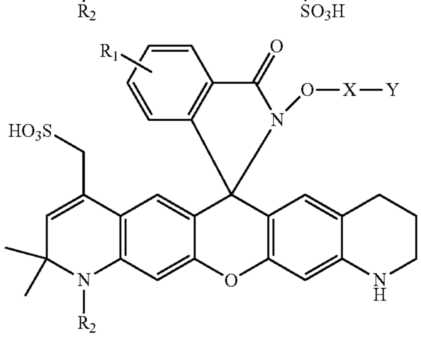,
-continued
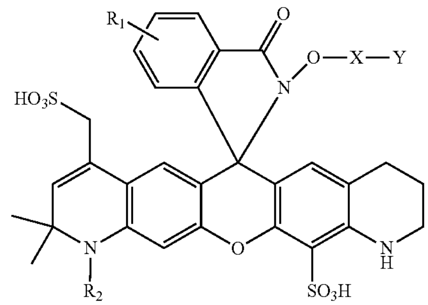,
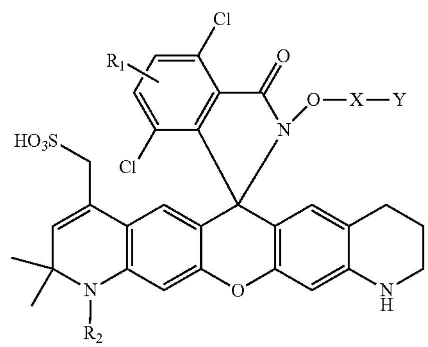,
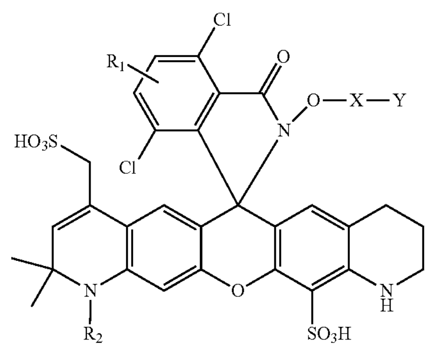,
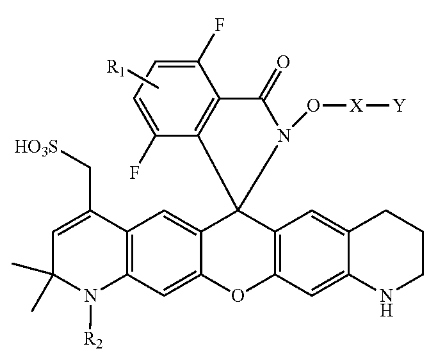,
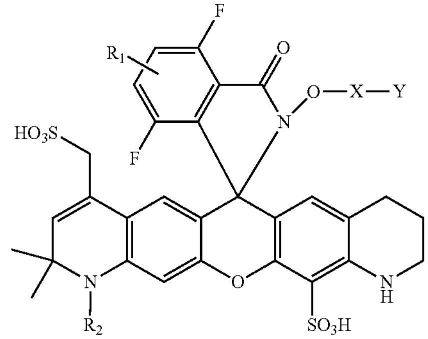, -continued
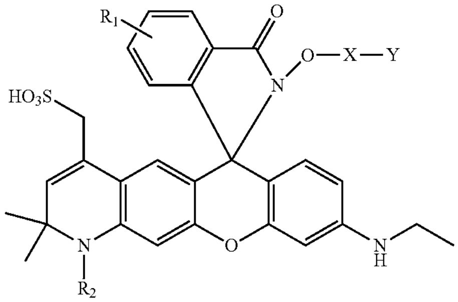
,
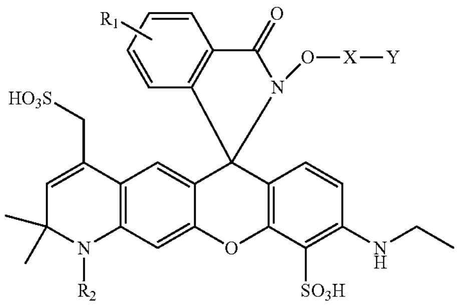
,
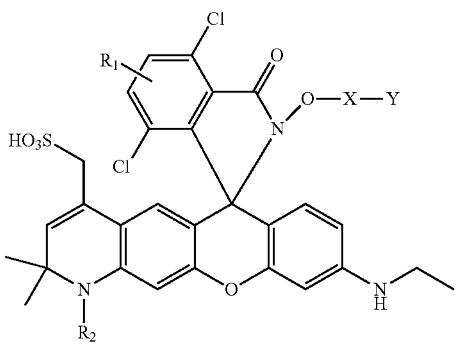
,
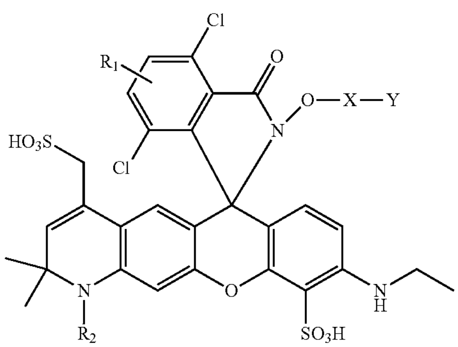
,
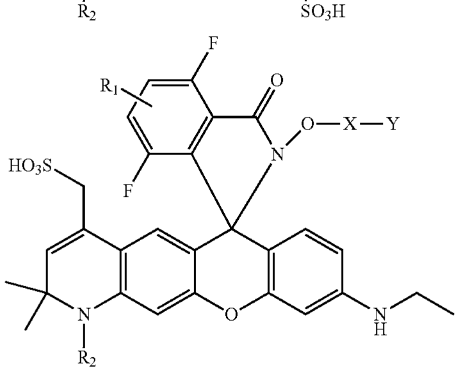
,
-continued
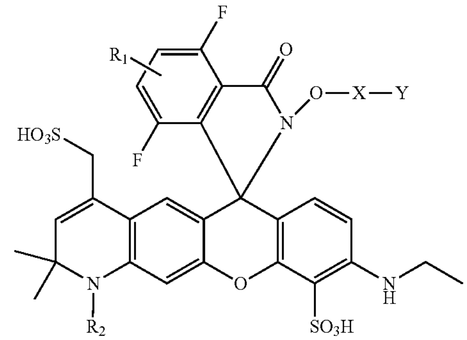
,
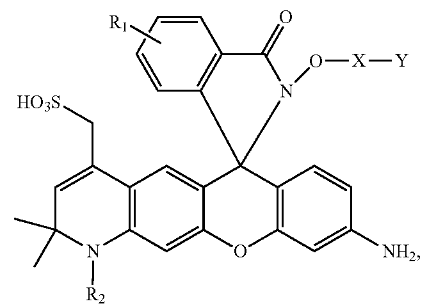
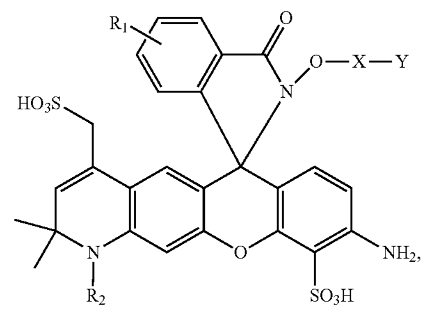
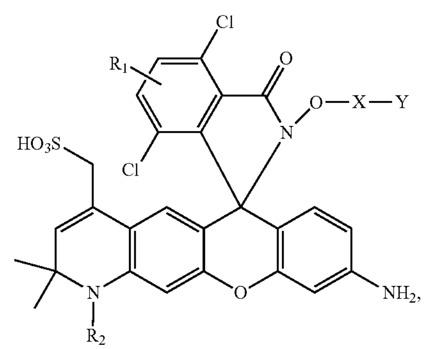
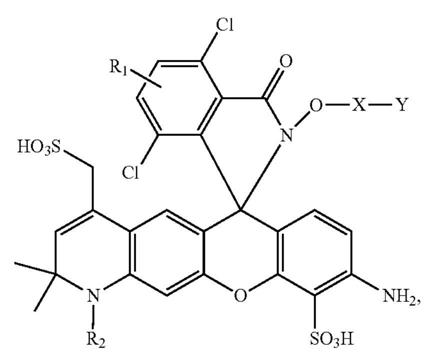

-continued
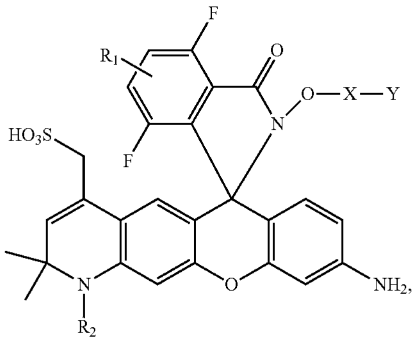
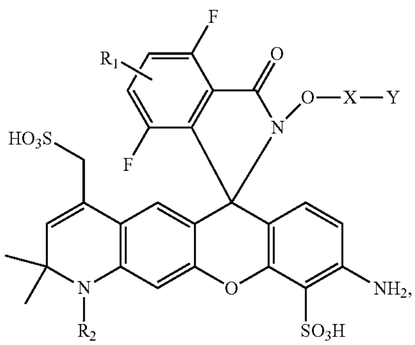
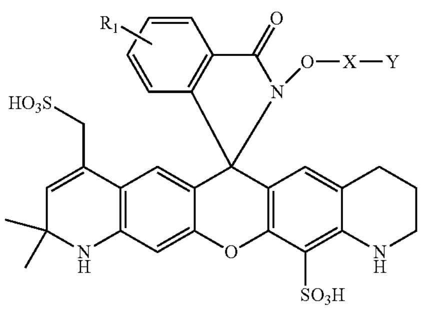
,
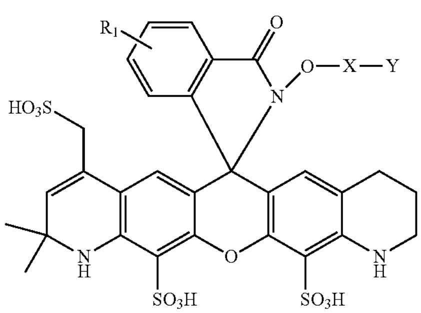
,
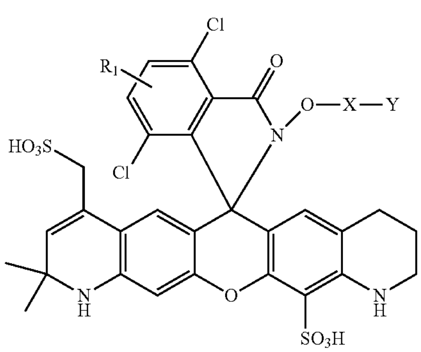
,
-continued
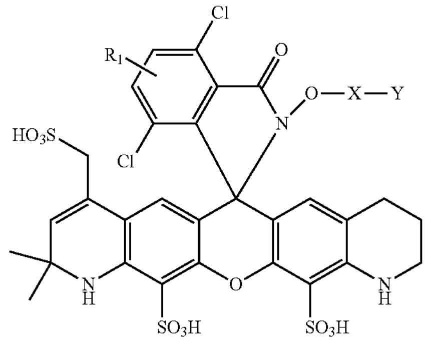
,
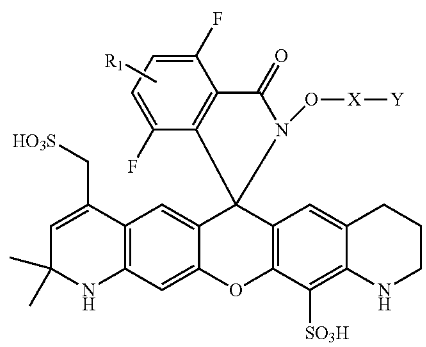
,
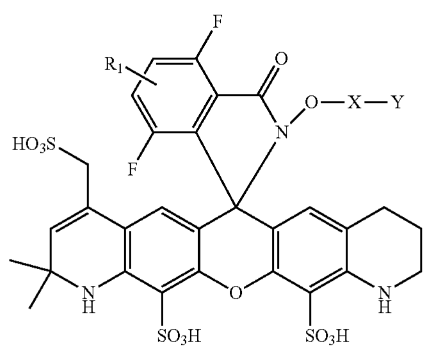
,
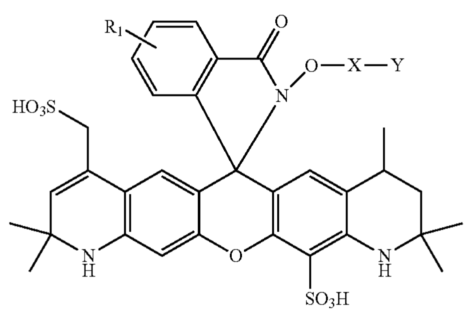
,
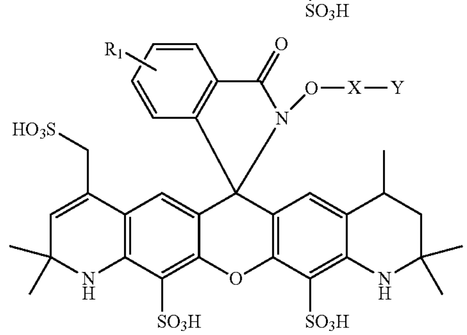
, -continued
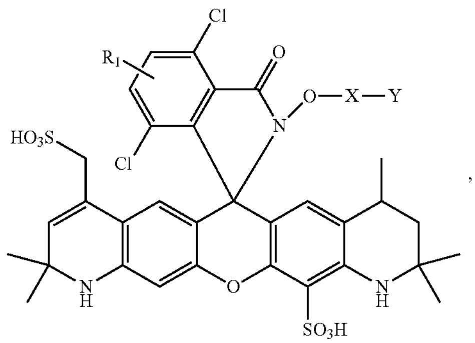
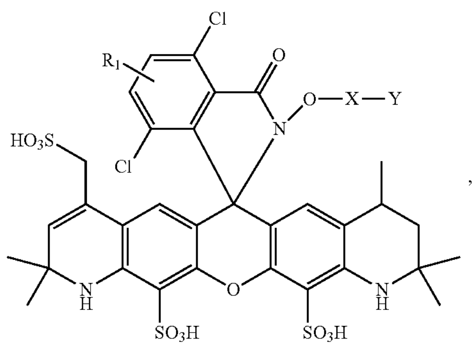
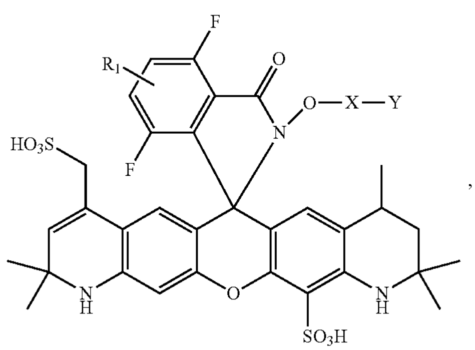
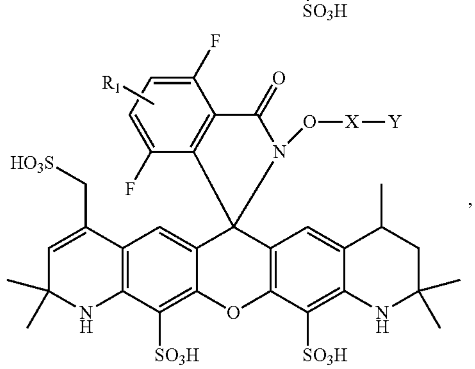
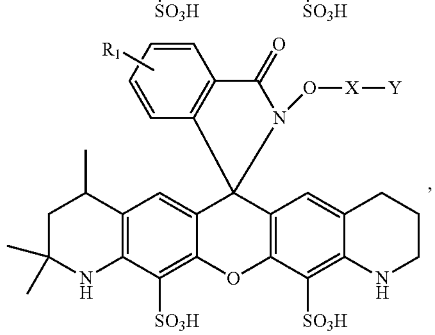
-continued
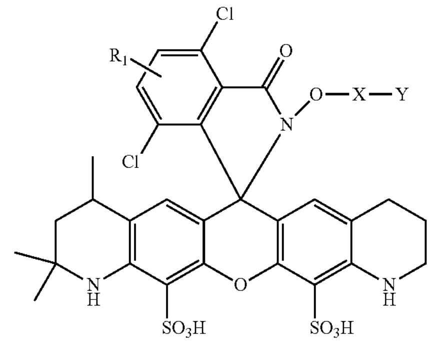
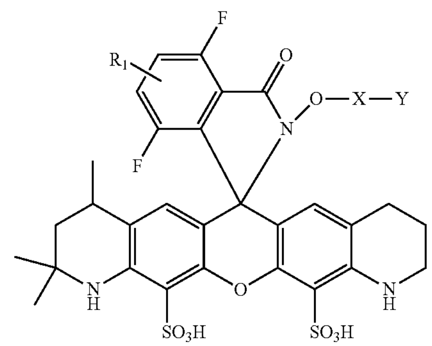
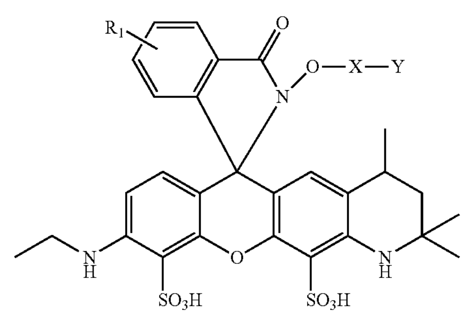
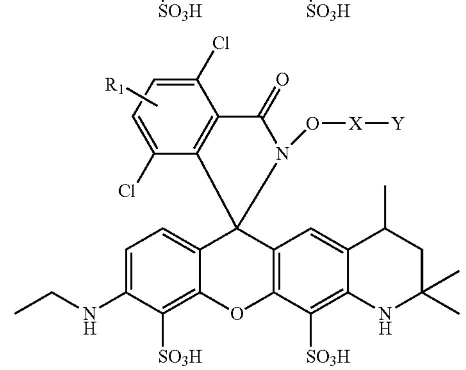
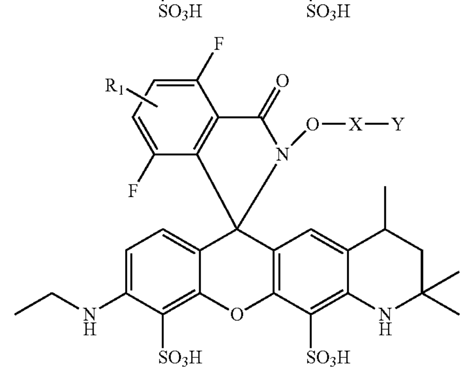

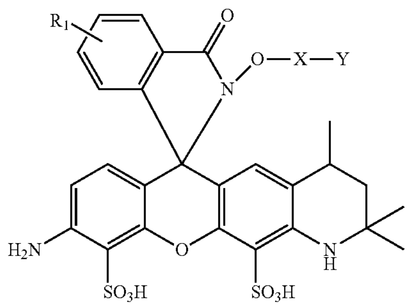
,
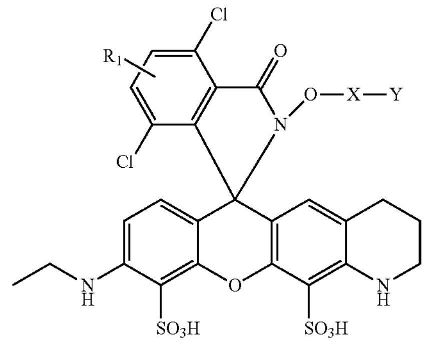
,
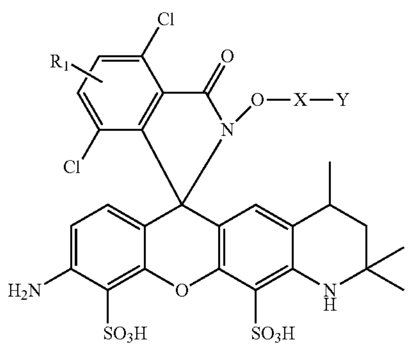
,
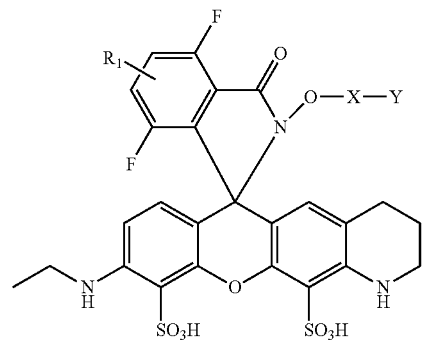
,
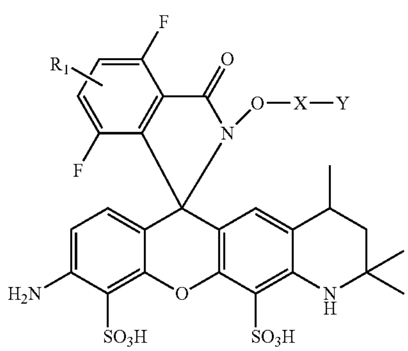
,
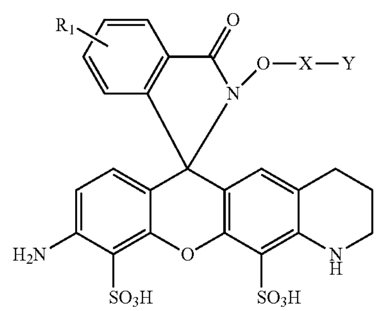
,
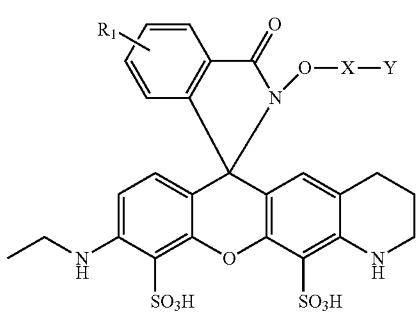
,
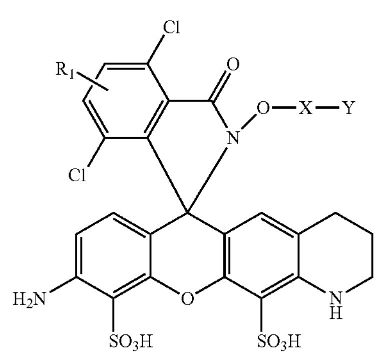
, -continued
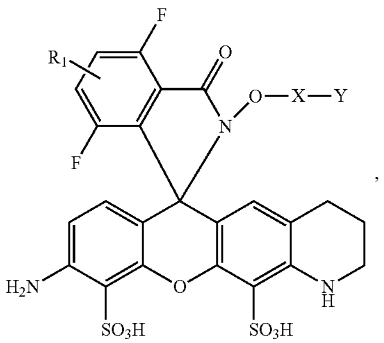
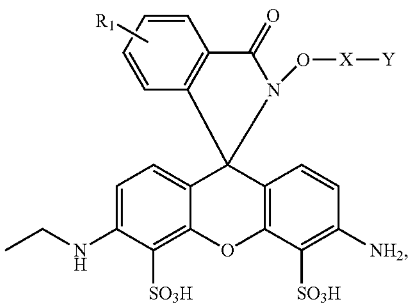
-continued
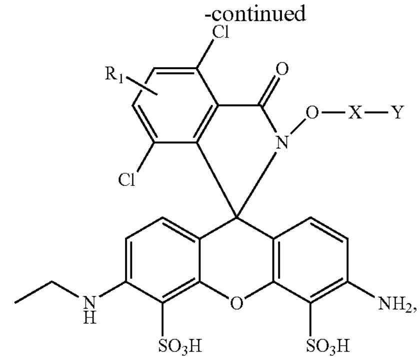
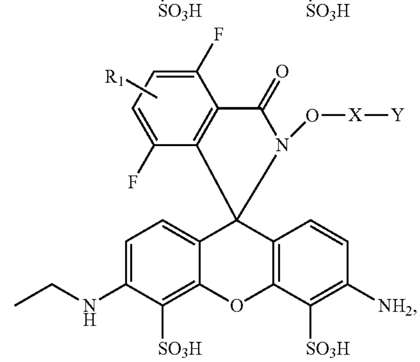
and salts thereof.
In certain embodiments, the O—X—Y group is chosen from
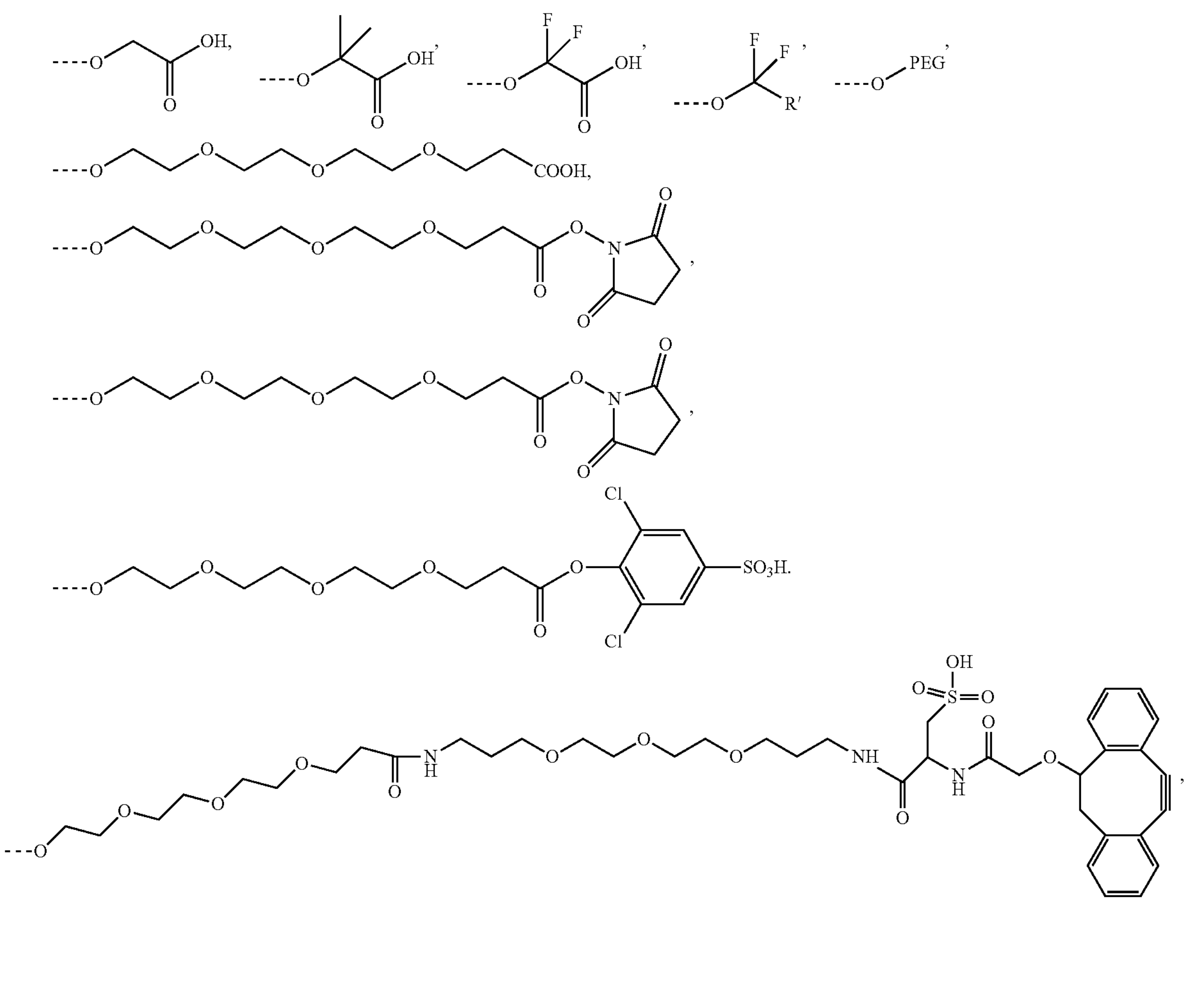

-continued

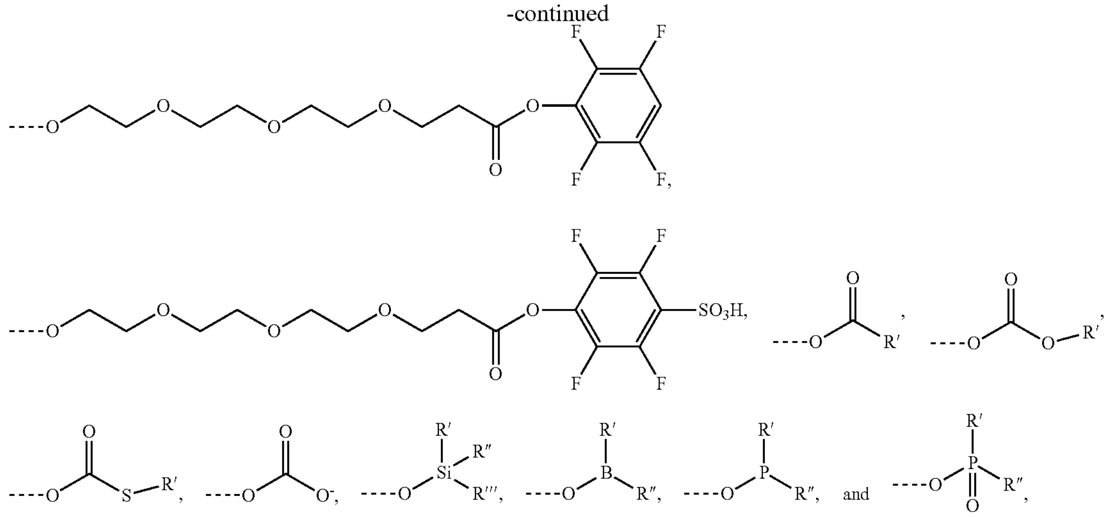

wherein

R', R" and R'" are each independently chosen from H, polyethylene glycol (PEG), alkyl, substituted alkyl, alkenyl, substituted alkenyl, alkynyl, substituted alkynyl, carbonyl, aryl, heteroaryl, heteroatom, =O, =NH, =S, and lone pair electrons.

In certain embodiments, $R_x$ is chosen from an acrylamide, a carboxylic acid, an activated ester of a carboxylic acid, an acyl azide, an acyl halide, hydroxy, an aldehyde, an alkyl halide, a sulfonate, an amine, an anhydride, an aniline, an aryl halide, an azide, an aziridine, a boronate, a carbodiimide, a diazoalkane, an epoxide, a glycol, a haloacetamide, a halomethyl, a halotriazine, a hydrazine, a hydroxylamine, an imido ester, an iodoacetamide, an isothiocyanate, a ketone, a maleimide, a sulfonyl halide, a thiol group, a succinimidyl ester, a substituted succinimidyl ester, a sulfo-succinimidyl ester, a reactive phenyl ester, a dibromophenyl ester, a nitrophenyl ester, a sulfodichlorophenyl ester, a sulfotetrafluorophenyl ester, a tetrafluorophenyl ester, a pentafluorophenyl ester, a thiophenyl ester, a substituted thiophenyl ester, a nitrilotriacetic acid, an isocyanate, a cyanate, an aminodextran, an acetoxymethyl ester, and a DIBO-amine.

In certain embodiments, $S_c$ is chosen from a biomolecule and a solid support.

In certain embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, a virus, and a virus-like particle.

In certain embodiments, the solid support is chosen from an aerogel, a hydrogel, a resin, a silica gel, a bead, a biochip, a microfluidic chip, a silicon ship, a multi-well plate, a membrane, a polymeric membrane, a particle, a derivatized plastic film, a glass bead, cotton, a plastic bead, alumina gel, polysaccharide, poly(acrylate), polystyrene, poly(acrylamide), polyol, agarose, agar, cellulose, dextran, starch, heparin, glycogen, amylopectin, mannan, inulin, nitrocellulose, diazocellulose, polyvinylchloride, polypropylene, polyethylene, nylon, latex bead, a conducting metal, a nonconducting metal, glass, a quantum dot, a nanocrystal, a nanoparticle, a nanotube, a carbon nanotube, graphene, a magnetic bead, a paramagnetic bead, a superparamagnetic bead, and a magnetic support.

In certain embodiments, the compound is a salt.

In certain embodiments, the compound is chosen from

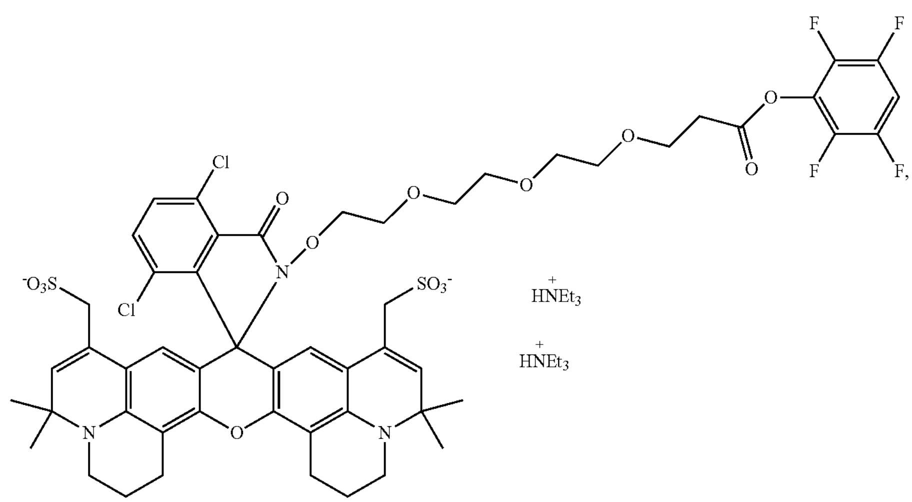

-continued
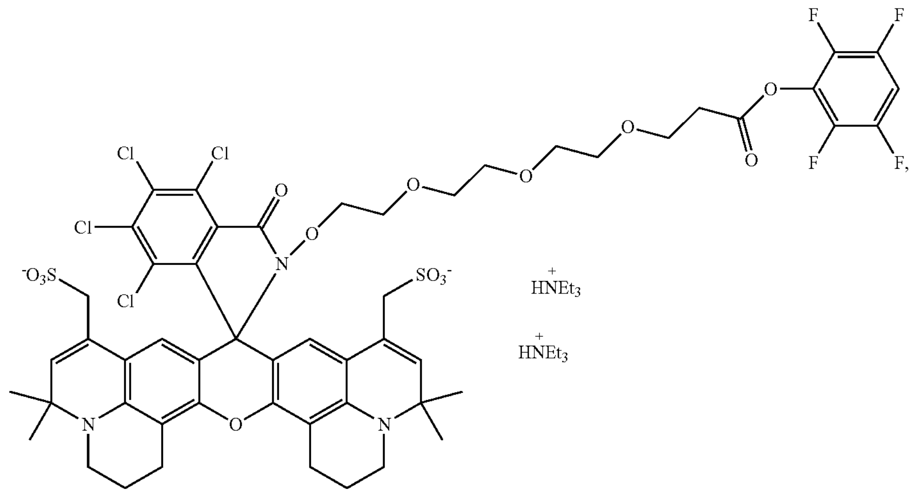
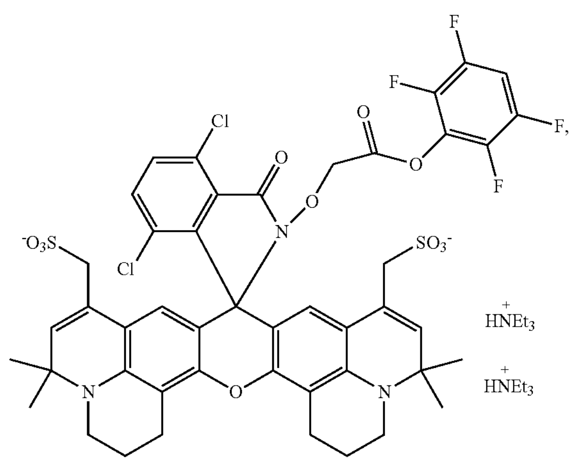
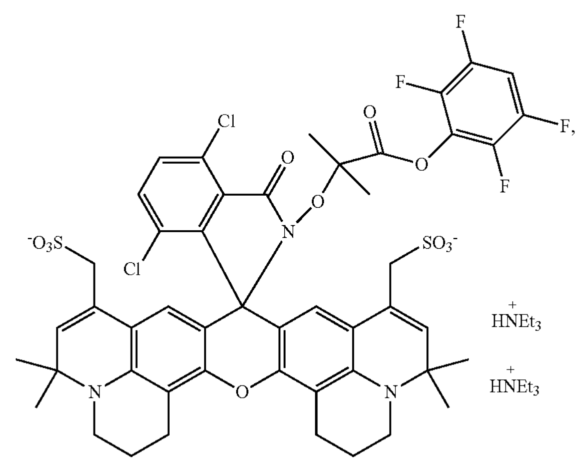
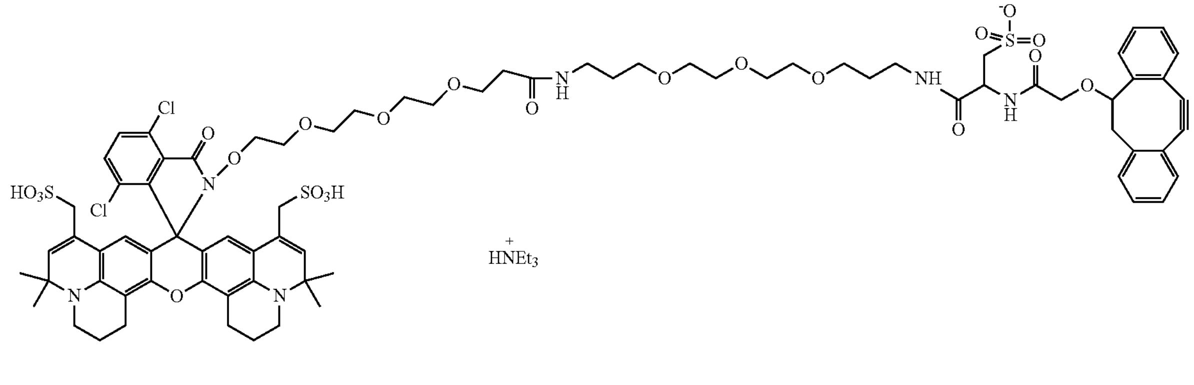

-continued

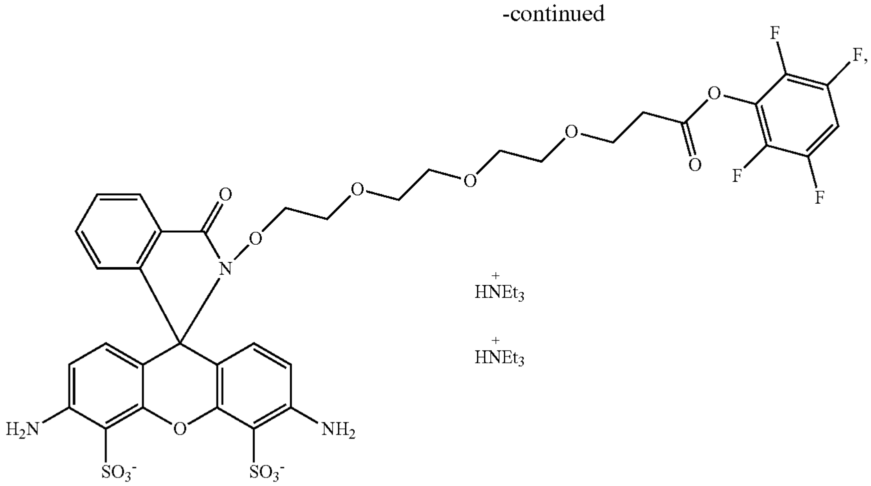

and

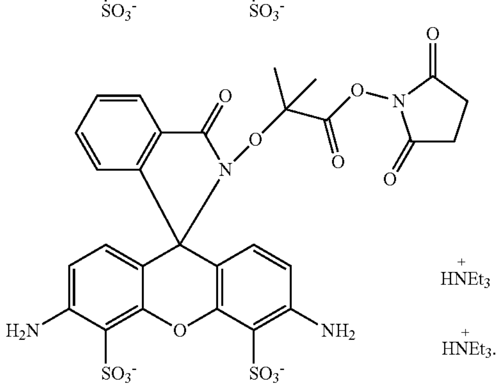

In another aspect, the present disclosure provides a method for determining the pH of a sample, the method comprising:

(a) contacting the sample with a compound of the present disclosure to form a contacted sample;

(b) illuminating the contacted sample to form an illuminated sample; and (c) detecting fluorescent emissions from the illuminated sample;

wherein the fluorescent emissions are used to determine the pH of the illuminated sample.

In certain embodiments, the sample is chosen from live cells, intracellular fluids, extracellular fluids, sera, biological fluids, biological fermentation media, environmental samples, industrial samples, viruses, proteins, peptides, buffer solutions, blood cells, immune cells, cultured cells, muscle tissue, neurons, extracellular vesicles, vascular tissue, blood fluids, saliva, urine, water, soil, waste water, sea water, pharmaceuticals, foodstuffs, and beverages.

In certain embodiments, the sample is immobilized on a quantum dot, a nanocrystal, a nanoparticle, a nanotube, a carbon nanotube, graphene, a polymeric membrane, within a polymeric gel, on a microparticle, on a microarray, on a silicon chip, on a glass slide, on a microwell plate, or on a microfluidic chip.

In certain embodiments, the method further comprises incubating the contacted sample prior to illuminating the contacted sample.

In certain embodiments, the contacting step further comprises contacting the sample with a compound having a different fluorescent emission spectrum from the compound and a different pKa from the compound.

In another aspect, the present disclosure provides a method for monitoring the pH inside a live cell, the method comprising:

(a) contacting the cell with a compound of the present disclosure to form a contacted cell;

(b) illuminating the contacted cell to form an illuminated cell; and (c) detecting fluorescent emissions from the illuminated cell, wherein the fluorescent emissions are used to monitor the pH inside the cell.

In certain embodiments, a change in the pH inside the cell corresponds to a cellular process.

In certain embodiments, the compound has a $S_c$ chosen from an antibody, a virus, a virus-like particle, a protein, a nucleic acid, and a lipid.

In certain embodiments, the method further comprises incubating the contacted cell prior to illuminating the contacted cell.

In another aspect, the present disclosure provides a method for detecting phagocytosis of a biomolecule in solution, the method comprising:

(a) contacting a compound according to the present disclosure wherein $S_c$ is a biomolecule with a cell to form a contacted cell;

(b) illuminating the contacted cell to form an illuminated cell; and (c) detecting fluorescent emissions from the illuminated cell;

wherein fluorescent emissions indicate phagocytosis of the biomolecule.

In certain embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, and virus-like particle.

In certain embodiments, the biomolecule is an *E. coli* bioparticle.

In certain embodiments, the method further comprises incubating the contacted cell prior to illuminating the contacted cell.

In another aspect, the present disclosure provides a method for detecting a pH related intracellular process, the method comprising:

(a) contacting a compound of the present disclosure with a cell to form a contacted cell;
(b) illuminating the contacted cell to form an illuminated cell; and
(c) detecting fluorescent emissions from the illuminated cell;

wherein increased fluorescent emissions indicate activation of the intracellular process.

In certain embodiments, the intracellular process is opening of an ion channel.

In certain embodiments, the ion channel is chosen from a calcium channel, a potassium channel, a sodium channel, a proton channel, a non-selective cation channel, a cyclic nucleotide-gated channel, and an ATP-gated channel.

In certain embodiments, the method further comprises incubating the contacted cell prior to illuminating the contacted cell.

In another aspect, the present disclosure provides a method for monitoring internalization of a biomolecule, the method comprising:

(a) contacting a compound of the present disclosure wherein $S_c$ is a biomolecule with a cell to form a contacted cell;
(b) illuminating the contacted cell to form an illuminated cell; and
(c) detecting fluorescent emissions from the illuminated cell;

wherein fluorescent emissions indicate internalization of the compound.

In certain embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, and virus-like particle.

In certain embodiments, the biomolecule is an antibody.

In certain embodiments, the method further comprises incubating the contacted cell prior to illuminating the contacted cell.

In another aspect, the present disclosure provides a method for monitoring internalization of a receptor, the method comprising:

(a) contacting a compound of the present disclosure wherein $S_c$ is a biomolecule that binds to a receptor with a cell to form a contacted cell;
(b) illuminating the contacted cell to form an illuminated cell; and
(c) detecting fluorescent emissions from the illuminated cell;

wherein fluorescent emissions indicate internalization of the receptor.

In certain embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, and virus-like particle.

In certain embodiments, the method further comprises incubating the contacted cell prior to illuminating the contacted cell.

In another aspect, the present disclosure provides a method for analyzing kinetics of migration of a species through a cell or cellular compartment, the method comprising:

(a) contacting a compound of the present disclosure wherein the R group is L-$S_c$ with a cell to form a contacted cell;
(b) illuminating the contacted cell to form an illuminated cell; and
(c) detecting fluorescent emissions from the illuminated cell over a time interval.

In certain embodiments, the method further comprises incubating the contacted cell prior to illuminating the contacted cell.

In another aspect, the present disclosure provides a method of labeling a cell or cellular compartment, the method comprising:

(a) contacting a sample containing one or more cells with a compound of the present disclosure to form a contacted sample;
(b) illuminating the contacted sample to form an illuminated sample; and
(c) detecting the fluorescent emissions from the illuminated sample.

In certain embodiments, the method further comprises incubating the contacted sample prior to illuminating the contacted sample.

In another aspect, the present disclosure provides a composition comprising: (a) a compound of the present disclosure; and (b) a biomolecule.

In certain embodiments, the biomolecule is chosen from a cell, protein, antibody, antibody fragment, receptor, lipid, virus, virus-like particle, nucleic acid, and an aptamer.

In certain embodiments, the biomolecule is a cell and the compound is located inside the cell.

In another aspect, the present disclosure provides a kit comprising: (a) a compound of the present disclosure; and (b) instructions for use according to any of the methods provided herein.

In certain embodiments, the kit further comprises at least one of the following: a buffering agent, a purification medium, a vial comprising the sample, and an organic solvent.

In another aspect, the present disclosure provides for the use of a compound of the present disclosure as a pH sensor, optionally for use in or with a living cell or in a sample comprising or suspected of comprising a biological entity or substance, such as a live cell, intracellular fluid, extracellular fluid, body fluid, serum, fermentation medium, cell culture, or tissue.

In another aspect, the present disclosure provides for the use of a compound of the present disclosure in a bioassay.

Additional objects and advantages will be set forth in part in the description which follows, and in part will be understood from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

The accompanying drawings, which are incorporated in and constitute a part of this specification, illustrate several embodiments and together with the description, serve to explain the principles described herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

In FIG. 25B, left side is control cells and right side is OCC occluded graph. CD11b-AF488-A is fluorescence intensity corresponding to CD11b markers on cell surface from treatment with ALEXA FLUOR 488-conjugated HERCEPTIN.

In FIG. 38B (graph on the right), red=cytochalasin; blue=bafilomycin; green=control.

DETAILED DESCRIPTION

Figure 1:
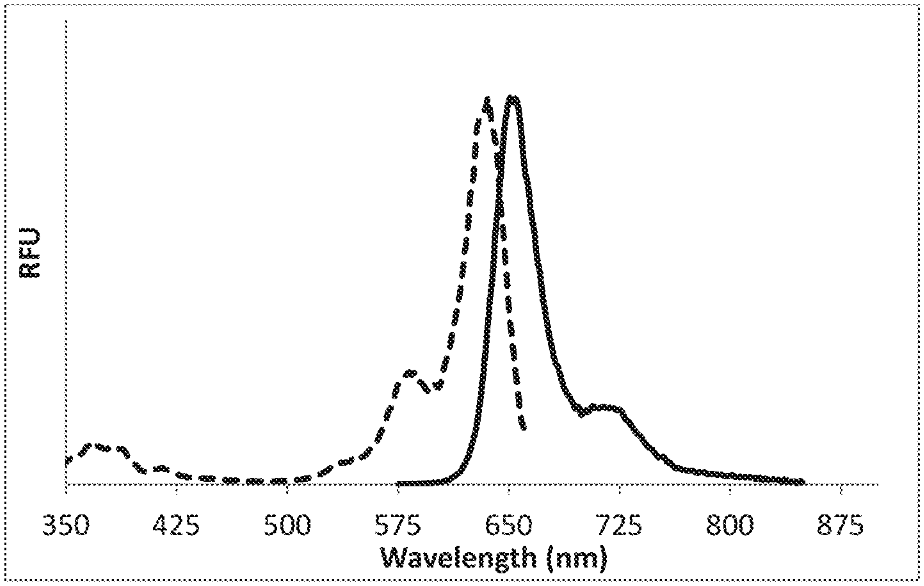
FIG. 1 provides the absorption and emission spectra of Compound C in PBS buffer at pH 2.2. The dashed line shows the absorption spectrum, and the solid line shows the emission spectrum.

To more clearly and concisely describe and point out the subject matter of the present disclosure, the following definitions are provided for specific terms, which are used in the following description and the appended claims. Throughout the specification, exemplification of specific terms should be considered as non-limiting examples.

I. Definitions

As used in this specification, the words "a" or "an" mean at least one, unless specifically stated otherwise. In this specification, the use of the singular includes the plural unless specifically stated otherwise. For example, but not as a limitation, "a biomolecule" means that more than one biomolecule can be present; for example, one or more of a particular biomolecule species, as well as two or more different species of biomolecule. The term "and/or" means that the terms before and after the slash can be taken together or separately. For illustration purposes, but not as a limitation, "X and/or Y" can mean "X or Y" or "X and Y".

It will be appreciated that there is an implied "about" prior to the temperatures, concentrations, times, etc. discussed in the present disclosure, such that slight and insubstantial deviations are within the scope of the present teachings herein. Also, the use of "comprise", "comprises", "comprising", "contain", "contains", "containing", "include", "includes", and "including" are not intended to be limiting. It is to be understood that both the foregoing general description and detailed description are exemplary and explanatory only and are not restrictive of the teachings.

Unless specifically noted in the specification, embodiments in the specification that recite "comprising" various components are also contemplated as "consisting of" or "consisting essentially of" the recited components; embodiments in the specification that recite "consisting of" various components are also contemplated as "comprising" or "consisting essentially of" the recited components; and embodiments in the specification that recite "consisting essentially of" various components are also contemplated as "consisting of" or "comprising" the recited components (this interchangeability does not apply to the use of these terms in the claims).

The term "or combinations thereof" as used herein refers to all permutations and combinations of the listed terms preceding the term. For example, "A, B, C, or combinations thereof" is intended to include at least one of: A, B, C, AB, AC, BC, or ABC, and if order is important in a particular context, also BA, CA, CB, ACB, CBA, BCA, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

The section headings used herein are for organizational purposes only and are not to be construed as limiting the desired subject matter in any way. All literature cited in the specification, including but not limited to, patents, patent applications, articles, books and treatises are expressly incorporated by reference in their entirety for any purpose. In the event that any of the incorporated literature contradicts any term defined in this specification, this specification controls. While the present teachings are described in conjunction with various embodiments, it is not intended that the present teachings be limited to such embodiments. On the contrary, the present teachings encompass various alternatives, modifications, and equivalents, as will be appreciated by those of skill in the art.

As used herein, "about" refers to a value that is 10% more or less than a stated value, gives results functionally equivalent to the stated value, or rounds to the stated value.

As used herein, the term "kit" refers to a packaged set of related components, such as one or more compounds or compositions and one or more related materials such as solvents, solutions, buffers, instructions, desiccants, or cells.

"Substituted" as used herein refers to a molecule wherein one or more hydrogen atoms are replaced with one or more non-hydrogen atoms, functional groups or moieties. By example, an unsubstituted nitrogen is —$NH_2$, while a substituted nitrogen is —$NHCH_3$. Exemplary substituents include but are not limited to halogen, e.g., fluorine and chlorine, ($C_1$-$C_8$) alkyl, sulfate, sulfonate, sulfone, amino, ammonium, amido, nitrile, nitro, lower alkoxy, phenoxy, aromatic, phenyl, polycyclic aromatic, heterocycle, water-solubilizing group, linkage, and linking moiety.

A dashed line projecting from a substituent, such as:

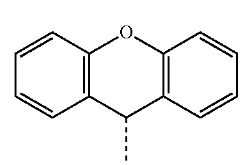

indicates the point of attachment to the base molecule. For a fused ring, dashed lines indicate portions of the base molecule where the fused ring is attached, such as:

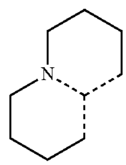

wherein the full molecule could have the structure:

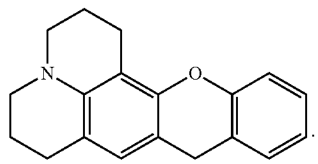 [SMILES: c1ccc2c(c1)Cc1cc3c4c(c1O2)CCCN4CCC3]

Unless indicated otherwise, the nomenclature of substituents that are not explicitly defined herein are arrived at by naming the terminal portion of the functionality followed by the adjacent functionality toward the point of attachment. For example, the substituent "arylalkyloxycarbonyl" refers to the group (aryl)-(alkyl)-O—C(O)—.

It is understood that in all substituted groups defined herein, polymers arrived at by defining substituents with further substituents to themselves (e.g., substituted aryl having a substituted aryl group as a substituent which is itself substituted with a substituted aryl group, which is further substituted by a substituted aryl group etc.) are not intended for inclusion herein. In such cases, the maximum number of such substitutions is three. For example, serial substitutions of substituted aryl groups with two other substituted aryl groups are limited to -substituted aryl-(substituted aryl)-substituted aryl.

Similarly, it is understood that the definitions provided herein are not intended to include impermissible substitution patterns (e.g., methyl substituted with 5 fluoro groups). Such impermissible substitution patterns are well known to the skilled artisan.

The compounds disclosed herein may exist in unsolvated forms as well as solvated forms, including hydrated forms. These compounds may exist in multiple crystalline or amorphous forms. In general, all physical forms are equivalent for the uses described herein and are intended to be within the scope of the present disclosure. The compounds disclosed herein may possess asymmetric carbon atoms (i.e., chiral centers) or double bonds; the racemates, diastereomers, geometric isomers and individual isomers of the compounds described herein are within the scope of the present disclosure. The compounds described herein may be prepared as a single isomer or as a mixture of isomers.

Where substituent groups are specified by their conventional chemical formulae and are written from left to right, they equally encompass the chemically identical substituents, which would result from writing the structure from right to left, e.g., —$CH_2$O— is intended to also recite —O$CH_2$—.

It will be understood that the chemical structures that are used to define the compounds disclosed herein are each representations of one of the possible resonance structures by which each given structure can be represented. Further, it will be understood that by definition, resonance structures are merely a graphical representation used by those of skill in the art to represent electron delocalization, and that the present disclosure is not limited in any way by showing one particular resonance structure for any given structure.

Where a disclosed compound includes a conjugated ring system, resonance stabilization may permit a formal electronic charge to be distributed over the entire molecule. While a particular charge may be depicted as localized on a particular ring system, or a particular heteroatom, it is commonly understood that a comparable resonance structure can be drawn in which the charge may be formally localized on an alternative portion of the compound.

As used herein, the term "alkyl" refers to monovalent saturated aliphatic hydrocarbyl groups having from 1 to 10 carbon atoms and preferably 1 to 6 carbon atoms, e.g. 1, 2, 3, 4, 5 or 6 carbon atoms. This term includes, by way of example, linear and branched hydrocarbyl groups such as methyl ($CH_3$—), ethyl ($CH_3CH_2$—), n-propyl ($CH_3CH_2CH_2$—), isopropyl ($(CH_3)_2CH$—), n-butyl ($CH_3CH_2CH_2CH_2$—), isobutyl ($(CH_3)_2CHCH_2$—), sec-butyl ($(CH_3)(CH_3CH_2)CH$—), t-butyl ($(CH_3)_3C$—), n-pentyl ($CH_3CH_2CH_2CH_2CH_2$—), and neopentyl ($(CH_3)_3CCH_2$—).

As used herein, the term "substituted alkyl" refers to an alkyl group having from 1 to 5, preferably 1 to 3, or more preferably 1 to 2 substituents selected from the group consisting of alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, aryl, substituted aryl, aryloxy, substituted aryloxy, arylthio, substituted arylthio, carboxyl, carboxylalkyl, carboxyl ester, (carboxyl ester) amino, (carboxyl ester)oxy, cyano, cycloalkyl, substituted cycloalkyl, cycloalkyloxy, substituted cycloalkyloxy, cycloalkylthio, substituted cycloalkylthio, cycloalkenyl, substituted cycloalkenyl, cycloalkenyloxy, substituted cycloalkenyloxy, cycloalkenylthio, substituted cycloalkenylthio, guanidino, substituted guanidino, halo, hydroxy, heteroaryl, substituted heteroaryl, heteroaryloxy, substituted heteroaryloxy, heteroarylthio, substituted heteroarylthio, heterocyclic, substituted heterocyclic, heterocyclyloxy, substituted heterocyclyloxy, heterocyclylthio, substituted heterocyclylthio, nitro, sulfonyl, sulfonyloxy, thioacyl, thiol, alkylthio, and substituted alkylthio, wherein said substituents are defined herein. Particular substituted alkyl groups comprise a reactive group for direct or indirect linking to a biomolecule or solid support; as examples may be mentioned alkyl substituted by carboxyl or a carboxyl ester (e.g. an activated ester such as an N-hydroxysuccinimide ester) and alkyl substituted by aminocarbonyl —CONHR where R is an organic moiety as defined below with reference to the term "aminocarbonyl", e.g. a $C_1$-$C_{10}$ (e.g. $C_1$-$C_6$) alkyl terminally substituted by a reactive group ($R_x$) including, but not limited to, carboxyl, carboxylester, maleimide, succinimidyl ester (SE), sulfodichlorophenol (SDP) ester, sulfotetrafluorophenol (STP) ester, tetrafluorophenol (TFP) ester, acetoxymethyl (AM) ester, nitrilotriacetic acid (NTA), aminodextran, and DIBO-amine.

As used herein, the term "alkyl halide" refers to any —$C(X)_3$ group wherein at least one X group is a halide and the other X groups are independently chosen from H, halide, alkyl, substituted alkyl, alkenyl, substituted alkenyl, alkynyl, substituted alkynyl, cycloalkyl, and substituted cycloalkyl. In certain embodiments, one X is a F or Cl and the other X groups are independently chosen from H and alkyl.

As used herein, the term "alkoxy" refers to any —O—R group wherein the R group is chosen from alkyl, alkenyl, alkynyl, and cycloalkyl. In certain embodiments, the R group in the alkyloxy is an alkyl.

As used herein, the term "substituted alkoxy" refers to any —O—R group wherein the R group is chosen from substituted alkyl, substituted alkenyl, substituted alkynyl, and substituted cycloalkyl. In certain embodiments, the R group in the alkoxy is a substituted alkyl.

As used herein, the terms "aryl" or "Ar" refers to a monovalent aromatic carboxylic group of from 6 to 14 carbon atoms having a single ring (e.g., phenyl) or multiple condensed rings (e.g., naphthyl or anthryl) which condensed rings may or may not be aromatic (e.g., 2-benzoxazolinone, 2H-1,4-benzoxazin-3(4H)-one-7-yl, and the like) provided that the point of attachment is at an aromatic carbon atom. Preferred aryl groups include phenyl and naphthyl.

As used herein, the term "alkenyl" refers to alkenyl groups having from 2 to 6 carbon atoms and preferably 2 to 4 carbon atoms and having at least 1 and preferably from 1 to 2 sites of alkenyl unsaturation. Such groups are exemplified, for example, by vinyl, allyl, but-3-en-1-yl, and propenyl.

As used herein, the term "substituted alkenyl" refers to alkenyl groups having from 1 to 3 substituents, and preferably 1 to 2 substituents, selected from the group consisting of alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, aryl, substituted aryl, aryloxy, substituted aryloxy, arylthio, substituted arylthio, carboxyl, carboxyl ester, (carboxyl ester)amino, (carboxyl ester)oxy, cyano, cycloalkyl, substituted cycloalkyl, cycloalkyloxy, substituted cycloalkyloxy, cycloalkylthio, substituted cycloalkylthio, cycloalkenyl, substituted cycloalkenyl, cycloalkenyloxy, substituted cycloalkenyloxy, cycloalkenylthio, substituted cycloalkenylthio, guanidino, substituted guanidino, halo, hydroxy, heteroaryl, substituted heteroaryl, heteroaryloxy, substituted heteroaryloxy, heteroarylthio, substituted heteroarylthio, heterocyclic, substituted heterocyclic, heterocyclyloxy, substituted heterocyclyloxy, heterocyclylthio, substituted heterocyclylthio, nitro, sulfonyl, sulfonyloxy, thioacyl, thiol, alkylthio, and substituted alkylthio, wherein said substituents are defined herein and with the proviso that any hydroxy substitution is not attached to a vinyl (unsaturated) carbon atom.

As used herein, the term "alkynyl" refers to alkynyl groups having from 2 to 6 carbon atoms and preferably 2 to 3 carbon atoms and having at least 1 and preferably from 1 to 2 sites of alkynyl unsaturation.

As used herein, the term "substituted alkynyl" refers to alkynyl groups having from 1 to 3 substituents, and preferably 1 to 2 substituents, selected from the group consisting of alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, aryl, substituted aryl, aryloxy, substituted aryloxy, arylthio, substituted arylthio, carboxyl, carboxyl ester, (carboxyl ester)amino, (carboxyl ester)oxy, cyano, cycloalkyl, substituted cycloalkyl, cycloalkyloxy, substituted cycloalkyloxy, cycloalkylthio, substituted cycloalkylthio, cycloalkenyl, substituted cycloalkenyl, cycloalkenyloxy, substituted cycloalkenyloxy, cycloalkenylthio, substituted cycloalkenylthio, guanidino, substituted guanidino, halo, hydroxy, heteroaryl, substituted heteroaryl, heteroaryloxy, substituted heteroaryloxy, heteroarylthio, substituted heteroarylthio, heterocyclic, substituted heterocyclic, heterocyclyloxy, substituted heterocyclyloxy, heterocyclylthio, substituted heterocyclylthio, nitro, sulfonyl, sulfonyloxy, thioacyl, thiol, alkylthio, and substituted alkylthio, wherein said substituents are defined herein and with the proviso that any hydroxy substitution is not attached to an acetylenic carbon atom.

As used herein, the term "acyl" refers to the groups H—C(O)—, alkyl-C(O)—, substituted alkyl-C(O)—, alkenyl-C(O)—, substituted alkenyl-C(O)—, alkynyl-C(O)—, substituted alkynyl-C(O)—, cycloalkyl-C(O)—, substituted cycloalkyl-C(O)—, cycloalkenyl-C(O)—, substituted cycloalkenyl-C(O)—, aryl-C(O)—, substituted aryl-C(O)—, heteroaryl-C(O)—, substituted heteroaryl-C(O)—, heterocyclic-C(O)—, and substituted heterocyclic-C(O)—, wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic and substituted heterocyclic are as defined herein. Acyl includes the "acetyl" group $CH_3C(O)$—.

As used herein, the term "amino" or "amine" refers to any —$NR_2$ group wherein each R group is independently chosen from H, alkyl, substituted alkyl, alkenyl, substituted alkenyl, alkynyl, substituted alkynyl, cycloalkyl, substituted cycloalkyl, heterocycle, and substituted heterocycle. In certain embodiments, the R groups in the amino are both alkyl groups.

As used herein, the term "substituted amino" or "substituted amine" refers to any —$NR_2$ group wherein at least one R group is chosen from a substituted alkyl, substituted alkenyl, substituted alkynyl, substituted cycloalkyl and substituted heterocycle, and the other R group is chosen from H, alkyl, substituted alkyl, alkenyl, substituted alkenyl, alkynyl, substituted alkynyl, cycloalkyl, substituted cycloalkyl, heterocycle, substituted heterocycle.

As used herein, the term "carbonyl" refers to the divalent group —C(O)— which is equivalent to —C(═O)—.

As used herein, the term "carboxyl" or "carboxy" refers to —COOH or salts thereof.

As used herein, the term "carboxyl ester" refers to any —C(═O)—OR group wherein the R group is chosen from alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl. In certain embodiments, the R group in the carboxyl ester is chosen from alkyl and substituted alkyl.

As used herein, the term "(carboxyl ester)amino" refers to any —NR— carboxylic ester wherein the carboxylic acid is as defined above and the R group on the N is chosen from H, alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl. In certain embodiments, the R group on the N is chosen from H, alkyl and substituted alkyl.

As used herein, the term "(carboxyl ester)oxy" refers to any —O-carboxylic ester wherein the carboxylic acid is as defined above. In certain embodiments, the carboxyl ester in the (carboxyl ester)oxy is chosen from alkyl and substituted alkyl.

As used herein, the term "cycloalkyl" refers to cyclic alkyl groups of from 3 to 10 carbon atoms having single or multiple cyclic rings including fused, bridged, and spiro ring systems. Examples of suitable cycloalkyl groups include, for instance, adamantyl, cyclopropyl, cyclobutyl, cyclopentyl, and cyclooctyl.

As used herein, the term "halogen" or "halo" or "halide" refers to F, Cl, Br, and I.

As used herein, the term "heteroatom" refers to any atom other than carbon. In certain embodiments, the heteroatom may be chosen from oxygen, nitrogen, and sulfur.

As used herein, the term "heteroaryl" refers to an aromatic group of from 1 to 10 carbon atoms and 1 to 4 heteroatoms selected from the group consisting of oxygen, nitrogen and sulfur within the ring. Such heteroaryl groups can have a single ring (e.g., pyridinyl or furyl) or multiple condensed rings (e.g., indolizinyl or benzothienyl) wherein the condensed rings may or may not be aromatic and/or contain a heteroatom provided that the point of attachment is through an atom of the aromatic heteroaryl group. In one embodiment, the nitrogen and/or the sulfur ring atom(s) of the heteroaryl group are optionally oxidized to provide for the N-oxide (N→O), sulfinyl, or sulfonyl moieties. Preferred heteroaryls include pyridinyl, pyrrolyl, indolyl, thiophenyl, and furanyl.

As used herein, the term "heterocycle" or "heterocyclic" or "heterocycloalkyl" or "heterocyclyl" refers to a saturated or unsaturated group having a single ring or multiple condensed rings, including fused bridged and spiro ring systems, from 1 to 10 carbon atoms and from 1 to 4 hetero atoms selected from the group consisting of nitrogen, sulfur or oxygen within the ring wherein, in fused ring systems, one or more the rings can be cycloalkyl, aryl or heteroaryl provided that the point of attachment is through the non-aromatic ring. In one embodiment, the nitrogen and/or sulfur atom(s) of the heterocyclic group are optionally oxidized to provide for the N-oxide, sulfinyl, or sulfonyl moieties.

Examples of heterocycle and heteroaryls include, but are not limited to, azetidine, pyrrole, imidazole, pyrazole, pyridine, pyrazine, pyrimidine, pyridazine, indolizine, isoindole, indole, dihydroindole, indazole, purine, quinolizine, isoquinoline, quinoline, phthalazine, naphthylpyridine, quinoxaline, quinazoline, cinnoline, pteridine, carbazole, carboline, phenanthridine, acridine, phenanthroline, isothiazole, phenazine, isoxazole, phenoxazine, phenothiazine, imidazolidine, imidazoline, piperidine, piperazine, indoline, phthalimide, 1,2,3,4-tetrahydroisoquinoline, 4,5,6,7-tetrahydrobenzo[b]thiophene, thiazole, thiazolidine, thiophene, benzo[b]thiophene, morpholinyl, thiomorpholinyl (also referred to as thiamorpholinyl), 1,1-dioxothiomorpholinyl, piperidinyl, pyrrolidine, and tetrahydrofuranyl.

As used herein, the term "sulfo" refers to the groups —$SO_3H$ or —$SO_3$.

As used herein, the term "sulfonyl" means any —S(═O)$_2$—R group wherein the R is chosen from an alkyl, substituted alkyl, alkenyl, substituted alkenyl, alkynyl, substituted alkynyl, cycloalkyl, substituted cycloalkyl, heterocycle, substituted heterocycle, aryl, substituted aryl, heteroaryl, and substituted heteroaryl. In certain embodiments, the R group in the sulfonyl is chosen from alkyl and substituted alkyl.

As used herein, the term "sulfonyl halide" refers to any —S(═O)$_2$—X group wherein the X group is a halide. In certain embodiments, the X is chosen from Cl and F.

As used herein, the term "alkylthio" refers to any —S—R group wherein the R group is chosen from alkyl, alkenyl, alkynyl, and cycloalkyl. In certain embodiments, the R group in the alkylthio is alkyl.

As used herein, the term "substituted alkylthio" refers to any —S—R group wherein the R group is chosen from a substituted alkyl, substituted alkenyl, substituted alkynyl, and substituted cycloalkyl. In certain embodiments, the R group in the substituted alkylthio is substituted alkyl.

As used herein, the term "anhydride" refers to any —C(═O)—O—C(═O)—R group where the R group is chosen from H, alkyl, substituted alkyl, alkenyl, substituted alkenyl, alkynyl, substituted alkynyl, cycloalkyl, and substituted cycloalkyl. In certain embodiments, the R group is an alkyl.

As used herein, the term "aniline" refers to

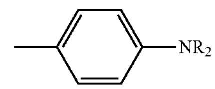

wherein the R groups are independently chosen from H, alkyl, substituted alkyl, alkenyl, substituted alkenyl, alkynyl, substituted alkynyl, cycloalkyl, and substituted cycloalkyl. In certain embodiments, the R groups are independently chosen from H and an alkyl.

As used herein, the term "aryl halide" refers to any

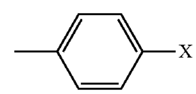

wherein the X is a halide and the aryl is optionally substituted with a group or groups chosen from an alkyl, substituted alkyl, alkenyl, substituted alkenyl, alkynyl, substituted alkynyl, cycloalkyl, and substituted cycloalkyl.

As used herein, the term "halotriazine" refers to any

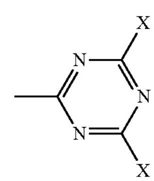

wherein the X groups are independently chosen from any halide group. In certain embodiments, the X groups are independently chosen from Cl and F.

As used herein, the term "maleimide" refers to any

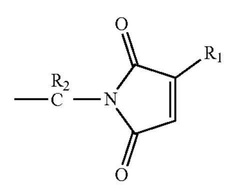

wherein $R_1$ and $R_2$ are independently chosen from H, alkyl, substituted alkyl, alkenyl, substituted alkenyl, alkynyl, substituted alkynyl, cycloalkyl, and substituted cycloalkyl. In certain embodiments, $R_1$ and $R_2$ are independently chosen from H and alkyl. In certain embodiments, both $R_1$ and $R_2$ are H.

As used herein, the term "carbodiimide" refers to any

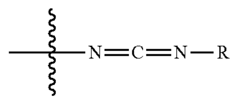

wherein the wavy line is the point of attachment and wherein the R group is chosen from H, alkyl, substituted alkyl, alkenyl, substituted alkenyl, alkynyl, substituted alkynyl, cycloalkyl, and substituted cycloalkyl. In certain embodiments, the R group is chosen from H and an alkyl.

As used herein, the term "haloacetamide" refers to any —NR—C(═O)—$CH_2$—X group wherein X is a halide and R is chosen from H, alkyl, substituted alkyl, alkenyl, substituted alkenyl, alkynyl, substituted alkynyl, cycloalkyl, and substituted cycloalkyl. In certain embodiments, the halide is chosen from Cl and I. In certain embodiments, the R group is chosen from H and alkyl.

As used herein, the term "assay" as used herein refers to an investigative analytic procedure for qualitatively assessing or quantitatively measuring the presence, amount or functional activity of a target entity. The methods of the present disclosure can be used in assays to determine the pH of a sample, monitor the pH inside a live cell, detect phagocytosis of a biomolecule, detect a pH related intracellular process, identify a target cell within a population of cells, monitor internalization of a biomolecule, monitor internalization of a receptor, analyze kinetics of migration of a species through a cell or cellular compartment, and label a cell or cellular compartment.

As used herein, the term "linker" or "L", as used herein, refers to a single covalent bond or a moiety comprising series of stable covalent bonds, the moiety often incorporating 1-40 plural valent atoms selected from the group consisting of C, N, O, S and P that covalently attach the fluorogenic compounds to another moiety such as a chemically reactive group or a biological and non-biological component. The number of plural valent atoms in a linker may be, for example, 0, 1, 2, 3, 4, 5, 6, 7, 8, 9, 10, 20, 25, 30 or a larger number up to 40 or more. A linker may be linear or non-linear; some linkers have pendant side chains or pendant functional groups, or both. Examples of such linkers include polyethylene glycol (PEG) groups. Examples of such pendant moieties are hydrophilicity modifiers, for example solubilizing groups like, e.g. sulfo. In certain embodiments, L is composed of any combination of single, double, triple or aromatic carbon-carbon bonds, carbon-nitrogen bonds, nitrogen-nitrogen bonds, carbon-oxygen bonds and carbon-sulfur bonds. Exemplary linking members include a moiety that includes —C(O)NH—, —C(O)O—, —NH—, —S—, —O—, and the like. Linkers may, by way of example, consist of a combination of moieties selected from alkyl; —C(O)NH—; —C(O)O—; —NH—; —S—; —O—; —C(O)—; —$S(O)_n$— where n is 0, 1 or 2; —O—; 5- or 6-membered monocyclic rings; and optional pendant functional groups, for example sulfo, hydroxy and carboxy. The moiety formed by a linker bonded to a reactive group ($R_x$) may be designated L-$R_x$. The reactive group may be reacted with a substance reactive therewith, whereby the linker becomes bonded to a conjugated substance ($S_c$); in this case, the linker typically contains a residue of a reactive group (e.g. the carbonyl group of an ester) and may be designated "$L_R$". A "cleavable linker" is a linker that has one or more cleavable groups that may be broken by the result of a reaction or condition. The term "cleavable group" refers to a moiety that allows for release of a portion, e.g., a fluorogenic or fluorescent moiety, of a conjugate from the remainder of the conjugate by cleaving a bond linking the released moiety to the remainder of the conjugate. Such cleavage is either chemical in nature, or enzymatically mediated. Exemplary enzymatically cleavable groups include natural amino acids or peptide sequences that end with a natural amino acid.

In addition to enzymatically cleavable groups, it is within the scope of the present disclosure to include one or more sites that are cleaved by the action of an agent other than an enzyme. Exemplary non-enzymatic cleavage agents include, but are not limited to, acids, bases, light (e.g., nitrobenzyl derivatives, phenacyl groups, benzoin esters), and heat. Many cleavable groups are known in the art. See, for example, Jung et al., *Biochem. Biophys. Acta,* 761:152-162 (1983); Joshi et al., *J Biol. Chem.,* 265:14518-14525 (1990); Zarling et al., *J Immunol.,* 124:913-920 (1980); Bouizar et al., *Eur. J Biochem.,* 155:141-147 (1986); Park et al., *J. Biol. Chem.,* 261:205-210 (1986); Browning et al., *J. Immunol.,* 143:1859-1867 (1989). Moreover, a broad range of cleavable, bifunctional (both homo- and hetero-bifunctional) spacer arms are commercially available.

An exemplary cleavable group, such as an ester, is a cleavable group that may be cleaved by a reagent, e.g., sodium hydroxide, resulting in a carboxylate-containing fragment and a hydroxyl-containing product.

The linker may be used to attach the compounds provided herein to another component of a conjugate, such as a targeting moiety (e.g., antibody, ligand, non-covalent protein-binding group, etc.), an analyte, a biomolecule, a drug and the like.

As used herein, the term "reactive group" (or "$R_x$"), refers to chemical moieties that are reactive as one of ordinary skill in the art would understand and generally represents a point of attachment for another substance. The reactive group is a moiety, such as a carboxylic acid or succinimidyl ester, on the compounds of the present disclosure that is capable of chemically reacting with a functional group on a different compound to form a covalent linkage. Reactive groups generally include nucleophiles, electrophiles and photoactivatable groups. Examples of reactive groups include, but are not limited to, olefins, acetylenes, alcohols, phenols, ethers, oxides, halides, aldehydes, ketones, carboxylic acids, esters, amides, cyanates, isocyanates, thiocyanates, isothiocyanates, amines, hydrazines, hydrazones, hydrazides, diazo, diazonium, nitro, nitriles, mercaptans, sulfides, disulfides, sulfoxides, sulfones, sulfonic acids, sulfinic acids, acetals, ketals, anhydrides, sulfates, sulfenic acids isonitriles, amidines, imides, imidates, nitrones, hydroxylamines, oximes, hydroxamic acids thiohydroxamic acids, allenes, ortho esters, sulfites, enamines, ynamines, ureas, pseudoureas, semicarbazides, carbodiimides, carbamates, imines, azides, azo compounds, azoxy compounds, nitroso compounds, acrylamides, activated esters of a carboxylic acid, acyl azides, acyl halides, hydroxy, alkyl halides, sulfonates, amines, anilines, aryl halides, aziridines, boronates, diazoalkanse, epoxides, glycols, haloacetamides, halotriazines, imido esters, sulfonyl halides, and thiols Reactive functional groups also include those used to prepare bioconjugates, for example, a succinimidyl ester (SE), a N-hydroxysuccinimide ester, a sulfo-succinimidyl ester and other substituted succinimidyl esters, a maleimide, reactive phenyl esters such as a dibromophenyl ester, a nitrophenyl ester, a thiophenyl ester, a substituted thiophenyl ester, a sulfodichlorophenyl (SDP) ester, a sulfotetrafluorophenyl (STP) ester, a tetrafluorophenyl (TFP) ester, a pentafluorophenyl (PFP) ester, a nitrilotriacetic acid (NTA), an aminodextran, an acetoxymethyl ester (AM), an isocyanate, a cyanate, an isothiocyanate, a thiocyanate, and a cyclooctyne-amine, such as a dibenzocyclooctyne (DIBO)-amine. Methods to prepare each of these functional groups are well known in the art and their application to or modification for a particular purpose is within the ability of one of skill in the art (see, for example, Sandler and Karo, eds., Organic Functional Group Preparations, Academic Press, San Diego, 1989).

As used herein, the phrase "xanthene ring analog" refers to analogs or derivatives of a xanthene including, but not limited to, fluorescein, eosins, rhodamines, including rhodamines substituted with a Group 13, Group 14 or Group 15 atom at position 10 of the xanthene ring, including, but not limited to Boron-rhodamines (B-rhodamines), Carbon-rhodamines (C-rhodamines), Silicon-rhodamines (Si-rhodamines), Germanium-rhodamines (Ge-rhodamines), Tin-rhodamines (Sn-rhodamines), Nitrogen-rhodamines (N-rhodamines), Phosphorous-rhodamines (P-rhodamines), Sulfur-rhodamines (S-rhodamines), Selenium-rhodamines (Se-rhodamines), and Tellurium-rhodamines (Te-rhodamines) [Deng and Xu, *Chin. Chem. Lett.* 30:1667-1681 (2019)]. Any commercial rhodamine dye and their analog in this category are included, for example ALEXA FLUOR dyes (Thermo Fisher Scientific, Waltham, MA), DYLIGHT dyes (Thermo Fisher Scientific, Waltham, MA), ATTO dyes (ATTO-TEC GmbH, Siegen, Germany) and CF dyes (Biotium, Inc., Hayward, CA). Also included are hybrid rhodamine dyes and asymmetrical rhodamine dyes.

As used herein, the term "salt" refers to a compound of Formula (I) or its corresponding compound of Formula (II) together with a cation to compensate for a negative charge on the compound. Cations include, but are not limited to, sodium ($Na^+$), potassium ($K^+$), calcium ($Ca^{+2}$), magnesium ($Mg^{2+}$) triethyl amine ($HNEt_3^+$), ammonium ($NH_4^+$), tetraalkylammonium, and any other cations that can compensate for the negative charge.

As used herein, the term "fused ring" refers to any ring system where two rings have at least two atoms and one bond in common.

As used herein, the term "PEG" or "polyethylene glycol" refers to any polyethylene glycol moiety, —[$CH_2$—$CH_2$—O]$_n$—, wherein n is an integer. In certain embodiments, n is chosen from 3, 4, and 5. In certain embodiments, n is 4.

As used herein, the term "glycol" refers to any —[CR(OH)—CR(OH)]$_n$—R group wherein n is an integer and the R groups are independently chosen from H, alkyl, substituted alkyl, alkenyl, substituted alkenyl, alkynyl, substituted alkynyl, cycloalkyl, and substituted cycloalkyl. In certain embodiments, the n group is chosen from 1, 2, 3, and 4. In certain embodiments, the R groups are independently chosen from H and an alkyl.

As used herein, a "cyclooctyne-amine" is a cyclooctyne comprising an amine reactive group. In certain embodiments, the cyclooctyne is a dibenzocyclooctyne (DIBO). In certain embodiments, the DIBO-amine is chosen from

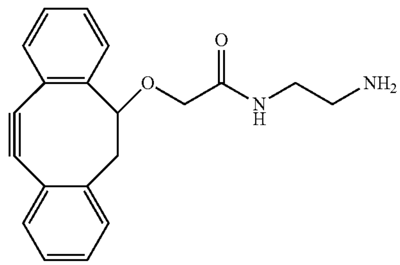

and

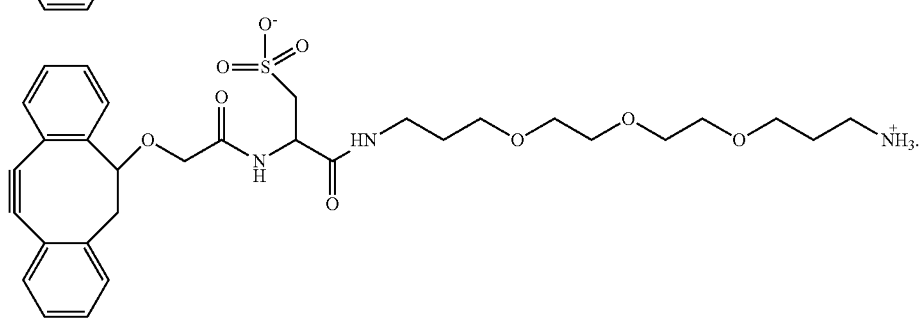

As used herein, a "tetrafluorophenyl ester" is a

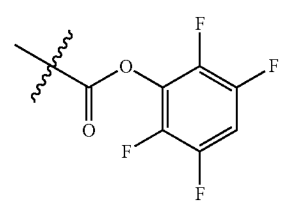 [SMILES: *C(=O)Oc1c(F)c(F)cc(F)c1F]

wherein the wavy line is the point of attachment.

As used herein, a "pentafluorophenyl ester" is a

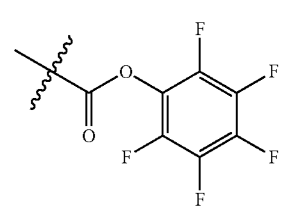 [SMILES: *C(=O)Oc1c(F)c(F)c(F)c(F)c1F]

wherein the wavy line is the point of attachment.

As used herein, a "nitrilotriacetic acid" is a

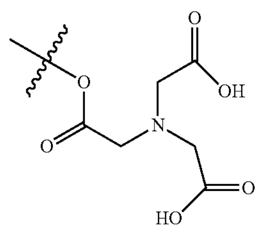 [SMILES: *OC(=O)CN(CC(=O)O)CC(=O)O]

wherein the wavy line is the point of attachment.

As used herein, the term "optionally" means that the subsequently described event or circumstance may or may not occur and that the description includes instances where said event or circumstance occurs and instances in which it does not.

As used herein, the terms "RSL-oxyamine" and "RSL-oxyamine pH sensor" refer to compounds of Formula (I), its corresponding compounds of Formula (II) or salts thereof.

As used herein, the term "conjugate" refers to a molecule composed of a compound of Formula (I), its corresponding compound of Formula (II) or salt thereof wherein $S_c$ is a biomolecule or solid support. Conjugates may be bonded by covalent or non-covalent bonds, including but not limited to hydrogen bonds and π-π stacking.

As used herein, the term "conjugated substance" refers to a biomolecule or solid support that is bonded to the $S_c$ group of the compound of Formula (I), its corresponding compound of Formula (II) or salt thereof.

As used herein, the term "biomolecule" refers to any biological molecule. In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand. In certain embodiments, the biomolecule is an *E. coli* bioparticle. In certain embodiments, the biomolecule is an antibody. In certain embodiments, the biomolecule is a virus or a virus-like particle.

As used herein, a "solid support" includes, but is not limited to, an aerogel, a hydrogel, a resin, a silica gel, a bead, a biochip, a microfluidic chip, a silicon ship, a multi-well plate, a membrane, a polymeric membrane, a particle, a derivatized plastic film, a glass bead, cotton, a plastic bead, alumina gel, polysaccharide, poly(acrylate), polystyrene, poly(acrylamide), polyol, agarose, agar, cellulose, dextran, starch, heparin, glycogen, amylopectin, mannan, inulin, nitrocellulose, diazocellulose, polyvinylchloride, polypropylene, polyethylene, nylon, latex bead, a conducting metal, a nonconducting metal, glass, quantum dots, nanocrystals, nanoparticles, nanotubes, carbon nanotubes, graphene, magnetic bead, paramagnetic bead, superparamagnetic bead, and a magnetic support.

As used herein, the term "illuminate" or "illuminating" refers to exposing any sample to light, optionally of a particular wavelength or wavelength range (activating wavelength) so as to activate a fluorophore to emit light (excitation wavelength).

As used herein, the term "incubate" or "incubating" refers to providing a sample in contact with a compound for a period of time. In some embodiments, the period of time is long enough to allow the compound to be absorbed, at least partially, into the sample. In some embodiments, a sample may be contacted with a compound for a period of time under conditions of interest to a particular experiment or investigation.

As used herein, the term "immobilize" or "immobilized" as it relates to a sample refers to affixing, at least in part, the sample to a surface. In certain embodiments, the surface is chosen from a polymeric membrane, a polymeric gel, a microparticle, a microarray, a silicon chip, a glass slide, a microwell plate, and a microfluidic chip.

As used herein, the term "inside" as it relates to a compound being inside a cell refers to the compound being at least partially inside the cell.

As used herein, the phrases "monitor the pH" or "monitoring the pH" of a sample refers to observing a sample at different intervals to determine if there is a pH change. In some embodiments, the sample is observed continuously until some predetermined time.

As used herein, the term "on" as it relates to immobilizing a sample on a surface refers to affixing a sample to at least part of the surface. In some embodiments, the sample is entirely affixed on the surface. In other embodiments, the sample is partially affixed on the surface.

As used herein, the phrase "within" as it relates to a sample being within a region (such as polymeric gel, cell, or population of cells) refers to residing either completely or partially inside the region.

II. Compounds

In general, for ease of understanding the present disclosure, the pH sensor compounds will first be described in detail, followed by various methods in which the compounds of the present disclosure are useful, which is followed by exemplary methods of use and synthesis of certain compounds that are particularly advantageous for use with the methods provided herein.

The compounds of the present disclosure make use of the spirolactam portion of certain xanthene compounds, such as rhodamines, as a pH sensing moiety. Being a type of fluorogenic probe, rhodamine-lactams operate in an "off-on" fashion. More specifically, rhodamine-lactams are in an "off" (non-fluorescent) configuration but upon protonation, isomerize into an "on" (fluorescent) configuration via opening of the intramolecular lactam ring which is fluorescent with noticeable color variation at acidic conditions. Although rhodamine-lactams (RL) have been used previously as low pKa pH sensors for different applications, the known rhodamine-lactams are primarily based on primary aliphatic amines or primary anilines (see Scheme A).

Scheme A

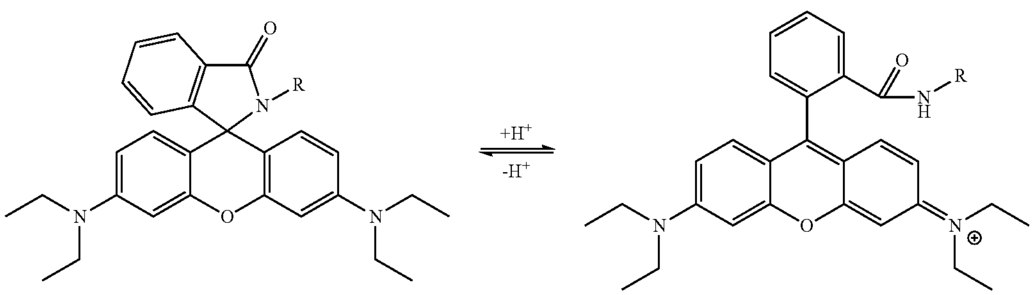

R = aliphatic chain or Aromatic ring

Typically, it takes minutes to hours for the fluorescent signals of these RLs with primary aliphatic amines or primary anilines on the lactam nitrogen to reach the maxima after being acidified. The slower dynamic response limits the use of these RLs in certain biological applications which proceed with much faster kinetics and may be transient.

In contrast, the compounds of the present disclosure are rhodamine-lactams that comprise an oxygen attached to the lactam nitrogen forming an oxyamine linkage, which has a $C_1$-$C_6$ alkyl or substituted alkyl directly attached to the oxygen of the oxyamine linkage, herein referred to as "RSL-oxyamine" or "RSL-oxyamine pH sensors". In contrast to the RLs with primary aliphatic amines or primary anilines, the RSL-oxyamines of the present disclosure surprisingly have an immediate dynamic response to protonation. Moreover, the RSL-oxyamines provided herein have a pKa around pH 4.5, which is optimal for biological applications, such as visualizing late endosomes and/or lysosomes within cells. It was unexpectedly discovered that the pKa can be adjusted to higher values (e.g., more basic pH) by changing the substituent attached to the oxygen that is adjacent to the amide group of the lactam moiety (see, for example, Scheme B).

In addition, it was unexpectedly found that the oxyamine linkage and the attached X and/or Y groups appear to regulate the pKa of the compound so that upon conjugation to a biomolecule, such as an antibody, the pKa of the conjugate remains essentially unchanged thereby affording a consistent determination of pKa so the "off-on" characteristics of the conjugate are essentially the same as the free dye.

Without wishing to be bound by theory, Scheme C provides a possible mechanism for the unexpected properties of the oxyamine linker and attached X and/or Y groups of the RSL-oxyamine pH sensors provided herein.

Scheme B

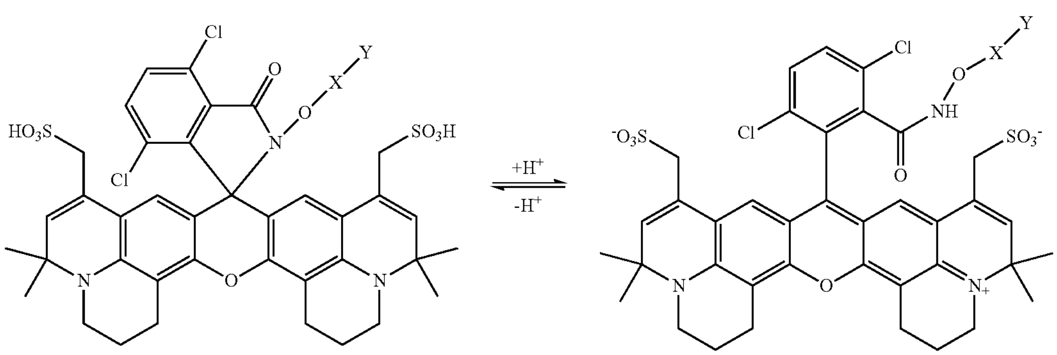

Off-State
Non-fluorescent

On-State
Strongly-fluorescent

X is C1-C6 alkyl or substituted alkyl; Y is chosen from Z, L—$R_x$ and L—$S_c$ as defined herein Scheme C

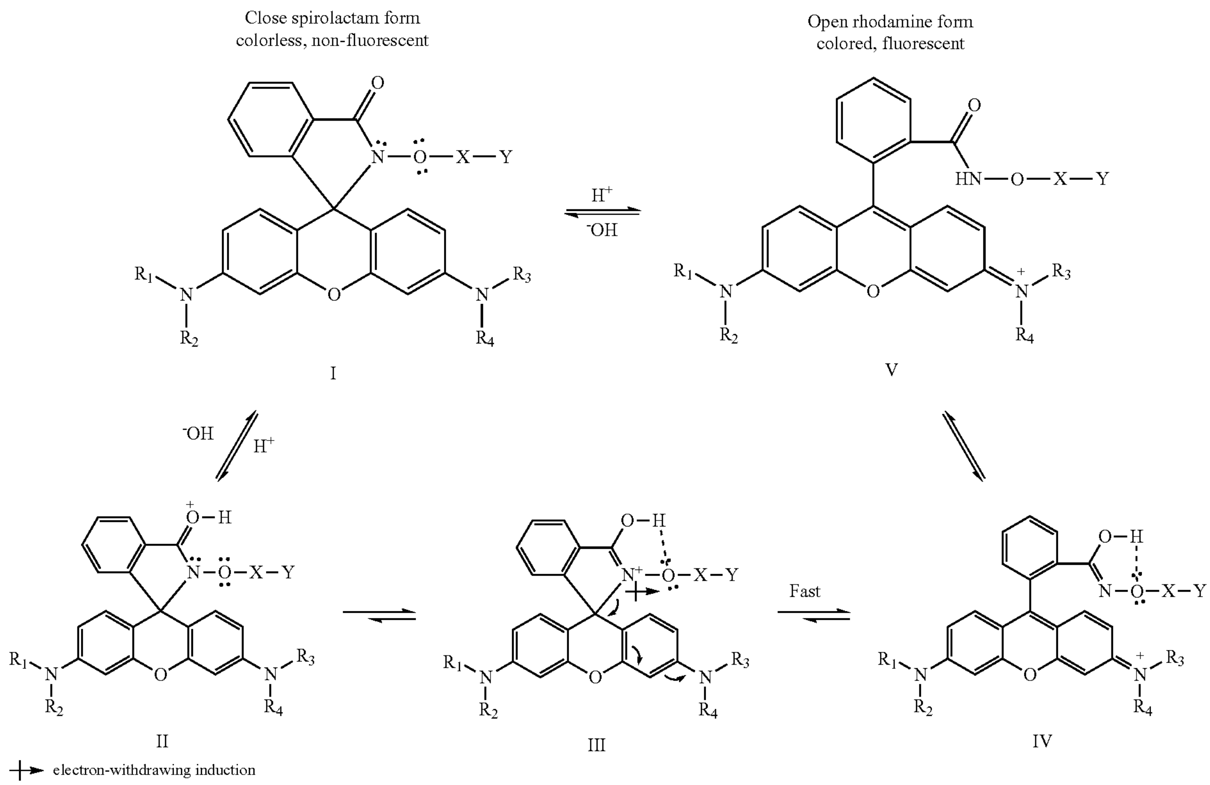

Czaplyski et al described the effects of certain substituents on the turn-on kinetics of rhodamine-based fluorescent pH probes noting that an increase in the rate of the conversion from non-fluorescent to fluorescent depends on the electronics of the spirolactam ring and associated an increased rate with an increase in electron-withdrawing substituents attached to the lactam nitrogen (Czaplyski et al, *Org. Biomol.* Chem. 12:526-533 (2014)). In other words, attaching an electron-withdrawing group to the lactam nitrogen of an RL with primary aliphatic amines or primary aniline moieties will reduce its electron density, e.g., modifying the neighbor carbon with electron-withdrawing group(s), and therefore increase the rate of conversion from non-fluorescent to fluorescent. In contrast, to create the RSL-oxyamines provided herein, the present inventors attached an alkoxy group to the lactam nitrogen, which resulted in a significant increase in the ring-opening rate when compared to the ring-opening rate of RL with primary aliphatic amines or primary aniline moieties. Because alkoxy groups can behave as electron-withdrawing groups by induction via the cm bonds due to its electro-negative oxygen as well as electron-donating groups by resonance via p-π conjugation due to the lone pairs of electrons on the oxygen, it cannot be predicted if the ring-opening rate will be increased or decreased by attaching an alkoxy group to the lactam nitrogen. In an effort to explain the unexpected result of the significant increase to the ring-opening rate by the alkoxy group, both the electron-withdrawing induction and electron-donating p-π conjugation may contribute to the fast ring-opening kinetics of rhodamine spiro-lactam triggered by protonation as depicted in Scheme C. In this scheme, in an acidic environment, structure I is protonated to structure II, which isomerizes to the stability-favored structure III. Structure III is favored since the structure avoids lone pair-lone pair repulsions in the N—O bond and the positive charge on the nitrogen is stabilized by delocalization of the lone-pairs on the oxygen via p-π conjugation (Bordwell et al, *J. Org. Chem.* 55:3330-3336 (1990); The Chemistry of Hydroxylamines, Oximes and Hydroxamic Acids, vol. 1, John Wiley & Sons, Dec. 23, 2008). The positive charge on the nitrogen atom and the electron-withdrawing induction of the oxygen through the GG N—O bond force the rapid ring-opening to form the more stable structure IV, in which the positive charge is delocalized in the much larger conjugation xanthine moiety, becoming colored and fluorescent. After protonation, the RSL-oxyamine exists as an equilibrium between structures IV and V.

Thus, the use of an alkoxy group attached to the lactam nitrogen creating an oxyamine linkage unexpectedly resulted in an immediate ring-opening rate by combining the effects of electron-withdrawing induction and resonance electron-donating properties of the alkyoxy group which also results in a fast rate of protonation triggered ring-opening.

In certain embodiments, the compounds provided herein can be used in fluorescence resonance energy transfer (FRET) systems. For example, the compounds provided herein can be paired with a FRET donor or FRET acceptor to form a pH sensitive FRET pair. When protonated, the compound can be a FRET acceptor or FRET donor, or energy relay for a donor-relay-acceptor energy transfer system.

In one embodiment, the present disclosure relates to compounds chosen from a compound of Formula (I):

(I)

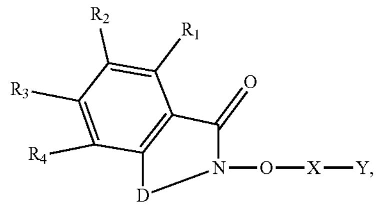

its corresponding compound of Formula (II)

(II)

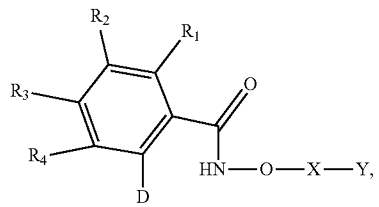

wherein,

X is a $C_1$-$C_6$ alkyl or substituted alkyl;

Y is chosen from Z, L-$R_x$ and L-$S_c$;

Z is absent or chosen from polyethylene glycol (PEG), alkyl, substituted alkyl, alkenyl, substituted alkenyl, alkynyl, substituted alkynyl, carbonyl, aryl, substituted aryl, heteroaryl and substituted aryl;

L is a linker chosen from a single covalent bond, and a moiety comprising a series of covalent bonds and incorporating at least one atom chosen from C, N, O, S and P;

$R_x$ is a reactive group;

$S_c$ is a conjugated substance;

$R_1$, $R_2$, $R_3$, and $R_4$ are each independently chosen from H, alkyl, substituted alkyl, alkenyl, substituted alkenyl, alkynyl, substituted alkynyl, cyano, halo, hydroxy, nitro, sulfo, sulfonyl, sulfonyloxy, thioacyl, thiol, alkylthio, substituted alkylthio, acyl, aryl, substituted aryl, heteroaryl, substituted heteroaryl, cycloalkyl, substituted cycloalkyl, heterocyclyl, substituted heterocyclyl, L-$R_x$ and L-$S_c$; and D is chosen from a xanthene ring and a xanthene ring analog, and salts thereof.

In some embodiments, D is a xanthene ring analog chosen from fluoresceins, eosins, rhodamines, Boron-rhodamines (B-rhodamines), Carbon-rhodamines (C-rhodamines), Silicon-rhodamines (Si-rhodamines), Germanium-rhodamines (Ge-rhodamines), Tin-rhodamines (Sn-rhodamines), Nitrogen-rhodamines (N-rhodamines), Phosphorous-rhodamines (P-rhodamines), Sulfur-rhodamines (S-rhodamines), Selenium-rhodamines (Se-rhodamines), Tellurium-rhodamines (Te-rhodamines), hybrid rhodamines, and asymmetrical rhodamines.

In some embodiments, D is chosen from

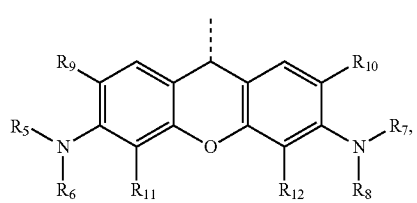

-continued

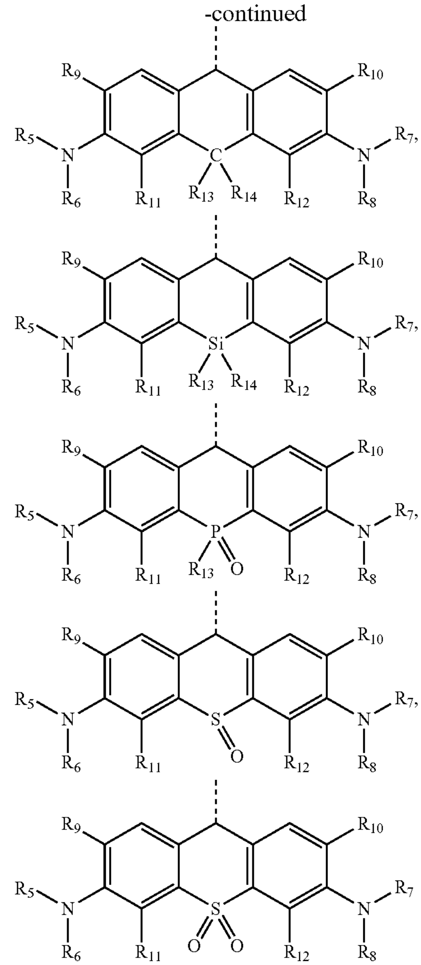

and wherein $R_5$, $R_6$, $R_7$ and $R_8$ are each independently chosen from H, alkyl, substituted alkyl, alkenyl, substituted alkenyl, alkynyl, substituted alkynyl, aryl, substituted aryl, heteroaryl, substituted heteroaryl, cycloalkyl, substituted cycloalkyl, heterocyclyl, substituted heterocyclyl, L-$R_x$ and L-$S_c$; and $R_9$, $R_{10}$, $R_{11}$, $R_{12}$, $R_{13}$ and $R_{14}$ are each independently chosen from H, alkyl, substituted alkyl, alkenyl, substituted alkenyl, alkynyl, substituted alkynyl, alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, carboxyl, carboxyl ester, (carboxyl ester)amino, (carboxyl ester)oxy, cyano, halo, hydroxy, nitro, sulfo, sulfonyl, sulfonyloxy, thioacyl, thiol, alkylthio, substituted alkylthio, aryl, substituted aryl, heteroaryl, substituted heteroaryl, cycloalkyl, substituted cycloalkyl, heterocyclyl, substituted heterocyclyl, L-$R_x$ and L-$S_c$; or $R_8$ is taken together with $R_{12}$ and the atoms to which they are attached to form an optionally substituted fused ring;

or $R_9$ is taken together with $R_5$ and the atoms to which they are attached to form an optionally substituted fused ring;

or $R_{10}$ is taken together with $R_7$ and the atoms to which they are attached to form an optionally substituted fused ring;

or $R_1$ is taken together with $R_6$ and the atoms to which they are attached to form an optionally substituted fused ring.

In some embodiments, D is chosen from

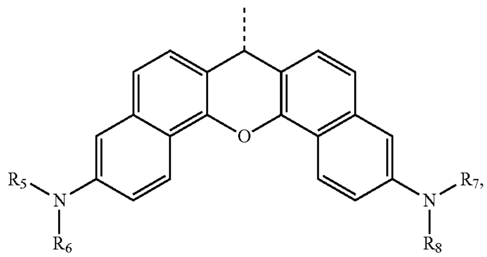

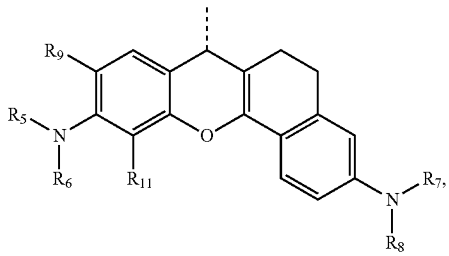

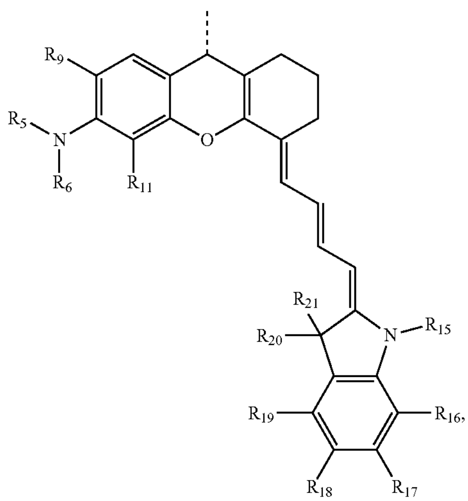

and

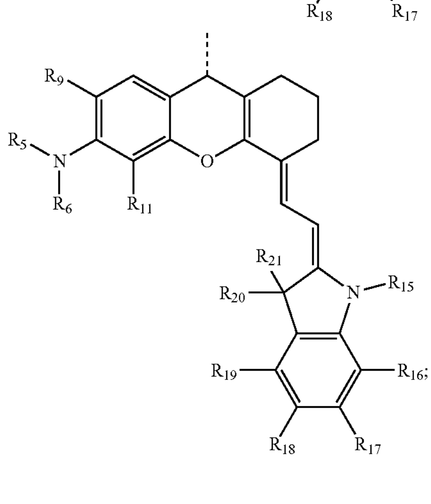

wherein $R_5$, $R_6$, $R_7$ and $R_8$ are each independently chosen from H, alkyl, substituted alkyl, alkenyl, substituted alkenyl, alkynyl, substituted alkynyl, aryl, substituted aryl, heteroaryl, substituted heteroaryl, cycloalkyl, substituted cycloalkyl, heterocyclyl, substituted heterocyclyl, L-$R_x$ and L-$S_c$; and $R_9$, $R_{11}$, $R_{15}$, $R_{16}$, $R_{17}$, $R_{18}$, $R_{19}$, $R_{20}$ and $R_{21}$ are each independently chosen from H, alkyl, substituted alkyl, alkenyl, substituted alkenyl, alkynyl, substituted alkynyl, alkoxy, substituted alkoxy, acyl, acylamino, acyloxy, amino, substituted amino, aminocarbonyl, aminothiocarbonyl, aminocarbonylamino, aminothiocarbonylamino, aminocarbonyloxy, aminosulfonyl, aminosulfonyloxy, aminosulfonylamino, amidino, carboxyl, carboxyl ester, (carboxyl ester)amino, (carboxyl ester)oxy, cyano, halo, hydroxy, nitro, sulfo, sulfonyl, sulfonyloxy, thioacyl, thiol, alkylthio, substituted alkylthio, aryl, substituted aryl, heteroaryl, substituted heteroaryl, cycloalkyl, substituted cycloalkyl, heterocyclyl, substituted heterocyclyl, L-$R_x$ and L-$S_c$.

In some embodiments, the compound is chosen from

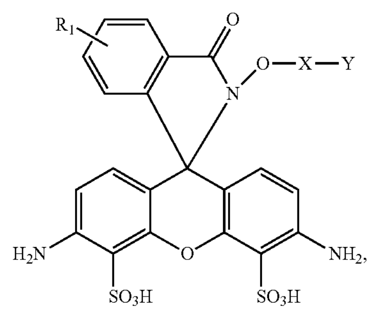

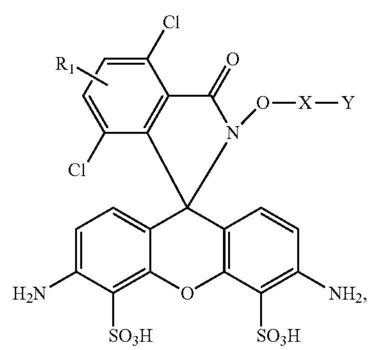

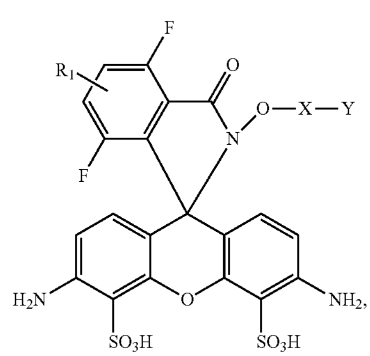

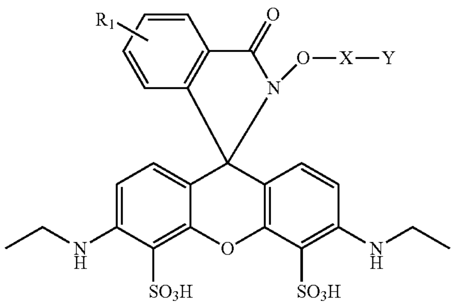
,
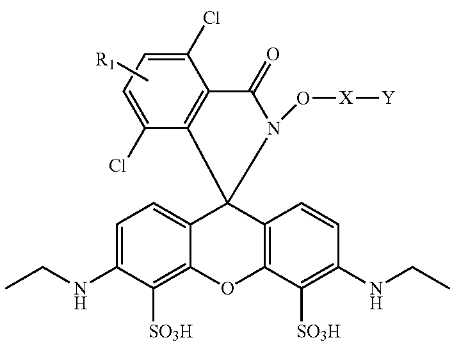
,
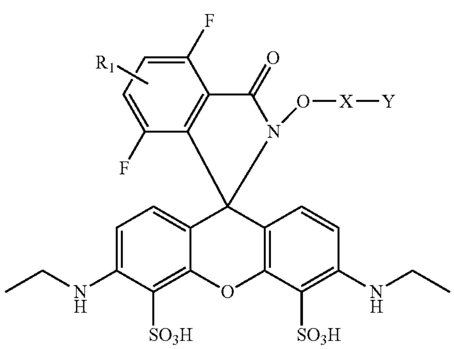
,
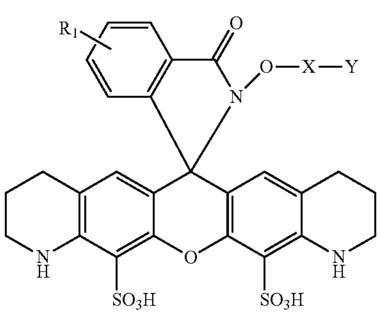
,
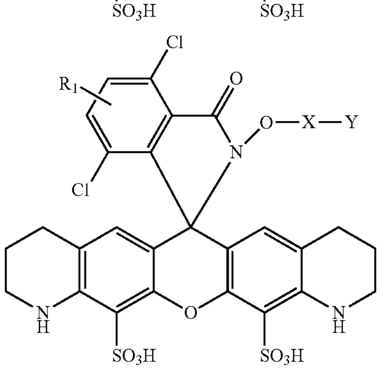
,
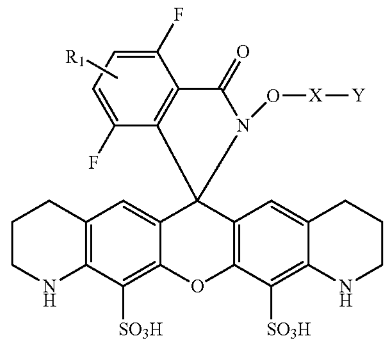
,
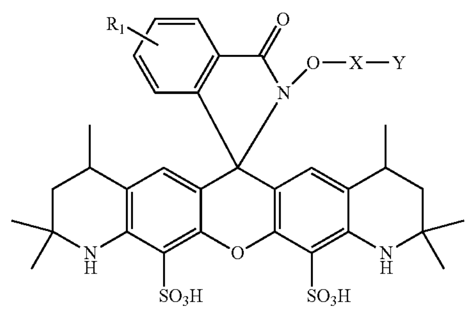
,
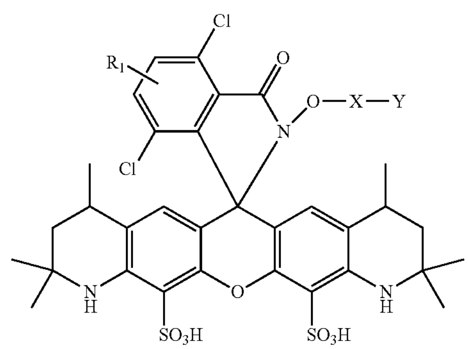
,
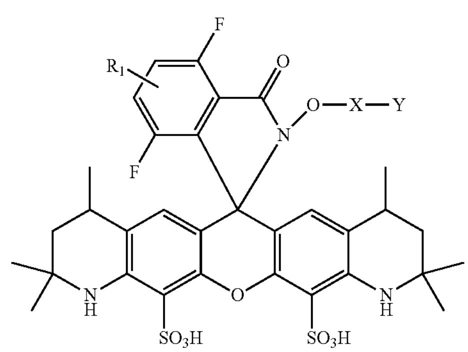
,
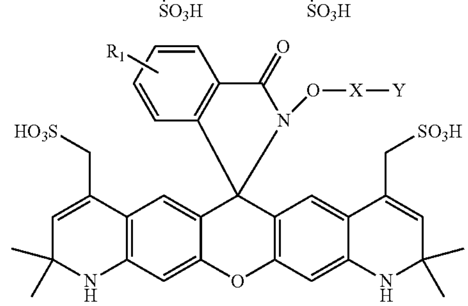
,

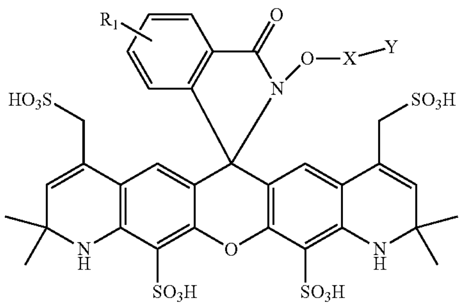
,
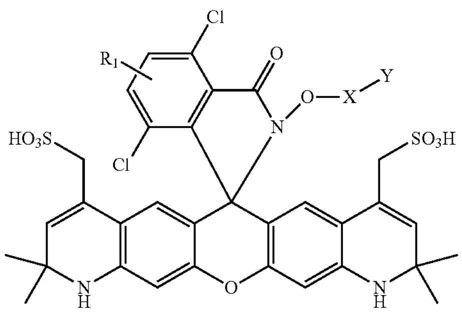
,
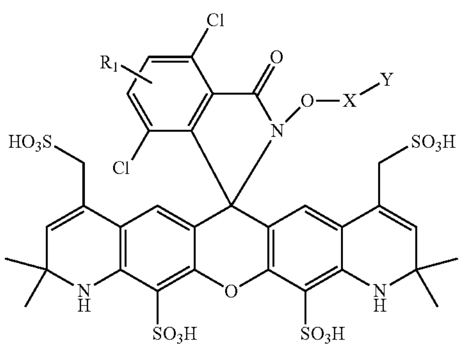
,
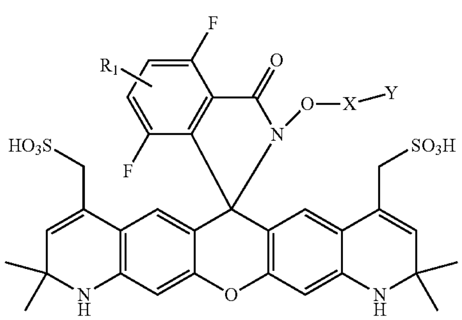
,
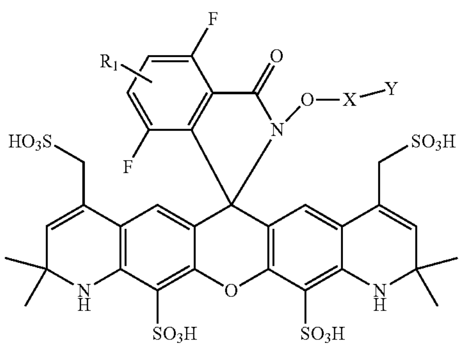
,
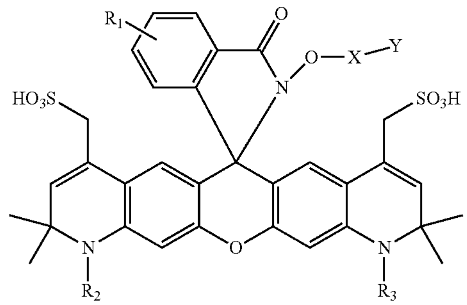
,
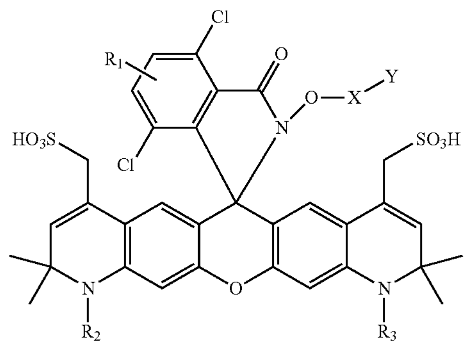
,
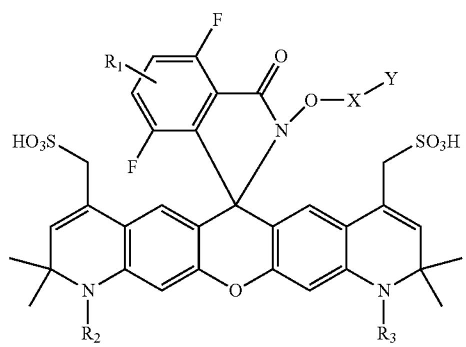
,
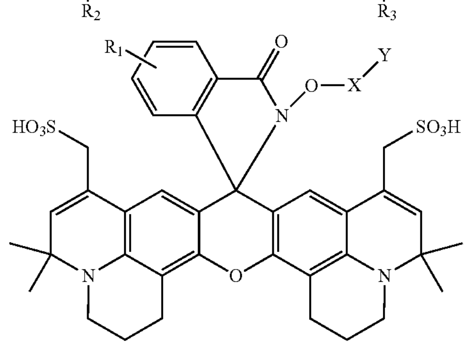
,
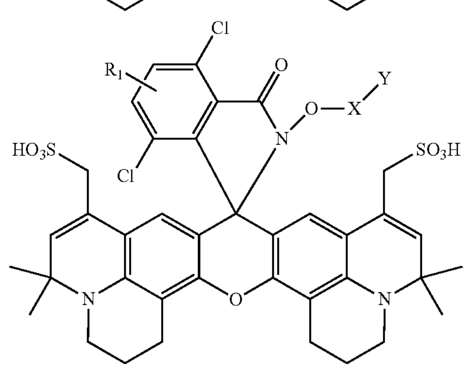
, -continued
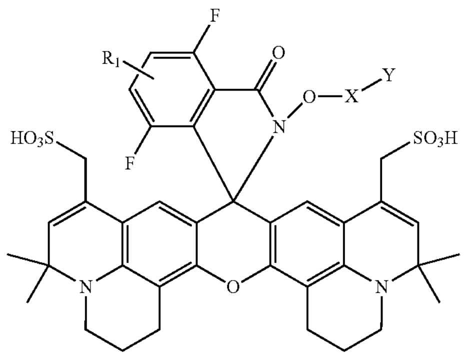
,
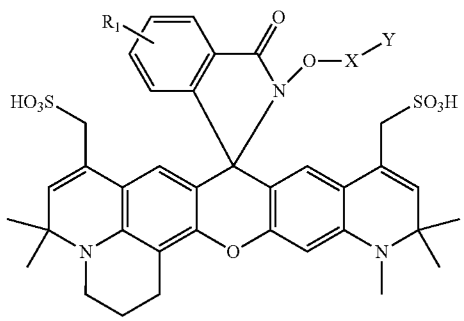
,
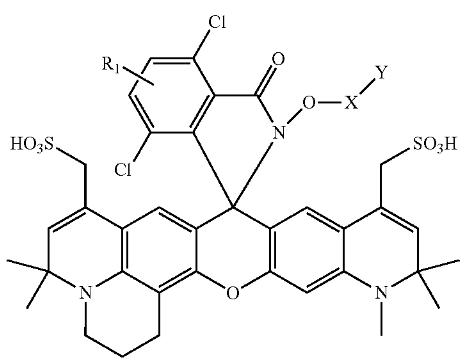
,
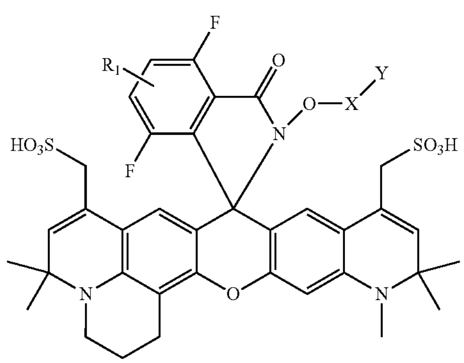
,
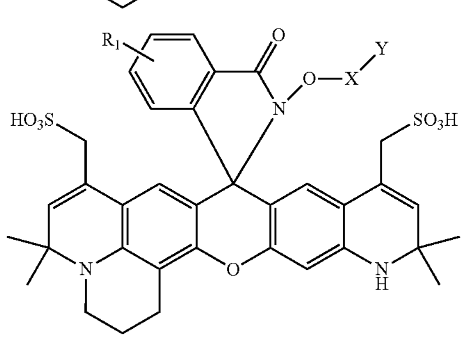
,
-continued
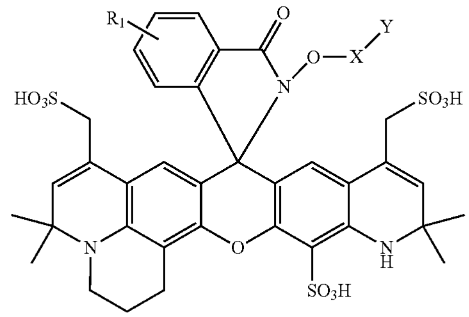
,
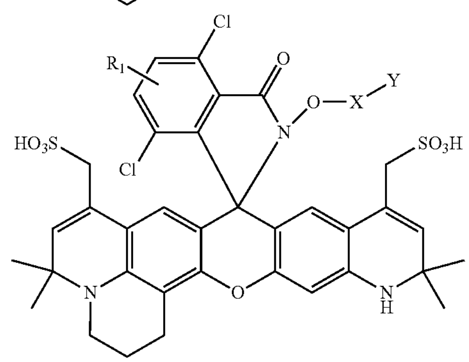
,
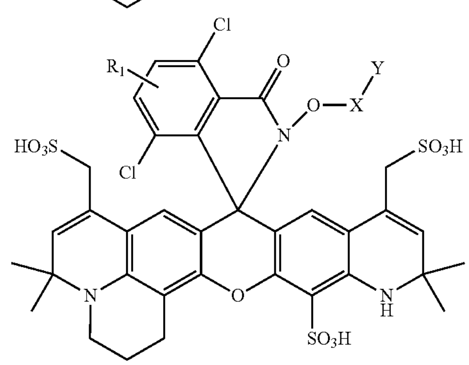
,
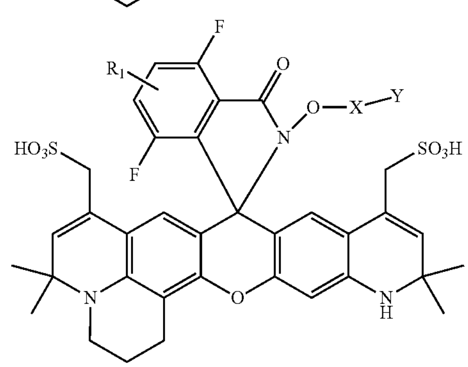
,
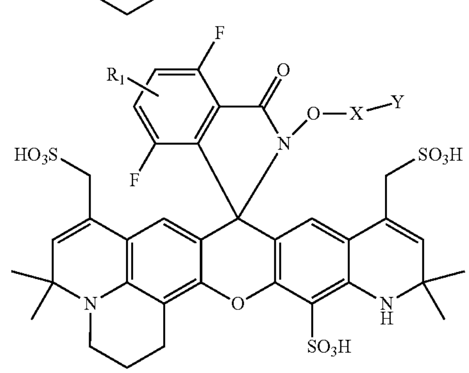
, -continued
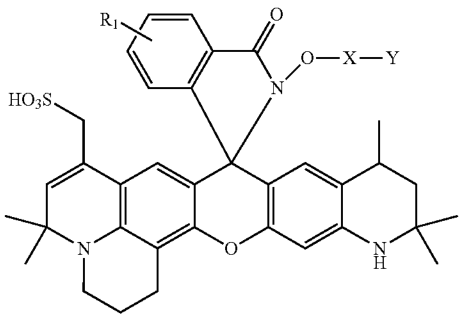
,
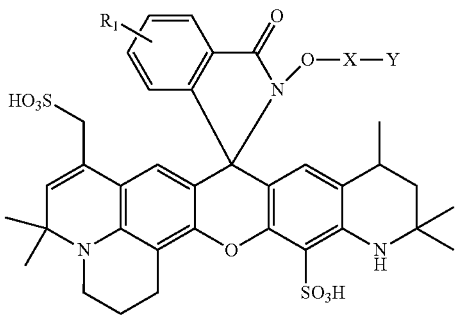
,
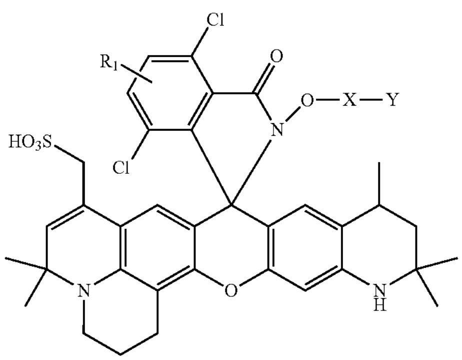
,
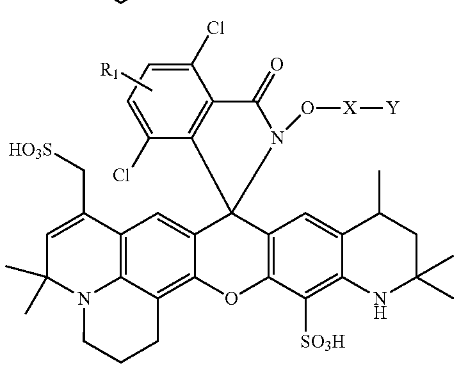
,
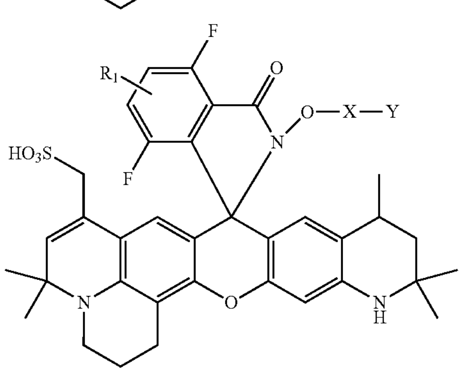
,
-continued
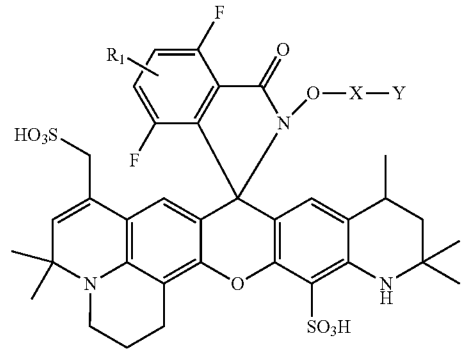
,
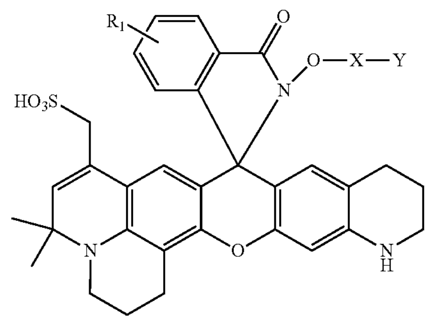
,
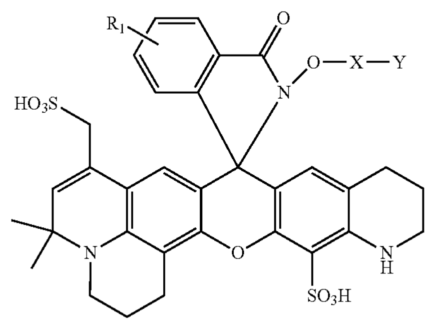
,
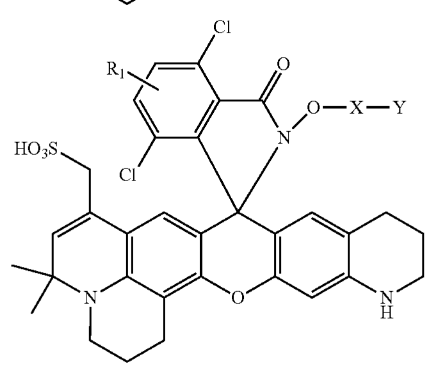
,
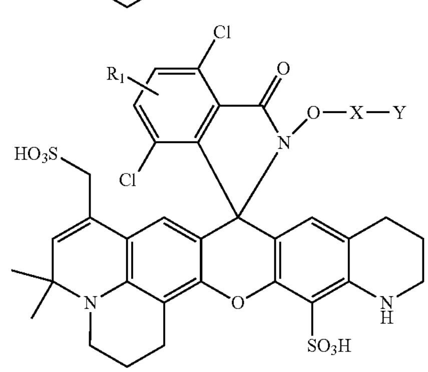
, -continued
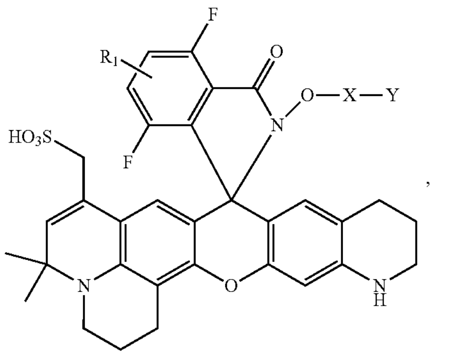
,
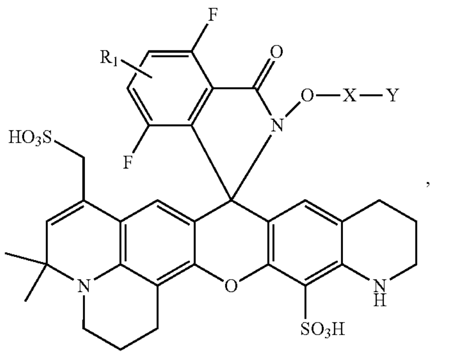
,
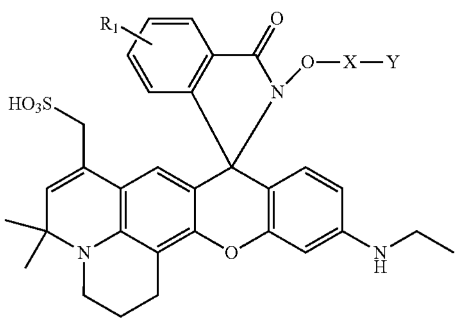
,
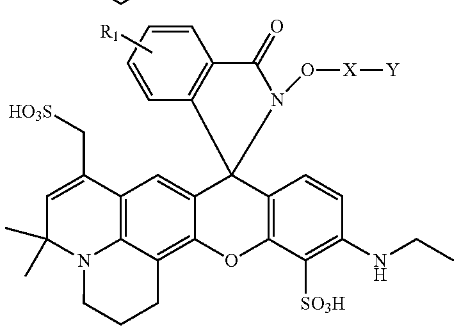
,
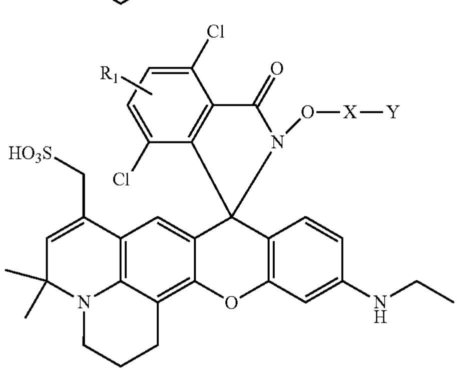
,
-continued
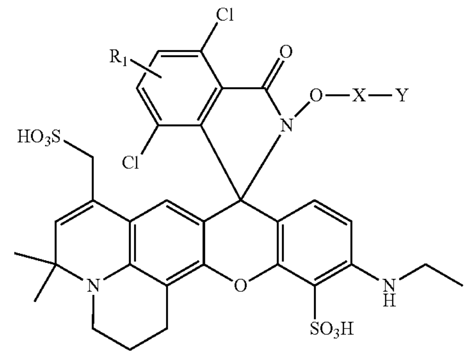
,
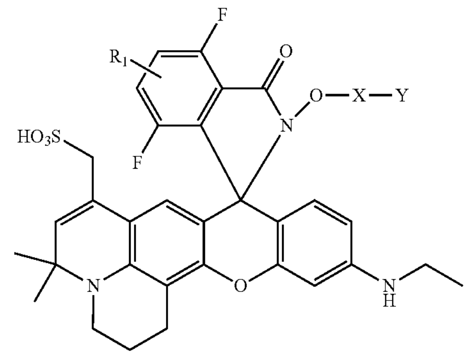
,
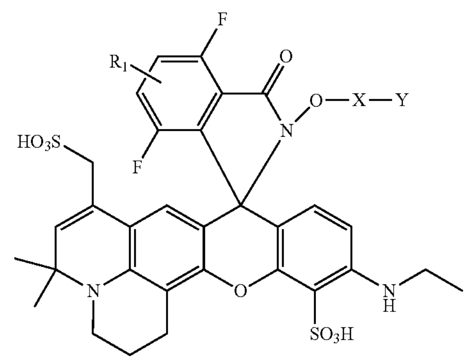
,
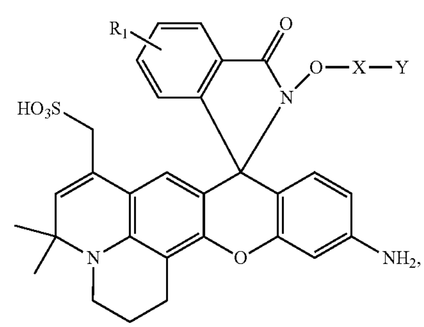
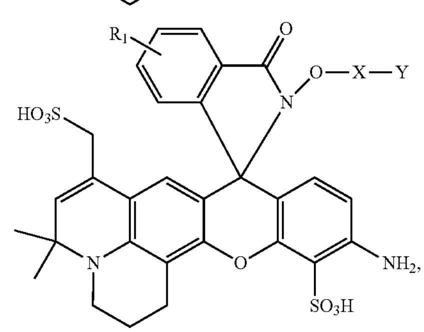

-continued
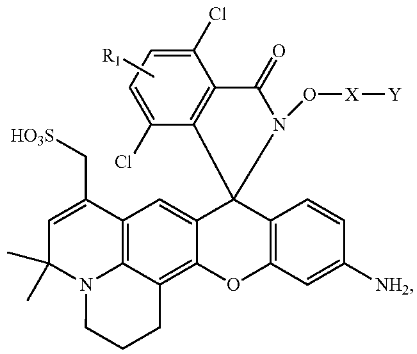
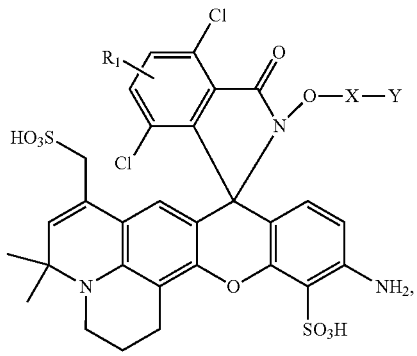
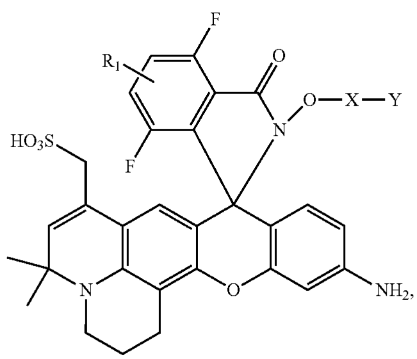
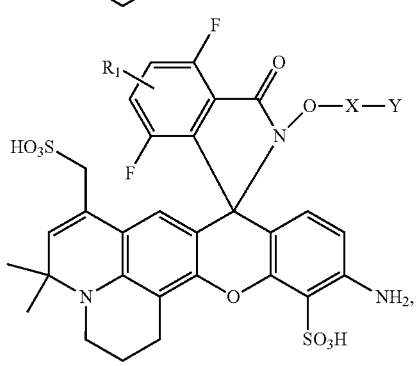
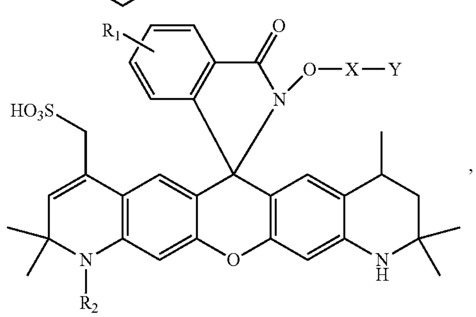
-continued
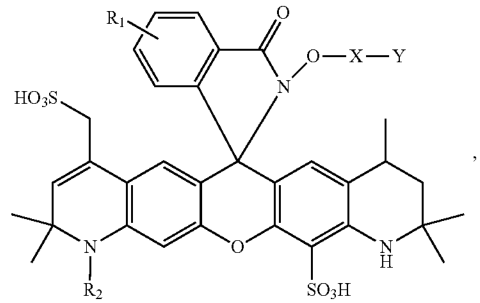
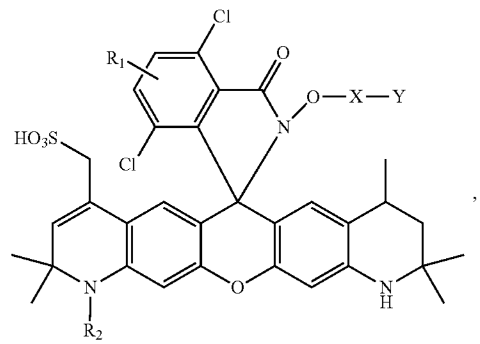
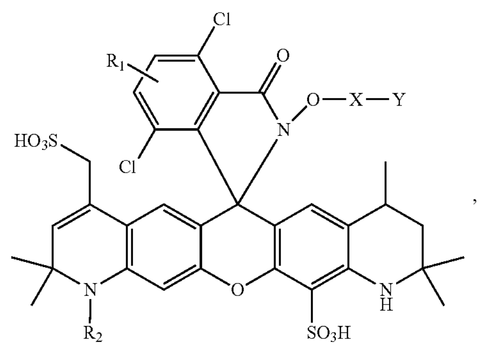
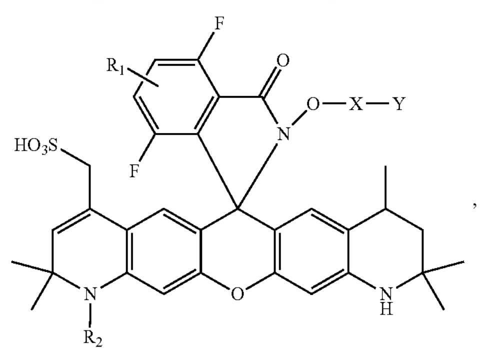
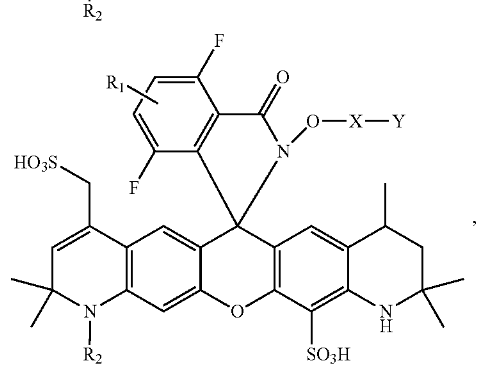

-continued
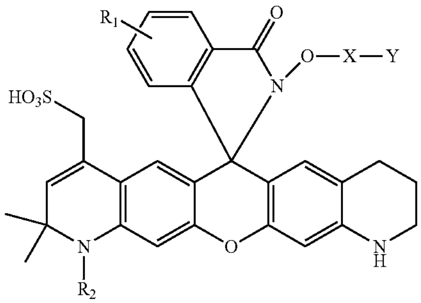
,
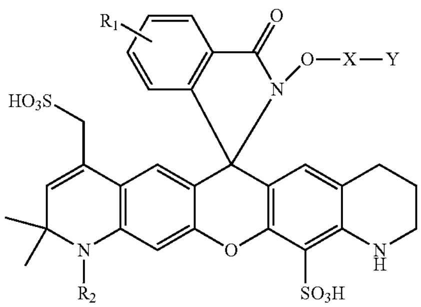
,
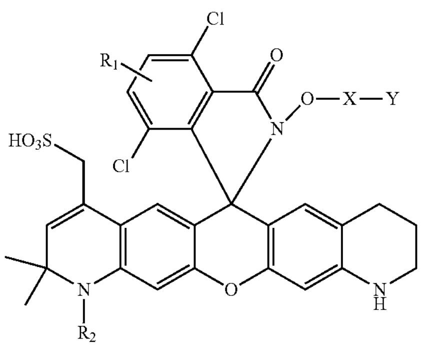
,
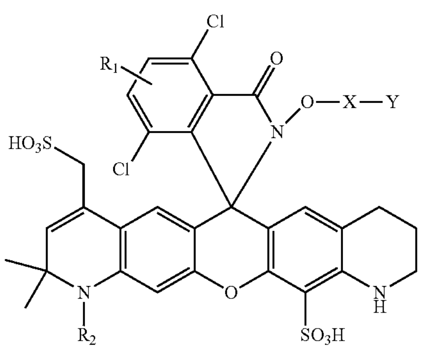
,
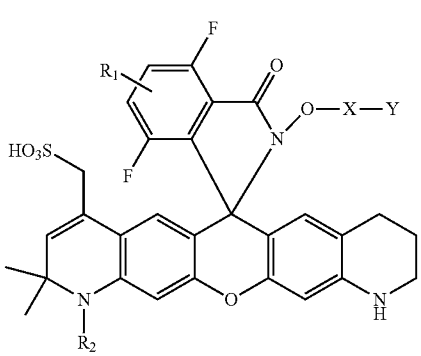
,
-continued
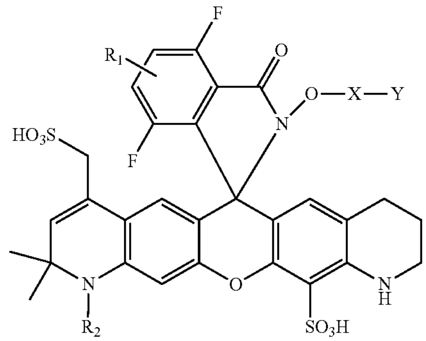
,
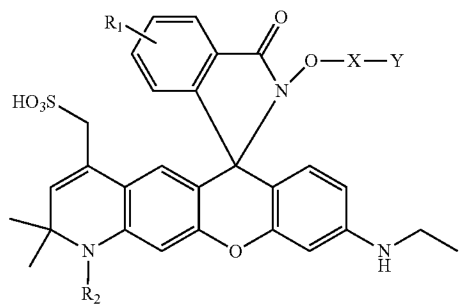
,
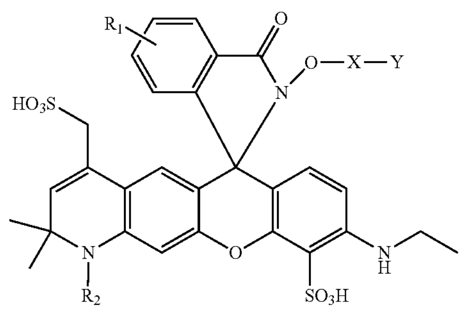
,
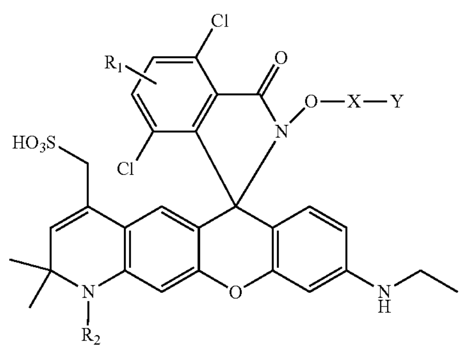
,
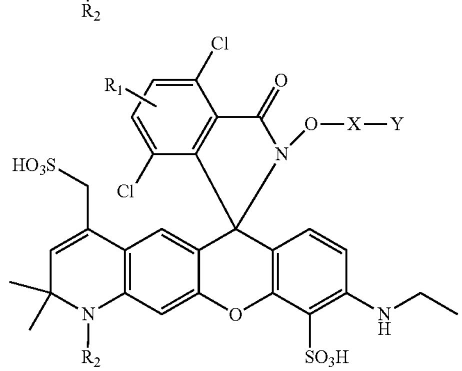
, -continued
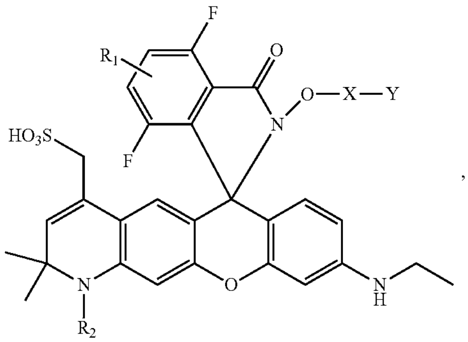
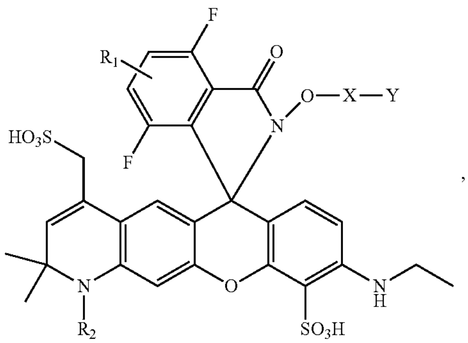
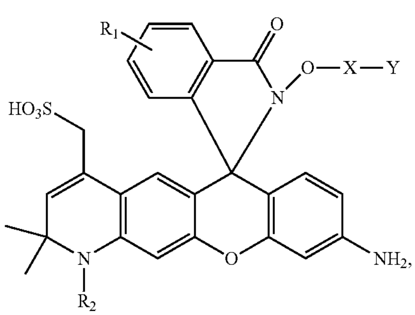
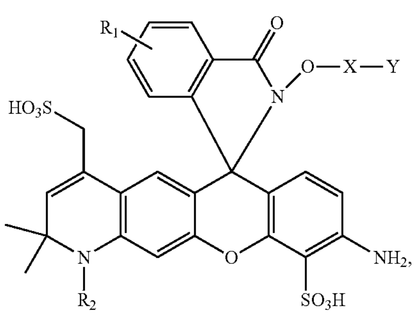
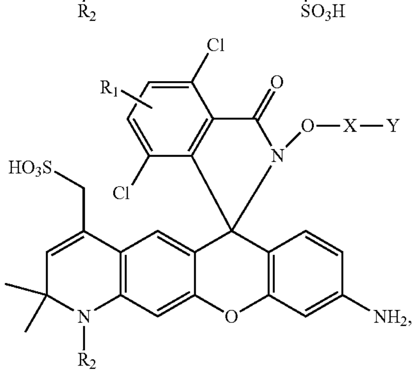
-continued
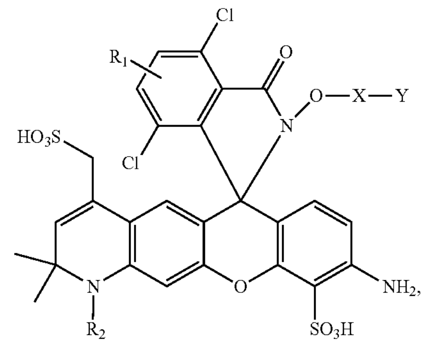
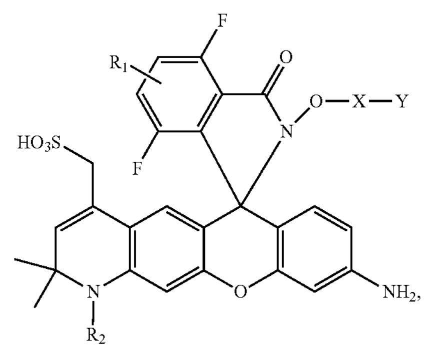
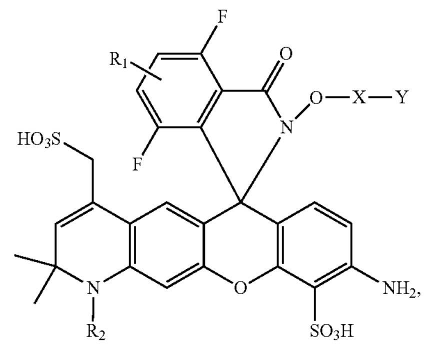
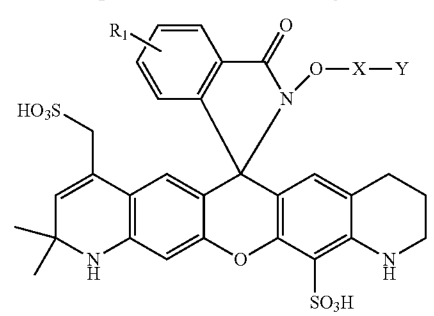
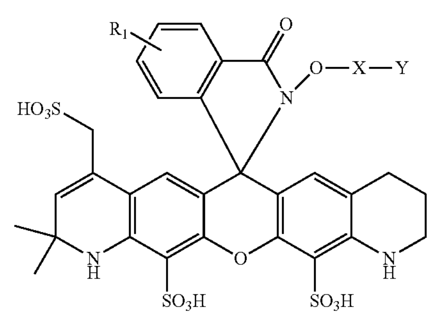

-continued
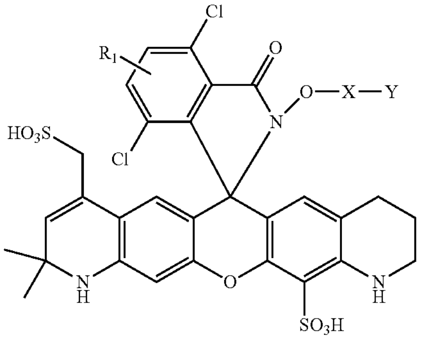
,
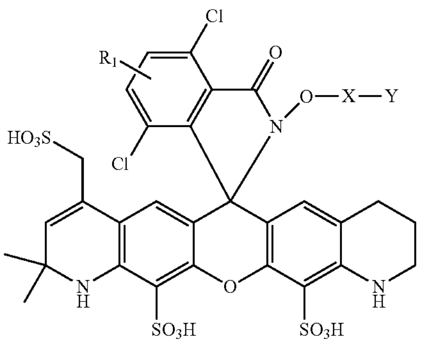
,
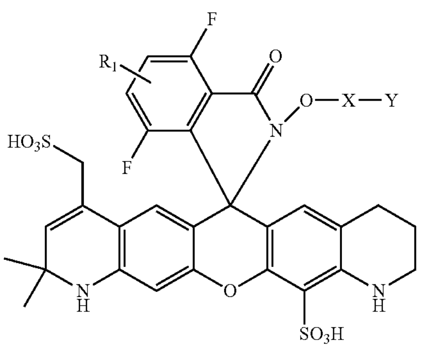
,
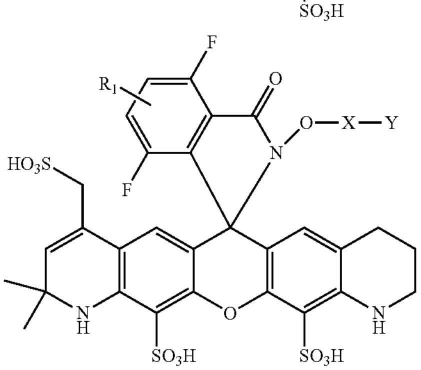
,
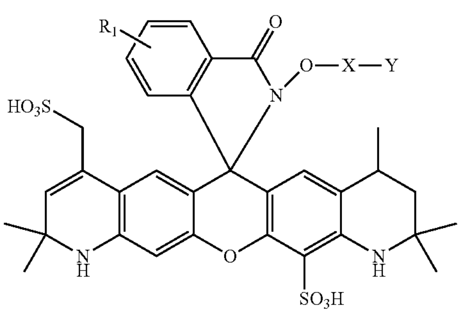
,
-continued
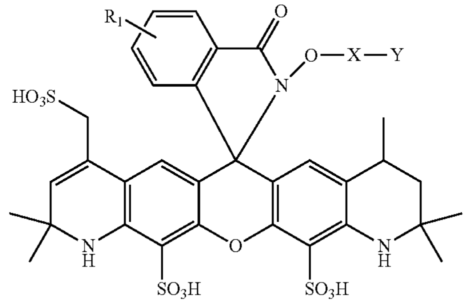
,
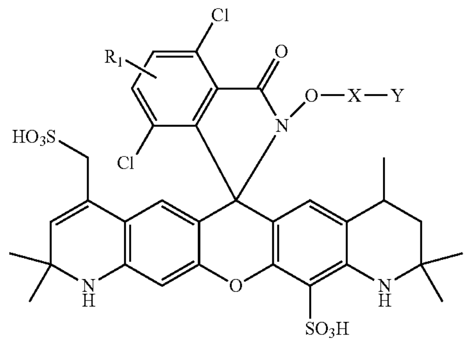
,
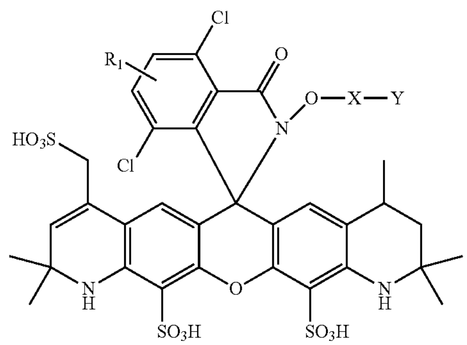
,
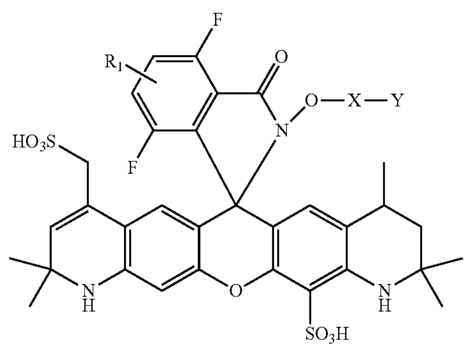
,
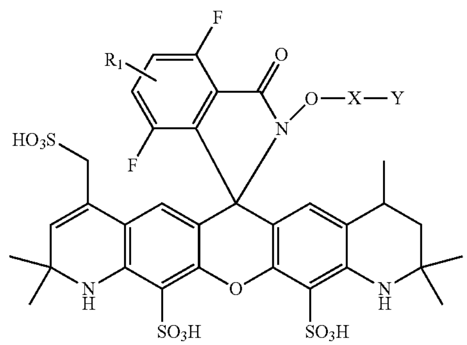
, -continued
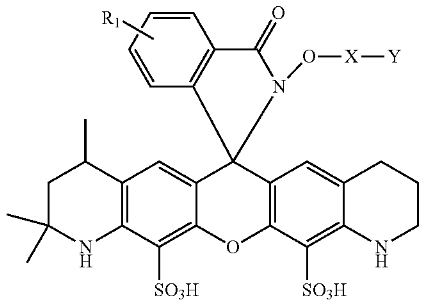
,
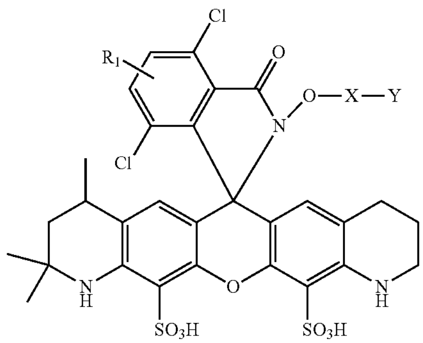
,
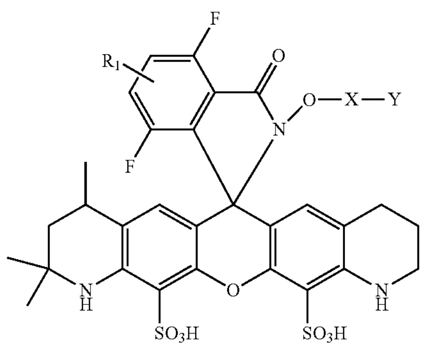
,
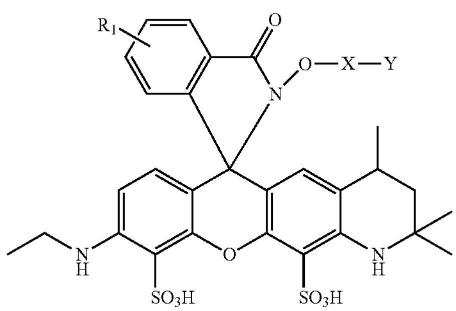
,
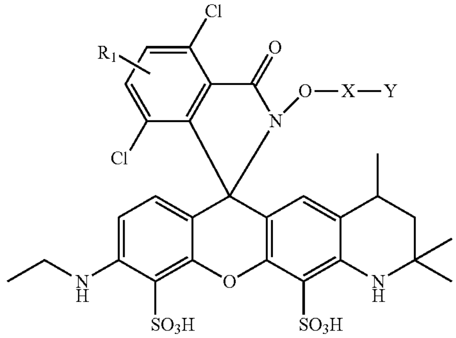
,
-continued
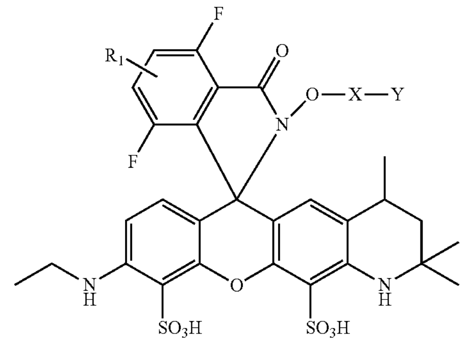
,
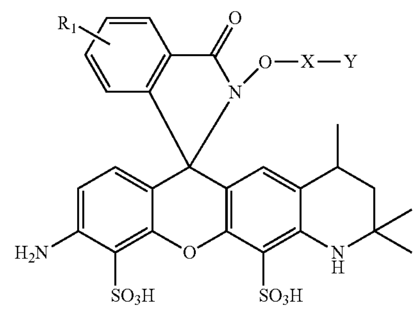
,
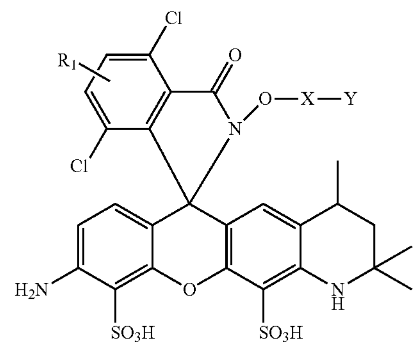
,
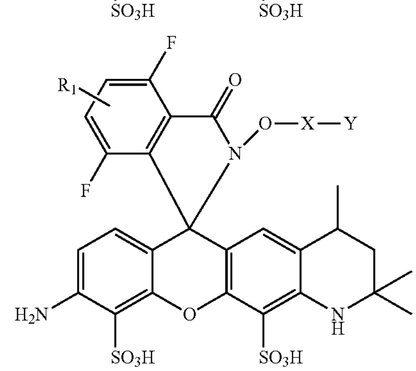
,
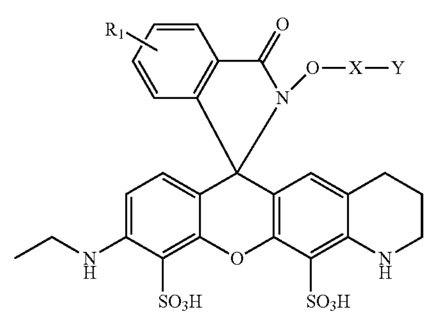
, -continued
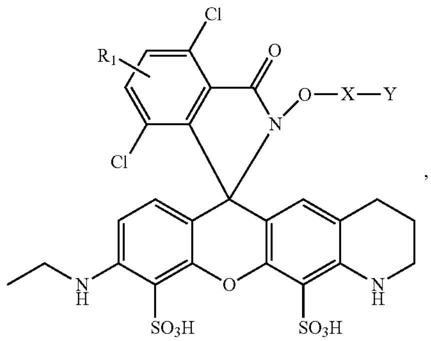
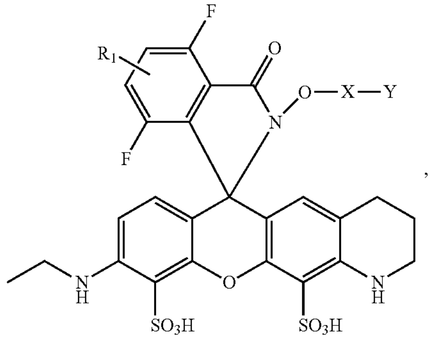
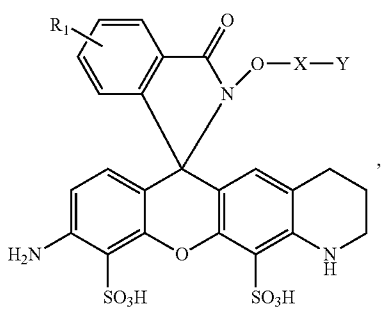
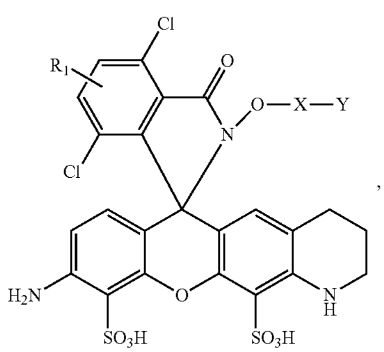
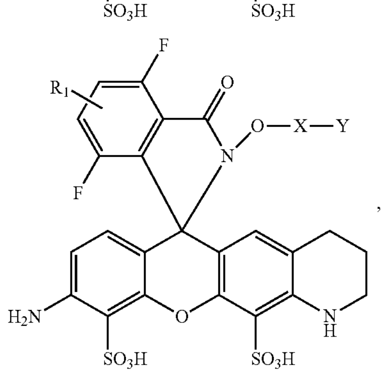
-continued
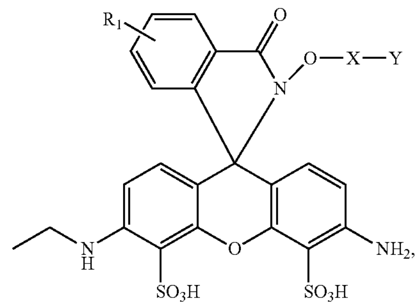
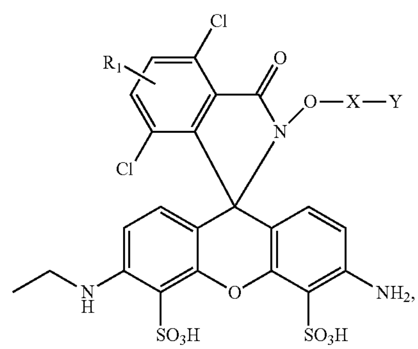
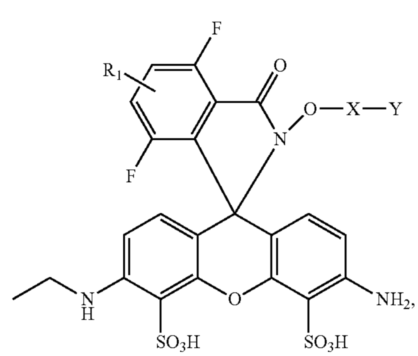
and salts thereof.

In some embodiments, the O—X—Y group of the compounds provided herein is chosen from

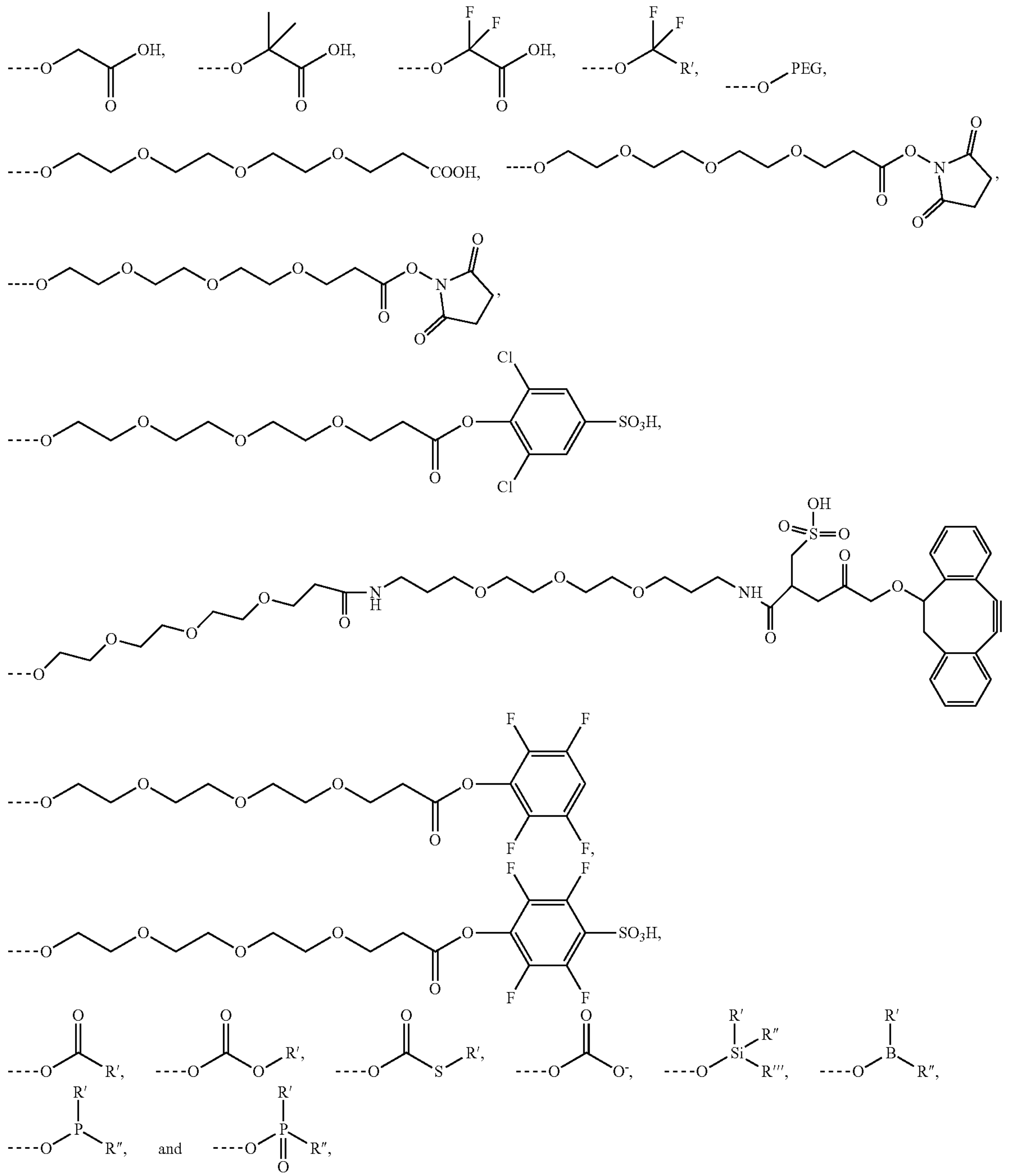

wherein R', R'' and R''' are each independently chosen from H, polyethylene glycol (PEG), alkyl, substituted alkyl, alkenyl, substituted alkenyl, alkynyl, substituted alkynyl, carbonyl, aryl, heteroaryl, heteroatom, ═O, ═NH, ═S, and lone pair electrons.

In some embodiments, $R_x$ is chosen from an acrylamide, a carboxylic acid, an activated ester of a carboxylic acid, an acyl azide, an acyl halide, hydroxy, an aldehyde, an alkyl halide, a sulfonate, an amine, an anhydride, an aniline, an aryl halide, an azide, an aziridine, a boronate, a carbodiimide, a diazoalkane, an epoxide, a glycol, a haloacetamide, a halomethyl, a halotriazine, a hydrazine, a hydroxylamine, an imido ester, an iodoacetamide, an isothiocyanate, a ketone, a maleimide, a sulfonyl halide, a thiol group, a succinimidyl ester, a substituted succinimidyl ester, a sulfo-succinimidyl ester, a reactive phenyl ester, a dibromophenyl ester, a nitrophenyl ester, a sulfodichlorophenyl ester, a sulfotetrafluorophenyl ester, a tetrafluorophenyl ester, a pentafluorophenyl ester, a thiophenyl ester, a substituted thiophenyl ester, a nitrilotriacetic acid, an isocyanate, a cyanate, an aminodextran, an acetoxymethyl ester, and a DIBO-amine.

In other embodiments, $R_x$ is chosen from a carboxylic acid, an activated ester of a carboxylic acid, an amine, a maleimide, an iodoacetamide, an isothiocyanate, a halomethyl, a succinimidyl ester, a sulfodichlorophenyl ester, a sulfotetrafluorophenyl ester, a tetrafluorophenyl ester, a pentafluorophenyl ester, a nitrilotriacetic acid, an aminodextran, an acetoxymethyl ester, or and a cyclooctyne-amine.

In some embodiments, $S_c$ is chosen from a biomolecule and a solid support. In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand. In certain embodiments, the biomolecule is an *E. coli* bioparticle.

In some embodiments, the solid support is chosen from an aerogel, a hydrogel, a resin, a silica gel, a bead, a biochip, a microfluidic chip, a silicon ship, a multi-well plate, a membrane, a polymeric membrane, a particle, a derivatized plastic film, a glass bead, cotton, a plastic bead, alumina gel, polysaccharide, poly(acrylate), polystyrene, poly(acrylamide), polyol, agarose, agar, cellulose, dextran, starch, heparin, glycogen, amylopectin, mannan, inulin, nitrocellulose, diazocellulose, polyvinylchloride, polypropylene, polyethylene, nylon, latex bead, a conducting metal, a nonconducting metal, glass, a quantum dot, a nanocrystal, a nanoparticle, a nanotube, a carbon nanotube, graphene, magnetic bead, paramagnetic bead, superparamagnetic bead, and a magnetic support.

In certain embodiments, the compound is a salt of a compound of Formula (I) or its corresponding compound of Formula (II). In some embodiments, the compound is chosen from:

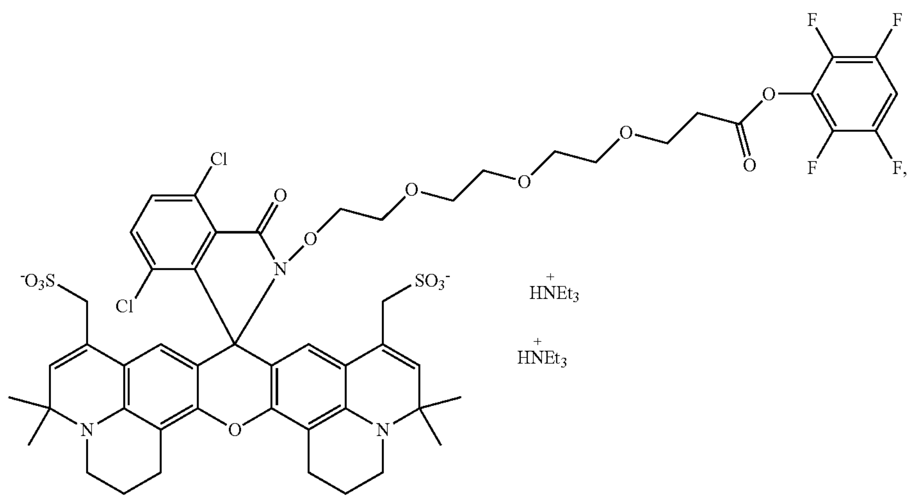

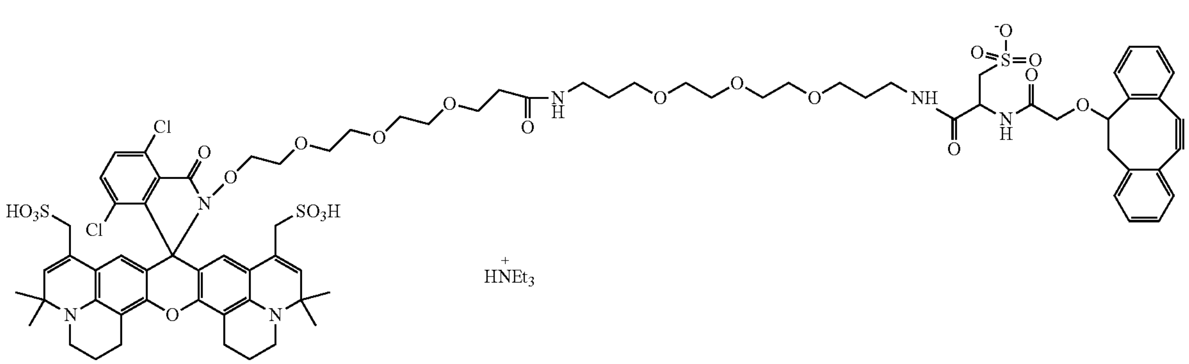

-continued
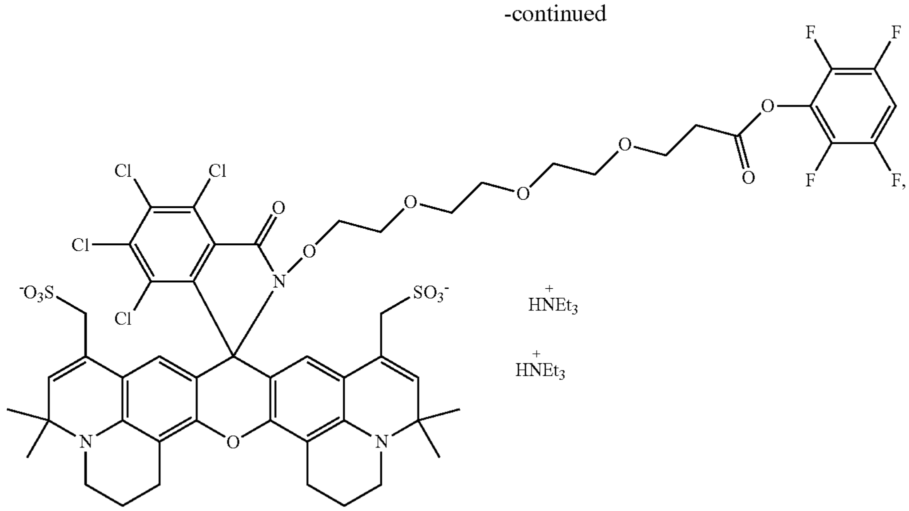
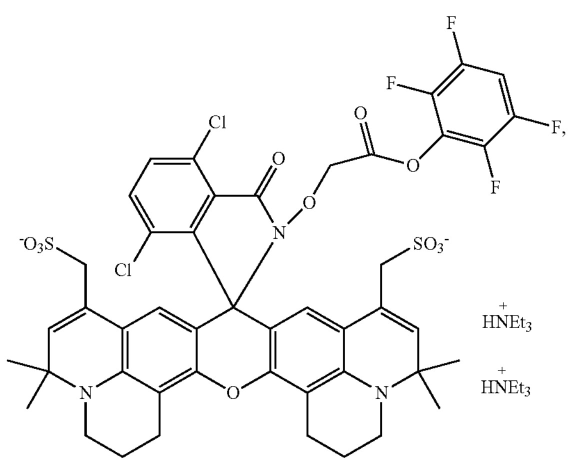
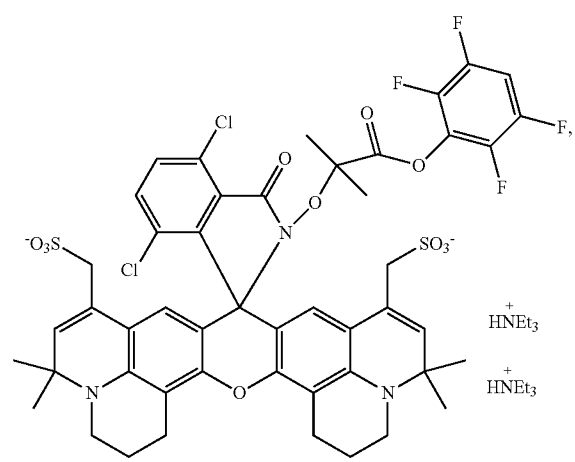
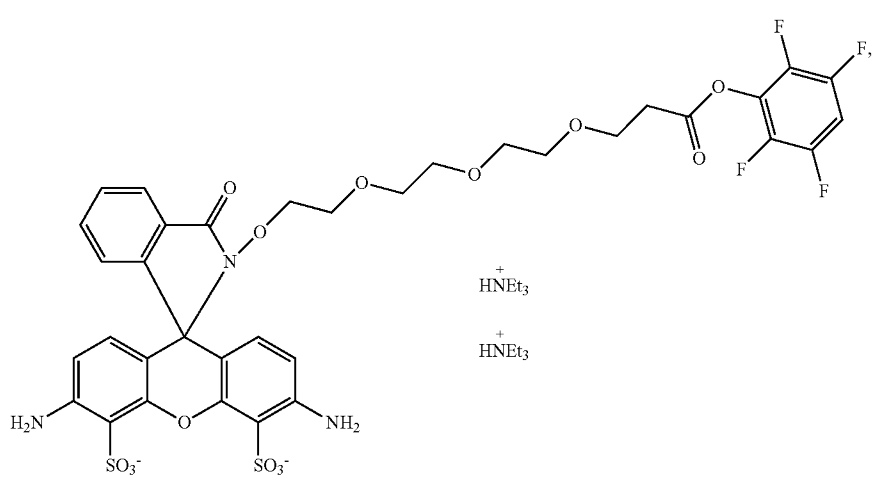
and

-continued

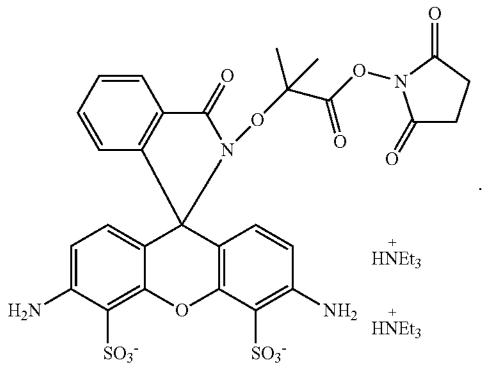

Reactive Groups:

In certain embodiments, the compounds provided herein are chemically reactive and are substituted by at least one reactive group ($R_x$). The reactive group functions as the site of attachment for another moiety, such as a biomolecule or a solid support, wherein the reactive group chemically reacts with an appropriate reactive or functional group on the biomolecule or solid support.

In certain embodiments, the compounds provided herein further comprise a reactive group which is a member selected from an acrylamide, an activated ester of a carboxylic acid, a carboxylic ester, an acyl azide, an acyl nitrile, an aldehyde, an alkyl halide, an anhydride, an aniline, an amine, an aryl halide, an azide, an aziridine, a boronate, a diazoalkane, a haloacetamide, a haloalkyl, a halotriazine, a hydrazine, an imido ester, an isocyanate, an isothiocyanate, a maleimide, a phosphoramidite, a photoactivatable group, a reactive platinum complex, a silyl halide, a sulfonyl halide, and a thiol. In certain embodiments, the reactive group is chosen from an acrylamide, a carboxylic acid, an activated ester of a carboxylic acid, an acyl azide, an acyl halide, hydroxy, an aldehyde, an alkyl halide, a sulfonate, an amine, an anhydride, an aniline, an aryl halide, an azide, an aziridine, a boronate, a carbodiimide, a diazoalkane, an epoxide, a glycol, a haloacetamide, a halomethyl, a halotriazine, a hydrazine, a hydroxylamine, an imido ester, an iodoacetamide, an isothiocyanate, a ketone, a maleimide, a sulfonyl halide, a thiol group, a succinimidyl ester, a substituted succinimidyl ester, a sulfo-succinimidyl ester, a reactive phenyl ester, a dibromophenyl ester, a nitrophenyl ester, a sulfodichlorophenyl ester, a sulfotetrafluorophenyl ester, a tetrafluorophenyl ester, a pentafluorophenyl ester, a thiophenyl ester, a substituted thiophenyl ester, a nitrilotriacetic acid, an isocyanate, a cyanate, an aminodextran, an acetoxymethyl ester, and a cyclooctyne-amine, such as a DIBO-amine. In certain embodiments the reactive group is selected from the group consisting of carboxylic acid, succinimidyl ester of a carboxylic acid, hydrazide, amine a maleimide, a tetrafluorophenyl ester and a DIBO-amine. The reactive group may be attached to any appropriate site on the compounds provided herein. In certain embodiments, at least one member chosen from Y, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ $R_{15}$, $R_{16}$, $R_{17}$, $R_{18}$, $R_{19}$, $R_{20}$ and $R_{21}$ is a reactive group. In certain embodiments, at least one member chosen from Y, $R^1$, $R^2$, $R^3$ and $R^4$ is a reactive group. Alternatively, if the compounds disclosed herein comprise a biomolecule or solid support a reactive group may be covalently attached independently to those substituents, allowing for further conjugation to a biomolecule or solid support.

These reactive groups are synthesized during the formation of the compounds provided herein and biomolecule- and/or solid support-containing compounds to provide chemically reactive compounds. In this way, compounds incorporating a reactive group may be covalently attached to a wide variety of biomolecules or solid supports that contain, or are modified to contain, functional groups with suitable reactivity, resulting in chemical attachment of the components. In certain embodiments, the reactive group of the compounds disclosed herein, and the functional group of the biomolecule or solid support comprise electrophiles and nucleophiles that can generate a covalent linkage between them. In certain embodiments, the reactive group comprises a photoactivatable group, which becomes chemically reactive only after illumination with light of an appropriate wavelength. Typically, the conjugation reaction between the reactive group and the biomolecule or solid support results in one or more atoms of the reactive group being incorporated into a new linkage attaching the compounds disclosed herein to the biomolecule or solid support. Selected examples of functional groups and linkages are shown in Table 1, where the reaction of an electrophilic group and a nucleophilic group yields a covalent linkage.

TABLE 1

Examples of some routes to useful covalent linkages

| Electrophilic Group | Nucleophilic Group | Resulting Covalent Linkage |
|---|---|---|
| activated esters* | amines/anilines | carboxamides |
| acrylamides | thiols | thioethers |
| acyl azides** | amines/anilines | carboxamides |
| acyl halides | amines/anilines | carboxamides |
| acyl halides | alcohols/phenols | esters |
| acyl nitriles | alcohols/phenols | esters |
| acyl nitriles | amines/anilines | carboxamides |
| aldehydes | amines/anilines | imines |
| aldehydes or ketones | hydrazines | hydrazones |
| aldehydes or ketones | hydroxylamines | oximes |
| alkyl halides | amines/anilines | alkyl amines |
| alkyl halides | carboxylic acids | esters |
| alkyl halides | thiols | thioethers |
| alkyl halides | alcohols/phenols | ethers |
| alkyl sulfonates | thiols | thioethers |
| alkyl sulfonates | carboxylic acids | esters |
| alkyl sulfonates | alcohols/phenols | ethers |
| anhydrides | alcohols/phenols | esters |
| anhydrides | amines/anilines | carboxamides |
| aryl halides | thiols | thiophenols |
| aryl halides | amines | aryl amines |
| aziridines | thiols | thioethers |
| boronates | glycols | boronate esters |

TABLE 1-continued

| Examples of some routes to useful covalent linkages | | |
|---|---|---|
| Electrophilic Group | Nucleophilic Group | Resulting Covalent Linkage |
| carbodiimides | carboxylic acids | N-acylureas or anhydrides |
| diazoalkanes | carboxylic acids | esters |
| epoxides | thiols | thioethers |
| haloacetamides | thiols | thioethers |
| haloplatinate | amino | platinum complex |
| haloplatinate | heterocycle | platinum complex |
| haloplatinate | thiol | platinum complex |
| halotriazines | amines/anilines | aminotriazines |
| halotriazines | alcohols/phenols | triazinyl ethers |
| halotriazines | thiols | triazinyl thioethers |
| imido esters | amines/anilines | amidines |
| isocyanates | amines/anilines | ureas |
| isocyanates | alcohols/phenols | urethanes |
| isothiocyanates | amines/anilines | thioureas |
| maleimides | thiols | thioethers |
| phosphoramidites | alcohols | phosphite esters |
| silyl halides | alcohols | silyl ethers |
| sulfonate esters | amines/anilines | alkyl amines |
| sulfonate esters | thiols | thioethers |
| sulfonate esters | carboxylic acids | esters |
| sulfonate esters | alcohols | ethers |
| sulfonyl halides | amines/anilines | sulfonamides |
| sulfonyl halides | phenols/alcohols | sulfonate esters |

*Activated esters, as understood in the art, generally have the formula —COΩ, where Ω is a suitable leaving group (e.g., succinimidyloxy ($—OC_4H_4O_2$) sulfosuccinimidyloxy ($—OC_4H_3O_2—SO_3H$), -1-oxybenzotriazolyl ($—OC_6H_4N_3$); or an aryloxy group or aryloxy substituted one or more times by electron withdrawing substituents such as nitro, fluoro, chloro, cyano, or trifluoromethyl, or combinations thereof, used to form activated aryl esters; or a carboxylic acid activated by a carbodiimide to form an anhydride or mixed anhydride $—OCOR^x$ or $—NR^xNHR^y$, where $R^x$ and $R^y$, which may be the same or different, are $C_1$-$C_6$ alkyl, $C_1$-$C_6$ perfluoroalkyl, or $C_1$-$C_6$ alkoxy; or cyclohexyl, 3-dimethylaminopropyl, or N-morpholinoethyl).
**Acyl azides can also rearrange to isocyanates.

The choice of the reactive group used to attach the compounds disclosed herein to the substance to be conjugated typically depends on the reactive or functional group on the substance to be conjugated and the type or length of covalent linkage desired. The types of functional groups typically present on the organic or inorganic substances (biomolecule or non-biomolecule) include, but are not limited to, amines, amides, thiols, alcohols, phenols, aldehydes, ketones, phosphates, imidazoles, hydrazines, hydroxylamines, disubstituted amines, halides, epoxides, silyl halides, carboxylate esters, sulfonate esters, phenyl esters, purines, pyrimidines, carboxylic acids, olefinic bonds, or a combination of these groups. A single type of reactive site may be available on the substance (typical for polysaccharides or silica), or a variety of sites may occur (e.g., amines, thiols, alcohols, phenols), as is typical for proteins.

Typically, the reactive group will react with an amine, a thiol, an alcohol, an aldehyde, a ketone, or with silica. Preferably, reactive groups react with an amine or a thiol functional group, or with silica. In certain embodiments, the reactive group is an acrylamide, an activated ester of a carboxylic acid, an acyl azide, an acyl nitrile, an aldehyde, an alkyl halide, a silyl halide, an anhydride, an aniline, an aryl halide, an azide, an aziridine, a boronate, a diazoalkane, a haloacetamide, a halotriazine, a hydrazine (including hydrazides), an imido ester, an isocyanate, an isothiocyanate, a maleimide, a phosphoramidite, a reactive platinum complex, a sulfonyl halide, or a thiol group. As used herein, "reactive platinum complex" refers to chemically reactive platinum complexes such as described in U.S. Pat. No. 5,714,327, herein incorporated by reference in its entirety.

In certain embodiments, the compounds disclosed herein comprise at least one reactive group that selectively reacts with an amine group. This amine-reactive group is selected from the group consisting of succinimidyl ester (SE), sulfonyl halide, tetrafluorophenyl (TFP) ester, sulfodichlorophenol (SDP) ester, sulfotetrafluorophenol (STP) ester, acetoxymethyl (AM) ester, nitrilotriacetic acid (NTA), aminodextran, DIBO-amine and iosothiocyanates. Thus, in certain embodiments, the compounds provided herein form a covalent bond with an amine containing molecule in a sample. In certain embodiments, the compounds provided herein comprise at least one reactive group that selectively reacts with a thiol group. This thiol-reactive group is selected from the group consisting of maleimide, haloalkyl and haloacetamide (including any reactive groups disclosed in U.S. Pat. Nos. 5,362,628; 5,352,803 and 5,573,904, all of which are herein incorporated by reference in their entirety).

Where the reactive group is an activated ester of a carboxylic acid, such as a succinimidyl ester of a carboxylic acid, a sulfonyl halide, a substituted succinimidyl ester, a sulfo-succinimidyl ester, a reactive phenyl ester, a dibromophenyl ester, a nitrophenyl ester, a tetrafluorophenyl (TFP) ester, a sulfodichlorophenol (SDP) ester, a sulfotetrafluorophenol (STP) ester, an acetoxymethyl (AM) ester, a nitrilotriacetic acid (NTA), an aminodextran, a DIBO-amine or an isothiocyanate, the resulting compound is particularly useful for preparing conjugates of biomolecules such as proteins, antibodies, nucleotides, oligonucleotides, or haptens. Where the reactive group is a maleimide, haloalkyl or haloacetamide (including any reactive groups disclosed in U.S. Pat. Nos. 5,362,628; 5,352,803 and 5,573,904, all of which are herein incorporated by reference in their entirety) the resulting compound is particularly useful for conjugation to thiol-containing substances. Where the reactive group is a hydrazide, the resulting compound is particularly useful for conjugation to periodate-oxidized carbohydrates and glycoproteins, and in addition is an aldehyde-fixable polar tracer for cell microinjection. Where the reactive group is a silyl halide, the resulting compound is particularly useful for conjugation to silica surfaces, particularly where the silica surface is incorporated into a fiber optic probe subsequently used for remote ion detection or quantitation.

In certain embodiments, the reactive group is a photoactivatable group such that the group is only converted to a reactive species after illumination with an appropriate wavelength. An appropriate wavelength is generally a UV wavelength that is less than 400 nm. This method provides for specific attachment to only the target molecules, either in solution or immobilized on a solid or semi-solid matrix. Photoactivatable reactive groups include, without limitation, benzophenones, aryl azides and diazirines.

Preferably, the reactive group is a photoactivatable group, succinimidyl ester of a carboxylic acid, a reactive phenyl ester, a haloacetamide, haloalkyl, a hydrazine, an isothiocyanate, a maleimide group, an aliphatic amine, a silyl halide, a cyclooctyne-amine, a cadaverine or a psoralen. More preferably, the reactive group is a succinimidyl ester of a carboxylic acid, a reactive phenyl ester, a maleimide, an iodoacetamide, a DIBO-amine, or a silyl halide. In certain preferred embodiments, the reactive group is a succinimidyl ester of a carboxylic acid, a sulfonyl halide, a substituted succinimidyl ester, a sulfo-succinimidyl ester, a reactive phenyl ester, a dibromophenyl ester, a nitrophenyl ester, a tetrafluorophenyl ester, an iosothiocyanates or a maleimide. In certain embodiments, the reactive group is selected from sulfodichlorophenyl (SDP) ester, sulfotetrafluorophenol (STP) ester, succinimidyl (SE) ester, tetrafluorophenol (TFP) ester, and a DIBO-amine.

Biomolecules:

In certain embodiments, the compounds provided herein are covalently bound to a biomolecule ($S_c$). If the compound has a reactive group, then the biomolecule can alternatively be linked to the compound through the reactive group. The reactive group may contain both a reactive functional moiety and a linker ($L-R_x$).

A variety of biomolecules are useful herein. Exemplary biomolecules include antigens, steroids, vitamins, drugs, haptens, metabolites, toxins, environmental pollutants, amino acids, peptides, proteins, nucleic acids, nucleic acid polymers, carbohydrates, lipids, polymers, viruses, virus-like particles, and bacterial particles. In certain embodiments, at least one member of Y, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ $R_{15}$, $R_{16}$, $R_{17}$, $R_{18}$, $R_{19}$, $R_{20}$ and $R_{21}$ is a biomolecule. In certain embodiments, at least one member chosen from Y, $R^1$, $R^2$, $R^3$ and $R^4$ is a biomolecule.

In certain embodiments, the biomolecule comprises an amino acid, a peptide, a protein, a polysaccharide, a nucleoside, a nucleotide, an oligonucleotide, a nucleic acid, a hapten, a psoralen, a drug, a hormone, a lipid, a lipid assembly, a synthetic polymer, a polymeric microparticle, a biological cell, a virus, a virus-like particle and combinations thereof. In certain embodiments, the biomolecule is selected from a hapten, a nucleotide, an oligonucleotide, a nucleic acid polymer, a protein, a peptide or a polysaccharide. In certain embodiments the biomolecule is amino acid, a peptide, a protein, a polysaccharide, a nucleoside, a nucleotide, an oligonucleotide, a nucleic acid, a hapten, a psoralen, a drug, a hormone, a lipid, a lipid assembly, a tyramine, a synthetic polymer, a polymeric microparticle, a biological cell, cellular components, an ion chelating moiety, an enzymatic substrate, a virus or a virus-like particle. In certain embodiments, the biomolecule is an antibody or fragment thereof, an antigen, an avidin or streptavidin, a biotin, a dextran, an IgG binding protein, a fluorescent protein, agarose, and a non-biological microparticle. In certain embodiments, the biomolecule is a therapeutic antibody. In certain embodiments, biomolecules may comprise a label or a fluorescent dye or quencher.

In certain embodiments, the biomolecule is an amino acid (including those that are protected or are substituted by phosphates, carbohydrates, or $C_1$ to $C_{22}$ carboxylic acids), or a polymer of amino acids such as a peptide or protein. In certain embodiments, the biomolecule contains at least five amino acids, more preferably 5 to 36 amino acids. Exemplary peptides include, but are not limited to, neuropeptides, cytokines, toxins, protease substrates, and protein kinase substrates. Other exemplary peptides may function as organelle localization peptides, that is, peptides that serve to target the conjugated compound for localization within a particular cellular substructure by cellular transport mechanisms. Preferred protein biomolecules include enzymes, antibodies, lectins, glycoproteins, histones, albumins, lipoproteins, avidin, streptavidin, protein A, protein G, phycobiliproteins and other fluorescent proteins, hormones, toxins and growth factors. Typically, the protein biomolecule is an antibody, an antibody fragment, avidin, streptavidin, a toxin, a lectin, a growth factor, bacterial particle or a binding partner for a cell receptor.

In certain embodiments, the biomolecule comprises a nucleic acid base, nucleoside, nucleotide or a nucleic acid polymer, optionally containing an additional linker or spacer for attachment of a fluorophore or other ligand, such as an alkynyl linkage (U.S. Pat. No. 5,047,519), an aminoallyl linkage (U.S. Pat. No. 4,711,955) or other linkage. In certain embodiments, the nucleotide biomolecule is a nucleoside or a deoxynucleoside or a dideoxynucleoside.

Exemplary nucleic acid polymer biomolecules are single- or multi-stranded, natural or synthetic DNA or RNA oligonucleotides, or DNA/RNA hybrids, or incorporating an unusual linker such as morpholine derivatized phosphates (AntiVirals, Inc., Corvallis OR), or peptide nucleic acids such as N-(2-aminoethyl)glycine units, where the nucleic acid contains fewer than 50 nucleotides, more typically fewer than 25 nucleotides.

In certain embodiments, the biomolecule comprises a carbohydrate or polyol that is typically a polysaccharide, such as dextran, FICOLL®, heparin, glycogen, amylopectin, mannan, inulin, starch, agarose and cellulose, or is a polymer such as a poly(ethylene glycol). In certain embodiments, the polysaccharide biomolecule includes dextran, agarose or FICOLL®.

In certain embodiments, the biomolecule comprises a lipid (typically having 6-25 carbons), including glycolipids, phospholipids, and sphingolipids. In certain embodiments, the biomolecule comprises a lipid vesicle, such as a liposome, or is a lipoprotein. Some lipophilic substituents are useful for facilitating transport of the conjugated dye into cells or cellular organelles.

In certain embodiments, the biomolecule is a cell, cellular system, cellular fragment, or subcellular particles, including virus particles, virus-like particles, bacterial particles, virus components, biological cells (such as animal cells, plant cells, bacteria, or yeast), or cellular components. Examples of cellular components that are useful as biomolecules include lysosomes, endosomes, cytoplasm, nuclei, histones, mitochondria, Golgi apparatus, endoplasmic reticulum and vacuoles.

In certain embodiments, the biomolecule non-covalently associates with organic or inorganic materials. Exemplary embodiments of the biomolecule that possess a lipophilic substituent may be used to target lipid assemblies such as biological membranes or liposomes by non-covalent incorporation of the compounds provided herein within the membrane, e.g., for use as probes for membrane structure or for incorporation in liposomes, lipoproteins, films, plastics, lipophilic microspheres or similar materials.

In certain embodiments, the biomolecule comprises a specific binding pair member wherein the compounds provided herein are conjugated to a specific binding pair member and used to the formation of the bound pair. Alternatively, the presence of the labeled specific binding pair member indicates the location of the complementary member of that specific binding pair; each specific binding pair member having an area on the surface or in a cavity which specifically binds to, and is complementary with, a particular spatial and polar organization of the other. In this instance, the compounds provided herein function as a reporter molecule for the specific binding pair. Exemplary binding pairs are set forth in Table 2.

TABLE 2

Representative Specific Binding Pairs

| Antigen | Antibody |
|---|---|
| biotin | avidin (or streptavidin or anti-biotin) |
| IgG* | protein A or protein G |
| drug | drug receptor |
| folate | folate binding protein |
| toxin | toxin receptor |
| carbohydrate | lectin or carbohydrate receptor |
| peptide | peptide receptor |
| protein | protein receptor |

TABLE 2-continued

| Representative Specific Binding Pairs | |
|---|---|
| Antigen | Antibody |
| enzyme substrate | enzyme |
| DNA (RNA) | cDNA (cRNA)† |
| hormone | hormone receptor |
| ion | chelator |

*IgG is an immunoglobulin

†cDNA and cRNA are the complementary strands used for hybridization

Solid Supports:

In certain embodiments, the compounds provided herein are covalently bonded to a solid support ($S_c$). The solid support may be attached to the compounds either through a substituent of the compound, or through a reactive group, if present, or through a biomolecule, if present. Even if a reactive group and/or a biomolecule are present, the solid support may be attached through a substituent of the compound provided herein. In certain embodiments, at least one member of Y, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ $R_{15}$, $R_{16}$, $R_{17}$, $R_{18}$, $R_{19}$, $R_{20}$ and $R_{21}$ is a solid support. In certain embodiments, at least one member chosen from Y, $R^1$, $R^2$, $R^3$ and $R^4$ is a solid support.

Solid supports suitable for use herein are typically substantially insoluble in liquid phases. Solid supports for use herein are not limited to a specific type of support. Rather, a large number of supports are available and are known to one of ordinary skill in the art. Thus, useful solid supports include solid and semi-solid matrixes, such as aerogels and hydrogels, resins, beads, biochips (including thin film coated biochips), microfluidic chip, a silicon chip, multi-well plates (also referred to as microtiter plates or microplates), membranes, conducting and nonconducting metals, glass (including microscope slides) and magnetic supports. More specific examples of useful solid supports include silica gels, polymeric membranes, particles, derivatized plastic films, glass beads, cotton, plastic beads, alumina gels, polysaccharides such as Sepharose®, poly(acrylate), polystyrene, poly(acrylamide), polyol, agarose, agar, cellulose, dextran, starch, FICOLL®, heparin, glycogen, amylopectin, mannan, inulin, nitrocellulose, diazocellulose, polyvinylchloride, polypropylene, polyethylene (including poly(ethylene glycol)), nylon, a quantum dot, a nanocrystal, a nanoparticle, a nanotube, a carbon nanotube, graphene, latex bead, magnetic bead, paramagnetic bead, superparamagnetic bead, starch and the like.

In certain embodiments, the solid support may include a solid support reactive functional group, including, but not limited to, hydroxyl, carboxyl, amino, thiol, aldehyde, halogen, nitro, cyano, amido, urea, carbonate, carbamate, isocyanate, sulfone, sulfonate, sulfonamide, sulfoxide, etc., for attaching the dye compounds disclosed herein. Useful reactive groups are disclosed above and are equally applicable to the solid support reactive functional groups herein.

A suitable solid phase support may be selected on the basis of desired end use and suitability for various synthetic protocols. For example, where amide bond formation is desirable to attach the compounds provided herein to the solid support, resins generally useful in peptide synthesis may be employed, such as polystyrene (e.g., PAM-resin obtained from Bachem Inc., Peninsula Laboratories, etc.), POLYHIPE™ resin (obtained from Aminotech, Canada), polyamide resin (obtained from Peninsula Laboratories), polystyrene resin grafted with polyethylene glycol (TentaGel™, Rapp Polymere, Tubingen, Germany), polydimethylacrylamide resin (available from Milligen/Biosearch, California), or PEGA beads (obtained from Polymer Laboratories).

Preparation of Conjugates:

In certain embodiments, compounds of Formula (I), its corresponding compounds of Formula (II) or salts thereof wherein $S_c$ is a biomolecule or solid support are provided herein. Conjugates of components (biomolecules or solid supports), e.g., drugs, peptides, toxins, nucleotides, phospholipids, antibodies, proteins, viruses and other organic molecules are prepared by organic synthesis methods using the compounds provided herein, are generally prepared by means well recognized in the art (Haugland, MOLECULAR PROBES HANDBOOK, supra, (2002)). Preferably, conjugation to form a covalent bond consists of mixing the reactive compounds provided herein in a suitable solvent in which both the compound and the substance to be conjugated are soluble. The reaction preferably proceeds spontaneously without added reagents at room temperature or below. For those reactive compounds that are photoactivated, conjugation is facilitated by illumination of the reaction mixture to activate the reactive compound. Chemical modification of water-insoluble substances, so that a desired compound-conjugate may be prepared, is preferably performed in an aprotic solvent such as dimethylformamide, dimethylsulfoxide, acetone, ethyl acetate, toluene, or chloroform. Similar modification of water-soluble materials is readily accomplished through the use of the instant reactive compounds to make them more readily soluble in organic solvents.

Preparation of peptide or protein conjugates typically comprises first dissolving the protein to be conjugated in aqueous buffer at about 1-10 mg/mL at room temperature or below. Bicarbonate buffers (pH about 8.3) are especially suitable for reaction with succinimidyl esters, phosphate buffers (pH about 7.2 to about 8) for reaction with thiol-reactive functional groups and carbonate or borate buffers (pH about 9) for reaction with isothiocyanates and dichlorotriazines. The appropriate reactive compound is then dissolved in a nonhydroxylic solvent (usually DMSO or DMF) in an amount sufficient to give a suitable degree of conjugation when added to a solution of the protein to be conjugated. The appropriate amount of compound for any protein or other component is conveniently predetermined by experimentation in which variable amounts of the compound are added to the protein, the conjugate is chromatographically purified to separate unconjugated compound and the compound-protein conjugate is tested in its desired application.

Following addition of the compound to the component solution, the mixture is incubated for a suitable period (typically about 1 hour at room temperature to several hours on ice), the excess compound is removed by gel filtration, dialysis, HPLC, adsorption on an ion exchange or hydrophobic polymer or other suitable means. The compound-conjugate may be used in solution or lyophilized. In this way, suitable conjugates may be prepared from antibodies, antibody fragments, avidins, lectins, enzymes, proteins A and G, cellular proteins, albumins, histones, growth factors, hormones, and other proteins.

Conjugates of polymers, including biopolymers and other higher molecular weight polymers are typically prepared by means well recognized in the art (for example, Brinkley et al., *Bioconjugate Chem.*, 3:2 (1992)). In these embodiments, a single type of reactive site may be available, as is typical for polysaccharides) or multiple types of reactive sites (e.g. amines, thiols, alcohols, phenols) may be available, as is typical for proteins. Selectivity of labeling is best obtained by selection of an appropriate reactive compound. For example, modification of thiols with a thiol-selective reagent such as a haloacetamide or maleimide, or modification of amines with an amine-reactive reagent such as an activated ester, acyl azide, isothiocyanate or 3,5-dichloro-2,4,6-triazine. Partial selectivity can also be obtained by careful control of the reaction conditions.

When modifying polymers with the compounds provided herein, an excess of compound is typically used, relative to the expected degree of compound substitution. Any residual, unreacted compound or a compound hydrolysis product is typically removed by dialysis, chromatography or precipitation. Presence of residual, unconjugated dye can be detected by thin layer chromatography using a solvent that elutes the compound away from its conjugate. In all cases it is usually preferred that the reagents be kept as concentrated as practical so as to obtain adequate rates of conjugation.

In certain embodiments, the conjugates disclosed herein are associated with an additional substance, that binds either to the compound or the conjugated substance (biomolecule or solid support) through noncovalent interaction. In another exemplary embodiment, the additional substance is an antibody, an enzyme, a hapten, a lectin, a receptor, an oligonucleotide, a nucleic acid, a liposome, or a polymer. The additional substance is optionally used to probe for the location of the compound-conjugate, for example, as a means of enhancing the signal of the compound-conjugate.

In certain embodiments, the antibody conjugates disclosed herein are formed using a copper-less click method (SITECLICK antibody labeling method, Thermo Fisher Scientific, Waltham, MA) using an azido-modified sugar, UDP-GalNAz and a Y289L mutant of the enzyme β-1,4-galactosyltransferase (GalT(289L)) to produce a site-selective azide label on N-linked glycans of the heavy chain Fc region of an antibody or antibody fragment (U.S. Pat. No. 8,716,033 and PCT Publication No. WO 2014/066733). The azide-tagged antibodies are reacted with a dibenzocyclooctyne (DIBO)-functionalized compound in the absence of metal catalysts. In certain embodiments, terminal galactose residues on the N-linked sugars are removed by treatment of the antibody with β-galactosidase followed by addition of a UDP-modified azide-containing sugar, UDP-GalNAz, to the modified carbohydrate domain of the antibody or antibody fragment via the 0-1,4-galactosyltransferase (GalT(289L))-catalyzed reaction targeting the terminal GlcNAc residues. Finally, the antibody which now contains an azide moiety, is conjugated to a DIBO-modified compound provided herein in a copper-free click reaction. This specific targeting maintains the integrity of the antigen binding site on the antibody.

III. Methods

Receptor-mediated antibody internalization is a key mechanism underlying several anti-cancer antibody therapeutics. Delivering highly toxic drugs to cancer cells, as in the case of antibody-drug conjugates (ADCs), efficient removal of surface receptors from cancer cells and changing the pharmacokinetics profile of the antibody drugs are some of the key ways that internalization impacts the therapeutic efficacy of the antibodies. Thus, studying antibody internalization is very important for ADCs. Antibody labeling with the compounds described herein having an apparent instantaneous ring-opening rate enables time and concentration dependent measurements of antibody internalization and other biological processes that are of a transient nature. Examples of such biological processes include, but are not limited to, cellular internalization of viruses and virus-like particles, ion channel opening, and receptor internalization and recycling. The methods provided herein use the compounds of the present disclosure, which are hydrophilic and are not fluorescent at neutral pH but become highly fluorescent at acidic pH. In addition, the compounds provided herein minimize antibody aggregation. For receptor-mediated antibody internalization methods provided herein, antibodies against receptors are conjugated to the compounds provided herein and incubated with the cells expressing the appropriate receptors. Upon binding to the receptor, the antibody-compound conjugates are not fluorescent because of the neutral pH of the media, but upon internalization and trafficking into endosomal and lysosomal vesicles the pH approaches the pKa of the antibody-compound conjugates resulting in fluorescence emission.

In certain embodiments, a change in the pH inside the cell corresponds to a cellular process. In certain embodiments, the compounds provided herein are conjugated to an antibody, protein, nucleic acid, virus or lipid. In certain embodiments, the compound is conjugated to transferrin. In certain embodiments, the compound is conjugated to an antibody. In certain embodiments, the antibody is a therapeutic antibody. In certain embodiments, the compound is conjugated to a virus or virus-like particle. In certain embodiments, the compound is conjugated to a biomolecule through a succinimidyl ester, a reactive phenyl ester or a DIBO-amine. In certain embodiments the compound is conjugated to a cell surface receptor or a biomolecule that binds a cell surface receptor. In certain embodiments the compound is non-fluorescent before entering the cell. More particularly, the compound becomes fluorescent after entering the cell. In certain embodiments, the compound enters the cell through phagocytosis. In certain embodiments, the compound enters the cell through receptor-mediated endocytosis.

Typically, the compound and/or compound-conjugates and/or compositions disclosed herein are introduced into a living cell or cell compartment by mixing with a sample comprising a cell or cell compartment, and then leaving the mixture to incubate for a time interval adequate to allow entry of the compound, compound-conjugate, or composition into the cell or cell compartment. During this time interval, the compound, compound-conjugate, or composition either passively diffuses across the plasma membrane or is taken up by the cell or cell compartment by a cell mediated mechanism.

In the case of conjugates, typically target molecules, including bacterial particles that induce phagocytosis and specific binding patterns that bind a cellular receptor and induce receptor internalization, are generally cell or cell compartment specific, hence a specific conjugate generally attaches to only one kind of cell or cell compartment. Once attached to a cell or cell compartment, the compound-conjugate can diffuse through a membrane of that cell or cell compartment or be trafficked to a specific cell compartment by receptor-mediated endocytosis, hence exposing itself to the internal pH of the cell or cell compartment.

Non-passive accumulation can occur through cell-mediated mechanisms such as phagocytosis and endocytosis, typically when a compound disclosed herein comprises a biomolecule or solid support that is bound by a cellular receptor. In this instance, whenever the compound provided herein is accumulated in the cell or cell compartment by a mechanism that does not rely solely on passive accumulation, the accuracy of a pH measurement will be highest when the pKa of the compound is near the pH to be measured. In this situation, without wishing to be bound by a theory, the increased accuracy available with the compounds disclosed herein may arise from the fact that the pKa is the pH of the aqueous medium containing a species when it is 50% protonated and that at this pH a change in proton intensity will have greatest effect on the properties of the species. Hence, the greatest change in fluorescence intensity occurs at the pKa of the compound, and measurements of absolute fluorescence intensity at this pH so that the compounds used to analyze a particular cell or cell compartment embraces the pH of that cell or cell compartment is generally sufficient.

Accumulation will occur passively when one form of the compound, compound-conjugate, or composition with respect to pH (the uncharged form) freely penetrates the cell or cell compartment of interest and the other form (a charged form) is non-penetrating. Fluorescence will approach its equilibrium position provided the form of the accumulated compound is the fluorescent form and that accumulation to equilibrium has occurred. The observed fluorescence intensity may then be used to determine pH according to any of the known methods, for instance by reference to calibration data, or by comparing the observed fluorescence intensity to the fluorescence intensity observed on acidifying the test sample so that all the compound or compound-conjugate fluoresces, the ratio of the two fluorescence intensities coupled with the known pKa allowing determination of pH. Passive accumulation may be achieved by use of a compound provided herein that is not attached to a biomolecule or solid support or a compound that is attached to a small, relatively hydrophobic target molecule capable of diffusing through the cell membrane, such as one or more acetoxymethyl (AM) ester groups.

In some embodiments, the compounds of Formula (I), their corresponding compounds of Formula (II) or salts thereof may be used to specifically detect and monitor phagocytosis and/or endocytosis within a cell. The compounds of Formula (I), their corresponding compounds of Formula (II) or salts thereof may be used to measure cytosolic pH. They may be used, in some embodiments, to track antibody internalization when the compounds of Formula (I), their corresponding compounds of Formula (II) or salts thereof are conjugated to an antibody. They may also be used, in some embodiments, to track ligand internalization when conjugated to a ligand. The compounds of Formula (I), their corresponding compounds of Formula (II) or salts thereof may also be used for random amine reactive labeling or site-specific antibody labeling. The compounds of Formula (I), their corresponding compounds of Formula (II) or salts thereof can be used in a variety of imaging modes, including but not limited to imaging of samples on a plate or slide, in flow cytometry, and in microplate assays.

In some embodiments, compounds of Formula (I), their corresponding compounds of Formula (II) or salts thereof may be used for intracellular pH visualization in live cells, where acidic compartments and organelles with fluoresce more brightly than other parts of the cell. Another aspect of the present disclosure is a method for detecting phagocytosis of a biomolecule in solution, the method comprising: (a) contacting a compound of Formula (I), its corresponding compound of Formula (II) or salt thereof wherein $S_c$ is a biomolecule with a cell to form a contacted cell; (b) illuminating the contacted cell to form an illuminated cell; and (c) detecting fluorescent emissions from the illuminated cell; wherein fluorescent emissions indicate phagocytosis of the biomolecule. In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand. In certain embodiments, the biomolecule is an *E. coli* bioparticle.

In certain embodiments, the method further comprises incubating the contacted cell prior to illuminating the contacted cell.

Another aspect of the present disclosure is a method for monitoring the pH inside a live cell, the method comprising: (a) contacting the cell with a compound of Formula (I), its corresponding compound of Formula (II) or salt thereof to form a contacted cell; (b) illuminating the contacted cell to form an illuminated cell; and c) detecting fluorescent emissions from the illuminated cell, thereby monitoring the pH inside the cell. In certain embodiments, a change in the pH inside the cell corresponds to a cellular process.

In some embodiments, the compound of Formula (I), its corresponding compound of Formula (II) or salt thereof has a $S_c$ is a biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand. In certain embodiments, the biomolecule is chosen from a protein, nucleic acid, and lipid.

In certain embodiments, the method further comprises incubating the contacted cell prior to illuminating the contacted cell.

Another aspect of the present disclosure is a method for monitoring internalization of a compound, the method comprising: (a) contacting a compound of Formula (I), its corresponding compound of Formula (II) or a salt thereof wherein $S_c$ is a biomolecule with a cell to form a contacted cell; (b) illuminating the contacted cell to form an illuminated cell; and (c) detecting fluorescent emissions from the illuminated cell; wherein fluorescent emissions indicate internalization of the compound.

In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand.

In certain embodiments, the method further comprises incubating the contacted cell prior to illuminating the contacted cell. Another aspect of the present disclosure is a method for monitoring internalization of a receptor, the method comprising: (a) contacting a compound of Formula (I), its corresponding compound of Formula (II) or a salt thereof wherein $S_c$ is a biomolecule that binds to a receptor with a cell to form a contacted cell; (b) illuminating the contacted cell to form an illuminated cell; and (c) detecting fluorescent emissions from the illuminated cell; wherein fluorescent emissions indicate internalization of the receptor.

In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand.

In some embodiments, the method further comprises incubating the contacted cell prior to illuminating the contacted cell.

In certain embodiments, methods are provided for detecting any one of the following with a compound provided herein: an antibody, protein, peptide, enzyme substrate, hormone, lymphokine, metabolite, receptor, antigen, hapten, lectin, avidin, streptavidin, toxin, carbohydrate, oligosaccharide, polysaccharide, nucleic acid, derivatized deoxy nucleic acid, DNA fragment, RNA fragment, derivatized DNA fragment, derivatized RNA fragment, nucleoside, nucleotide, natural drug, synthetic drug, virus particle, virus-like particle, bacterial particle, virus component, yeast component, blood cell, blood cell component, plasma component, serum component, biological cell, neuronal cells, noncellular blood component, bacteria, bacterial component, natural or synthetic lipid vesicle, poison, environmental pollutant, polymer, polymer particle, glass particle, glass surface, plastic particle, plastic surface, polymer membrane, conductor or semiconductor comprising detecting a compound disclosed herein bound to said antibody, protein, peptide, enzyme substrate, hormone, lymphokine, metabolite, receptor, antigen, hapten, lectin, avidin, streptavidin, toxin, carbohydrate, oligosaccharide, polysaccharide, nucleic acid, derivatized deoxy nucleic acid, DNA fragment, RNA fragment, derivatized DNA fragment, derivatized RNA fragment, nucleoside, nucleotide, natural drug, synthetic drug, virus particle, bacterial particle, virus component, yeast component, blood cell, blood cell component, plasma component, serum component, biological cell, noncellular blood component, bacteria, bacterial component, natural or synthetic lipid vesicle, poison, environmental pollutant, polymer, polymer particle, glass particle, glass surface, plastic particle, plastic surface, polymer membrane, conductor or semiconductor.

Another aspect of the present disclosure is a method for determining the pH of a sample, the method comprising: (a) contacting the sample with a compound of Formula (I), its corresponding compound of Formula (II) or salt thereof to form a contacted sample; (b) illuminating the contacted sample to form an illuminated sample; and (c) detecting fluorescent emissions from the illuminated sample; wherein the fluorescent emissions are used to determine the pH of the illuminated sample. In certain embodiments, the method further comprises incubating the contacted sample prior to illuminating the contacted sample. In some embodiments, the contacting step further comprises contacting the sample with a compound having a different fluorescence emission spectrum from the compound of Formula (I), its corresponding compound of Formula (II), or salt thereof and a different pKa from the compound of Formula (I), its corresponding compound of Formula (II), or salt thereof (i.e. a second dye). The second dye may be a compound of Formula (I), its corresponding compound of Formula (II) or salt thereof, it may be a dye that is not a compound of Formula (I), its corresponding compound of Formula (II), or salt thereof (i.e., any other dye, such as a commercially available dye). The second dye may be a dye that fluoresces in a different color to allow for multiplexed experiments.

In certain embodiments, the sample may be any sample where an investigator desires information about pH about the entire sample or a portion of the sample. For example, the sample may be any biological sample or any sample that may contain biological material. In some embodiments, the sample is chosen from live cells, intracellular fluids, extracellular fluids, sera, biological fluids, biological fermentation media, environmental samples, industrial samples, viruses, proteins, peptides, buffer solutions, blood cells, immune cells, cultured cells, muscle tissue, neurons, extracellular vesicles, vascular tissue, blood fluids, saliva, urine, water, soil, waste water, sea water, pharmaceuticals, foodstuffs, and beverages. In some embodiments, the sample is immobilized on a polymeric membrane, within a polymeric gel, on a microparticle, on a microarray, on a silicon chip, on a glass slide, on a microwell plate, or on a microfluidic chip.

Accuracy for the general means of measuring pH may be further increased by using a plurality of the compounds provided herein having different fluorescent responses. In certain embodiments, two or more compounds according to the present disclosure may be used, optionally bonded to identical biomolecules or solid supports, or a compound as disclosed herein and another different fluorescent dye. In certain embodiments, the second fluorescent dye has a positive fluorescence response with increasing pH (i.e., that the intensity of fluorescence exhibited by the dye or complex increases with increasing pH). It is preferable that the two or more fluorescent dyes or compounds have overlapping titration ranges, and more preferably the different dyes, compounds or conjugates have pKa values within about 1 unit of each other. The intensity of fluorescence of each dye, compound or conjugate is then measured, and pH determined by calculating the ratio of the fluorescence intensity of the first compound to the fluorescence intensity of the second compound or dye and comparing the value obtained to a calibration curve.

In certain embodiments, the compounds and compositions provided herein may be used in methods including, but not limited to, methods to determine the pH of living cells or cell compartments, to determine a change in pH to the local environment caused by a cell, and directly and indirectly detect specific cellular events associated with a change in pH. In certain embodiments, the methods involve detecting contamination in cell culture or on agar plates. For sake of clarity, the sample may also include material other than live cells and cell compartments such as, but not limited to, cell culture medium, biological fluids, diagnostic materials, and bacterial medium such as agar plates. As used herein, the term "a cell compartment" refers to one of the many organelles suspended in the cell cytoplasm. The pH of a cell or cell compartment may be measured by introducing one or more of the compounds or compositions provided herein into a cell or cell compartment, irradiating the compound with a suitable light source, and observing the intensity of fluorescence of the compound. The observed fluorescence intensity may then be used to determine pH by a variety of methods known in the field, selected according to the method of accumulation of the compound. For instance, the observed fluorescence may be compared to a known standard, for example a calibration curve of fluorescence intensity versus pH, or to fluorescence intensity measurements indicative of the total compound or composition present.

Any conventional fluorometric equipment may be used to irradiate the sample, and to measure the resulting fluorescent response.

As stated above, the sample may comprise live cells, intracellular fluids, extracellular fluids, biological fluids, sera, biological fermentation media, environmental sample, industrial samples, proteins, peptides, buffer solutions, biological fluids or chemical reactors, blood cells, immune cells, cultured cells, muscle tissue, neurons, extracellular vesicles; vascular tissue, blood fluids, saliva, urine, water, soil, waste water, sea water; pharmaceuticals, foodstuffs or beverages. In certain embodiments, the sample is immobilized on a polymeric membrane, within a polymeric gel, on a microparticle, on a microarray, on a silicon chip, on a glass slide, on a microwell plate, and on a microfluidic chip.

The compounds disclosed herein may therefore be used as pH sensors in relation to samples comprising or suspected of comprising a biological entity or biological substance. The compounds disclosed herein may be used in assays involving a biological entity or biological substance. In certain embodiments, the current teachings provide for the use of the compounds in a biological assay for the purposes described herein, particularly as a pH sensor.

In certain embodiments, the compounds disclosed herein are used in cell culture for detection of contamination. In certain embodiments, the compounds disclosed herein are used in or on agar plates for the detection of contamination.

Another aspect of the present disclosure is a method for detecting a pH related intracellular process, the method comprising: (a) contacting a compound of Formula (I), its corresponding compound of Formula (II) or salt thereof with a cell to form a contacted cell; (b) illuminating the contacted cell to form an illuminated cell; and (c) detecting fluorescent emissions from the illuminated cell; wherein increased fluorescent emissions indicates activation of the intracellular process.

In certain embodiments, the intracellular process is opening of an ion channel. In some embodiments, the ion channel is chosen from a calcium channel, a potassium channel, a sodium channel, a proton channel, a non-selective cation channel, a cyclic nucleotide-gated channel, and an ATP-gated channel.

In certain embodiments, the method further comprises incubating the contacted cell prior to illuminating the contacted cell.

Another aspect of the present disclosure is a method for identifying a target cell within a population of cells whereby the target cell is differentially labeled as compared to neighboring cells within the population, the method comprising: (a) contacting a compound of Formula (I), its corresponding compound of Formula (II) or salt thereof with a population of cells to form a contacted cell population; and (b) illuminating the contacted cell population; wherein the target cell is identified by an increased fluorescence as compared to neighboring cells within the population. In some embodiments, the method further comprises incubating the contacted cell population prior to illuminating the contacted cell population.

Another aspect of the present disclosure is a method for analyzing kinetics of migration of a species through a cell or cellular compartment, the method comprising: (a) contacting a compound of Formula (I), its corresponding compound of Formula (II) or salt thereof wherein R is L-$S_c$ with a cell to form a contacted cell; (b) illuminating the contacted cell to form an illuminated cell; and (c) detecting fluorescent emissions from the illuminated cell over a time interval.

In some embodiments, $S_c$ is a biomolecule. In certain embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand.

In some embodiments, $S_c$ is a solid support. In certain instances, the solid support is chosen from an aerogel, a hydrogel, a resin, a silica gel, a bead, a biochip, a microfluidic chip, a silicon ship, a multi-well plate, a membrane, a polymeric membrane, a particle, a derivatized plastic film, a glass bead, cotton, a plastic bead, alumina gel, polysaccharide, poly(acrylate), polystyrene, poly(acrylamide), polyol, agarose, agar, cellulose, dextran, starch, heparin, glycogen, amylopectin, mannan, inulin, nitrocellulose, diazocellulose, polyvinylchloride, polypropylene, polyethylene, nylon, latex bead, a conducting metal, a nonconducting metal, glass, a quantum dot, a nanocrystal, a nanoparticle, a nanotube, a carbon nanotube, graphene, magnetic bead, paramagnetic bead, superparamagnetic bead, and a magnetic support In some embodiments, the method further comprises incubating the contacted cell prior to illuminating the contacted cell.

In certain embodiments, the compounds provided herein may be used to analyze the kinetics of migration of a species into or through a cell or cell compartment. This may be done by monitoring the intensity of fluorescence of a compound provided herein over a time interval. Where pH is known, the compound should be selected so as to have a pKa in the range between the pH at the starting point and the pH at the end point of the pathway to be analyzed. In some cases, it may be desirable to use a plurality of compounds having a variety of pKa values, with each dye or complex tuned to a different portion of the pathway to be analyzed.

Another aspect of the present disclosure is a method of labeling a cell or cellular compartment, the method comprising: (a) contacting a sample containing one or more cells with a compound of Formula (I), its corresponding compound of Formula (II) or salt thereof to form a contacted sample; (b) illuminating the contacted sample to form an illuminated sample; and (c) detecting the fluorescent emissions from the illuminated sample. In some embodiments, method further comprises incubating the contacted sample prior to illuminating the contacted sample.

Another aspect of the present disclosure relates to the use of a compound of Formula (I), its corresponding compound of Formula (II) or salt thereof as a pH sensor, optionally for use in or with a living cell or in a sample comprising or suspected of comprising a biological entity or substance, such as a live cell, intracellular fluid, extracellular fluid, body fluid, serum, fermentation medium, cell culture, or tissue.

Another aspect of the present disclosure relates to the use of a compound of Formula (I), its corresponding compound of Formula (II) or a salt thereof in a bioassay.

In certain embodiments, methods are provided for using a compound or composition provided herein for analysis or detection. More particularly, the detection may be performed by optical means. In certain embodiments, the fluorescence emission is optionally detected by visual inspection, or by use of any of the following devices: CCD cameras, video cameras, photographic film, laser scanning devices, fluorometers, photodiodes, quantum counters, epifluorescence microscopes, scanning microscopes, flow cytometers, fluorescence microplate readers, or by means for amplifying the signal such as photomultiplier tubes.

Illumination:

In certain embodiments, the sample or medium in which a compound provided herein is present is illuminated with a wavelength of light selected to give a detectable optical response and observed with a means for detecting the optical response. Equipment that is useful for illuminating the compounds and compositions disclosed herein includes, but is not limited to, hand-held ultraviolet lamps, mercury arc lamps, xenon lamps, lasers and laser diodes. These illumination sources are optically integrated into laser scanners, fluorescence microplate readers or standard or microfluorometers.

The compounds and compositions disclosed herein may, at any time after or during an assay, be illuminated with a wavelength of light that results in a detectable optical response and observed with a means for detecting the optical response. Upon illumination, such as by an ultraviolet or visible wavelength emission lamp, an arc lamp, a laser, or even sunlight or ordinary room light, the fluorescent compounds, including those bound to the complementary specific binding pair member, display intense visible absorption as well as fluorescence emission. Selected equipment that is useful for illuminating the fluorescent compounds disclosed herein include, but is not limited to, hand-held ultraviolet lamps, mercury arc lamps, xenon lamps, argon lasers, laser diodes, and YAG lasers. These illumination sources are optionally integrated into laser scanners, fluorescence microplate readers, standard or mini fluorometers, or chromatographic detectors. This fluorescence emission is optionally detected by visual inspection, or by use of any of the following devices: CCD cameras, video cameras, photographic film, laser scanning devices, fluorometers, photodiodes, quantum counters, epifluorescence microscopes, scanning microscopes, flow cytometers, fluorescence microplate readers, or by means for amplifying the signal such as photomultiplier tubes. Where the sample is examined using a flow cytometer, a fluorescence microscope or a fluorometer, the instrument is optionally used to distinguish and discriminate between the fluorescent compounds disclosed herein and a second fluorophore with detectably different optical properties, typically by distinguishing the fluorescence response of the fluorescent compounds of the invention from that of the second fluorophore. Where a sample is examined using a flow cytometer, examination of the sample optionally includes isolation of particles within the sample based on the fluorescence response by using a sorting device. In certain embodiments, the illumination source is used to form a covalent bond between the present compound and an analyte of interest. In this instance the compound comprises a photoactivatable reactive group, such as those discussed above.

IV. Compositions and Kits

Another aspect of the present disclosure relates to a composition comprising: (a) a compound of Formula (I), its corresponding compound of Formula (II) or salt thereof; and (b) a biomolecule. In some embodiments, the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, virus-like particle, and ligand. In certain embodiments, the biomolecule is chosen from a cell, protein, antibody, antibody fragment, receptor, lipid, virus, virus-like particle, nucleic acid, and an aptamer. In some embodiments, the biomolecule is a cell and the compound or salt thereof is located inside the cell.

In some embodiments, the compound of Formula (I), its corresponding compound of Formula (II) or a salt thereof is conjugated to the biomolecule as described above, wherein the biomolecule is $S_c$.

Another aspect of the present disclosure relates to a kit for determining the pH of a sample comprising: (a) a compound of Formula (I), its corresponding compound of Formula (II) or salt thereof; and (b) instructions for determining the pH of the sample.

Another aspect of the present disclosure relates to a kit comprising: (a) a compound of Formula (I), its corresponding compound of Formula (II) or salt thereof, and (b) instructions for use according to any of the methods provided herein.

In certain embodiments, the kits further comprise one or more of the following: a buffering agent, a purification medium, a vial comprising the sample, or an organic solvent.

As used herein, the term "kit" refers to a packaged set of related components, typically one or more compounds or compositions provided herein. In certain embodiments, the kits disclosed herein comprise one or more of compounds described herein, one or more carriers suitable for in vitro or in vivo applications, and one or more containers in which to store the one or more compounds provided herein and/or one or more carriers, such as solvents, buffers, stabilizers, pH adjusting agents, etc. The kit optionally contains instructions for how to prepare the one or more compounds provided herein or how to prepare a composition containing the one or more compounds, and how to administer the compound or composition containing the compound. In certain embodiments, the kit comprises instructions for performing an assay that detects the pH or pH changes in samples. In certain preferred embodiments, the kit comprises instructions for performing an assay that monitors internalization of a biomolecule. In certain embodiments, the assay is an in vitro assay. In certain embodiments, the assay is an in vivo assay. The kit may further comprise one or more pieces of equipment to administer the compound, or composition comprising the compound provided herein including, but not limited to, syringes, pipettes, pipette bulbs, spatulas, vials, syringe needles, and various combinations thereof.

In certain embodiments, the kits provided herein comprise indicator solutions or indicator "dipsticks", blotters, culture media, cuvettes, and the like. In certain embodiments, the kits provided herein comprise indicator cartridges (where a kit component is bound to a solid support) for use in an automated detector. In certain embodiments, the kits provided herein further comprise molecular weight markers, wherein said markers are selected from phosphorylated and non-phosphorylated polypeptides, calcium-binding and non-calcium binding polypeptides, sulfonated and non-sulfonated polypeptides, and sialylated and non-sialylated polypeptides. In certain embodiments, the kits provided herein further comprise a member selected from a fixing solution, a detection reagent, a standard, a wash solution, and combinations thereof.

EXAMPLES
Example 1. Synthesis of Compound A
Compound A was prepared as shown in Scheme 1 below and detailed in the following experimental synthesis workflow.
Scheme 1
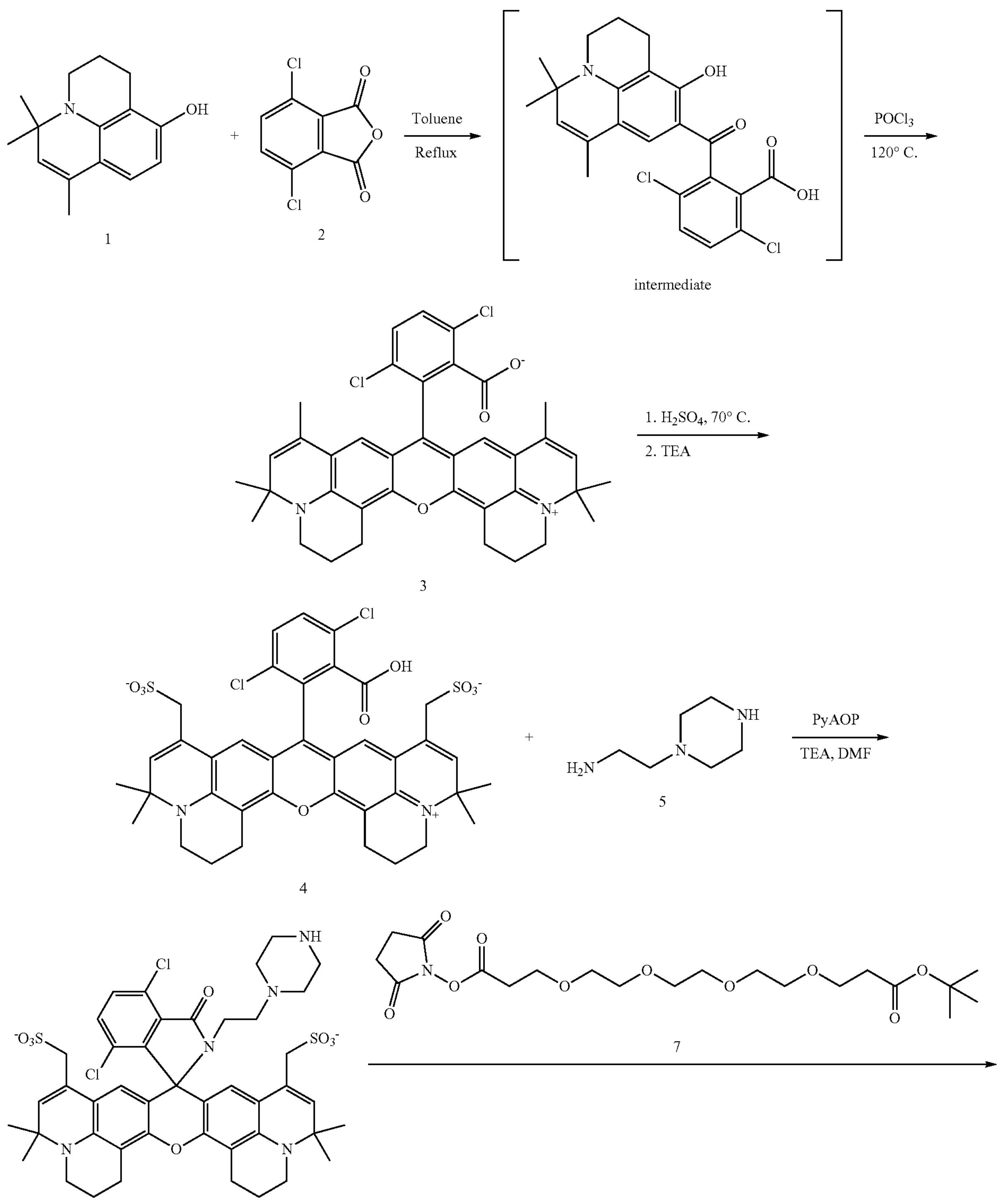

-continued

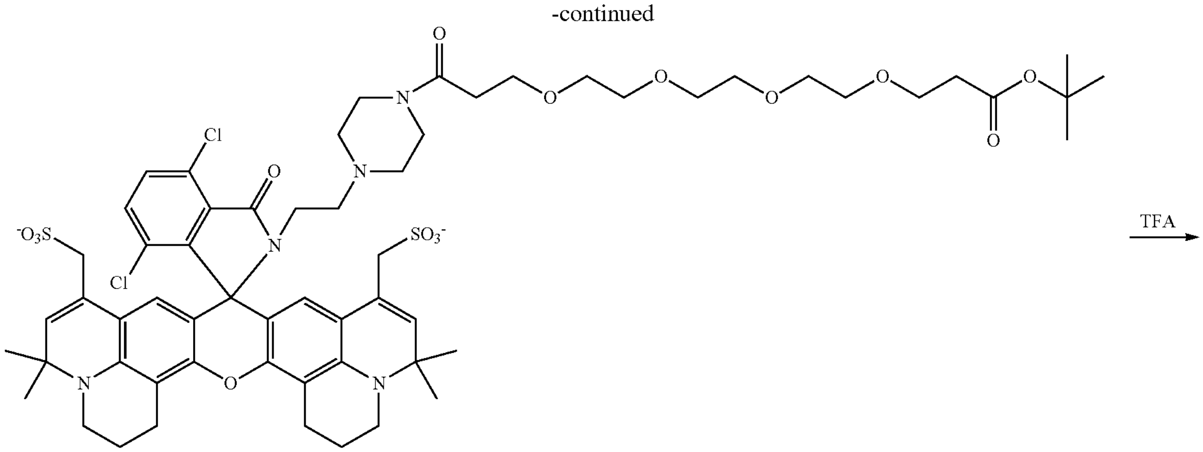

8

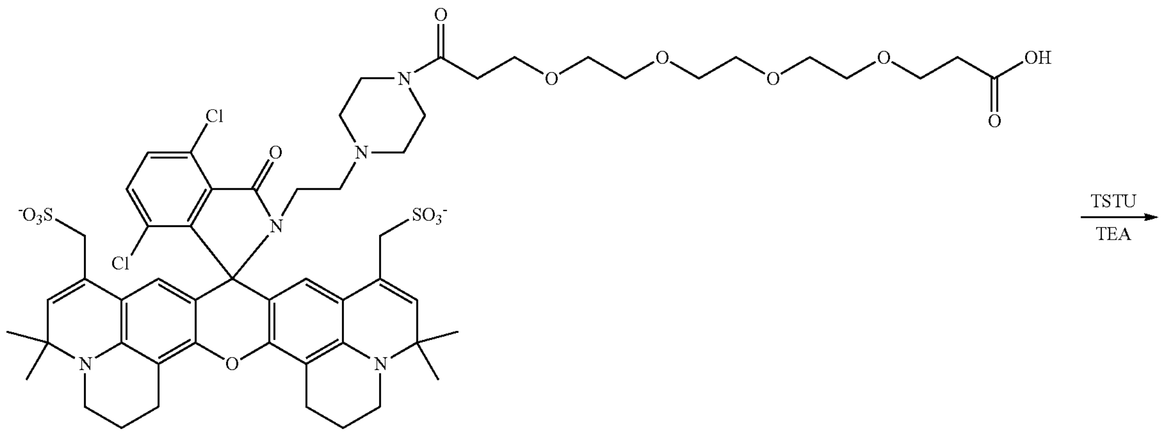

9

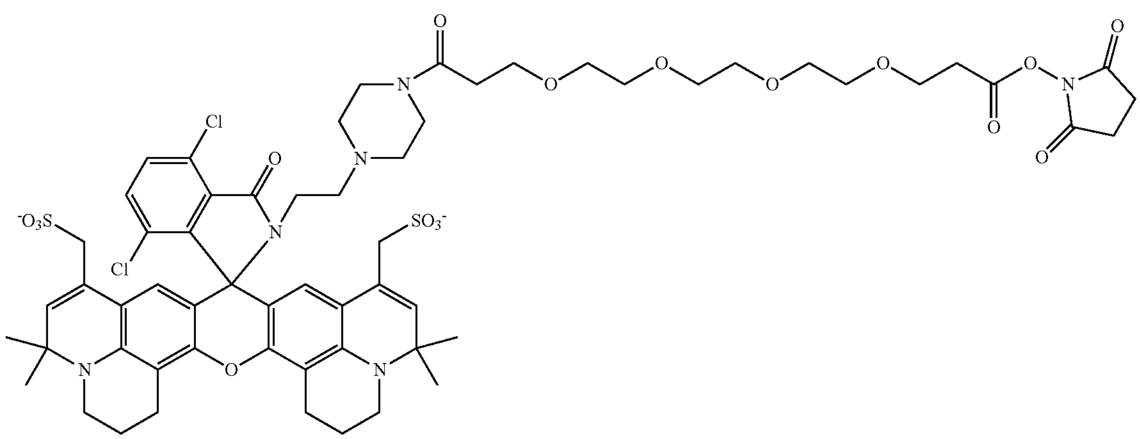

Compound A

1. Synthesis of Compound 3: Compound 1 (2.293 g) and Compound 2 (1.085 g) in anhydrous toluene (40 mL) were heated at 120° C. under inert atmosphere and stirring for 3 hours. $POCl_3$ (4.3 mL) was added to the reaction mixture slowly within 5 minutes and the mixture was stirred at 120° C. until TLC showed the disappearance of the intermediate and Compound 1 (15-20 minutes). After cooling to room temperature, the reaction mixture was poured into water (200 mL) that was cooled in an ice bath. The aqueous layer was decanted. The gummy residue was dissolved in ~300 mL 10% MeOH/$CH_2$Cl2 and washed with saturated bicarbonate (2×150 mL) then brine (150 mL). The organic layer was dried over $Na_2SO_4$, filtered and evaporated with rotary evaporation. The solid was dried under house vacuum to a constant weight (>2 days) to yield ~3.5 g of Compound 3 as a dark blue solid. The solid was used for next step without further purification.

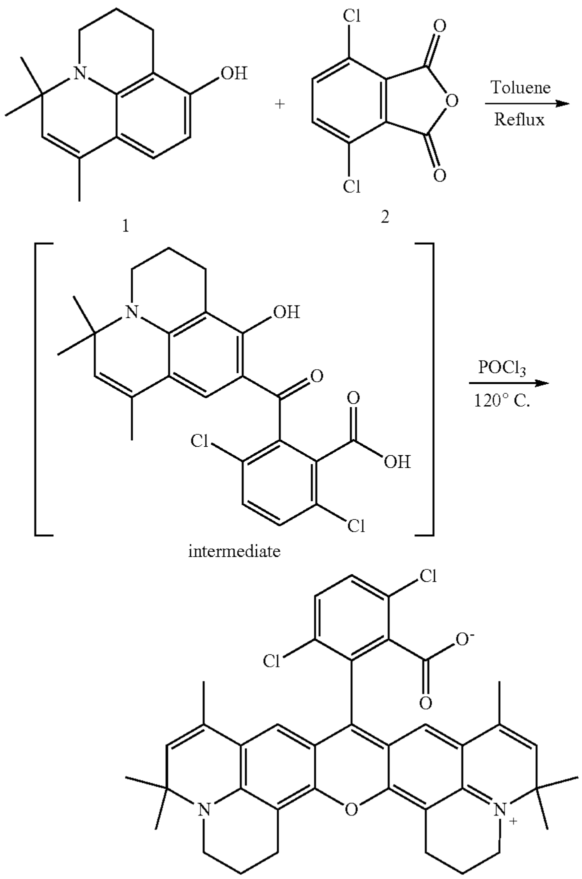

1

2 intermediate

3

2. Synthesis of Compound 4: Compound 3 (3.5 g) was added to concentrated $H_2SO_4$ (20 mL). The mixture was heated at 70° C. for 2 hours. After cooling to room temperature, the mixture was carefully poured into 300 mL cold ether in an ice bath under stirring. After 15 minutes, the ether layer was decanted, and the residue was washed with ether (300 mL) and then ethyl acetate (300 mL). The residue was dissolved in 200 mL 10% trimethylamine in methanol and the solvent was evaporated. The residue was washed with ethyl acetate (2×300 mL) by swirling and decanting. The residue was dried and then purified by reverse phase column chromatography purification. Evaporation of the solvent followed by lyophilization gave Compound 4 as a blue solid. Yield: 0.8 g (18% for two steps).

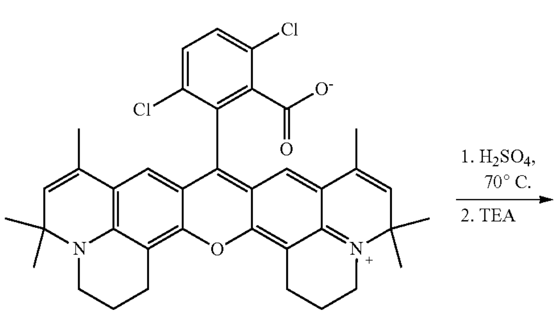

3

-continued

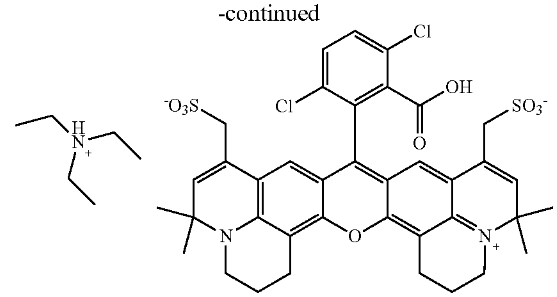

4

3. Synthesis of Compound 6: Compound 4 (15 mg, 1 equivalent), Compound 5 (2 equivalents) and PyAOP ((7-Azabenzotriazol-1-yloxy) tripyrrolidinophosphonium hexafluorophosphate) (1.5 equivalents) were dissolved in 1 mL DMF. Triethylamine (TEA) (5 equivalents) was added to the solution) under inert atmosphere. The mixture was stirred until TLC showed the disappearance of Compound 4 (~1.5 hours). The solvent was evaporated with rotary evaporation and the residue was purified by reverse phase column chromatography. Evaporation of the solvent followed by lyophilization gave Compound 6 as a light blue solid. Yield: 15 mg (81%).

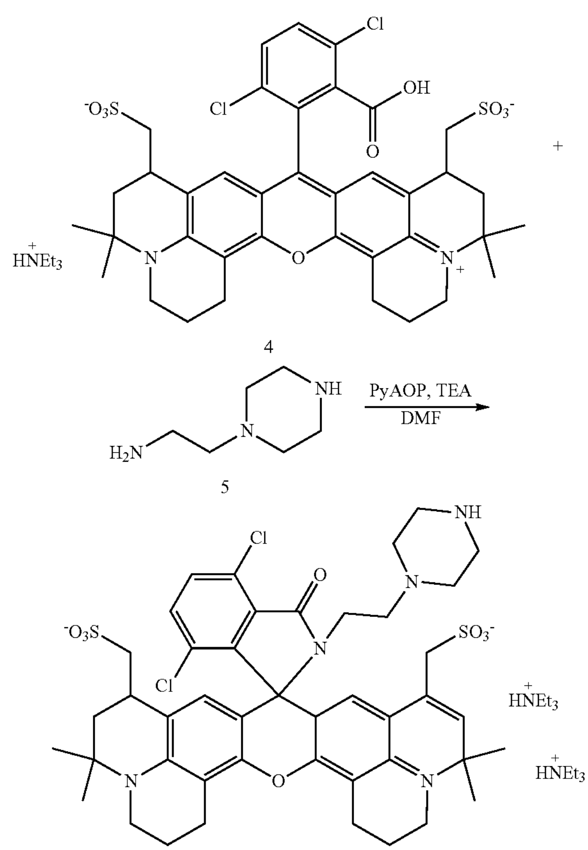

4

5

6

4. Synthesis of Compound 8: Compound 6 (11 mg) and Compound 7 (9 mg) were dissolved in DMF (0.5 mL). Triethylamine (TEA) (20 μL) was added to the solution under inert atmosphere. The mixture was stirred until TLC showed the disappearance of Compound 6 (~2 hours). The solvent was evaporated with rotary evaporation to give Compound 8. Compound 8 was used for next step without purification.

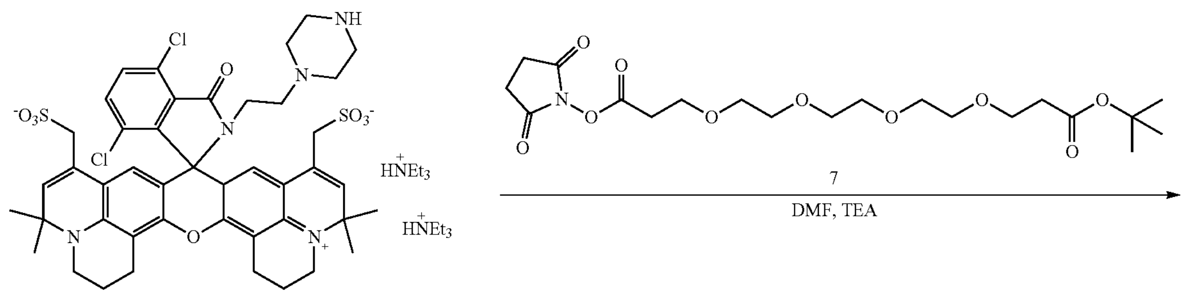

6

7

DMF, TEA

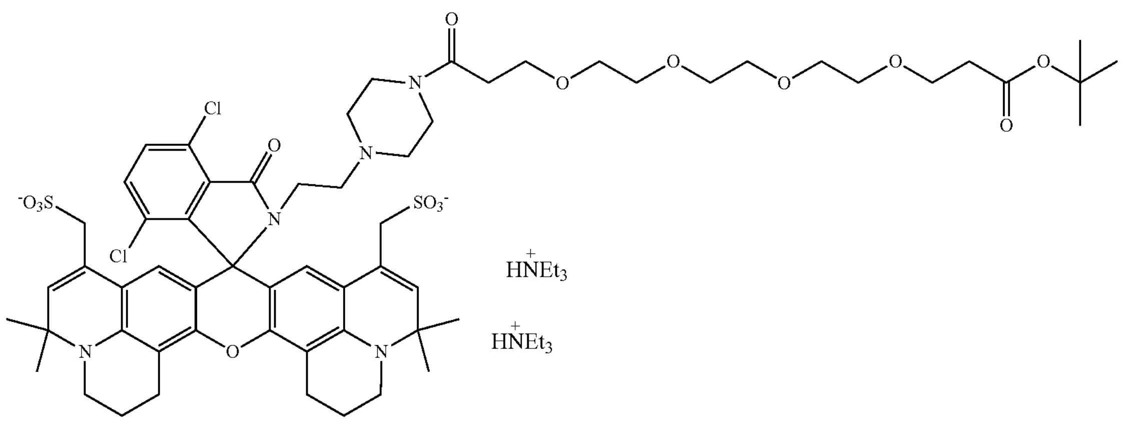

8

5. Synthesis of Compound 9: Compound 8 from last step was dissolved in TFA (trifluoroacetic acid) (1 mL). The solution was stirred at room temperature until TLC showed the disappearance of Compound 8 (~2 hours). TFA was evaporated with rotary evaporation and the residue was co-evaporated with $CH_3CN$-Toluene (1:1) twice. The residue was purified by reverse phase column chromatography. Evaporation of the solvent followed by lyophilization gave Compound 9 as a light blue solid. Yield: 10 mg (730 for two steps).

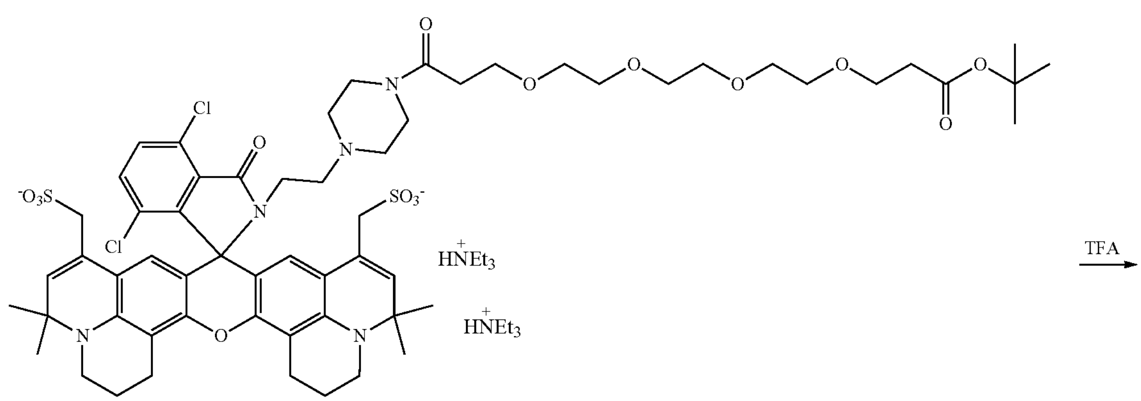

8

TFA

-continued

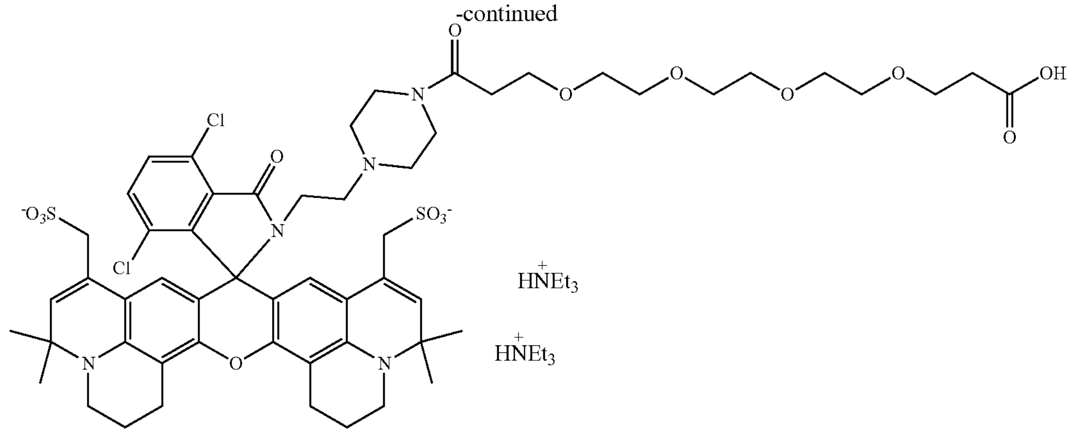

9

6. Synthesis of Compound A: Compound 9 (10 mg) and TEA (15 μL) were dissolved in DMF (0.5 mL). O—(N-Succinimidyl)-N,N,N',N'-tetramethyluronium tetrafluoroborate (TSTU) (3 mg) was added and the solution was stirred at room temperature until TLC showed the disappearance of Compound 9 (~1 hour). The solvent was evaporated with rotary evaporation and the residue was washed with ethyl acetate three times to give Compound A as a light blue solid (9 mg). UV-Vis (PBS buffer pH2.2): λabs=637 nm; λem=650 nm. pKa=5.20.

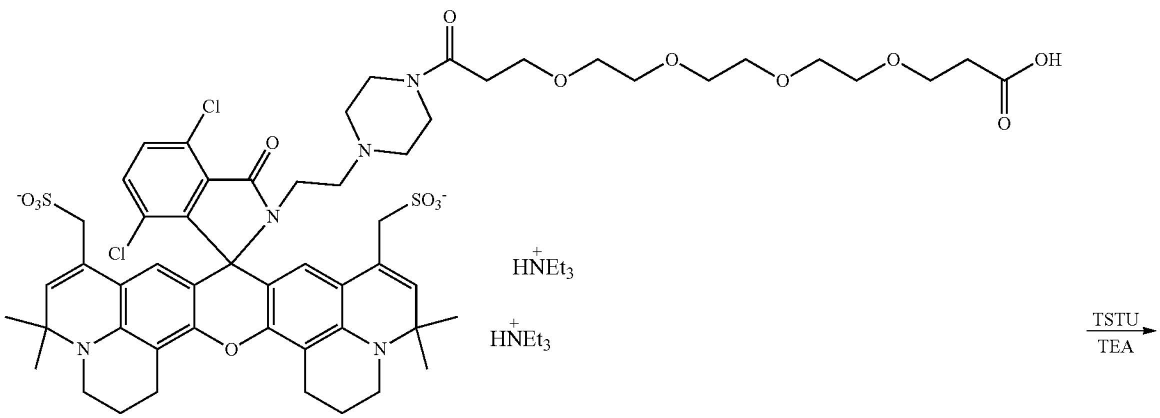

9

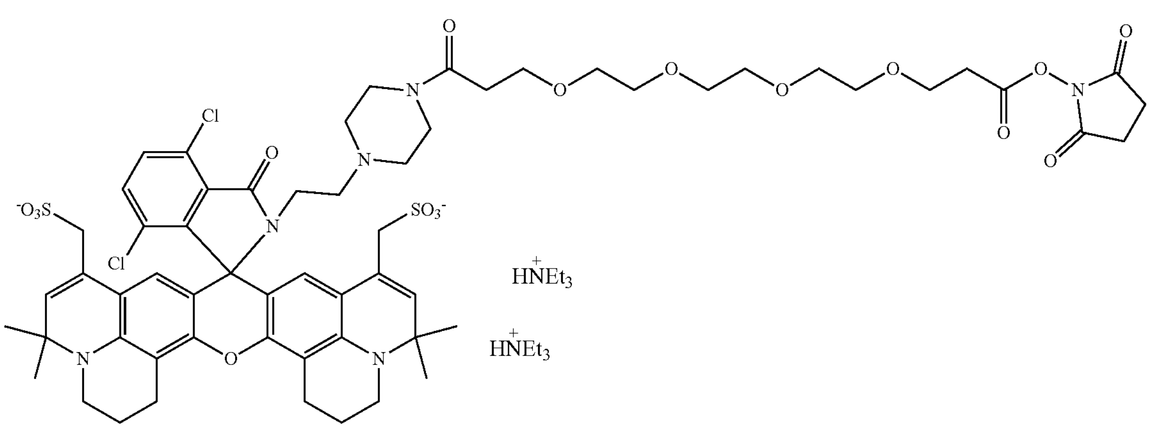

Compound A

Example 2. Synthesis of Compound B
Compound B was prepared as shown in Scheme 2 and detailed in the following experimental synthesis workflow.
Scheme 2
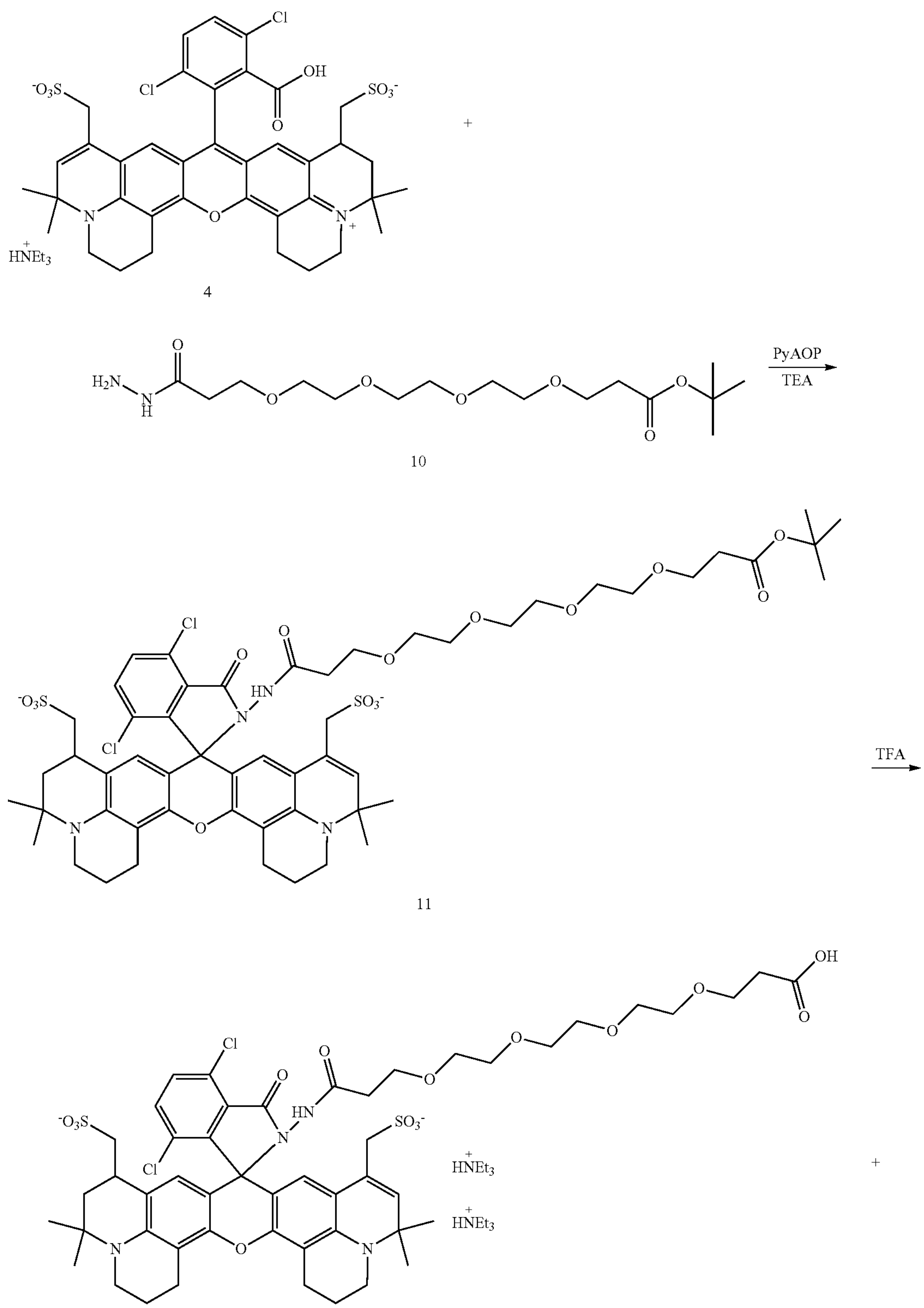

-continued

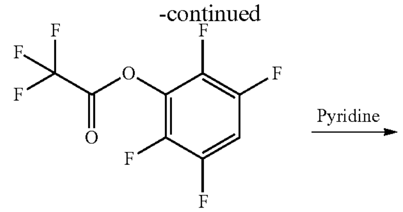

13

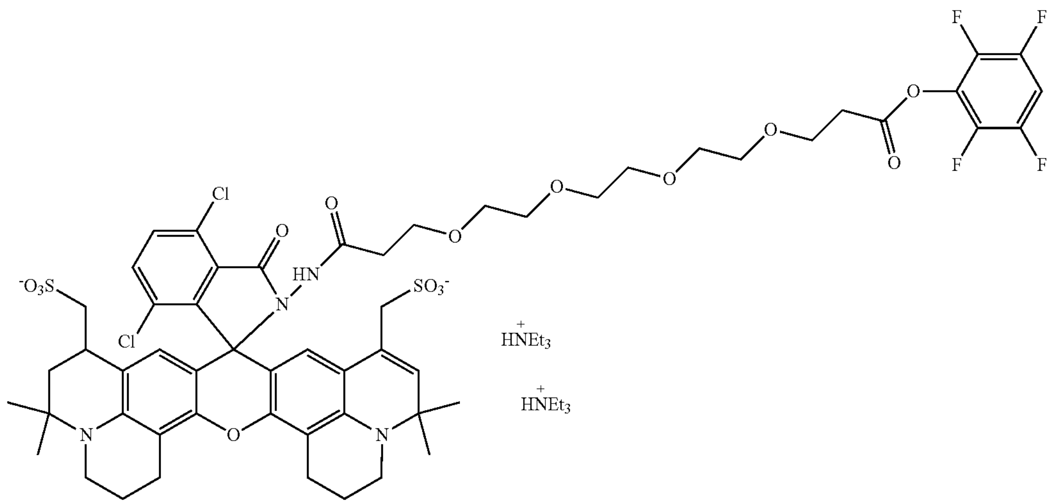

Compound B

1. Synthesis of Compound 11: Compound 4 (15 mg, 1 equivalent), Compound 10 (2 equivalents) and PyAOP ((7-Azabenzotriazol-1-yloxy) tripyrrolidinophosphonium hexafluorophosphate) (1.5 equivalents) were dissolved in 1 mL DMF. Triethylamine (TEA) (5 equivalents) was added to the solution under inert atmosphere. The mixture was stirred until TLC showed the disappearance of Compound 4 (~1.5 hours). The solvent was evaporated with rotary evaporation to give Compound 11 as a light blue solid. Compound 11 was used for next step without further purification.

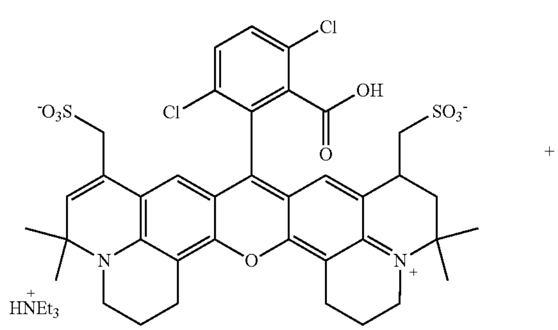

4

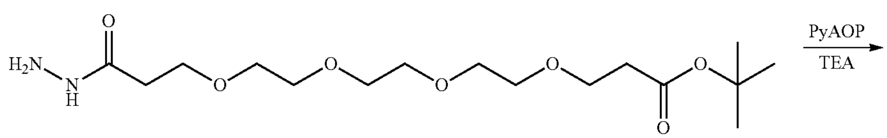

10

-continued

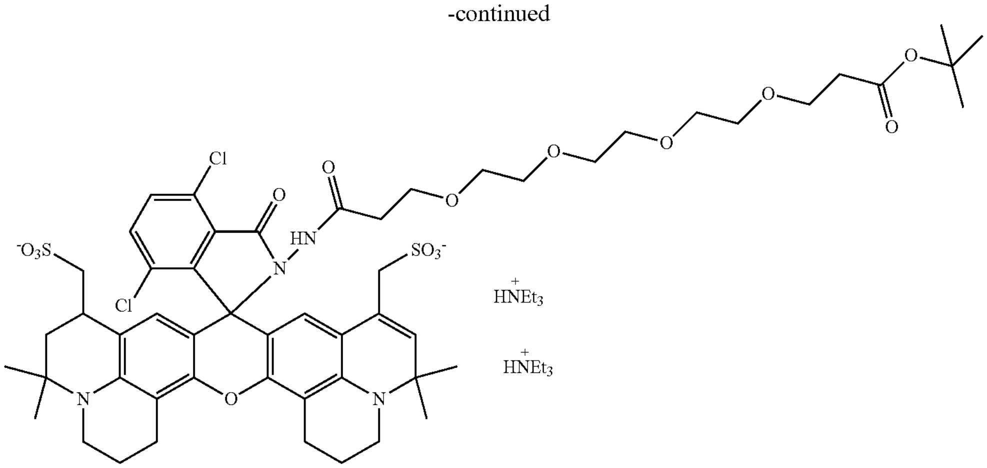

11

2. Synthesis of Compound 12: Compound 11 from last step was dissolved in TFA (trifluoroacetic acid) (1 mL). The solution was stirred at room temperature until TLC showed the disappearance of Compound 11 (~2 hours). TFA was evaporated with rotary evaporation and the residue was co-evaporated with $CH_3CN$-Toluene (1:1) twice. The residue was purified by reverse phase column chromatography. Evaporation of the solvent followed by lyophilization gave Compound 12 as a light blue solid. Yield: 15 mg (77% for two steps).

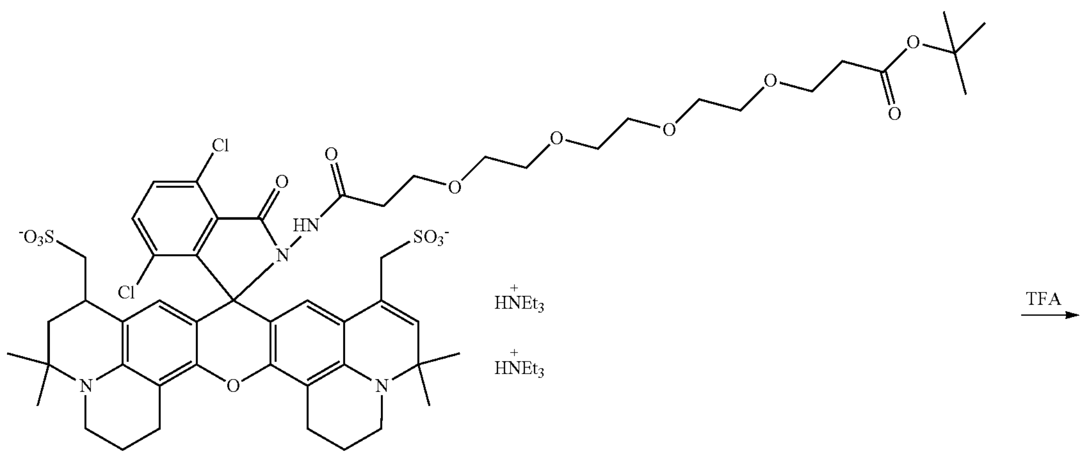

11

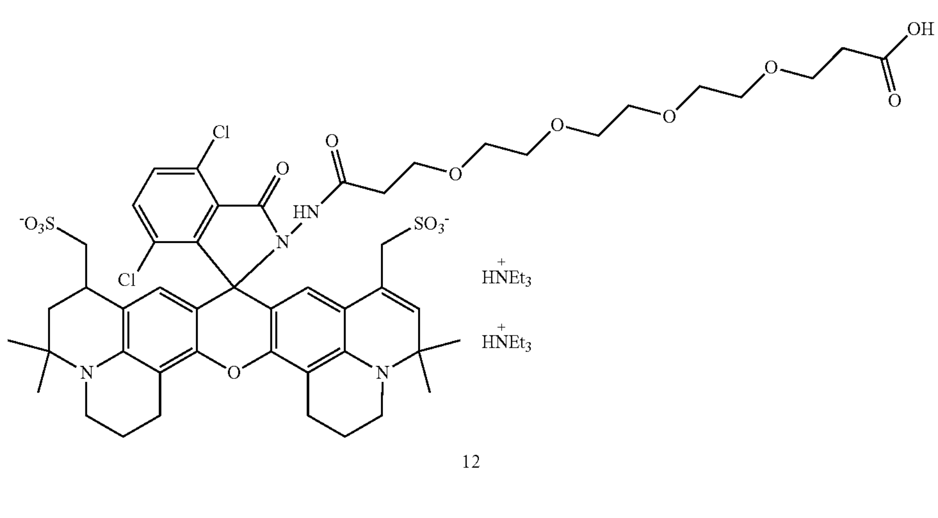

12

3. Synthesis of Compound B: Compound 12 (10 mg) was dissolved in 1 mL dry pyridine. Compound 13 (2 equivalents) was added and the solution was stirred at room temperature under inert atmosphere for 1 hour. Additional Compound 13 (2 equivalents) was added and the solution was stirred at room temperature for one more hour. The solution was added into 15 mL Hexanes-ethyl acetate (9:1) mixture. The precipitate was collected by centrifuge and washed with hexanes-ethyl acetate (5:5) mixture (2×15 mL). The solid was dissolved in 1 mL chloroform and the solution was added into 15 mL hexanes-ethyl acetate (9:1) mixture. The solid was collected by centrifuge and washed with hexanes-ethyl acetate (5:5) mixture (2×15 mL). The solid was dried under high vacuum to give Compound B as a light blue solid. Yield: 9 mg (81%). UV-Vis (PBS buffer pH 2.2): λabs=637 nm; λem=650 nm. pKa=3.7.

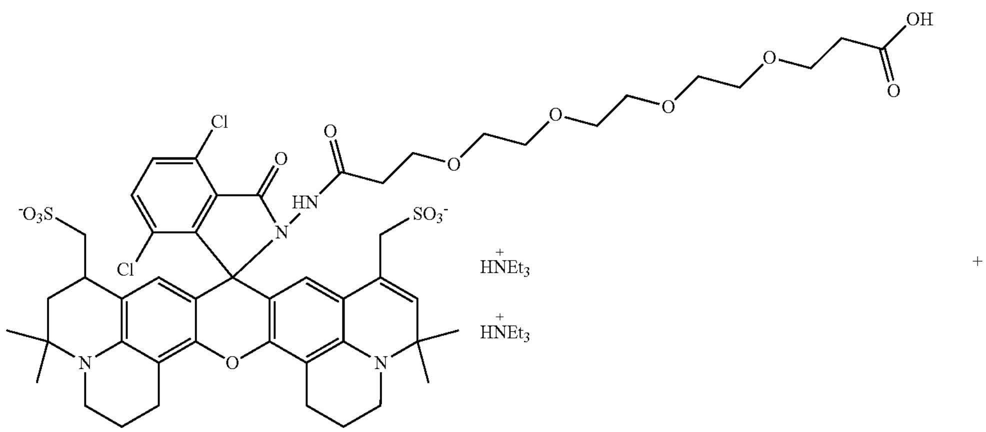

12

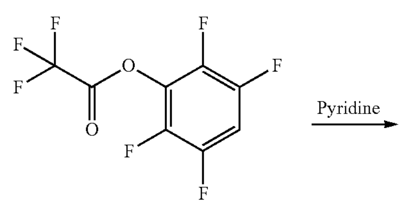

13

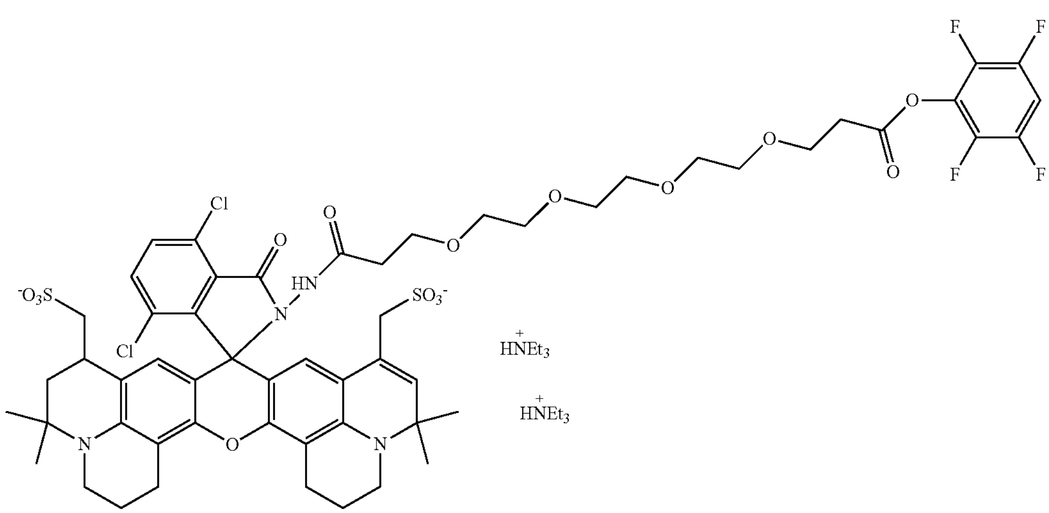

Compound B

Example 3. Synthesis of Compound C
Compound C was prepared as shown in Scheme 3 and detailed in the following experimental synthesis workflow.
Scheme 3
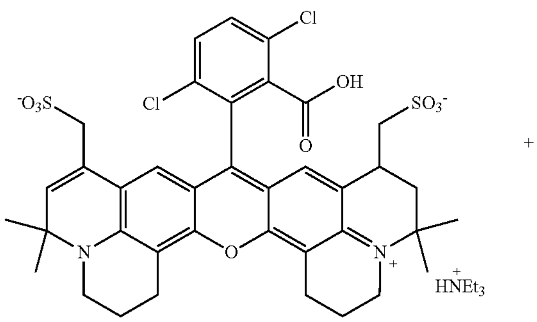
4
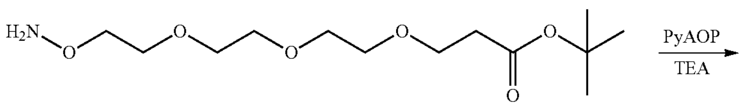
14
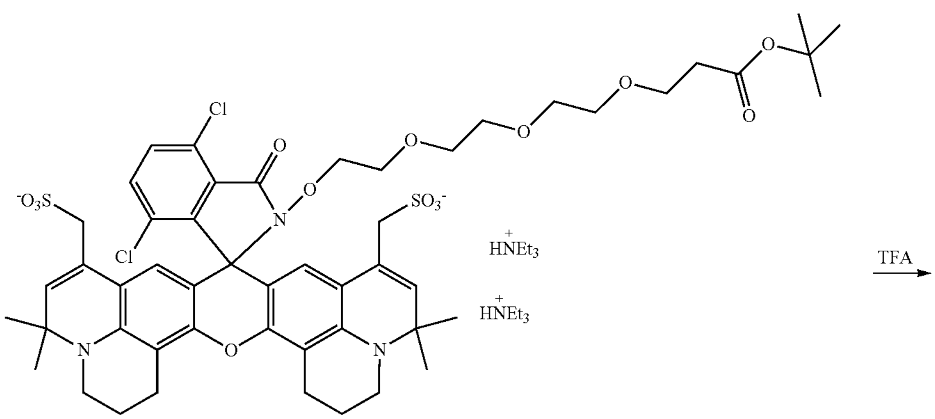
15
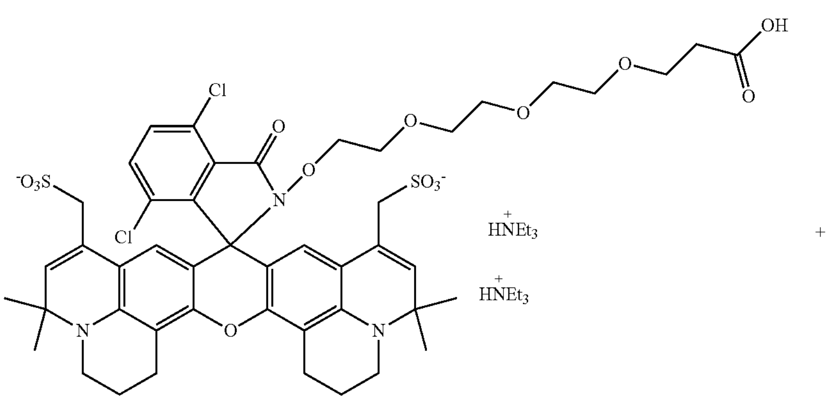
16

-continued

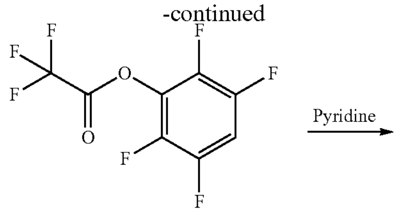

13

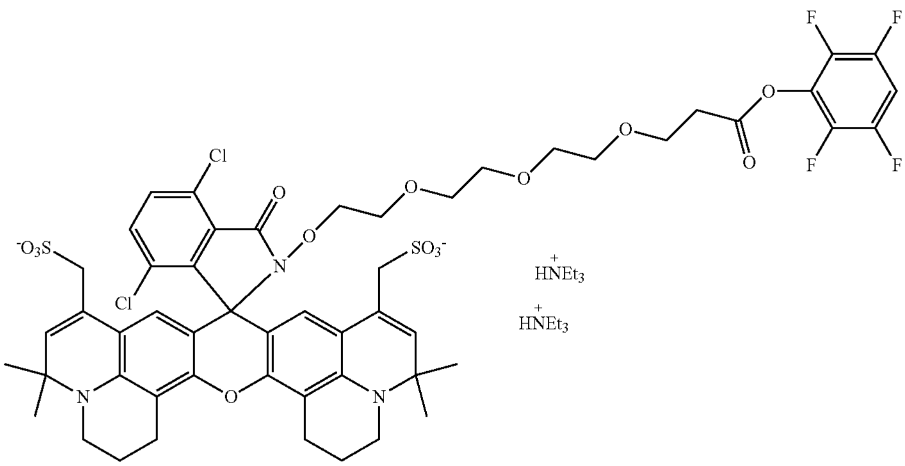

Compound C

1. Synthesis of Compound 15: Compound 4 (15 mg, 1 equivalent), Compound 14 (2 equivalents) and PyAOP ((7-Azabenzotriazol-1-yloxy) tripyrrolidinophosphonium hexafluorophosphate) (1.5 equivalents) were dissolved in 1 mL DMF. Triethylamine (TEA) (5 equivalents) was added to the solution under inert atmosphere. The mixture was stirred until TLC showed the disappearance of Compound 4 (~1.5 hours). The solvent was evaporated with rotary evaporation to give Compound 15 as a light blue solid. Compound 15 was used for next step without further purification.

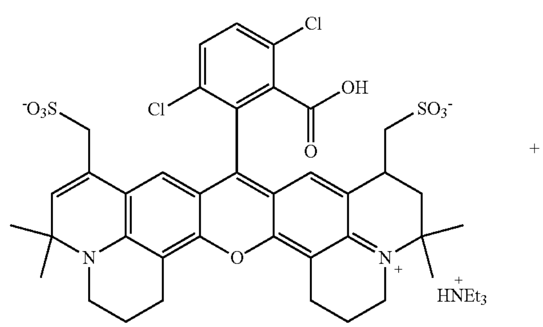

4

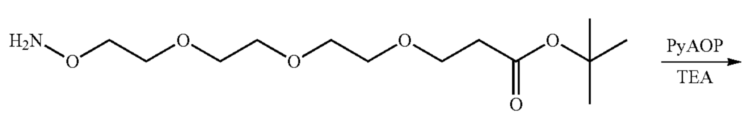

14

-continued

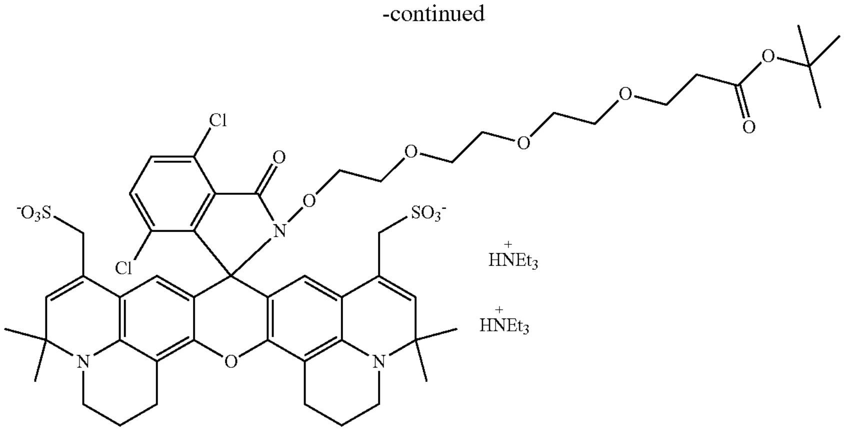

15

2. Synthesis of Compound 16: Compound 15 from the last step was dissolved in TFA (trifluoroacetic acid) (1 mL). The solution was stirred at room temperature until TLC showed the disappearance of Compound 15 (~2 hours). TFA was evaporated with rotary evaporation and the residue was co-evaporated with $CH_3CN$-Toluene (1:1) twice. The residue was purified by reverse phase column chromatography. Evaporation of the solvent followed by lyophilization gave Compound 16 as a light blue solid. Yield: 14 mg (77% for two steps).

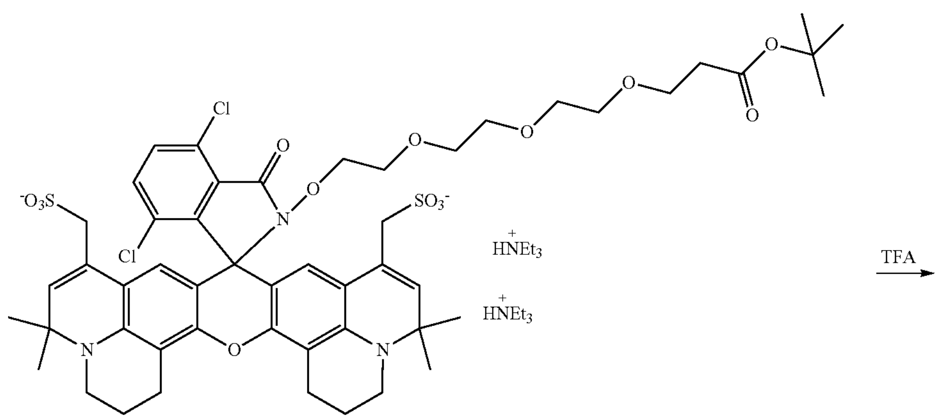

15

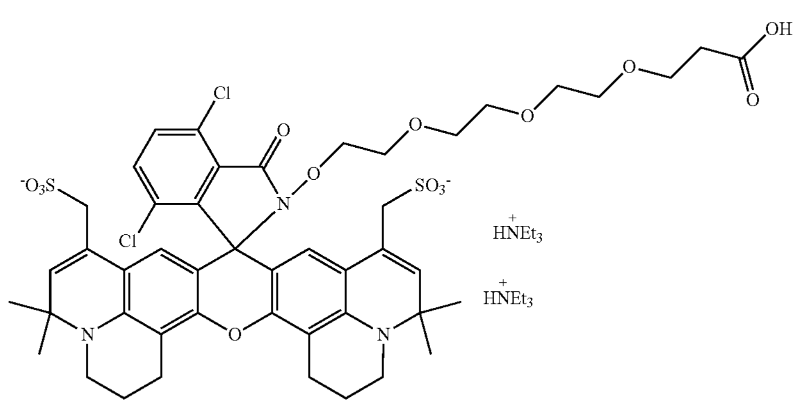

16

3. Synthesis of Compound C: Compound C was prepared from Compounds 16 and 13 using the procedure described in step 3 of Example 2. UV-Vis (PBS buffer pH2.2): λabs=637 nm; λem=650 nm, see FIG. 1. pKa=4.87.
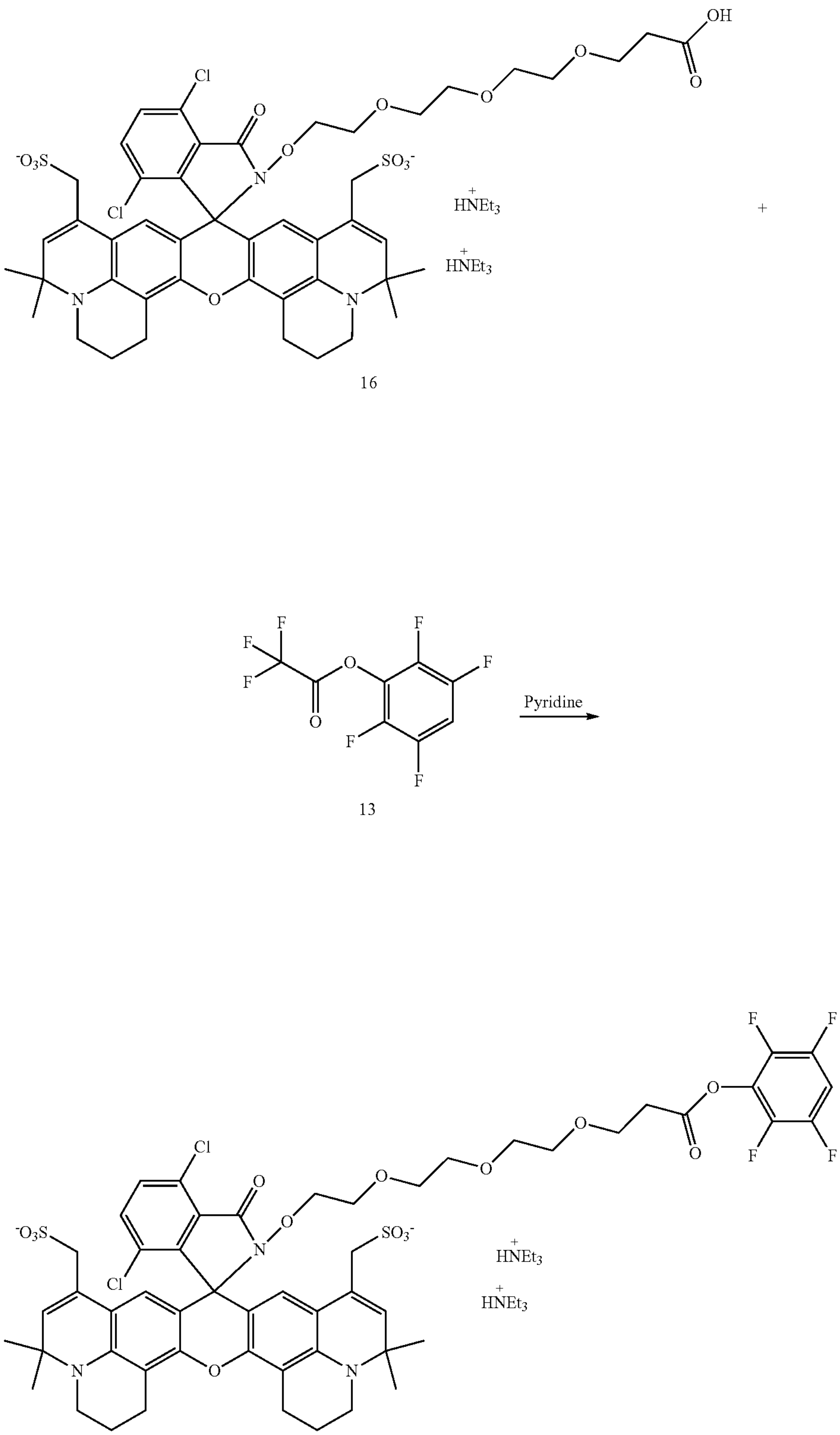
Compound C Example 4. Synthesis of Compound D
Compound D was prepared as shown in Scheme 4 and detailed in the following experimental synthesis workflow.
Scheme 4
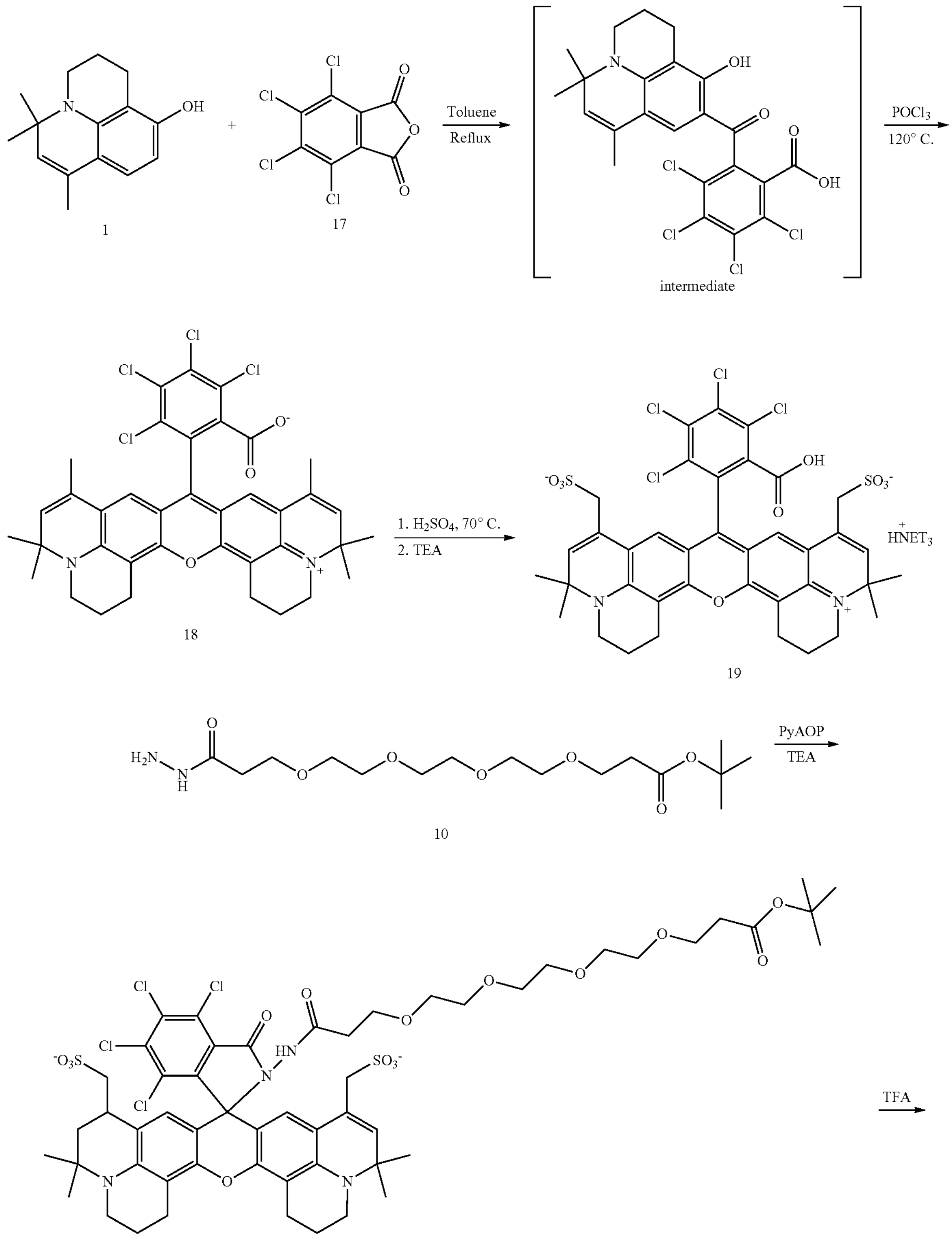
20

-continued
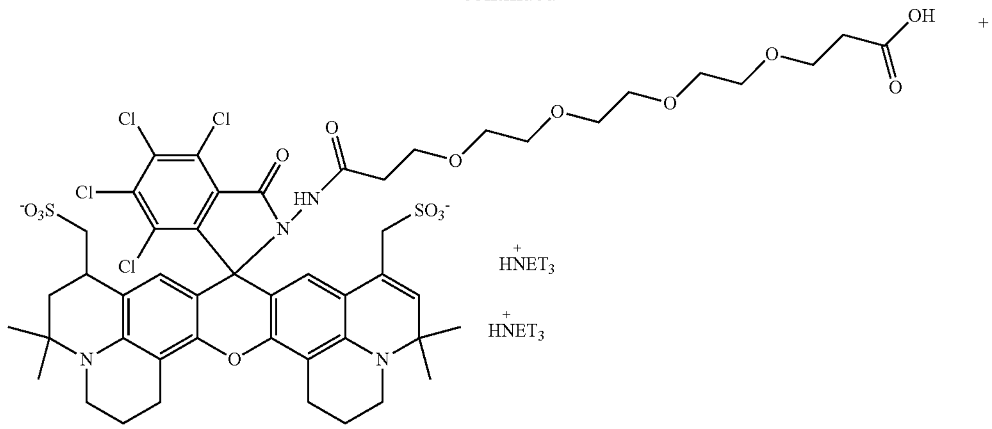
21
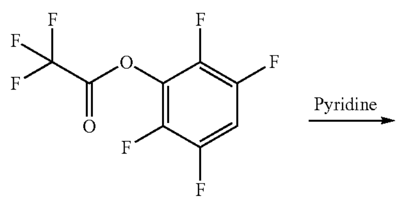
13
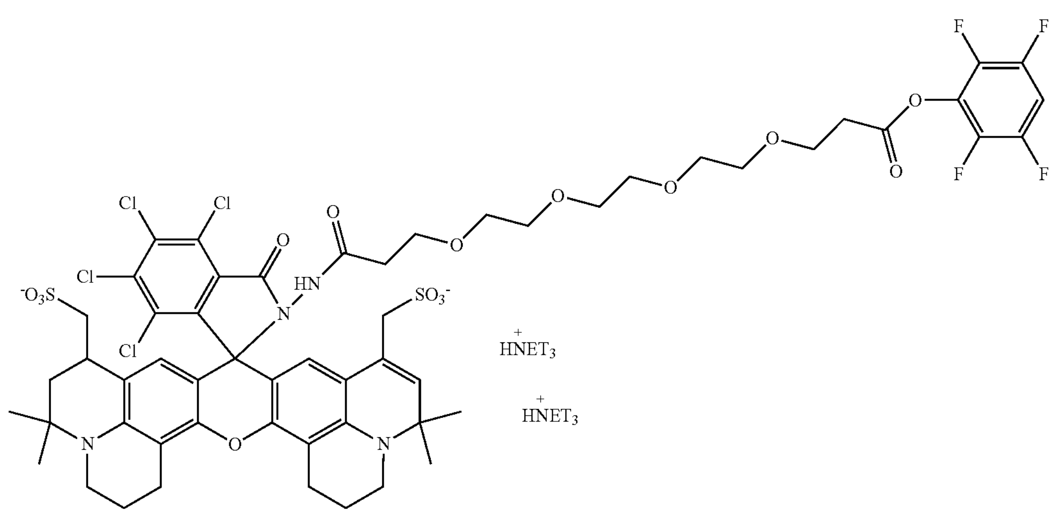
Compound D

1. Synthesis of Compound 18: Compound 18 was prepared from Compound 1 and Compound 17 using the procedure described for the synthesis of Compound 3 in step 1 of Example 1.

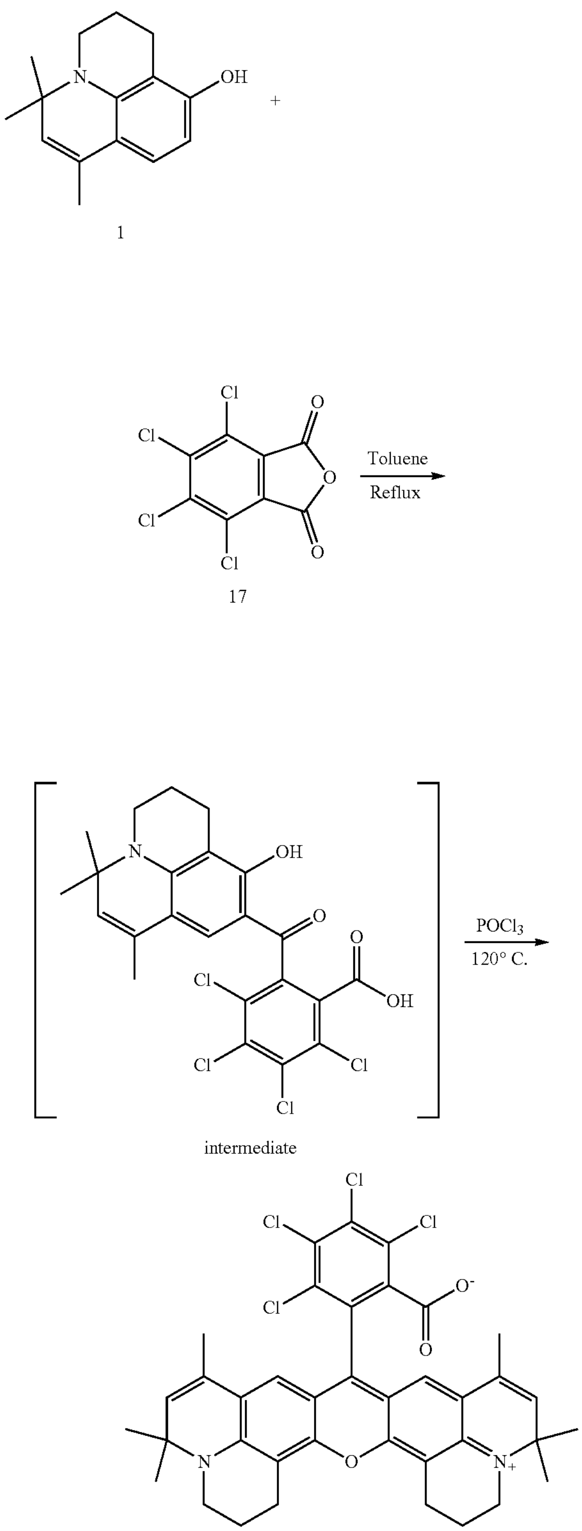

1

17 intermediate

18

2. Synthesis of Compound 19: Compound 19 was prepared from Compound 18 using the procedure described for the synthesis of Compound 4 in step 2 of Example 1.

18

19

3. Synthesis of Compound 20: Compound 20 was prepared from Compound 19 and Compound 10 using the procedure described for the synthesis of Compound 11 in step 1 of Example 2.

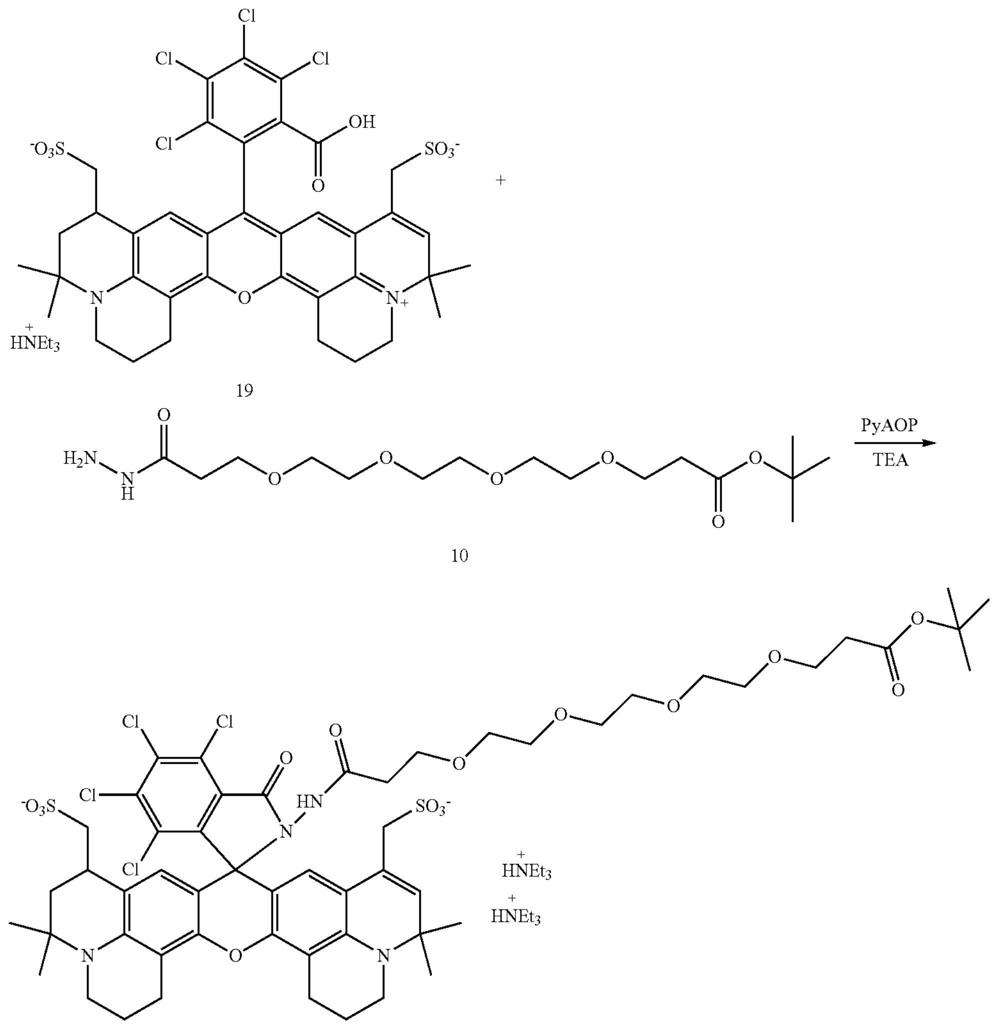
19
10
20
4. Synthesis of Compound 21: Compound 21 was prepared from Compound 20 using the procedure described for the synthesis of Compound 12 in step 2 of Example 2.
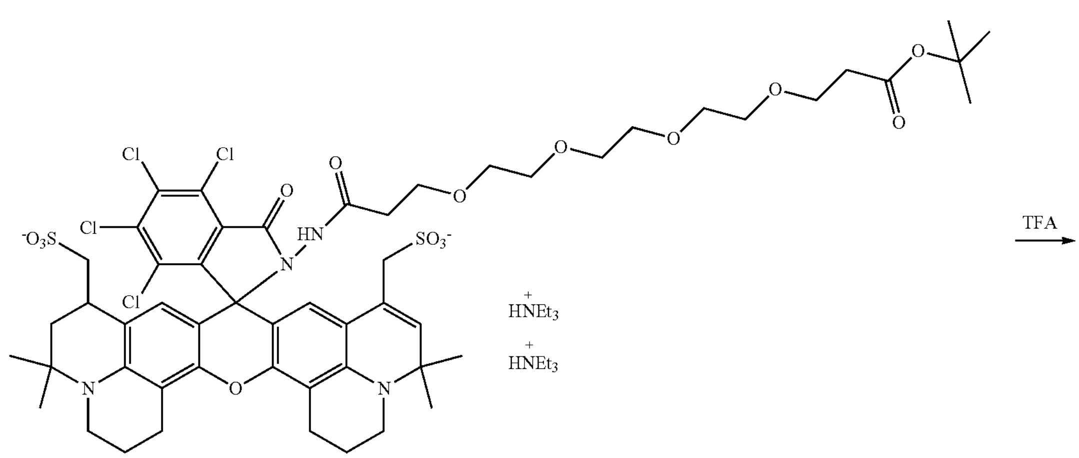
20

-continued
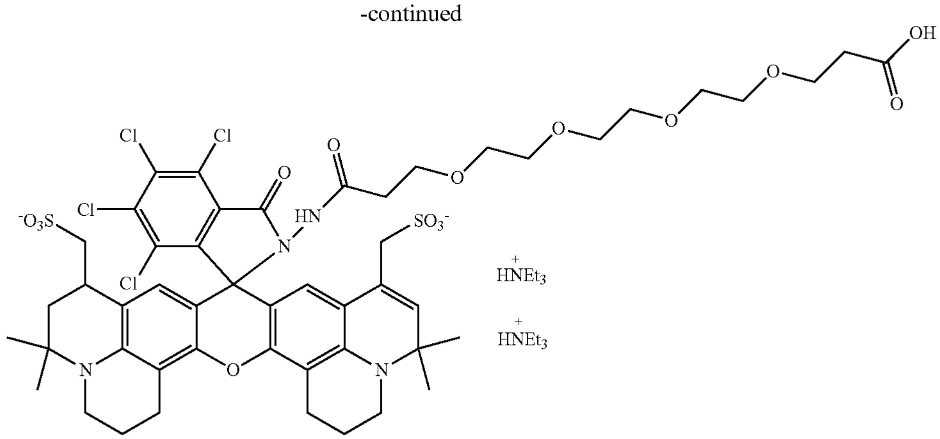
21
5. Synthesis of Compound D: Compound D was prepared from Compound 21 and Compound 13 using the procedure described for the synthesis of Compound B in step 3 of Example 2. UV-Vis (PBS buffer pH 2.2): λabs=637 nm; λem=650 nm. pKa=4.30.
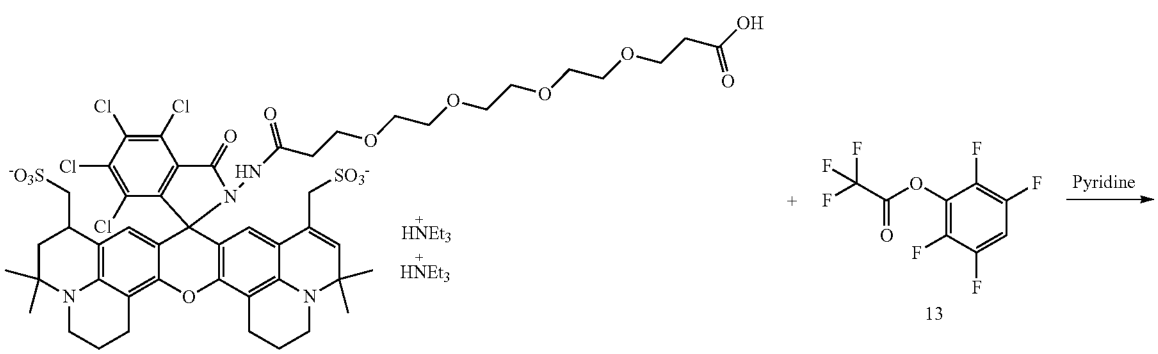
21
13
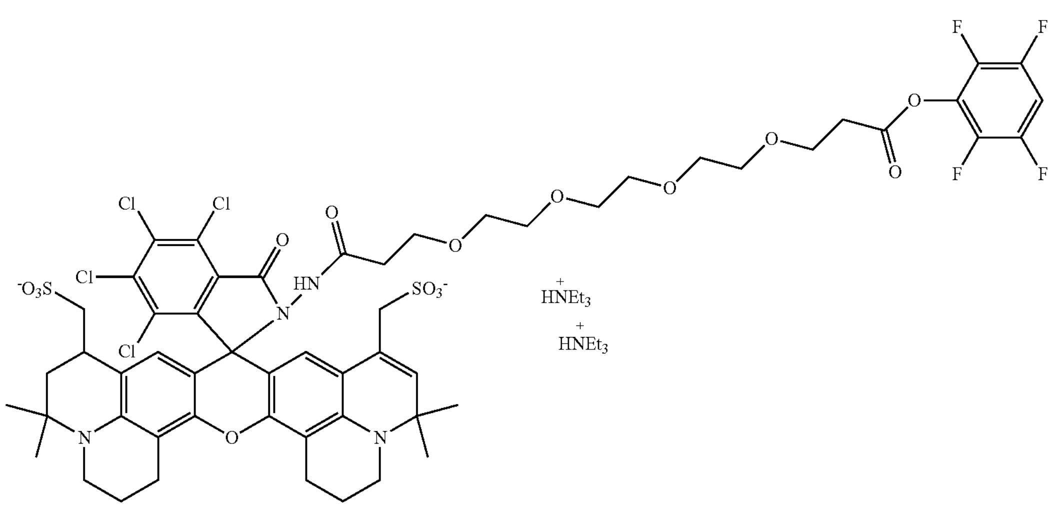
Compound D Example 5. Synthesis of Compound E
Compound E was prepared as shown in Scheme 5 and detailed in the following experimental synthesis workflow.
Scheme 5
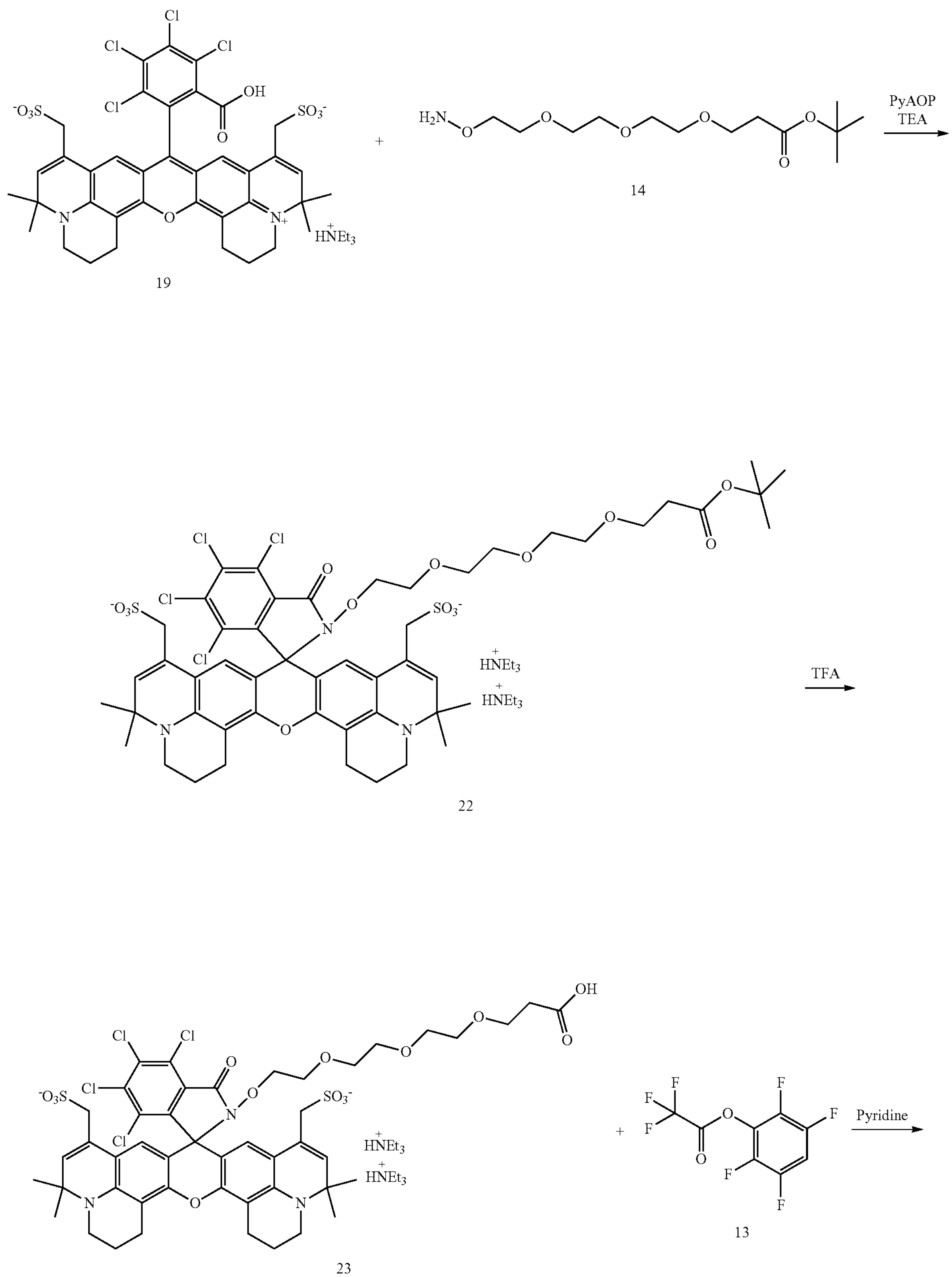

-continued
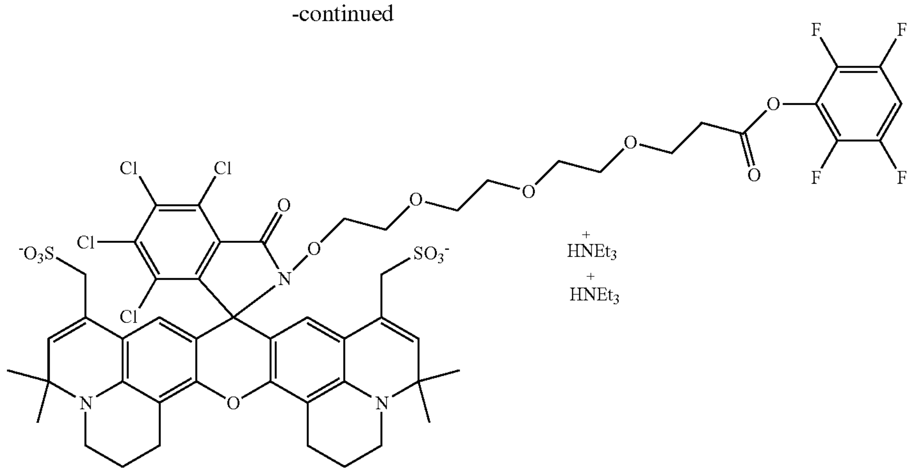
Compound E
1. Synthesis of Compound 22: Compound 22 was prepared from Compound 19 and Compound 14 using the procedure described for the synthesis of Compound 15 in step 1 of Example 3.
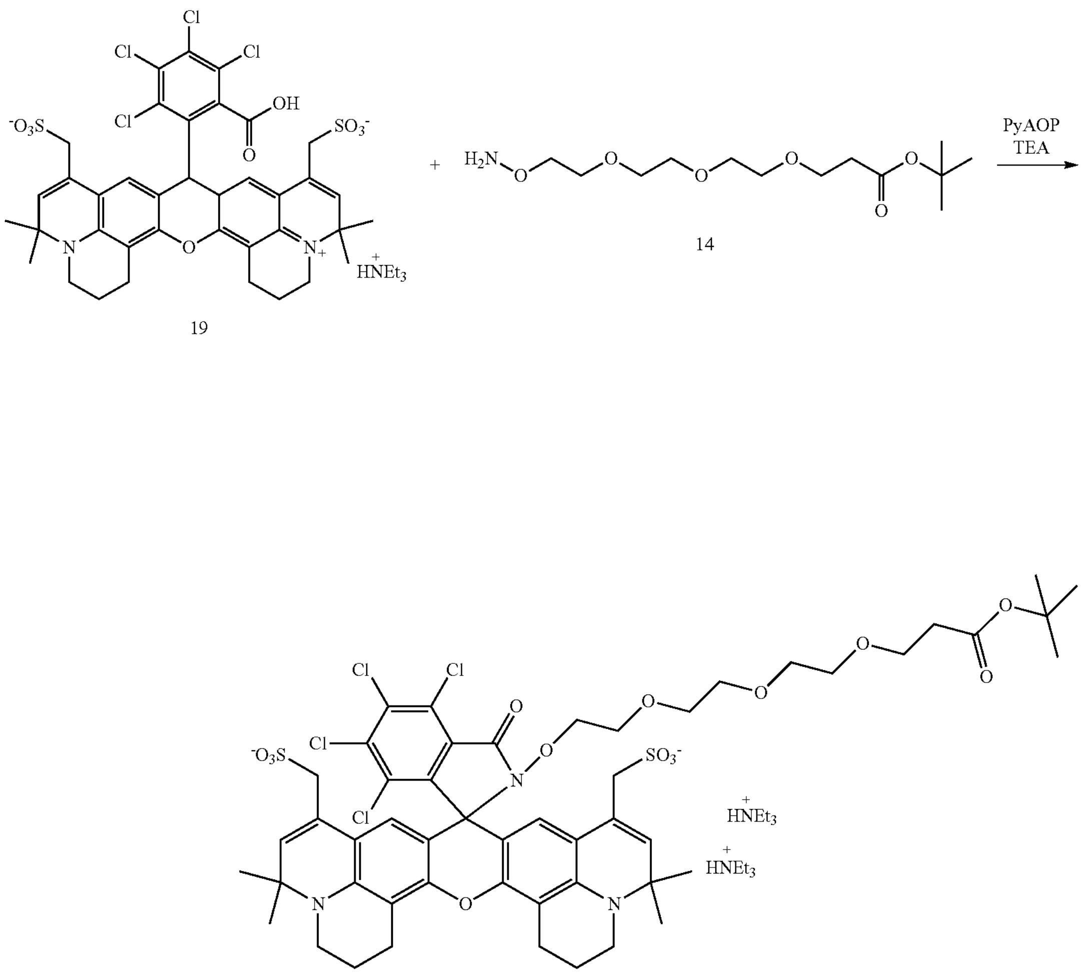
19
14
22

Figure 2:
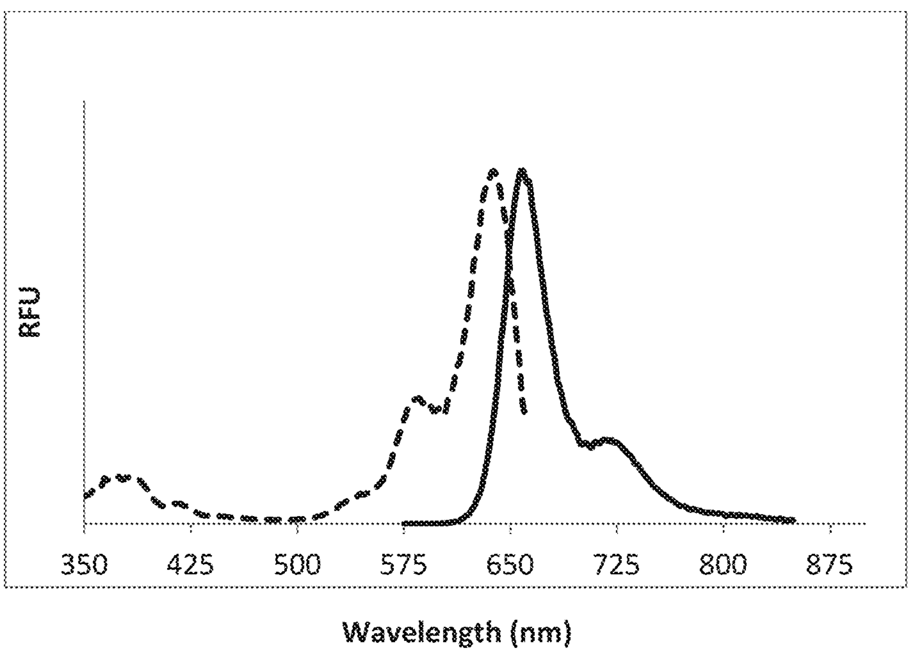
FIG. 2 provides the absorption and emission spectra of Compound E in PBS buffer at pH 2.2. The dashed line shows the absorption spectrum, and the solid line shows the emission spectrum.

2. Synthesis of Compound 23: Compound 23 was prepared from Compound 22 using the procedure described for the synthesis of Compound 16 in step 2 of Example 3.
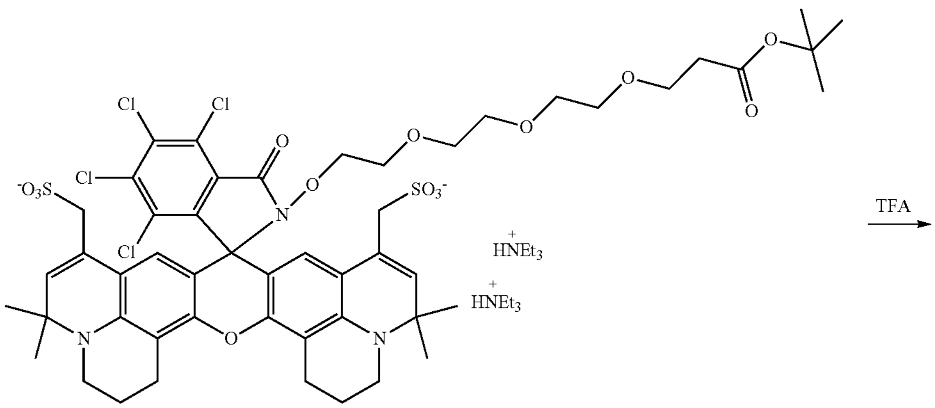
22
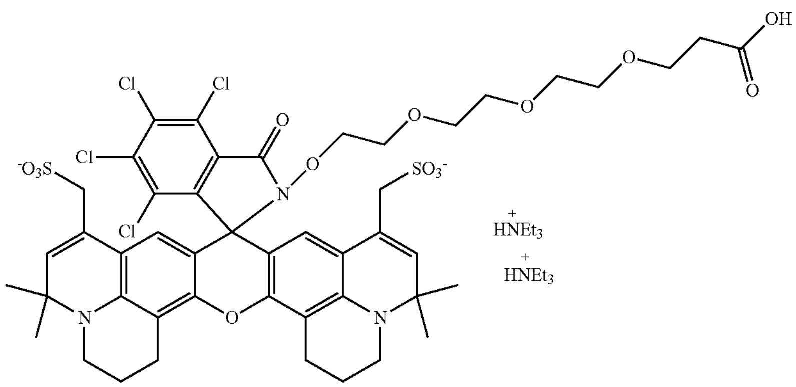
23
3. Synthesis of Compound E: Compound E was prepared from Compound 23 and Compound 13 using the procedure described for the synthesis of Compound B in step 3 of Example 2. UV-Vis (PBS buffer pH 2.2): λabs=637 nm; λem=650 nm, see FIG. 2. pKa=4.67.
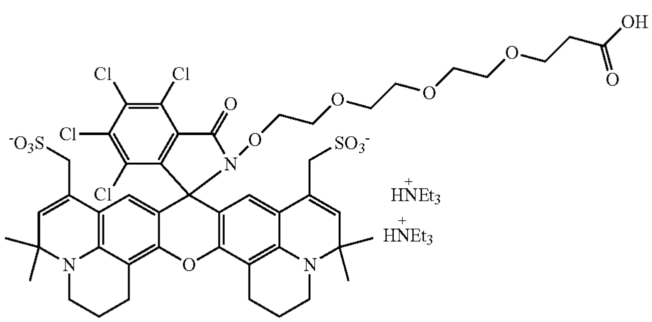
23
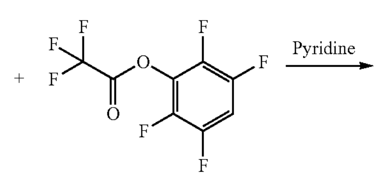
13

-continued
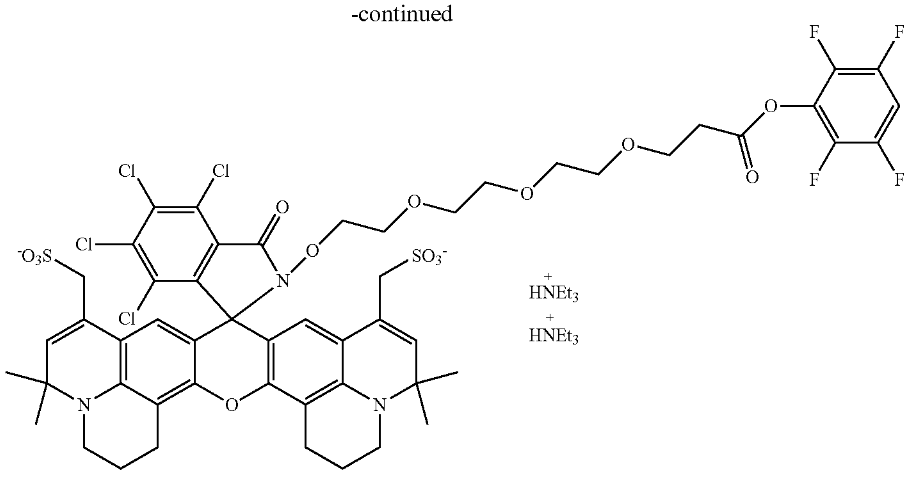
Compound E
Example 6. Synthesis of Compound F
Compound F was prepared as shown in Scheme 6 and detailed in the following experimental synthesis workflow.
Scheme 6
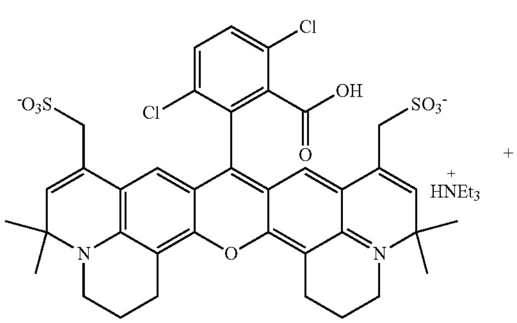
4
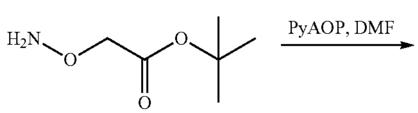
24
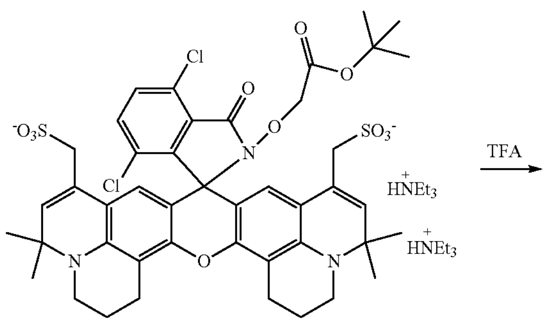
25
-continued
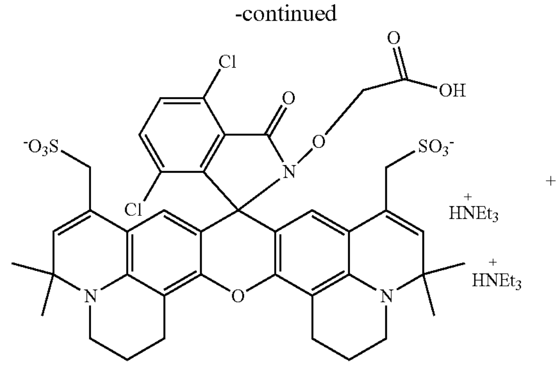
26
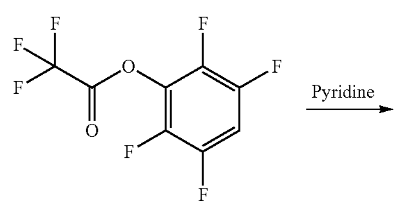
13
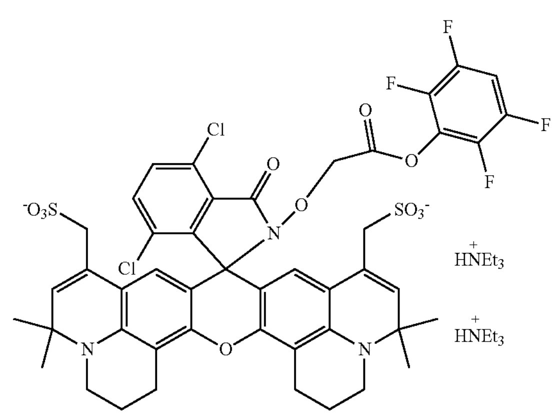
Compound F 1. Synthesis of Compound 25: Compound 25 was prepared from Compound 4 and Compound 24 using the procedure described for the synthesis of Compound 15 in step 1 of Example 3.

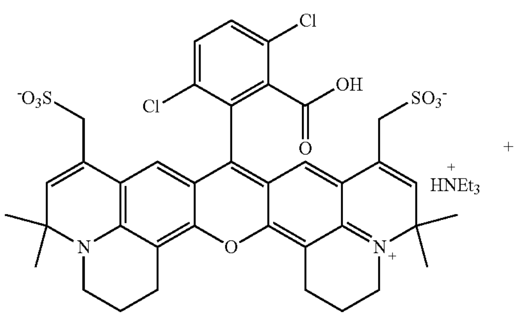

4

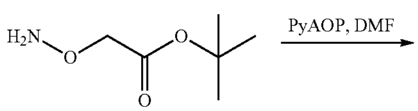

24

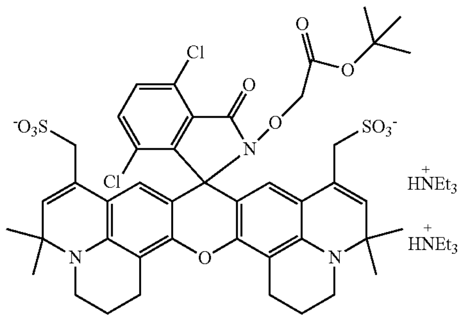

25

2. Synthesis of Compound 26: Compound 26 was prepared from Compound 25 using the procedure described for the synthesis of Compound 16 in step 2 of Example 3.

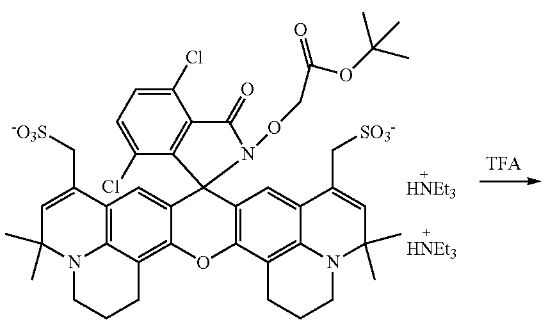

25

-continued

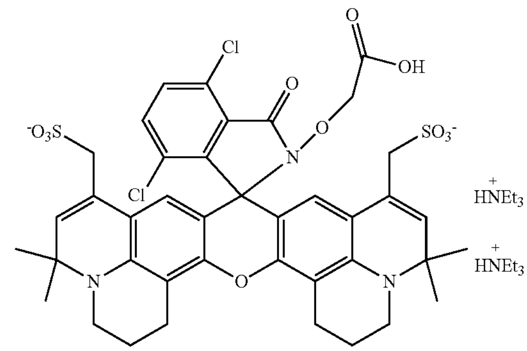

26

3. Synthesis of Compound F: Compound F was prepared from Compound 26 and Compound 13 using the procedure described for the synthesis of Compound B in step 3 of Example 2. UV-Vis (MeOH/HCl): λabs=630 nm; λem=652 nm. pKa=5.5.

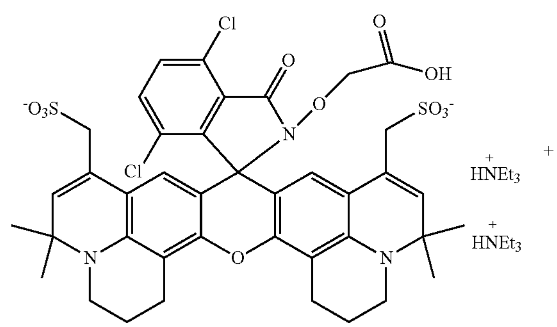

26

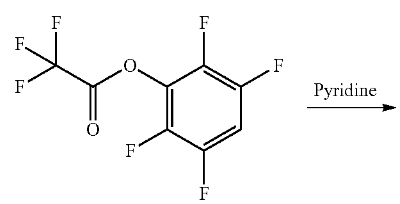

13

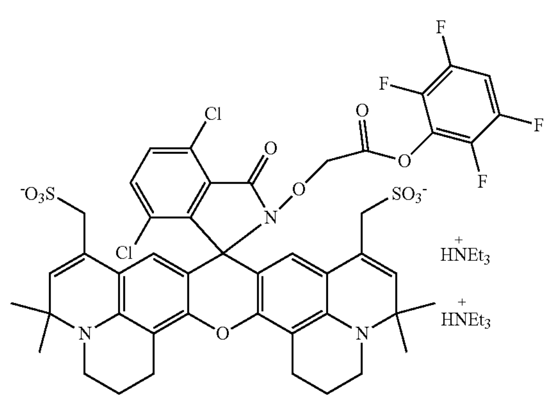

Compound F

Example 7. Synthesis of Compound G
Compound G was prepared as shown in Scheme 7 and detailed in the following experimental synthesis workflow.
Scheme 7
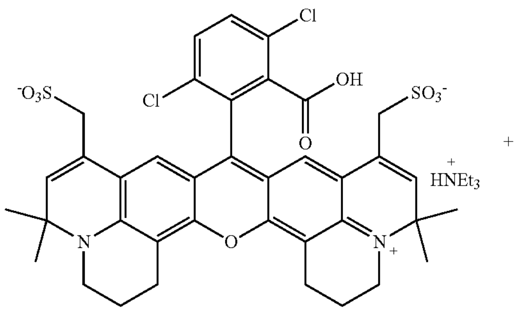
4
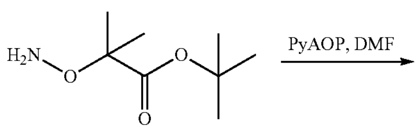
27
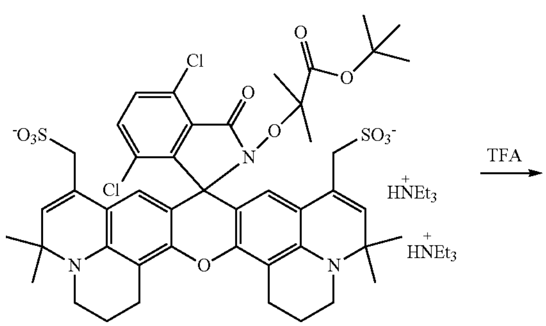
28
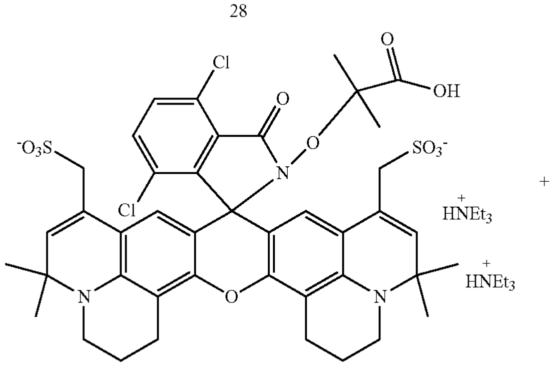
29
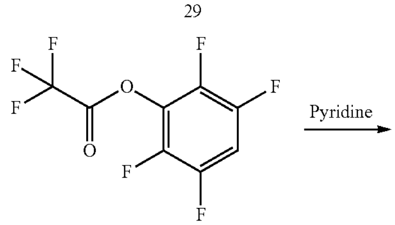
13
-continued
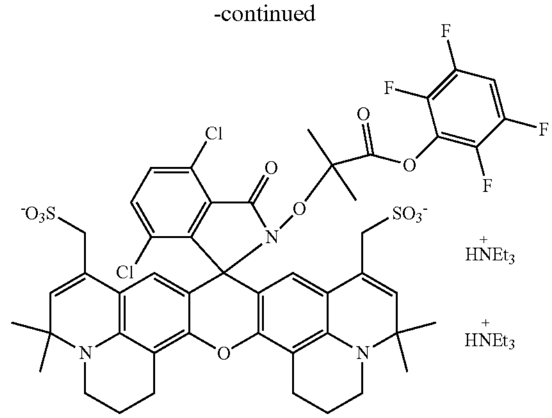
Compound G
1. Synthesis of Compound 28: Compound 28 was prepared from Compound 4 and Compound 27 using the procedure described for the synthesis of Compound 15 in step 1 of Example 3.
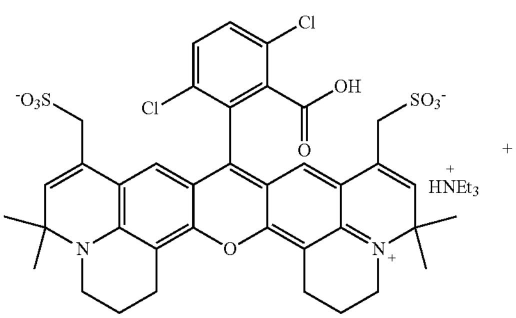
4
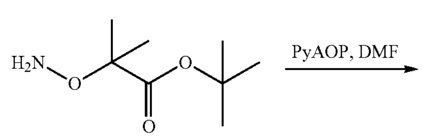
27

-continued
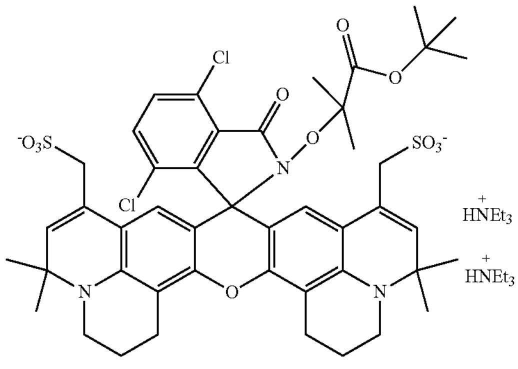
28
2. Synthesis of Compound 29: Compound 29 was prepared from Compound 28 using the procedure described for the synthesis of Compound 16 in step 2 of Example 3.
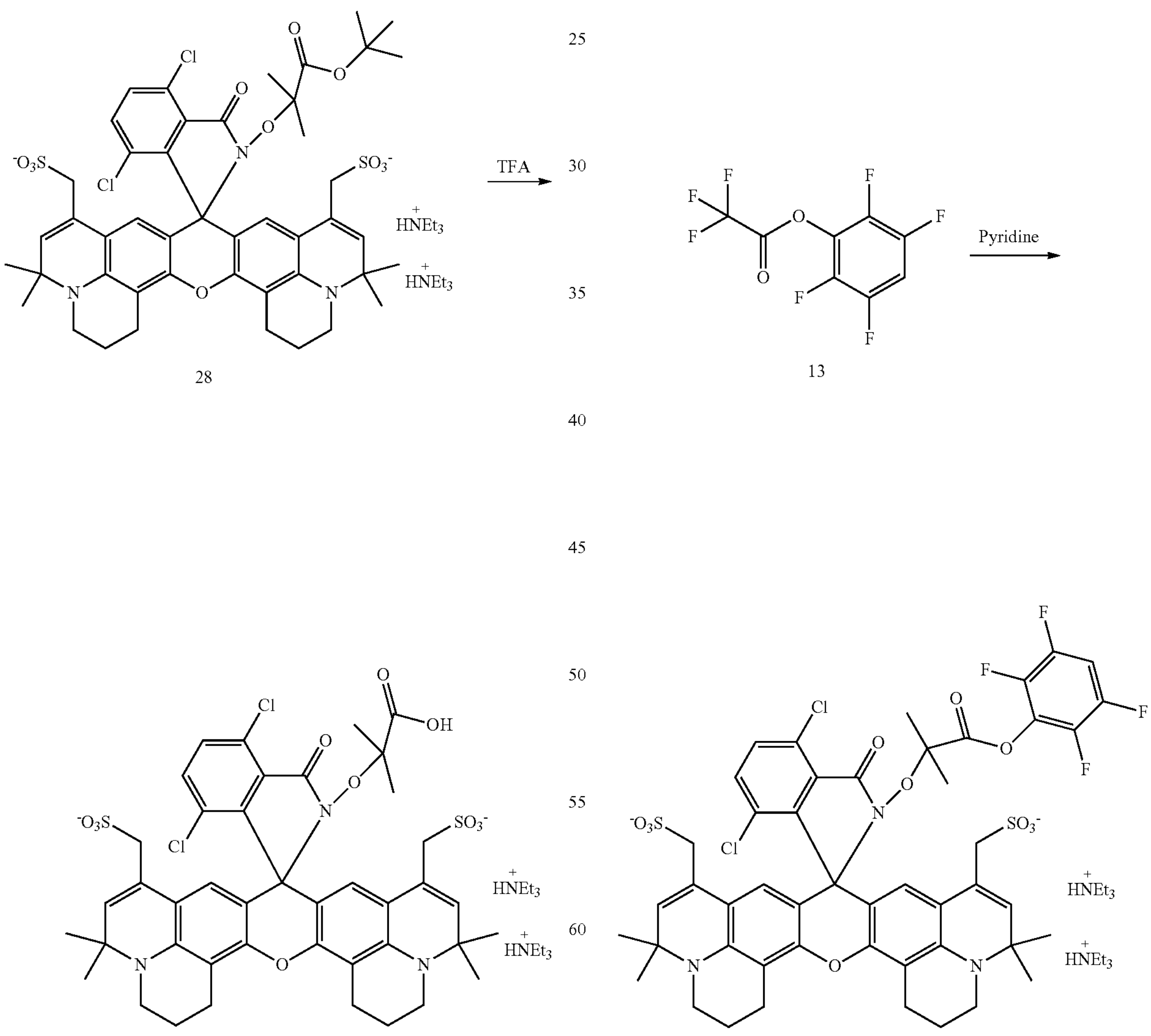
3. Synthesis of Compound G: Compound G was prepared from Compound 29 and Compound 13 using the procedure described for the synthesis of Compound B in step 3 of Example 2. UV-Vis (MeOH/HCl): λabs=630 nm; λem=652 nm. pKa=6.5.
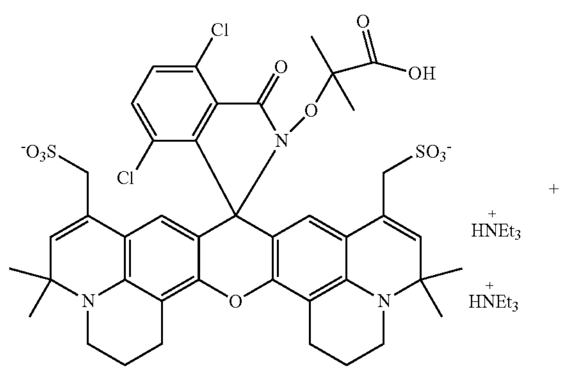
Compound G Example 8. Synthesis of Compound H
Compound H was prepared as shown in Scheme 8 and detailed in the following experimental synthesis workflow.
Scheme 8
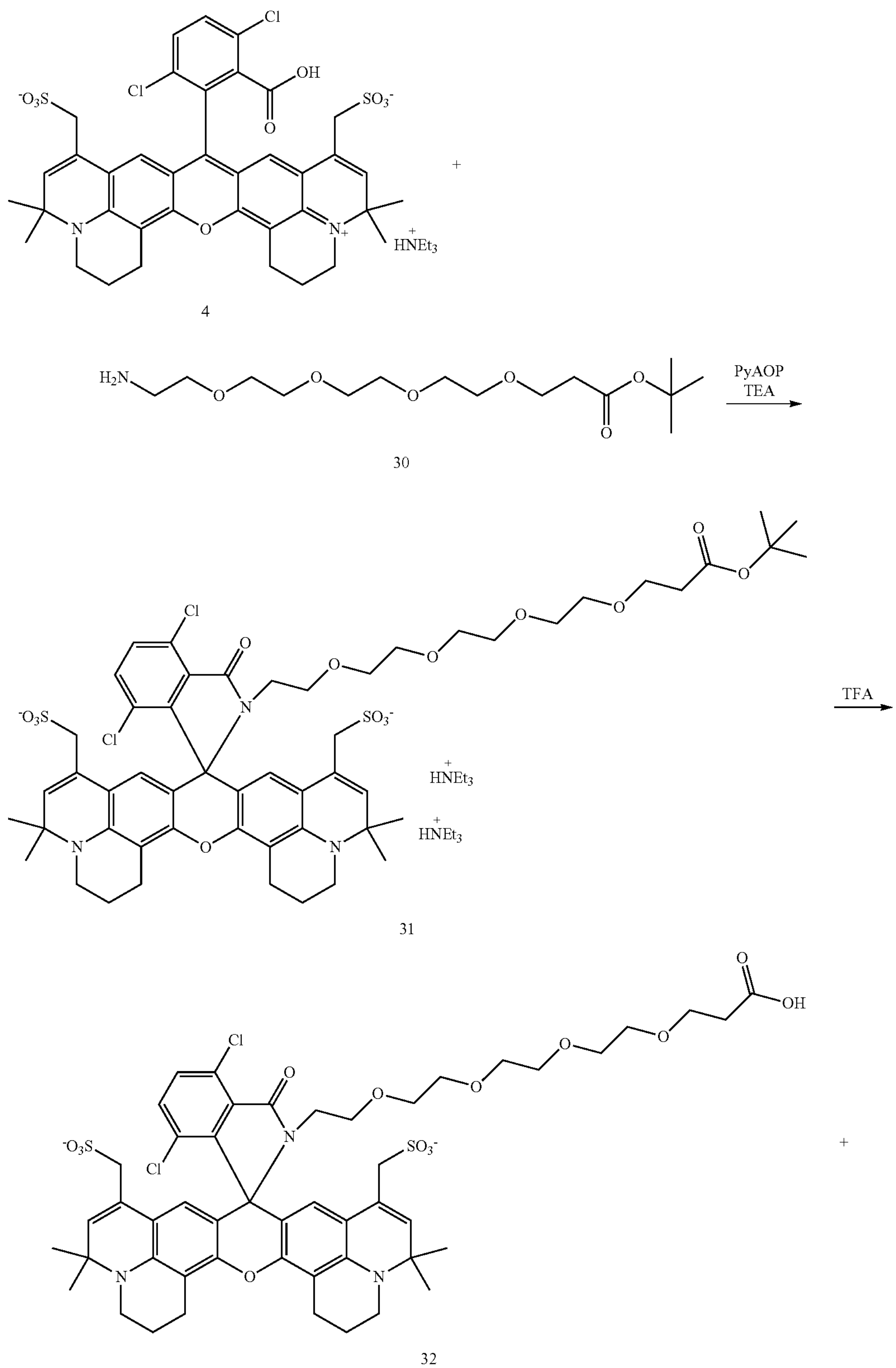

-continued
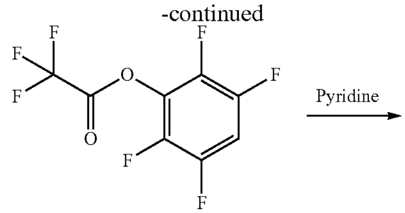
13
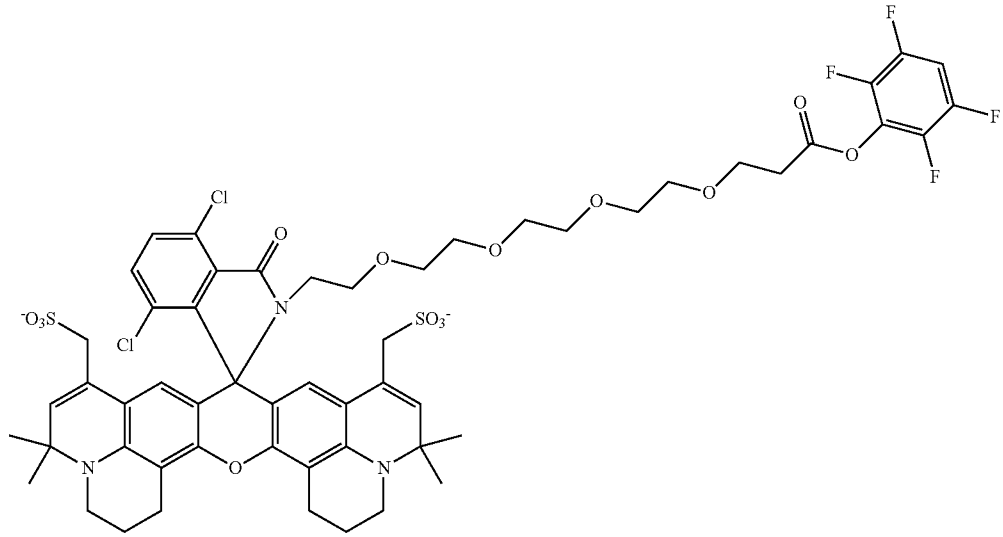
Compound H
1. Synthesis of Compound 31: Compound 31 was prepared from Compound 4 and Compound 30 using the procedure described for the synthesis of Compound 15 in step 1 of Example 3.
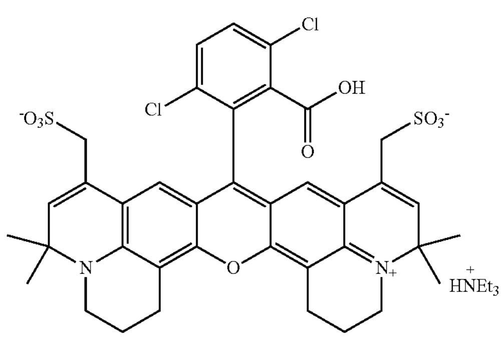
4
+
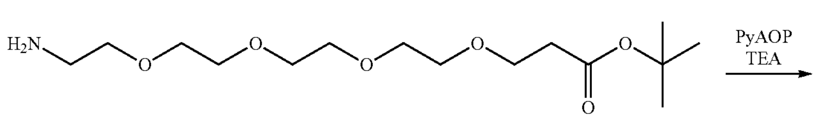
30

-continued
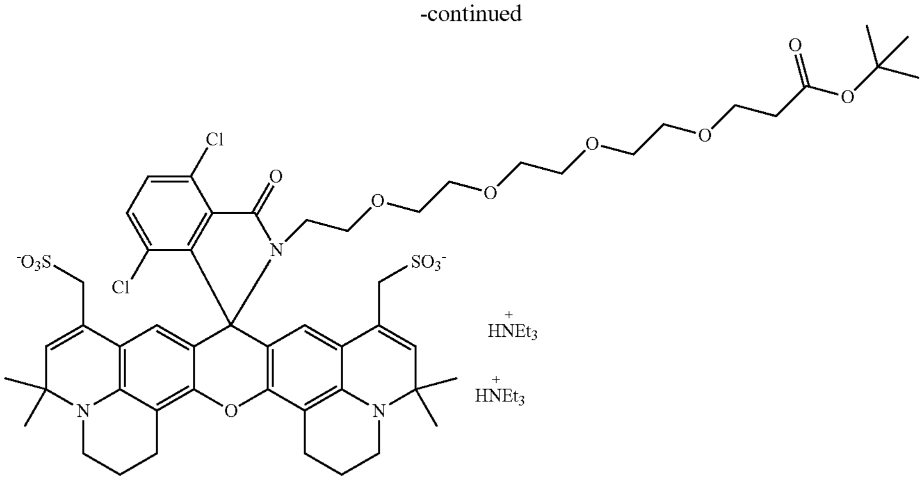
31
2. Synthesis of Compound 32: Compound 32 was prepared from Compound 31 using the procedure described for the synthesis of Compound 16 in step 2 of Example 3.
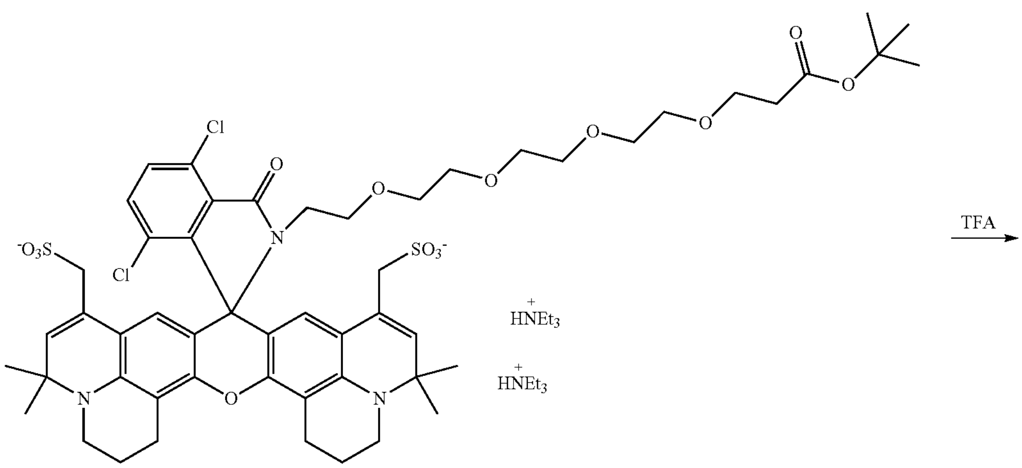
31
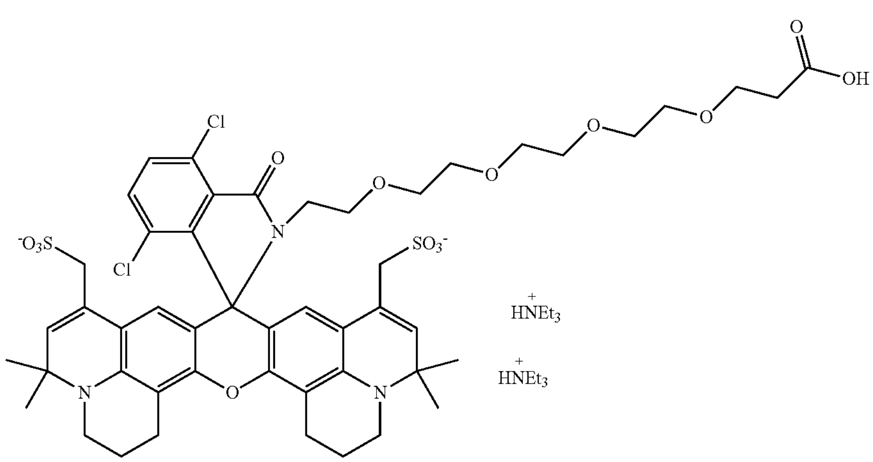
32

3. Synthesis of Compound H: Compound H was prepared from Compound 32 and Compound 13 using the procedure described for the synthesis of Compound B in step 3 of Example 2. UV-Vis (PBS buffer, pH 3.1): λabs=637 nm; λem=652 nm. pKa=5.20.
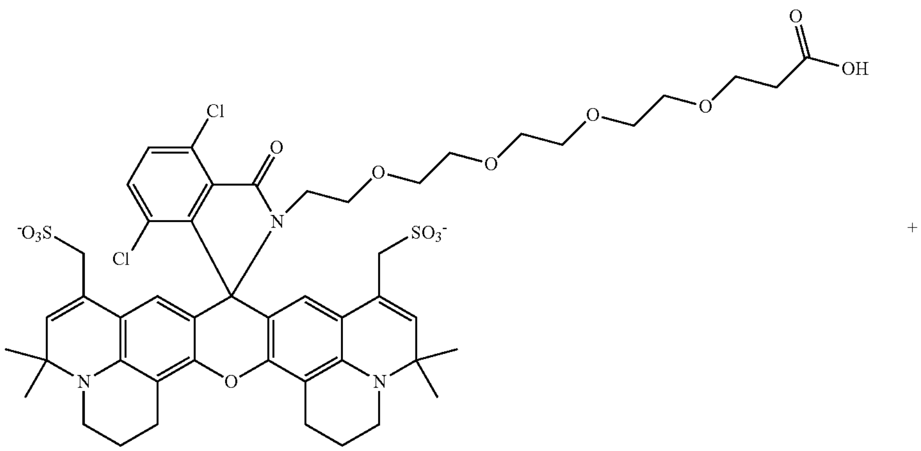
32
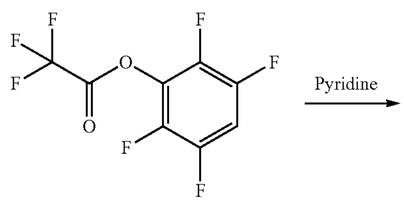
13
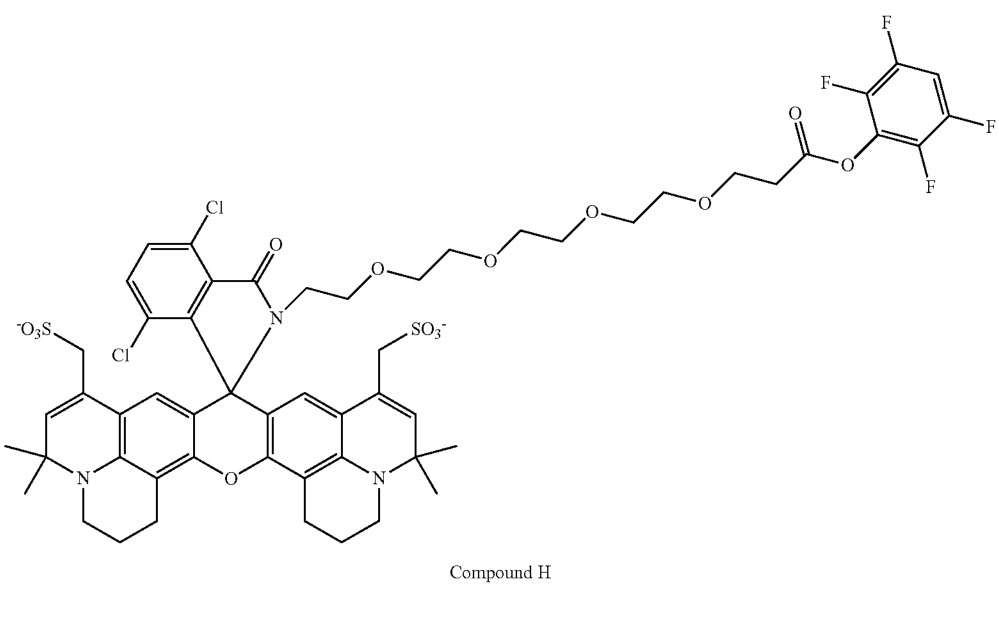
Compound H Example 9. Synthesis of Compound I
Compound I was prepared as shown in Scheme 9 and detailed in the following experimental synthesis workflow. Compound 33 was synthesized using the procedure reported in literature (*Chemistry—A European Journal,* 2018, 24(57), 15329-15335).
Scheme 9
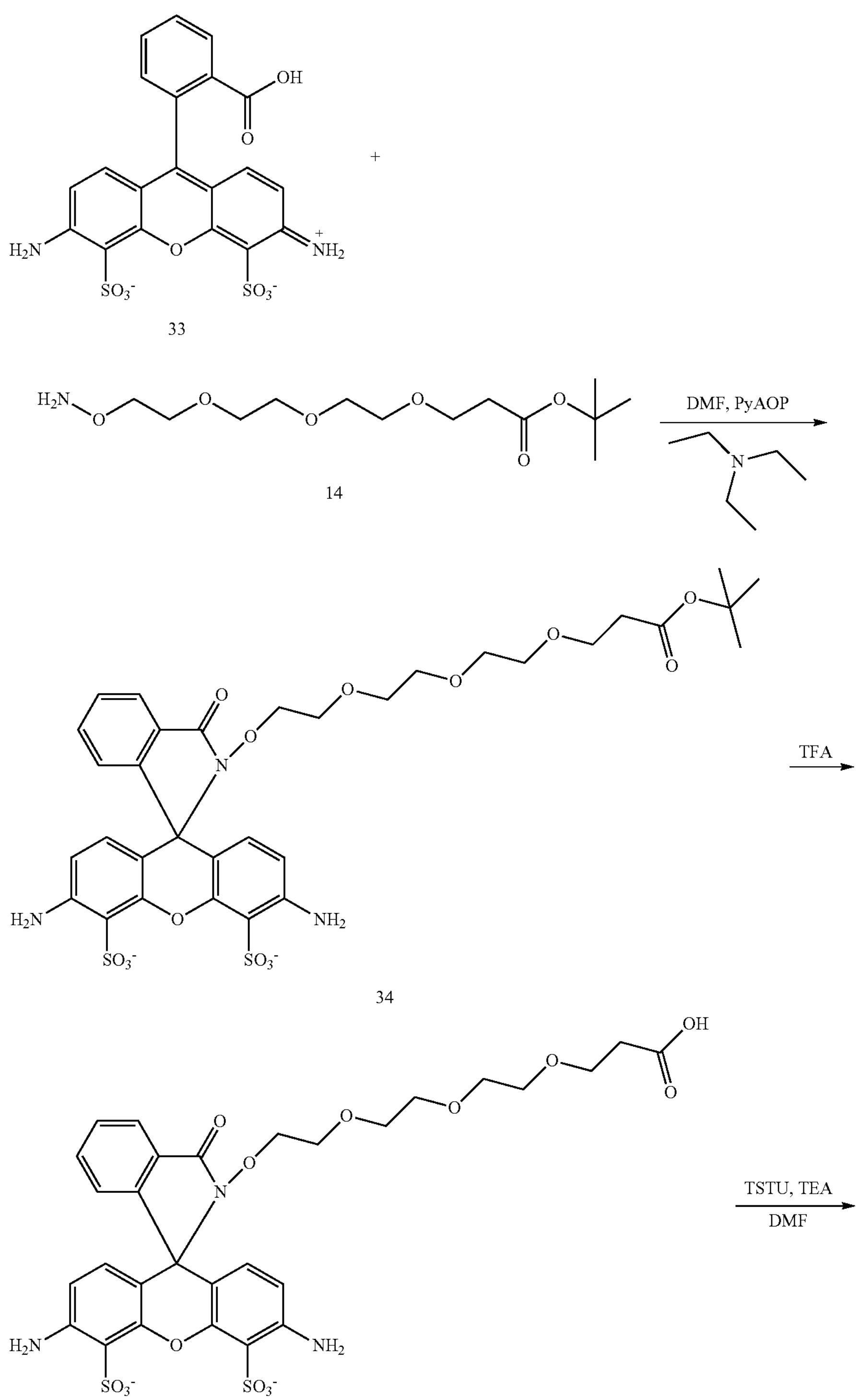
35

-continued
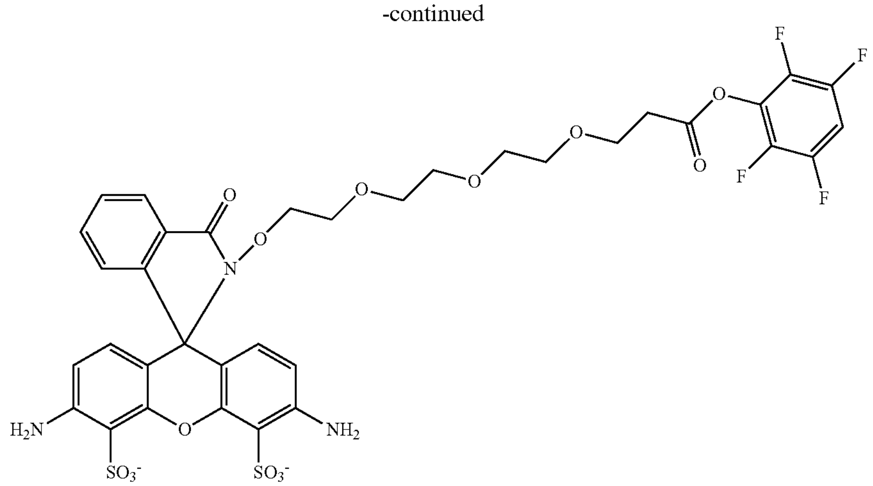
Compound I
1. Synthesis of Compound 34: Compound 34 was prepared from Compound 33 and Compound 14 using the procedure described for the synthesis of Compound 15 in step 1 of Example 3.
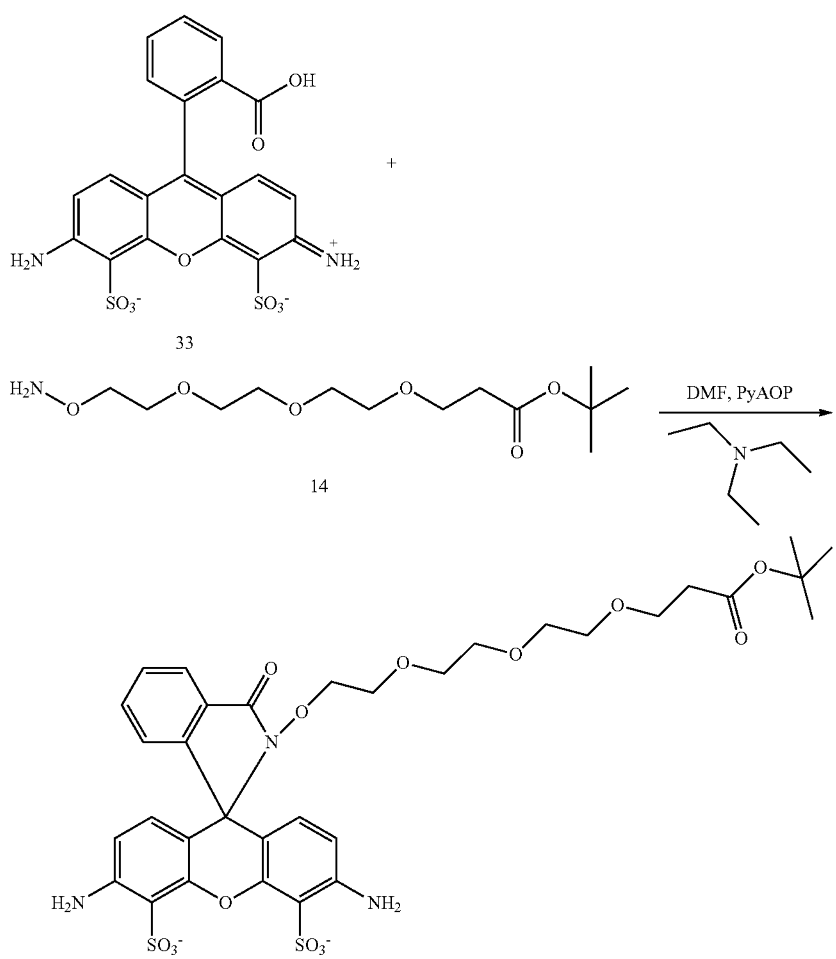
33
14
34

2. Synthesis of Compound 35: Compound 35 was prepared from Compound 34 using the procedure described for the synthesis of Compound 16 in step 2 of Example 3.
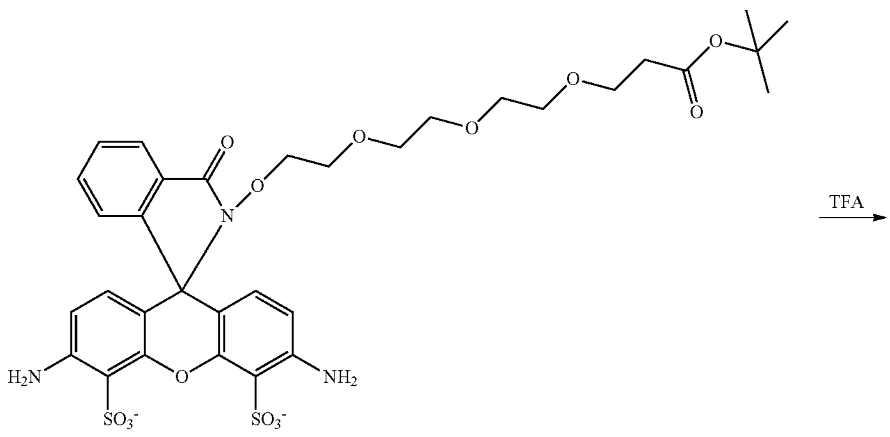
34
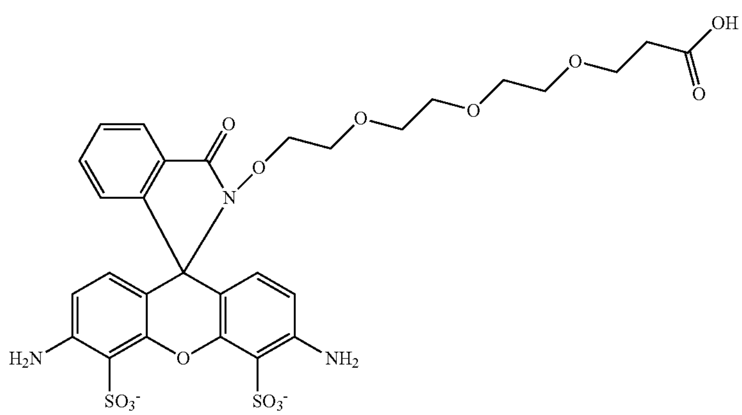
35
3. Synthesis of Compound I: Compound I was prepared from Compound 35 with TSTU using the procedure described for the synthesis of Compound A in step 6 of Example 1.
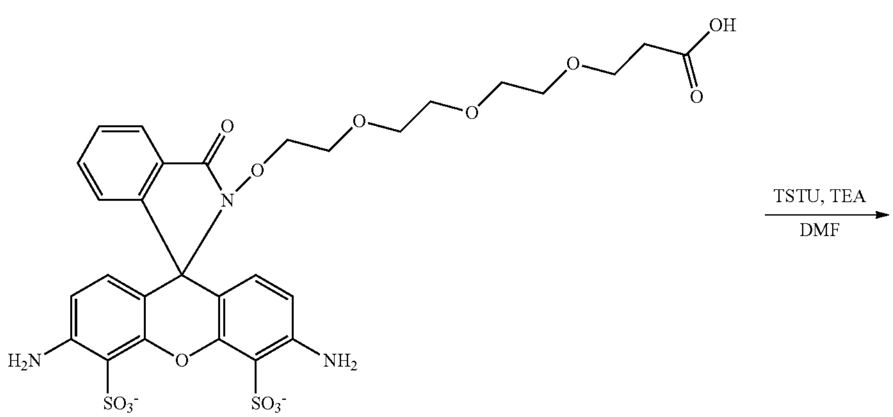
35

-continued
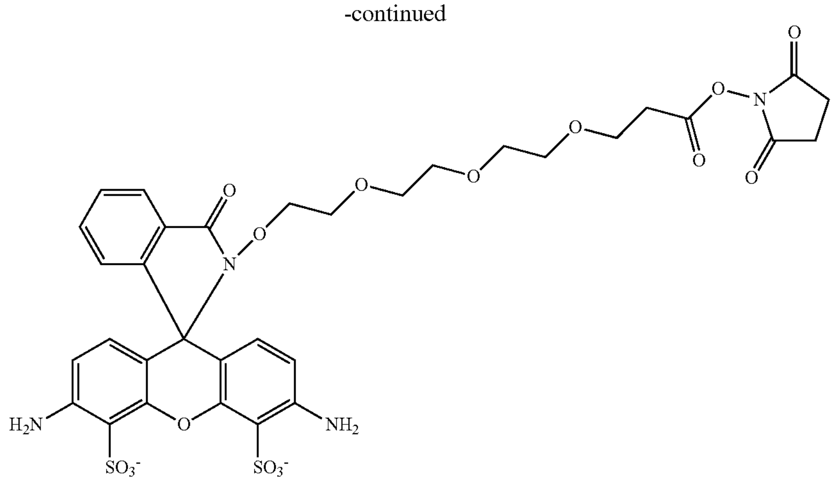
Compound I
Example 10. Synthesis of Compound J
Compound J was prepared as shown in Scheme 10 and detailed in the following experimental synthesis workflow.
Scheme 10
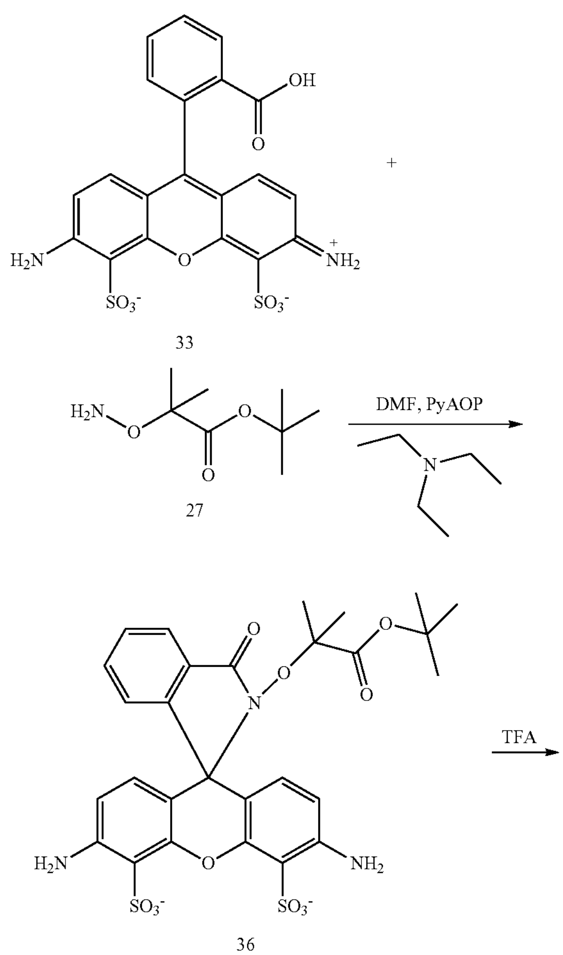
-continued
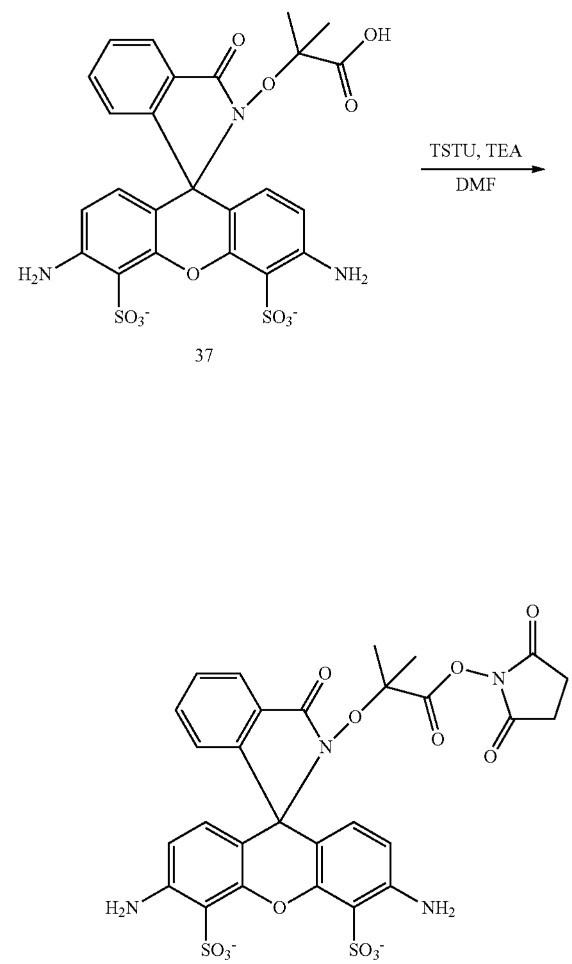
Compound J
1. Synthesis of Compound 36: Compound 36 was prepared from Compound 33 and Compound 27 using the procedure described for the synthesis of Compound 15 in step 1 of Example 3.

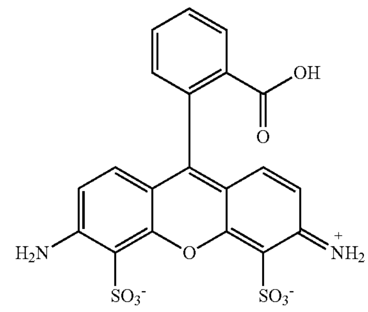

33

+

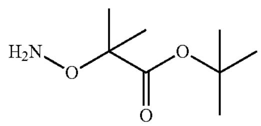

27

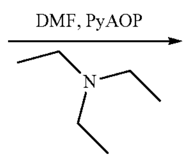

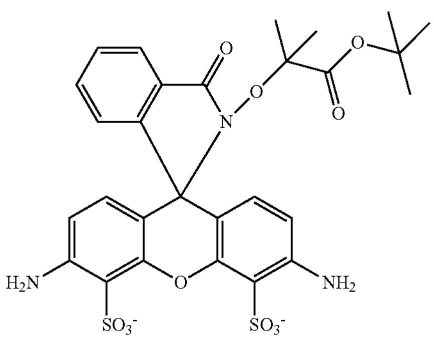

36

2. Synthesis of Compound 37: Compound 37 was prepared from Compound 36 using the procedure described for the synthesis of Compound 16 in step 2 of Example 3.

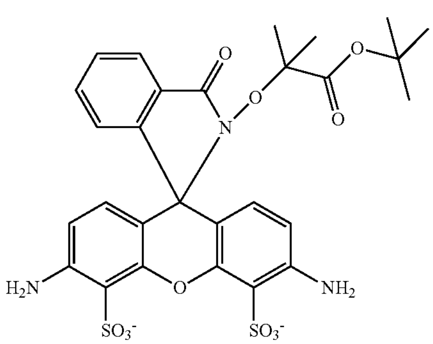

36

-continued

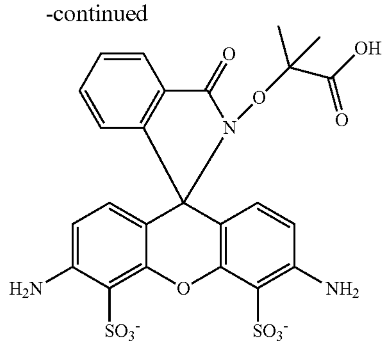

37

3. Synthesis of Compound J: Compound J was prepared from Compound 37 with TSTU using the procedure described for the synthesis of Compound A in step 6 of Example 1.

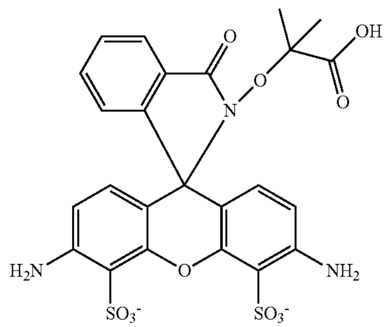

37

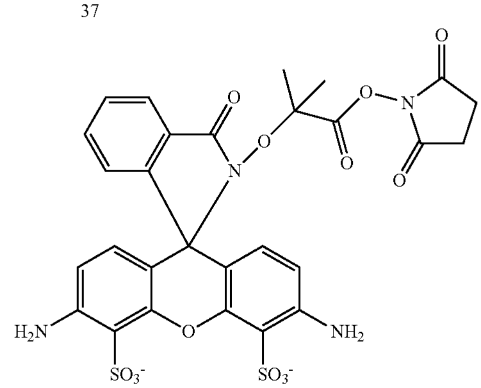

Compound J

Example 11. Compounds for Use in Click Chemistry

Compounds that contained a cyclooctyne reactive group for use in copper-less Click Chemistry were prepared in a similar procedure as the synthesis of Compound 6 described in step 3 of Example 1. The free acid, such as Compound C, (1 equivalent), a DIBO-amine (1.4 equivalents) and PyAOP ((7-Azabenzotriazol-1-yloxy)tripyrrolidinophosphonium hexafluorophosphate) (1.5 equivalents) were dissolved in DMF. To the solution was added triethylamine (TEA) (5 equivalents) under stirring and inert atmosphere. The mixture was stirred until TLC showed the disappearance of the sensor acid (~1.5 hours). The solvent was evaporated with rotary evaporation and the residue was purified by reverse phase column chromatography. Evaporation of the solvent followed by lyophilization resulted in a DIBO-compound, such as Compound C1, as a light blue solid (see Scheme 11). Yield: ~80%.

Scheme 11

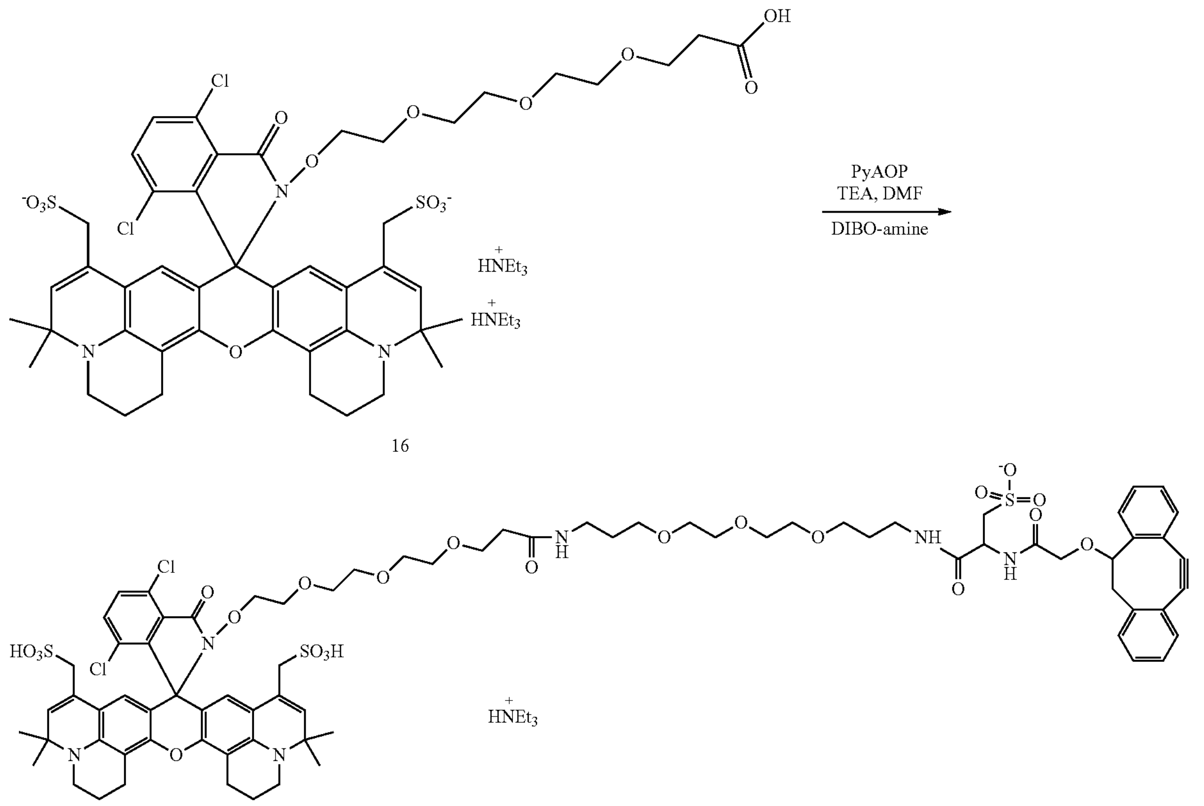

16

Compound C1

Example 12. pH Response Kinetics Study

The kinetics of the ring opening of Compound A, Compound C, and Compound H were studied by measuring absorbance changes at 637 nm (absorption maxima of the ring-opening states) with UV-Vis spectroscopy. Stock solutions of the three dyes were prepared in pH 7.4 phosphate buffer with concentration of 1.8 mM. The dye solutions in pH 7.4 buffer were almost colorless, indicating that the dyes were in ring-closing states. Stock solutions (10 μL) containing the dyes (1.8 mM) in phosphate buffer (pH 7.4) were diluted 300 times with phosphate buffer (pH 3.13) to a final concentration of 6.6 μM at pH 3.13. The absorption changes were recorded at room temperature at 637 nm.

Figure 3:
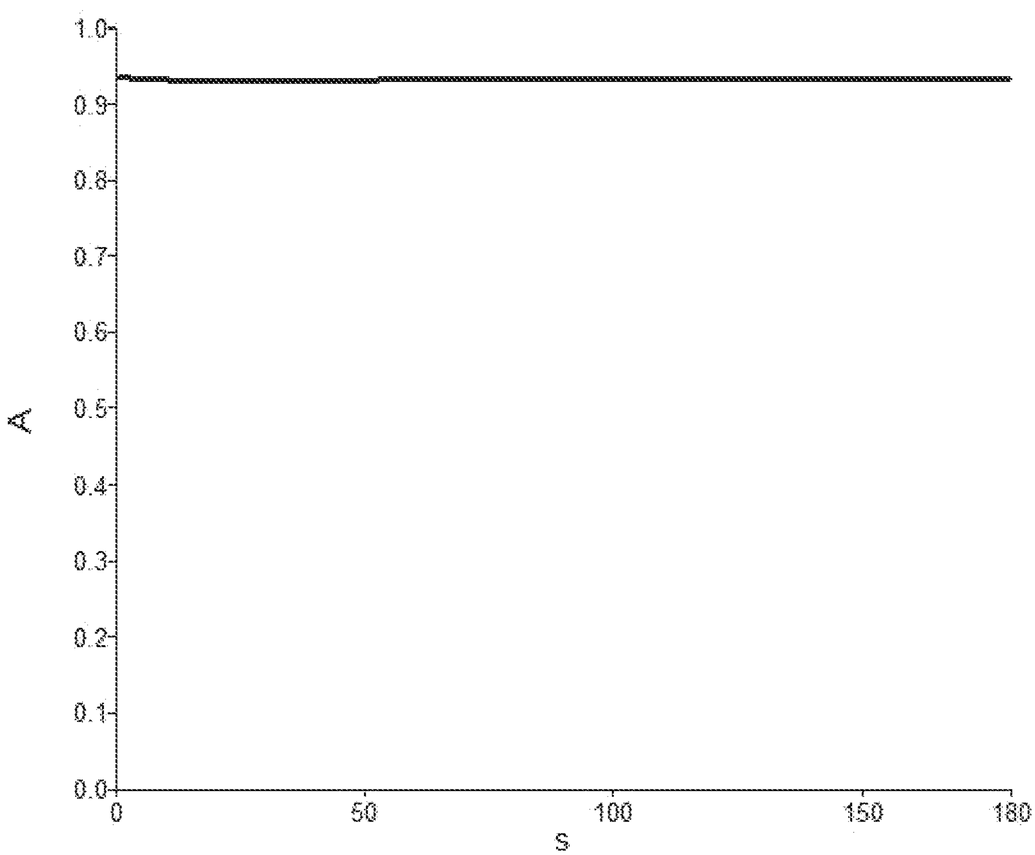
FIG. 3 provides the pH response kinetics of Compound C. A stock solution (10 L) containing Compound C (1.8 mM) in phosphate buffer (pH 7.4) was mixed with 2.99 mL of phosphate buffer (pH 3.13). A=absorption and S=seconds.

Compound C exhibited fast pH response kinetics. As shown in FIG. 3, the color of the solution changed immediately from colorless to blue color when the stock solution (10 μL) containing Compound C (1.8 mM) in phosphate buffer (pH 7.4) was mixed with 2.99 mL of phosphate buffer (pH 3.13). The absorption at 637 nm reached maximum (A=0.93) immediately after mixing the two buffer solutions and kept constant.

Figure 4:
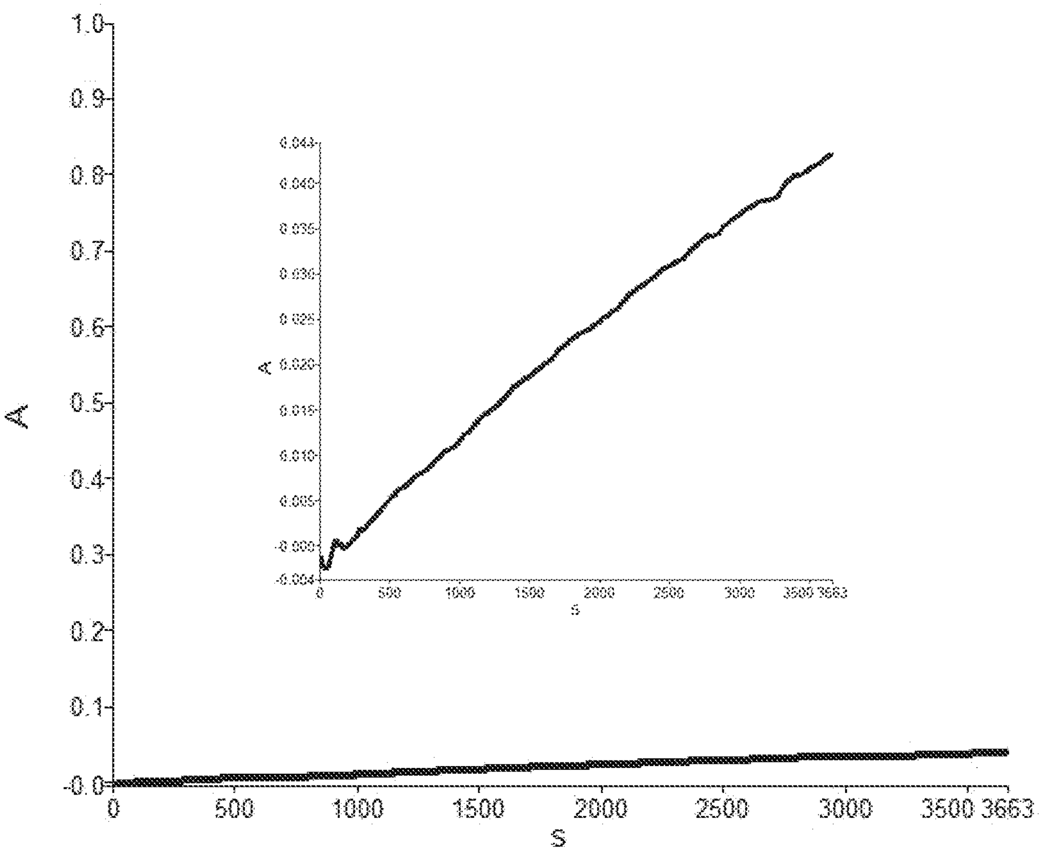
FIG. 4 provides the pH response kinetics of Compound A. A stock solution (10 L) of Compound A (1.8 mM) in phosphate buffer (pH 7.4) was mixed with 2.99 mL of phosphate buffer (pH 3.13). A=absorption and S=seconds. The insert is a kinetic curve with Y-axis range of 0-0.05.

The pH response kinetics for Compound A was slow. As shown in FIG. 4, the solution was colorless when the stock solution (10 μL) of Compound A (1.8 mM) in phosphate buffer (pH 7.4) was mixed with 2.99 mL of phosphate buffer (pH 3.13). The absorption at 637 nm increased very slowly and after 3600 seconds (60 minutes) the absorbance reached 0.05, which was only 5% of the expected maximum value (A=0.93). The color changed to blue slowly. The inset is the kinetic curve with Y-axis range of 0-0.05, which shows the increase trend of the absorption at 637 nm.

Figure 5:
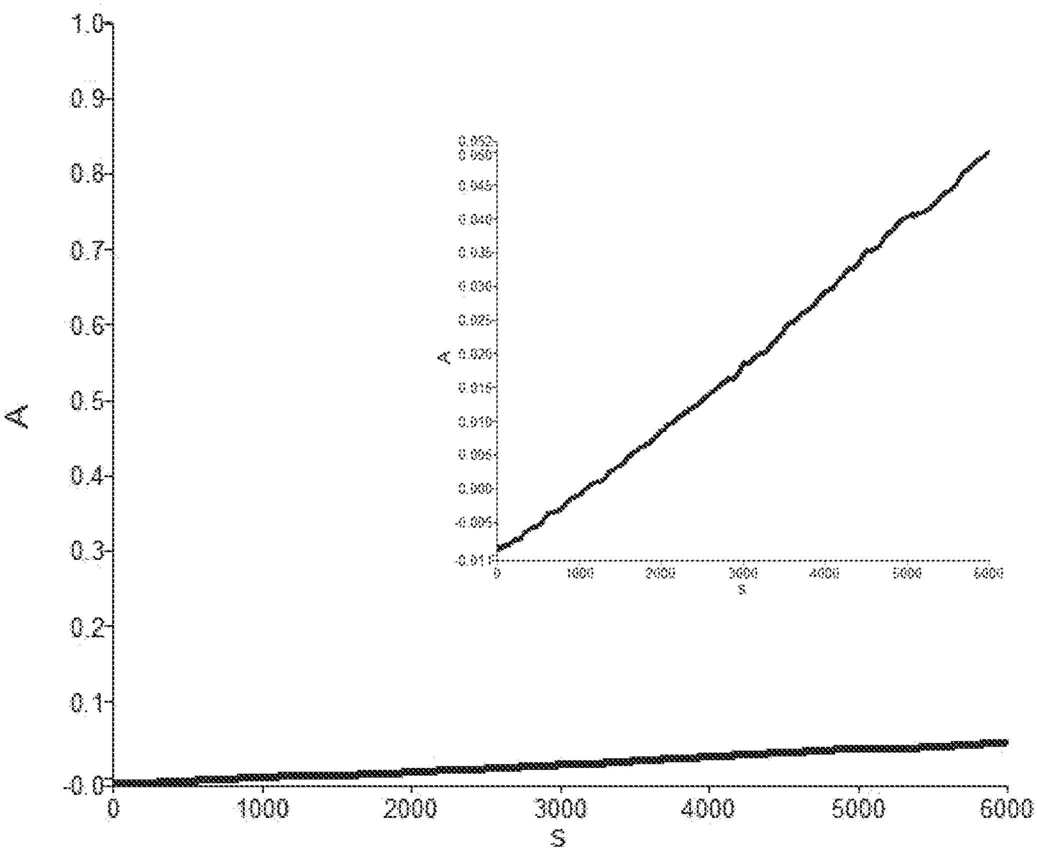
FIG. 5 provides the pH response kinetics of Compound H. A stock solution (10 L) of Compound H (1.8 mM) in phosphate buffer (pH 7.4) was mixed with 2.99 mL of phosphate buffer (pH 3.13). A=absorption and S=seconds. The insert is a kinetic curve with Y-axis range of 0-0.05.

The pH response kinetics for Compound H was also slow. As shown in FIG. 5, the solution was colorless when the stock solution (10 μL) of Compound H (1.8 mM) in phosphate buffer (pH 7.4) was mixed with 2.99 mL of phosphate buffer (pH 3.13). The absorption at 637 nm increased very slowly and after 6000 seconds (100 minutes) the absorbance reached 0.05, which was only 5% of the expected maximum value (A=0.93). The color changed to blue slowly. The inset is the kinetic curve with Y-axis range of 0-0.05, which shows the increase trend of the absorption at 637 nm.

Example 13. pH Profile of Fluorescence Intensity

Figure 6:
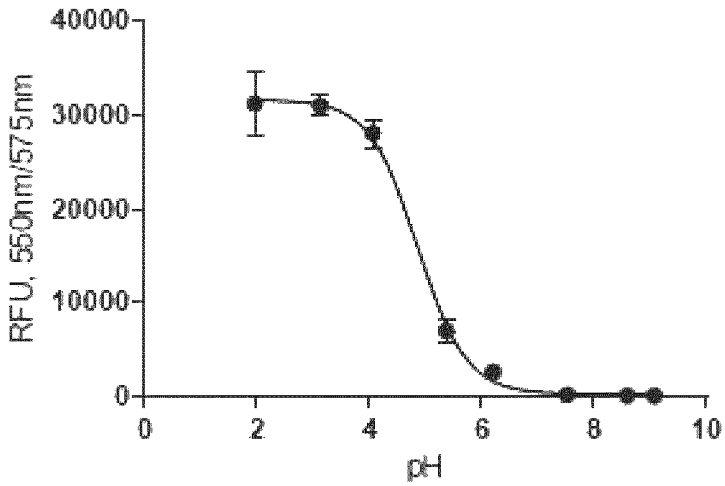
FIG. 6 provides the pH profile of fluorescence intensity of Compound C at room temperature. Fluorescence was measured using 636 nm ex, 654 nm em, with 5 nm bandpass. Solutions were diluted to 5 uM with a series of pH buffers in triplicate in a 96-well clear-bottom black walled plate. Samples were measured on a Tecan Infinite M100 plate reader via top-read. RFU=relative fluorescence units.

FIG. 6 shows the pH profile of fluorescence intensity of Compound C at room temperature. Fluorescence was measured using 636 nm excitation wavelength (ex), 654 nm emission wavelength (em), with 5 nm bandpass filter. Solutions were diluted to 5 uM with a series of pH buffers (see Table 3) in triplicate in a 96-well clear-bottom black walled plate. Samples were measured on a Tecan Infinite M100 plate reader via top-read.

TABLE 3

| List of pH Buffers | |
|---|---|
| pH | Composition |
| 2.0 | HCl/NaCl, 100 mM |
| 3.0 | KHP/HCl, 100 mM |
| 4.0 | KHP/HCl, 100 mM |
| 5.3 | KHP/NaOH, 100 mM |
| 6.1 | $NaH_2PO_4$/NaOH, 100 mM |
| 7.5 | $NaH_2PO_4$/NaOH, 100 mM |
| 8.5 | Tris/Tris-HCl, 100 mM |
| 9.2 | —$Na_2CO_3$/$NaHCO_3$, 100 mM |

Figure 7:
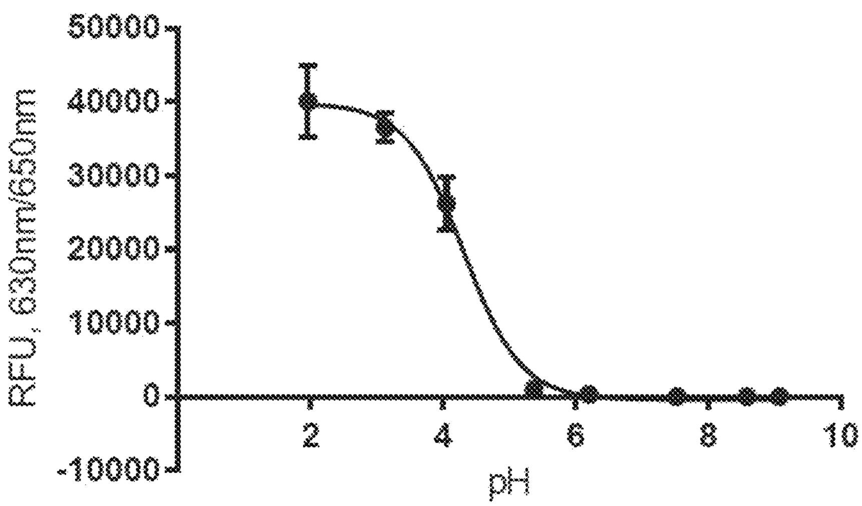
FIG. 7 provides the pH profile of fluorescence intensity of Compound E at room temperature. Fluorescence was measured using 636 nm ex, 654 nm em, with 5 nm bandpass. Solutions were diluted to 5 uM with pH buffers in triplicate in a 96-well clear-bottom black walled plate. Samples were measured on a Tecan Infinite M100 plate reader via top-read. RFU=relative fluorescence units.
Figure 8:
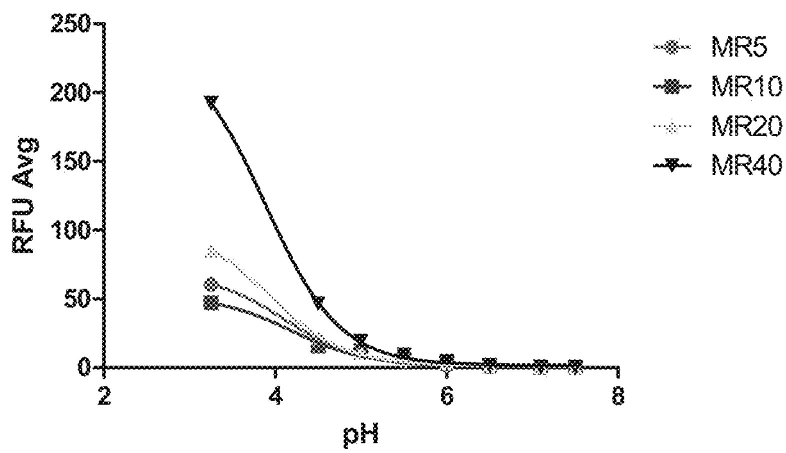
FIG. 8 provides the pKa determination of the conjugate of Compound B and Rabbit IgG at various molar ratios (MR). RFU=relative fluorescence units. Circles=MR5; squares=MR10; triangles=MR20; upside-down triangles=MR40.
Figure 9:
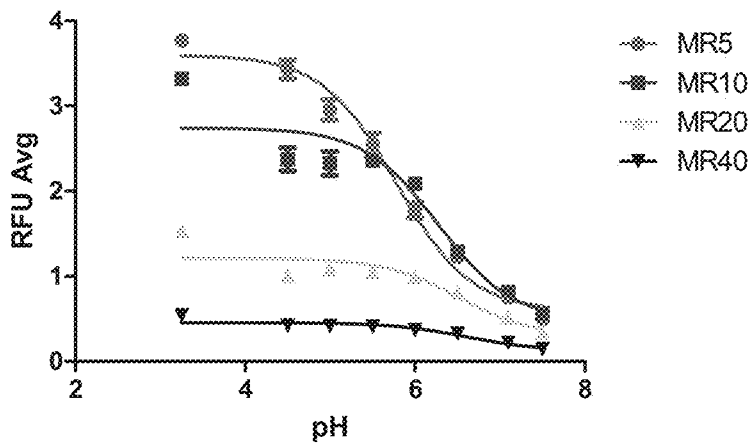
FIG. 9 provides the pKa determination of the conjugate of Compound A and Rabbit IgG at various molar ratios (MR). RFU=relative fluorescence units. Circles=MR5; squares=MR10; triangles=MR20; upside-down triangles=MR40.
Figure 10:
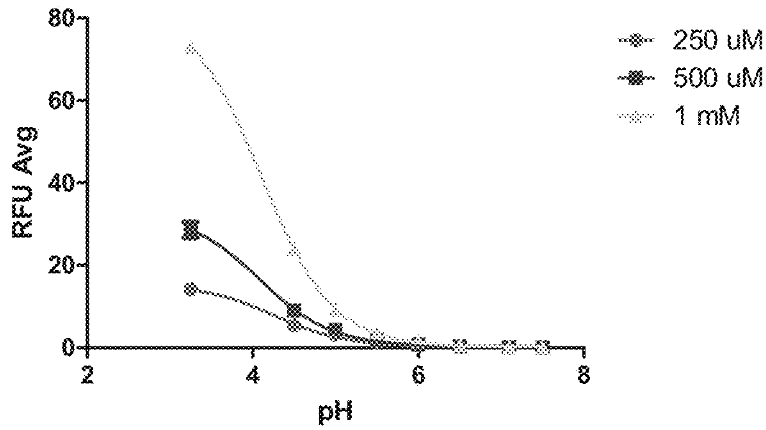
FIG. 10 provides the pKa determination of the conjugate of Compound B and HERCEPTIN (trastuzumab, Genentech, Inc., South San Francisco, CA) at various concentrations (uM). RFU=relative fluorescence units. Circles=250 uM; squares=500 uM; triangles=1 mM.
Figure 11:
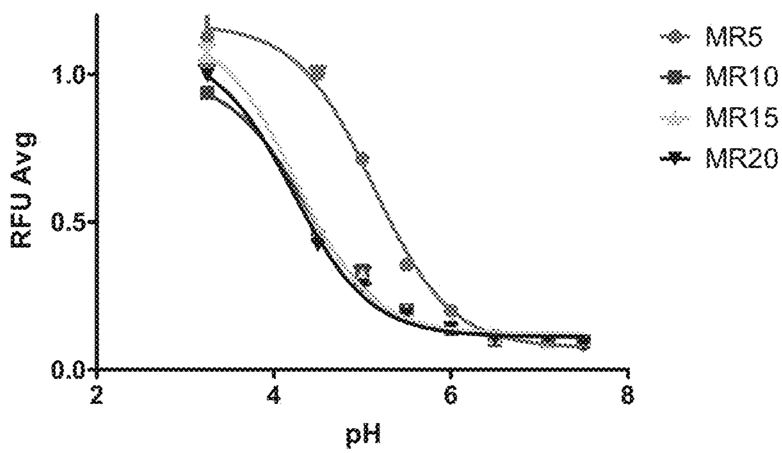
FIG. 11 provides the pKa determination of the conjugate of Compound E and HERCEPTIN at various molar ratios (MR). RFU=relative fluorescence units. Circles=MR5; squares=MR10; triangles=MR15; upside-down triangles=MR20.
Figure 12:
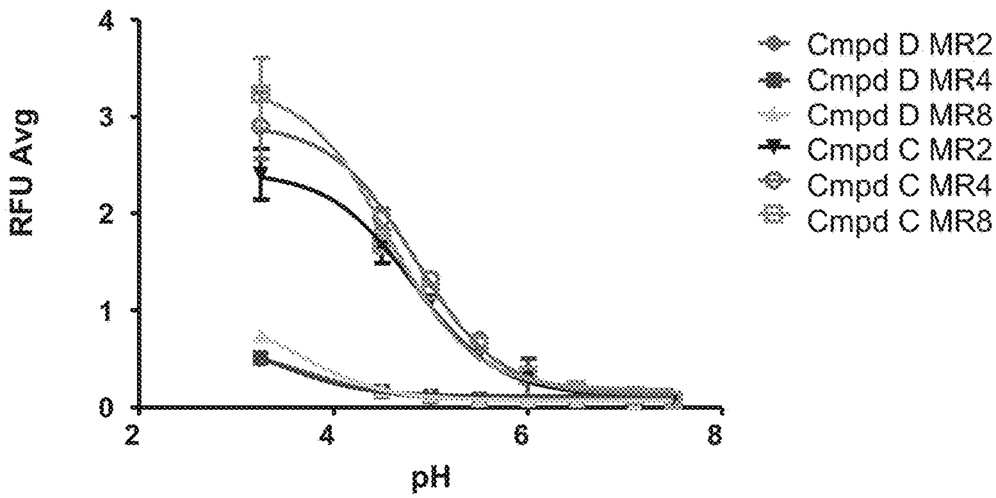
FIG. 12 provides the pKa determination of the conjugate of Compound C and HERCEPTIN and the conjugate of Compound D and HERCEPTIN at various molar ratios (MR). RFU=relative fluorescence units. Filled circles=Compound D at MR2; filled squares=Compound D at MR4; filled triangles=Compound D at MR8; upside-down filled triangles=Compound C at MR2; unfilled circles=Compound C at MR4; and unfilled squares=Compound C at MR8.
Figure 13:
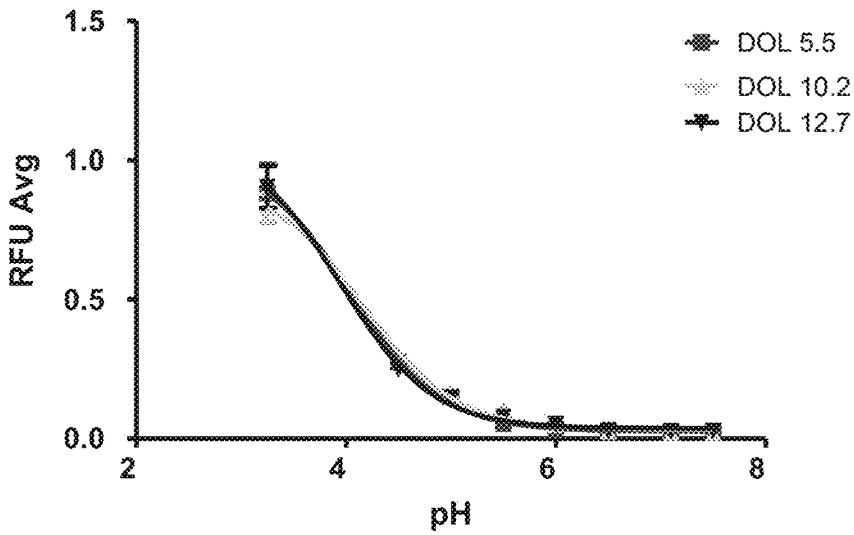
FIG. 13 provides the pKa determination of the conjugate of Compound B and HERCEPTIN at varying DOL (degree of labeling). RFU=relative fluorescence units. Squares=DOL 5.5; triangles=DOL 10.2; upside-down triangles=DOL 12.7.
Figure 14:
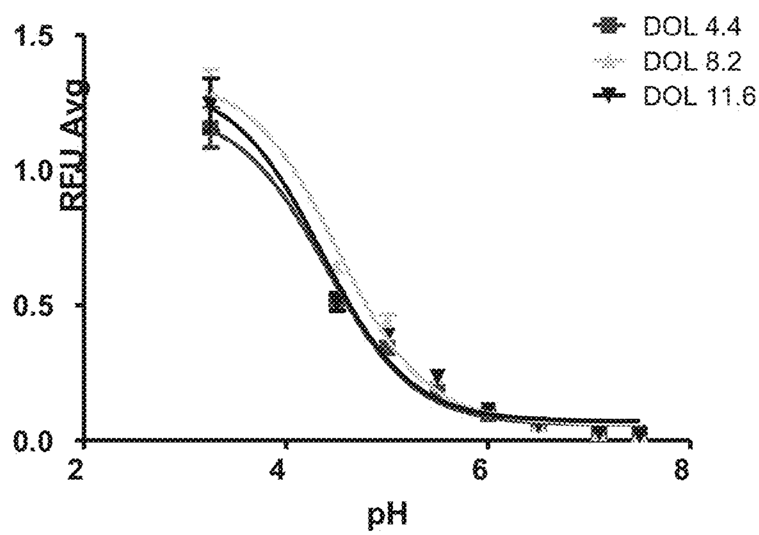
FIG. 14 provides the pKa determination of the conjugate of Compound C and HERCEPTIN at varying DOL (degree of labeling). RFU=relative fluorescence units. Squares=DOL 4.4; triangles=DOL 8.2; upside-down triangles=DOL 11.6.

FIG. 7 shows the pH profile of fluorescence intensity of Compound E at room temperature. Fluorescence was measured using 636 nm ex, 654 nm em, with 5 nm bandpass. Solutions were diluted to 5 uM with pH buffers in triplicate in a 96-well clear-bottom black walled plate. Samples were measured on a Tecan Infinite M100 plate reader via top-read.

Example 14: General Protocol for Mammalian and Bacterial Cell Labeling with Compounds Provided Herein Jurkat suspension cells or adherent cells were grown as normal in desired media and treatment conditions. Regular split and feed protocols were used to keep cells healthy and viable, avoiding overgrowth. Aseptic conditions were used to prevent microbial contamination. The labeling and wash buffer were warmed to room temperature. Approximately 15 mL of buffer per labeling reaction were used. In advance of adding cells, 1 mL of compound solution (containing $1\times10^6$ cells) were warmed to room temperature. Approximately 5 mL of complete cell culture media per labeling reaction was cooled to 4° C. in a clean vial.

Working in an aseptic cell culture hood, began with an appropriate volume of cells suspended in growth medium to contain 1.5 to 2 million cells in 5 mL, between 300,000 and 400,000 cells per mL. Transferred 5 mL of cell suspension into a sterile 15 mL conical vial and centrifuge 400×g for 5 minutes. Carefully aspirated growth medium from the cells. Screwed the cap onto the vial and tapped several times to loosen the pellet. Added 10 mL complete cell labeling and wash buffer and gently resuspended cells to monodispersion. Ensured that cells were completely dispersed by mixing several times by inversion. Centrifuged at 400×g for 5 minutes. Carefully aspirated buffer from the cells. Screwed the cap onto the vial and tapped several times to loosen the pellet. Added 1 mL complete cell labeling and wash buffer. Ensured that cells were completely dispersed. Took a cell count and determined the cell density.

Using a COUNTESS Automated Cell Counter (Thermo Fisher Scientific, Waltham, MA), removed 10 uL cell suspension and mixed with 10 uL trypan blue. Transferred 10 uL onto a cell counting slide and determined the cell density and total number of cells in the vial. There should be 1-2 million cells per mL. After calculating the number of cells, removed a volume containing 1 million cells and diluted the suspension to a final density of $1\times10^6$ total cells per mL with labeling and wash buffer. Only used enough buffer and cell suspension to prepare 1 mL of cells at $1\times10^6$ per mL for each labeling reaction.

Next, prepared the cell labeling reaction. Warmed the vial of 1 the compound before the labeling reaction and transferred into the cell culture hood. Transferred the 1 mL cell suspension containing one million cells into the vial of compound and capped tightly. Mixed the reaction gently by inversion until the small pellet of dye compound at the bottom of the vial was dissolved and no longer visible. Incubated two hours at room temperature, protected from light.

Some cell types may rapidly internalize surface reacted dye and activate the within acidic endosomes, which can contribute to background. For best results, labeled at room temperature or cooler on a rocking or nutating platform to prevent an endocytic signal from labeled cells.

Ideal labeling times may vary between 45 and 180 minutes at temperatures between 4° C. and 37° C., depending on the desired application.

After the labeling reaction, transferred the cell suspension to a conical tube. Added 1 mL cold growth medium to the labeling vial and rinsed briefly to recover all the cells. Transferred the culture medium rinse into the conical tube with cell suspension. Serum in the culture medium will help to scavenge unreacted compound but is not necessary if the cells are cultured in serum free conditions. Centrifuged the cells at 400×g for two minutes and carefully aspirated the supernatant. Leaving the pellet intact, capped the vial and flicked several times to loosen the pellet. Added 2 mL cold cell culture medium and resuspended the cells by gently mixing, avoiding trituration if possible. Centrifuged the cells at 400×g for two minutes and carefully aspirated the supernatant.

Resuspended the labeled, washed cells in 500 uL cold cell culture medium. Took a cell count and determined the cell density. Using a COUNTESS Automated Cell Counter (Thermo Fisher Scientific, Waltham, MA), removed 10 uL cell suspension and mixed with 10 uL trypan blue. Transferred 10 uL onto a cell counting slide and proceeded with cell count. Resuspended cells to final density per mL in complete media for desired application. Cell densities were typically 100,000-500,000 cells per mL for downstream phagocytosis assays.

Example 15: General Protocol for Antibody Labeling with a Compound Provided Herein Added 1 mL water to the bicarbonate buffer vial and set aside. This was a 10× stock solution. The kit will only require 3×10 uL of bicarbonate buffer. Froze unused portion in bulk for future labeling reactions and discarded unused portion after. Prepared the antibody to be labeled in supplied buffer or a pH neutral buffer at 1.1 mg/mL.

Procedure for reactive ester form of compound: Set up the labeling reaction: Added to vial containing the compound in order: 1) 90 uL of 1.1 mg/mL antibody in supplied protein-free buffer or desired protein-free pH neutral buffer; 2) 10 uL 10× Bicarbonate. Mixed well to ensure complete dissolution of the compound and antibody. If any liquid splashed up the side of the container, spun briefly to return the entire reaction volume to the bottom. Set aside on benchtop for two hours.

Procedure for DIBO form of compound: Prepared an azide-modified antibody with materials and as described in SITECLICK Antibody Azido Modification Kit (Thermo Fisher Scientific, Waltham. MA). Prepared 225 uL of antibody at 1.1 mg/ml in buffer or a pH neutral buffer. Added 25 uL of the azide modified antibody to the vial containing the DIBO form of the compound. Mixed well to ensure complete dissolution of the compound and antibody. If any liquid splashed up the side of the container, spun briefly to return the entire reaction volume to the bottom. Set aside on benchtop overnight.

Pack and equilibrate the purification column: Used supplied columns that are single use, pre-cast antibody purification columns designed to separate free compound from IgG. Ten minutes before the end of the 2-hour incubation, loosened the cap on a spin column, twisted the tab off of the bottom of the column, and placed into a wash vial. Washed vials have no cap. Spun 2 minutes at 1000×g to pack the column. Removed the column, poured the liquid from the wash vial and set the column back into the wash vial. Added 500 uL of supplied (or desired) buffer to equilibrate the column. Spun 2 minutes at 1,000×g to equilibrate the column. Transferred the packed and equilibrated column into a fresh collection vial. Collection vials had caps. Carefully dripped the entire 100 uL reaction mixture onto the column. Quickly transferred the column back to the microcentrifuge and spudn 2 minutes at 1,000×g. Remove and discarded the used column and made note of the volume collected. Set aside 10 uL for protein yield determination with the PIERCE Coomassie Plus (Bradford) Assay Kit (Thermo Fisher Scientific, Waltham, MA). Calculated mg/mL protein from the sample and indexed this result to the volume of recovered sample and determined mg of protein recovered for percent yield.

Example 16. Antibody Labeling

To prepare the antibody-labeled conjugates, Compounds A-E (250 ug) were mixed with 100 uL Reaction volume. Protein-free and otherwise pure preparations of antibodies: Rabbit immunoglobulin ("IgG") (Thermo Fisher Scientific, Waltham, MA) or HERCEPTIN (trastuzumab) (Roche Diagnostics, South San Francisco, CA) were prepared at 2.5 mg/mL in PBS (pH 7.2). Sodium bicarbonate 1:10 (100 mM) from 1M was freshly prepared. A guard band (i.e., a range of input dye MR's to find appropriate MR's for the reaction) of labeling concentrations in varying molar ratio (MR=ratio of moles of conjugate to 1 mole of antibody) were prepared at 10× in DMSO. The conjugate was spiked in 1:10 and mixed well for 2 hours at room temperature. The final solution was then spun through a P30 packed column and the antibody-labeled conjugate was recovered.

Example 17. Determining Degree of Labeling

The samples were prepared either with denaturing or non-denaturing conditions. Compound B-HERCEPTIN conjugate and Compound D-HERCEPTIN conjugate were denatured. Compound E-HERCEPTIN conjugate and Compound C-HERCEPTIN conjugate showed no difference in quantitation between denaturing and non-denaturing conditions.

Denaturing conditions: After purification, an aliquot of the relevant antibody-compound conjugates was diluted 1:2 or 1:1 with pH 2.2 6M Guanidinium buffer and allowed to stand for 10 minutes after mixing. This was then diluted 10× with a buffer composed of a 1:2 mixture of PBS pH 7.4 and pH 2.2 6M Guanidine buffer, to a final volume of 600 μL.

Non-denaturing conditions: After purification, an aliquot of the relevant antibody-compound conjugates was diluted 1:2 or 1:1 with pH 2.0 0.1M HCl/NaCl buffer and allowed to stand for 10 minutes after mixing. This was then diluted 10× with pH 2.0 0.1M HCl/NaCl buffer, to a final volume of 600 μL.

Measurement and analysis: The free acid form of the compound was measured separately via UV/Vis spectrophotometry to determine the contribution of the compound to the absorbance at 280 nm as a ratio to the maximum absorbance peak of the compound, the correction factor (CF), as well as the extinction coefficient ($\varepsilon_{dye}$) of the dye at its maximum absorbance wavelength under the measurement conditions:

$$CF = \frac{A_{280\,nm}}{A_{max}}$$

The final diluted solution of the compound-antibody conjugate was then measured via UV/Vis spectrophotometry, and DOL was calculated through application of the CF, $\varepsilon_{Ab}$ and $\varepsilon_{dye}$ using the following relations:

$$\text{Antibody concentration } (M) = \frac{A_{280} - (A_{max} \times CF)}{\varepsilon_{Ab}} \times \text{dilution factor}$$

$$\text{Moles of dye per mole antibody } (DoL) = \frac{A_{max} \text{ of labeled antibody}}{\varepsilon_{dye} \times \text{Antibody concentration}} \times \text{dilution factor}$$

Example 18. pKa Determinations of Antibody-Labeled Conjugates

The pKa of the antibody-compound conjugates was determined by diluting the antibody-labeled conjugate in water (1:5). The sample was then diluted (1:10) into pH standards in a microplate format. Using a conventional plate reader, a fluorescence signal was scanned across 3 experimental replicates at the indicated pH in 100 uL final volume. The data points were exported and fitted to log scale proton concentration vs Relative Fluorescence Units (RFU) on the Y axis. FIGS. 8-14 show the results of pKa determination of various Compound-antibody conjugates: Compound A conjugate had a pKa of 5.2; Compound B conjugate had a pKa of 3.7; Compound C conjugate had a pKa of 4.87; Compound D conjugate had a pKa of 4.3; Compound E conjugate had a pKa of 4.67; Compound F conjugate had a pKa of 5.5; Compound G conjugate had a pKa of 6.5; and Compound H conjugate had a pKa of 5.2. These results demonstrated that the pKa of the conjugates did not change meaningfully upon conjugation, that different MR's did not significantly change the pKa for a single conjugate, and that compound-conjugate concentration effects did not change the measured pKa (see FIGS. 6-14).

Example 19. Antibody-Labeled Conjugate Uptake

General method: SKBR3 cells were plated at 5,000 cells per well in a 96 well plate 48 hours before the experiment and washed once with fresh culture medium on the day of experiment. Any pretreatments to cells in the form of unlabeled HERCEPTIN or control in equal mg/mL BSA were made at the time of this media change. After antibody labeling and purification of the conjugate as discussed above, the conjugate was diluted 1:100 into cells with fresh culture medium and any pretreatments overnight in the cell culture incubator. IgG-Conjugate concentrations in the internalization assay were typically 20-100 ng/mL. After overnight incubation, the samples were stained with Hoechst nuclear dye added from a 10× stock for 30 minutes at 37° C. to facilitate image registry and segmentation in subsequent visualization and quantification. Following removal of the spent media containing the conjugate and nuclear dye, the cells were washed once in the desired physiological buffer or complete medium for imaging.

For data acquisition and quantification of binding and internalization of labeled antibody conjugates, the cells were segmented for High Content Analysis ("HCA") using nuclear images collected in the Hoechst/DAPI channel on the CELLINSIGHT CX 5 High Content Analyzer (Thermo Fisher Scientific, Waltham, MA) to register individual cells. Then the software collected corresponding imagery in the Cy5 channel and localized it to puncta, defined with an onboard spot counting algorithm in CELLINSIGHT using defined thresholds of detection at 30% of maximum positive signal. The plots showed competitive inhibition of identified spots per cell when the cells are pretreated with an excess level of unlabeled HERCEPTIN across a wide range.

Figure 15A:
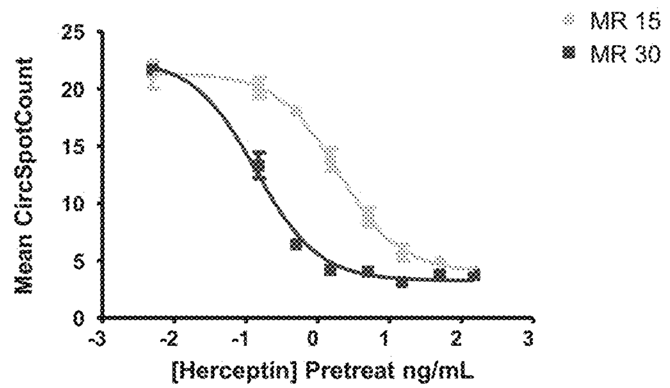
FIG. 15A provides the High Content Analysis (HCA) of the uptake of the conjugate of Compound B and HERCEPTIN at different MR using the Cy5 channel. Circles=MR15; squares=MR30.
Figure 15B:
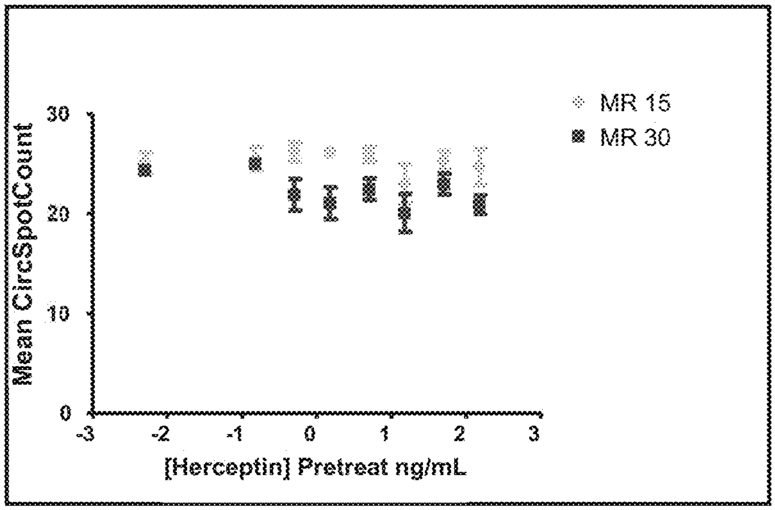
FIG. 15B provides the HCA analysis of the uptake of the conjugate of Compound B and HERCEPTIN at different MR using LYSOTRACKER Red staining. Circles=MR15; squares=MR30.
Figure 16:
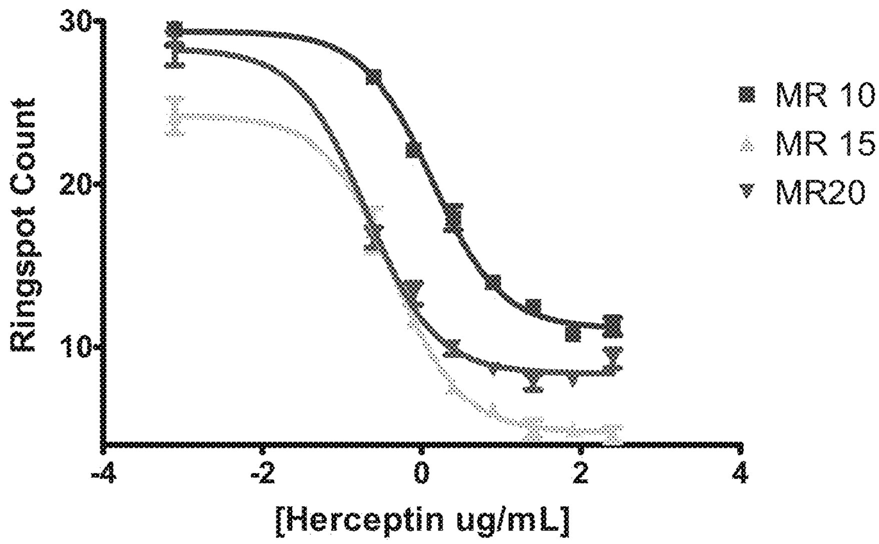
FIG. 16 provides the HCA analysis of the uptake of the conjugate of Compound B and HERCEPTIN at different MR with matched probe concentrations (e.g., the same final concentration of the conjugates was used across different MR). Squares=MR10; triangles=MR15; upside-down triangles=MR20.

Compound B-HERCEPTIN Conjugate: A dose-competition study was conducted on SKBR3 cells using MR15 and MR30 Compound B-HERCEPTIN Conjugate. HER-2+ cells were pretreated with a titration of unlabeled HERCEPTIN to occlude binding of label. A probe with MR15 and MR30 Compound B-HERCEPTIN Conjugates was prepared and incubated overnight. The cells were stained with Hoechst and LYSOTRACKER Red DND-99 (Thermo Fisher Scientific, Waltham, MA). The results were quantified with SpotCount on the CELLINSIGHT CX5. The results are shown in FIGS. 15A and 15B. The results show a clear dose-dependent occlusion of labeled HERCEPTIN uptake (probe is specific). The results of MR10, MR15 and MR20 Compound B-HERCEPTIN Conjugates specific uptake with matched probe concentrations are shown in FIG. 16. These results demonstrate that uptake of Compound B-HERCEPTIN conjugates decreased with increasing concentrations of unconjugated HERCEPTIN, thereby confirming that the conjugate is being internalized into the cell by the same pathway as the unconjugated HERCEPTIN.

Figure 17:
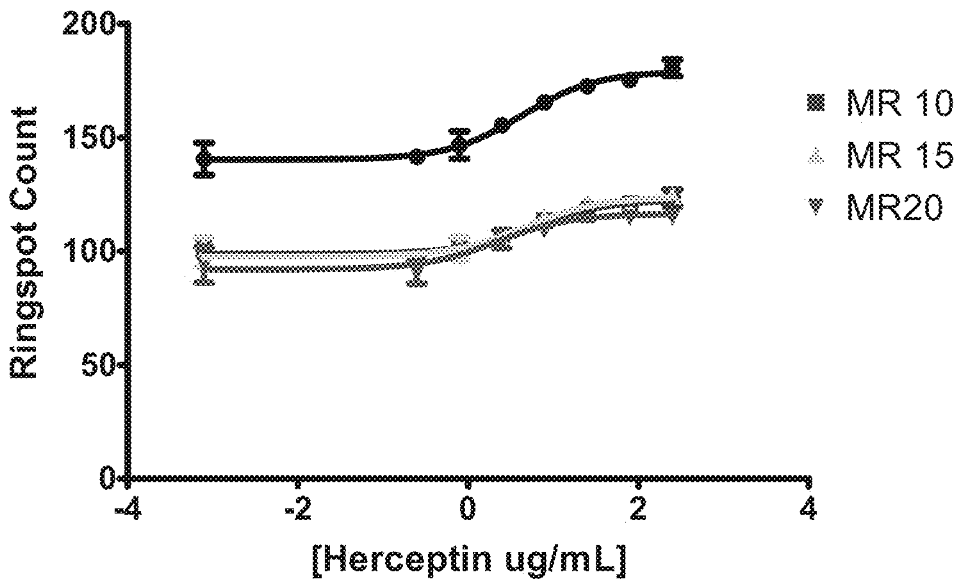
FIG. 17 provides the HCA analysis of the uptake of the conjugate of Compound E and HERCEPTIN at different MR. Squares=MR10; triangles=MR15; upside-down triangles=MR20.

Compound E-HERCEPTIN Conjugate: A dose-competition study was conducted on SKBR3 cells using MR10, MR15 and MR20 Compound E-HERCEPTIN Conjugates. The cells were pretreated with 250 ug/mL unlabeled HERCEPTIN and then treated overnight with 20 nM MR10, MR15, and MR20 Compound E-HERCEPTIN Conjugates. The results were quantified with SpotCount on CELLINSIGHT CX5. The results are shown in FIG. 17.

Figure 18:
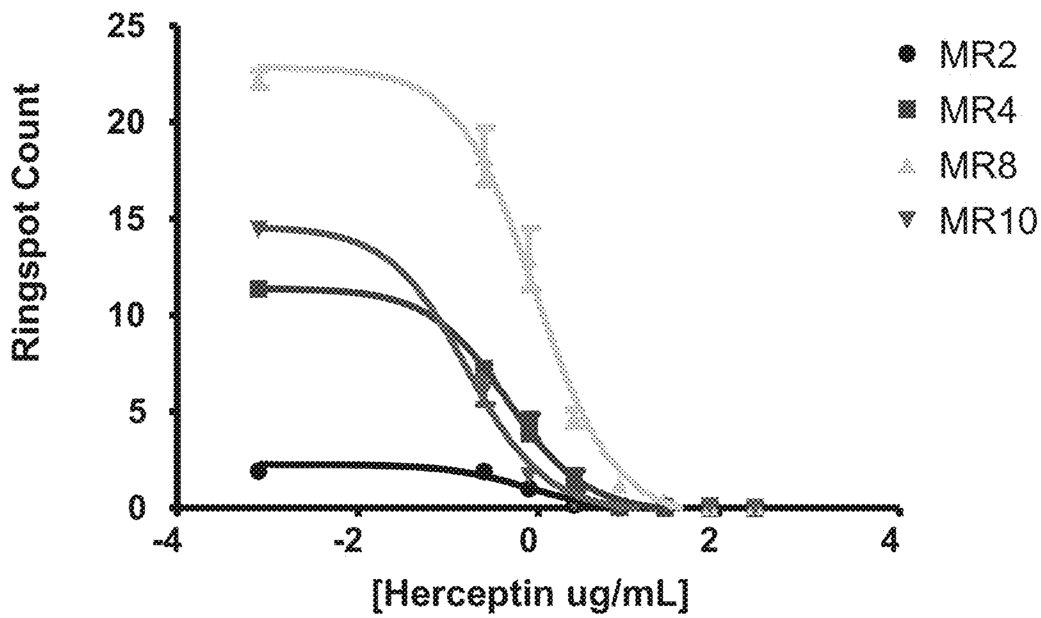
FIG. 18 provides the HCA analysis of the uptake of the conjugate of Compound C and HERCEPTIN and the conjugate of Compound B and HERCEPTIN at different MR. Circles=Compound C at MR2; squares=Compound C at MR4; triangles=Compound C at MR8; upside-down triangles=Compound B at MR10.

Compound B-HERCEPTIN and Compound C-HERCEPTIN Conjugates: The results of a HERCEPTIN uptake study on Compound B-HERCEPTIN and Compound C-HERCEPTIN Conjugates are shown in FIG. 18.

Figure 19:
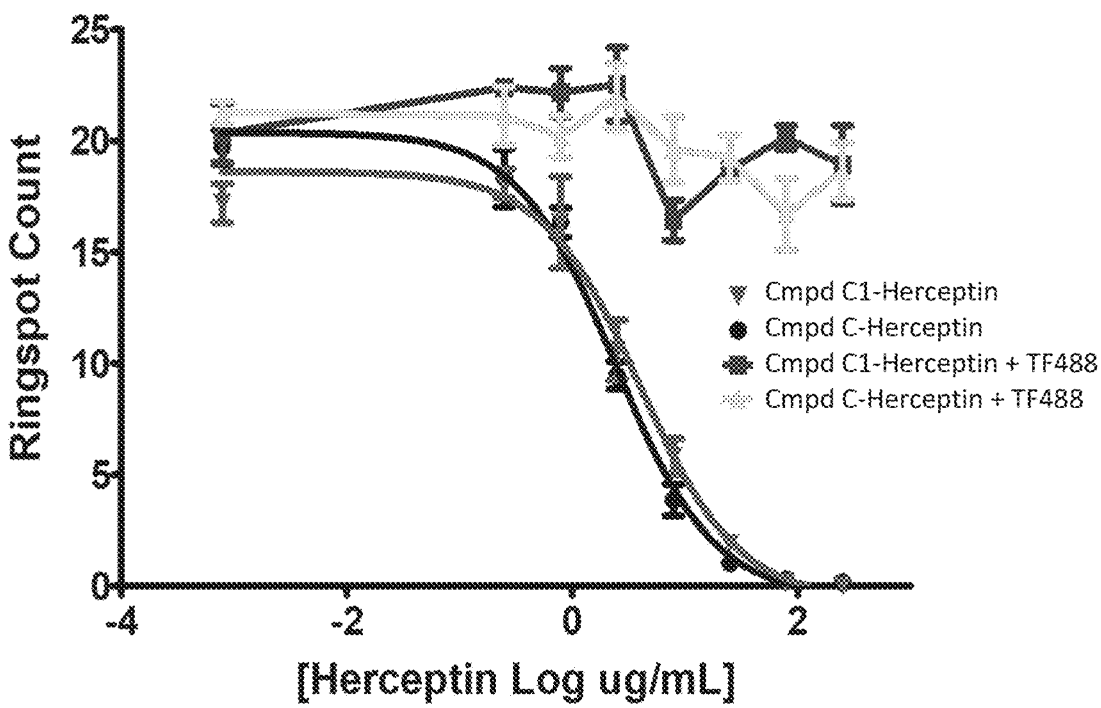
FIG. 19 provides the HCA analysis of a competitive inhibition assay of HERCEPTIN antibodies conjugated to either a dibenzocyclooctyne (DIBO) reactive form of a compound of the present disclosure, Compound C1, or a trifluorophenyl (TFP) reactive ester form of a compound of the present disclosure, Compound C, after pre-treatment with unconjugated HERCEPTIN. The assay was multiplexed with ALEXA FLUOR 488-labeled transferrin ("TF488") which was used to visualize recycling endosomes. Upside-down triangles=Compound C1-HERCEPTIN conjugate; circles=Compound C-HERCEPTIN Conjugate; squares=Compound C1-HERCEPTIN conjugate in the presence of TF488; triangles=Compound C-HERCEPTIN conjugate in the presence of TF488.
Figure 20:
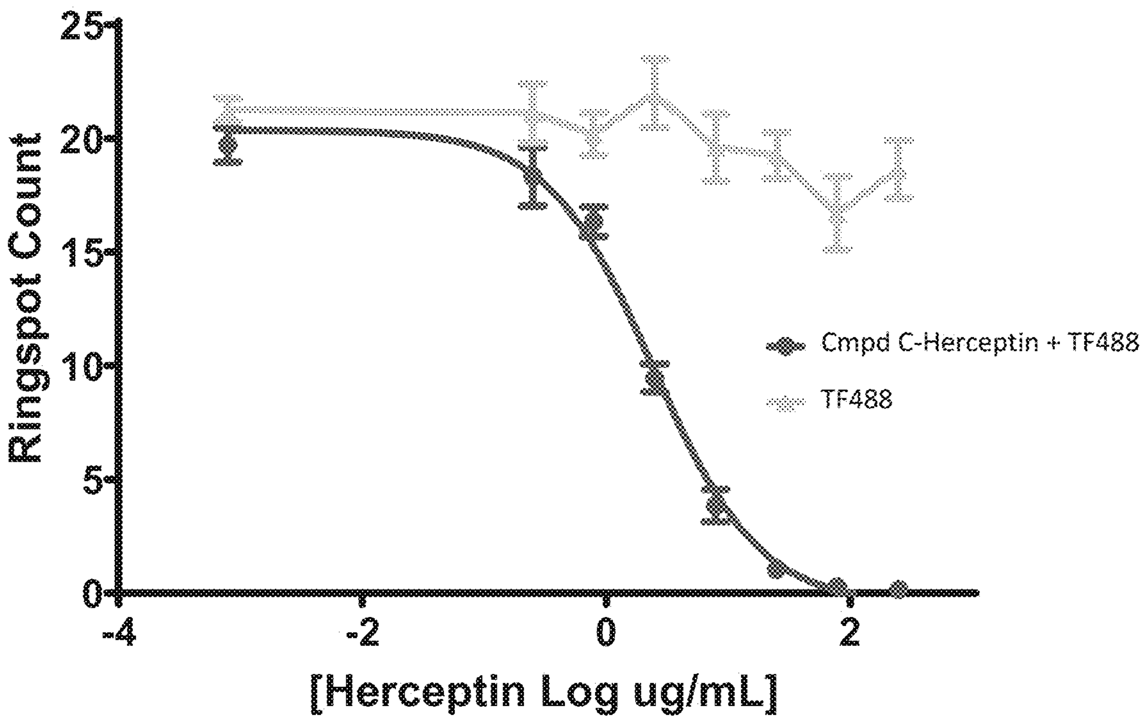
FIG. 20 provides the HCA analysis of a competitive inhibition assay of HERCEPTIN antibodies conjugated to Compound C after pre-treatment of cells with unconjugated HERCEPTIN. The assay was multiplexed with ALEXA FLUOR 488-labeled transferrin ("TF488"), which was used to visualize early and recycling endosomes. Circles=Compound C-HERCEPTIN conjugate in the presence of TF488; triangles=ALEXA FLUOR 488-labeled transferrin alone.
Figure 21:
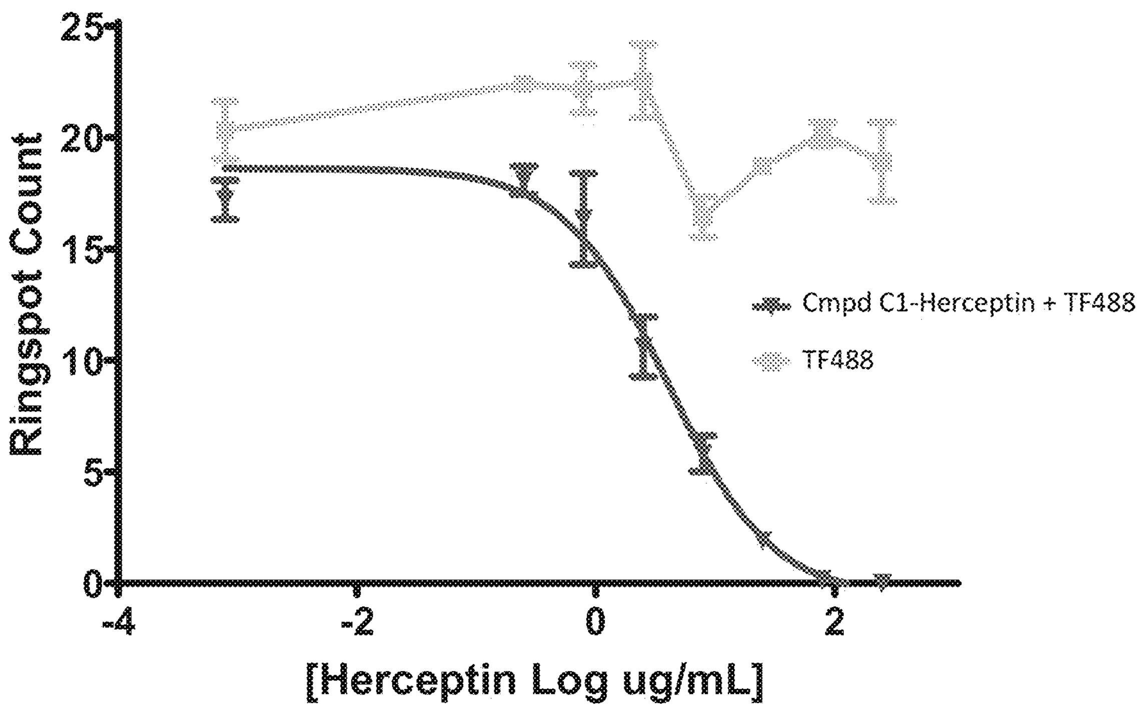
FIG. 21 provides the HCA analysis of a competitive inhibition assay of HERCEPTIN antibodies conjugated to Compound C1 after pre-treatment of cells with ALEXA FLUOR 488-labeled transferrin ("TF488"), which was used to visualize early and recycling endosomes. Upside-down triangles=Compound C1-HERCEPTIN conjugate in the presence of TF488; squares=ALEXA FLUOR 488-labeled Transferrin alone.

Compound C1- and Compound C-HERCEPTIN Conjugates: The internalization study on Compound C1- and Compound C-HERCEPTIN conjugates was conducted using the general method above, however, cells were concomitantly probed with the early/recycling endosome marker, transferrin, labeled with ALEXA FLUOR 488 (Thermo Fisher Scientific, Waltham, MA). Intrinsic recycling pathways composed of early endosomes labeled with ALEXA FLUOR 488 transferrin can be multiplexed and are undisturbed by probe and antibody pretreatment conditions. The results are shown in FIGS. 19-21.

Example 20. Flow Cytometry Test and Occlusion Experiments

Figure 22A:
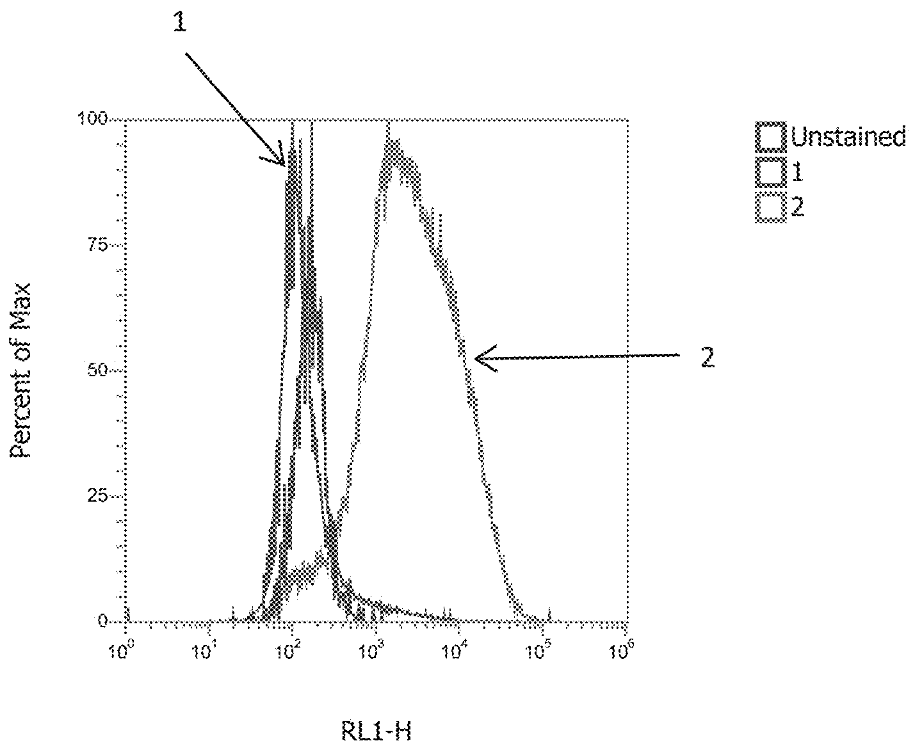
FIG. 22A provides flow cytometry analysis of the conjugate of Compound B and HERCEPTIN with a DOL of 10.2. "MFI"="Mean Fluorescence Intensity". x-axis is signal intensity from excitation with the red laser RL1, y-axis is a normalized count of events. Sample 1 is cells pretreated with unconjugated HERCEPTIN antibody; Sample 2 is cells treated with Compound B-HERCEPTIN conjugate.
Figure 22B:
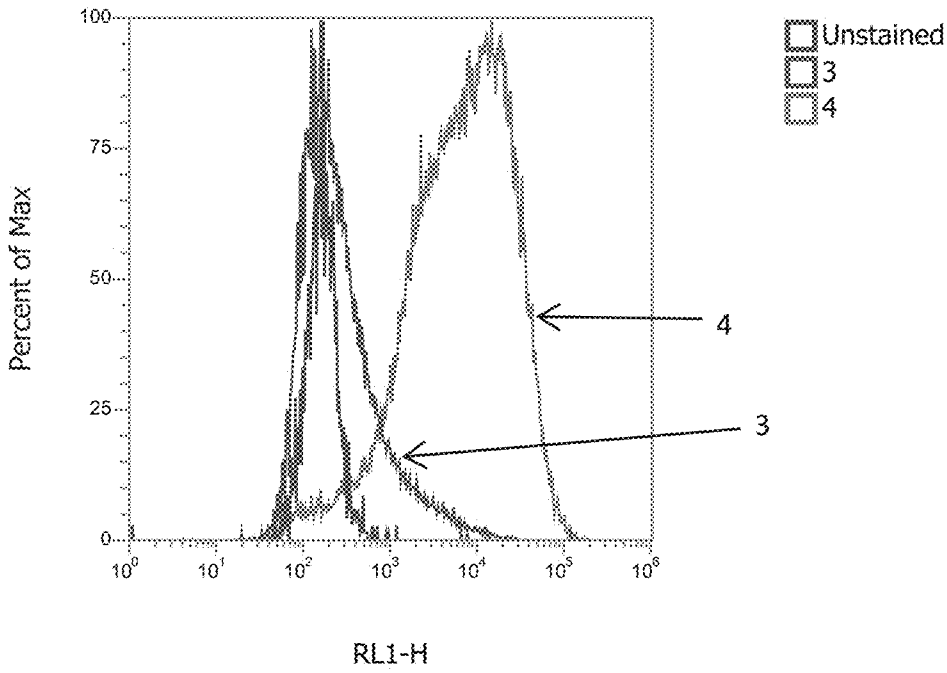
FIG. 22B provides flow cytometry analysis of the conjugate of Compound B and HERCEPTIN with a DOL of 12.7. "MFI"="Mean Fluorescence Intensity". x-axis is signal intensity from excitation with the red laser RL1, y-axis is a normalized count of events. Sample 3 is cells pretreated with unconjugated HERCEPTIN antibody; Sample 4 is cells treated with Compound B-HERCEPTIN conjugate.
Figure 23A:
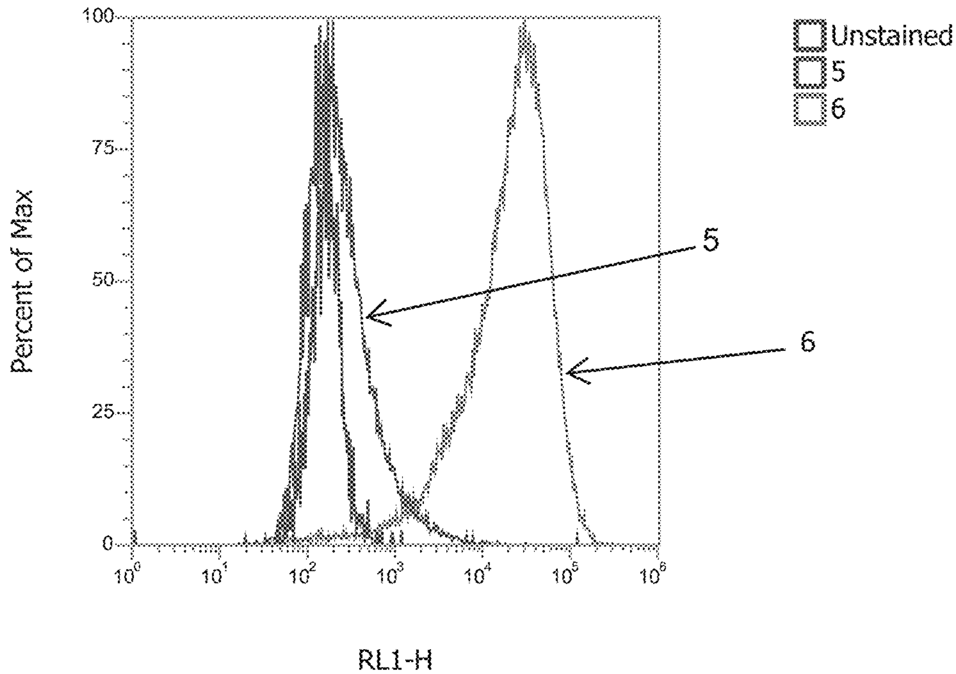
FIG. 23A provides flow cytometry analysis of the conjugate of Compound C and HERCEPTIN with a DOL of 8.2. "MFI"="Mean Fluorescence Intensity". x-axis is signal intensity from excitation with the red laser RL1, y-axis is a normalized count of events. Sample 5 is cells pretreated with unconjugated HERCEPTIN antibody; Sample 6 is cells treated with Compound C-HERCEPTIN conjugate.
Figure 23B:
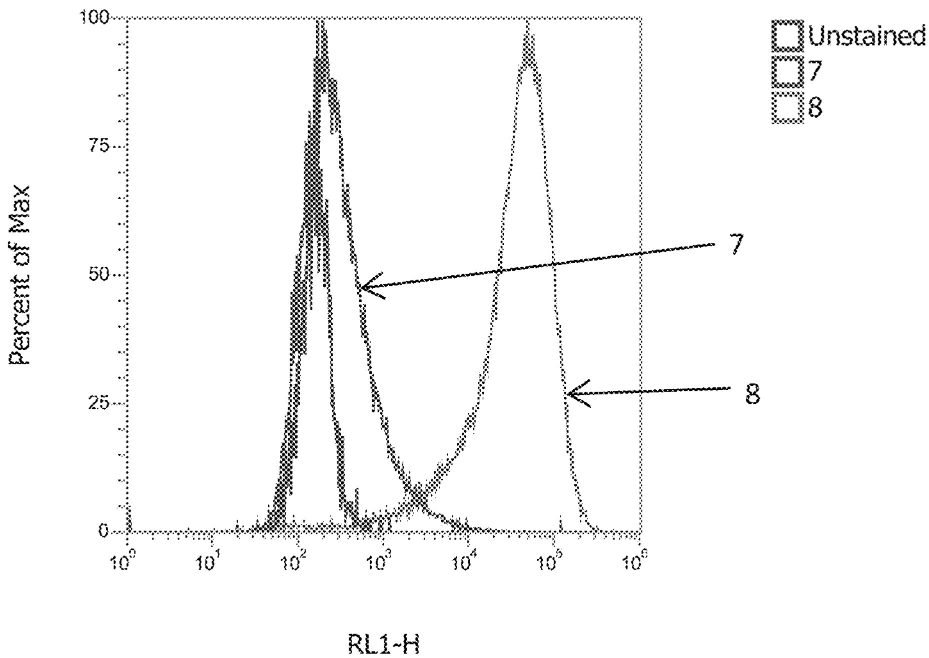
FIG. 23B provides flow cytometry analysis of the conjugate of Compound C and HERCEPTIN with a DOL of 11.6. "MFI"="Mean Fluorescence Intensity". x-axis is signal intensity from excitation with the red laser RL1, y-axis is a normalized count of events. Sample 7 is cells pretreated with unconjugated HERCEPTIN antibody; Sample 8 is cells treated with Compound C-HERCEPTIN conjugate.

HERCEPTIN conjugate concentrations were normalized to 2 uM (100×) for the HERCEPTIN uptake experiment. The cells were pretreated with control or excess unlabeled HERCEPTIN. After incubating overnight, the cells were trypsinized and resuspended in PBS −/− at 100,000 cells/mL. The samples were run on an Attune Nxt Flow Cytometer (80,000 cells at 0.8 mL/min flow rate) with 647 laser RL1 channel. The results of the Compound B-HERCEPTIN conjugates are shown in FIGS. 22A and 23B, and results of the Compound C-HERCEPTIN conjugates are shown in FIGS. 23A and 23B.

Figure 24:
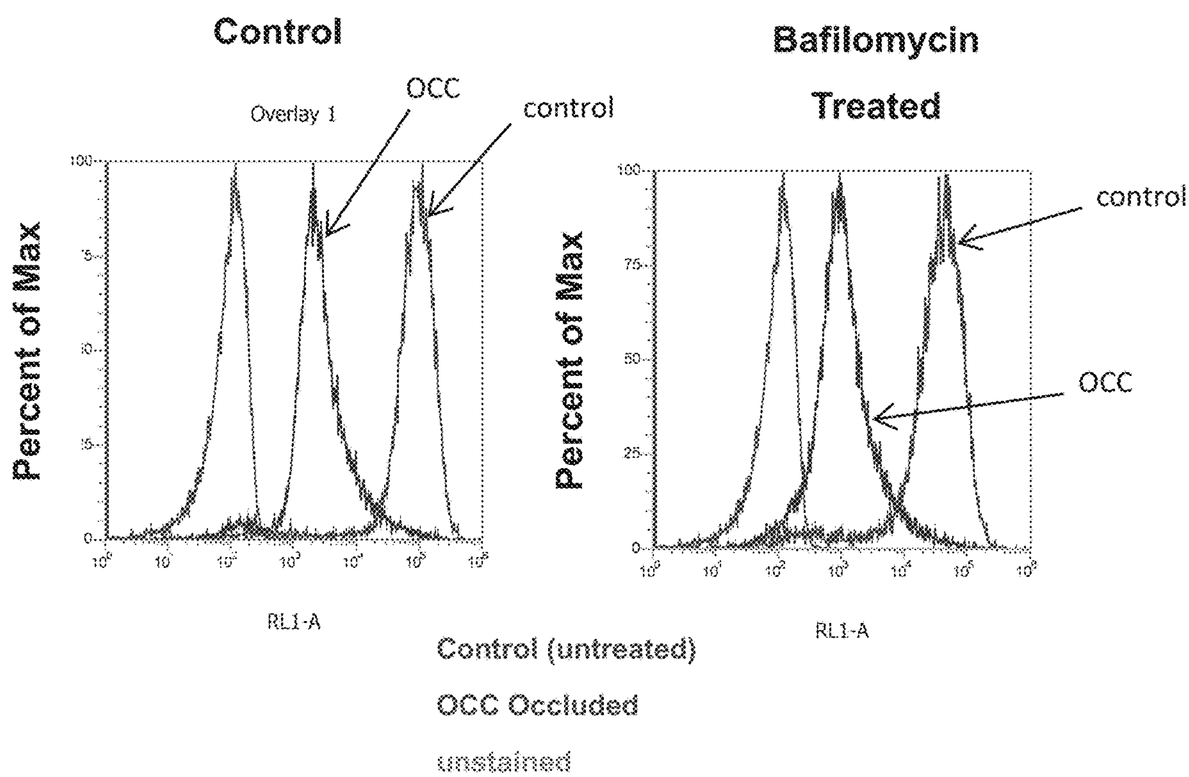
FIG. 24 provides flow cytometry spectra of the conjugate of Compound C and HERCEPTIN. Each spectrum has three curves: left=control (untreated); middle=occluded (OCC) indicating pre-treatment with unconjugated HERCEPTIN to block the Compound C-HERCEPTIN conjugate; right=unstained.

A second study was conducted on the Compound C-HERCEPTIN conjugate. In this study, SKBR3 cells were plated at 200,000 cells per well in a 6 well UPCELL NUNC plate (Thermo Fisher Scientific, Waltham, MA) for 48 hours before experiment and washed once with fresh culture medium before adding probe on the day of experiment with the Compound C-HERCEPTIN conjugate. Any pretreatments to cells in the form of unlabeled HERCEPTIN or control in equal mg/mL BSA were made at the time of this media change. The Compound C-HERCEPTIN conjugate was diluted 1:100 into cells with fresh culture medium and any pretreatments overnight in the cell culture incubator. After overnight incubation, samples were recovered from the UPCELL NUNC plates by cooling to room temperature and treated with the SKBR cell surface marker primary antibody conjugate CD24-FITC (Thermo Fisher Scientific, Waltham, MA). The results are shown in FIG. 24.

Figure 25A:
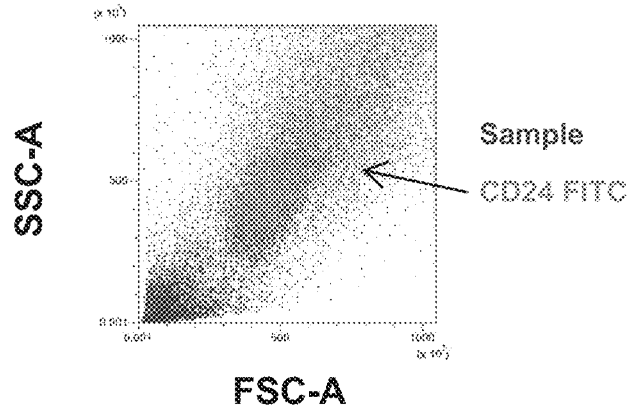
FIGS. 25A and 25B provide flow cytometry spectra of the conjugate of Compound C and HERCEPTIN in SKBR3 cells. SCC-A=Side Scatter; FSC-A=Forward Scatter.
Figure 25B:
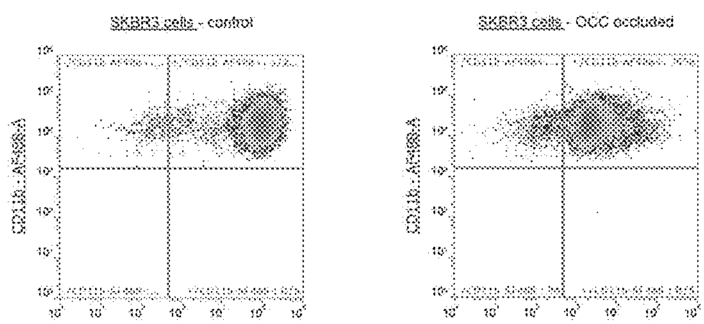

FIGS. 25A and 25B show the scatter plots, which indicate CD24 positive cells were also positive for the Compound C-Herceptin conjugate. CD24 positive cells that had been pretreated with control, excess Herceptin or 50 nM bafilomycin (to neutralize late endosome pH) prior to recovery were plotted for analysis. CD24 positive cells treated with excess Herceptin or bafilomycin showed several decades' shift in staining index for Compound C relative to control.

Example 21. Co-Localization Study

General method: Resuspended cells at 100,000/mL and transduced overnight with BacMam at 1:50. The next day, added the Herceptin conjugate at 20 nM and incubated overnight. The cells were stained with Hoechst and RFP (red fluorescent protein) positive cells were imaged with appropriate expression levels on M7000. Overlays were generated with a HERCEPTIN probe. The presence of signal in late endosomes and lysosomes was looked for as well as the absence of signal in early endosomes. Early Endosomes RFP marker: Rab 5a; Late Endosomes RFP marker: Rab 7a; Lysosomes RFP marker: LAMP.

Figure 26:
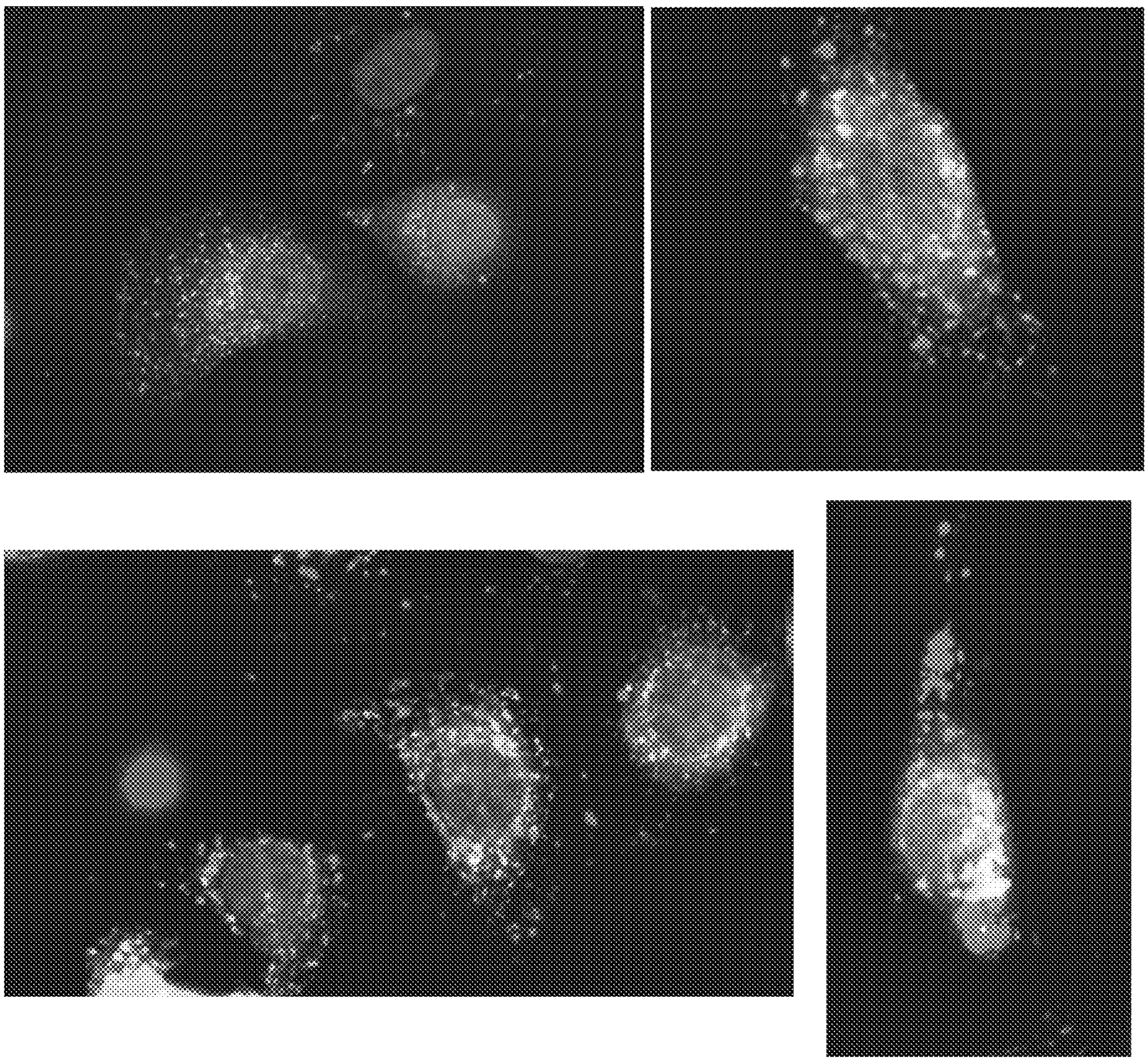
FIG. 26 provides co-localization of the Compound B-HERCEPTIN conjugate (DOL 10.2) compared to early endosomes. Blue=Hoechst (nuclear); green=Rab 5a-RFP early endosome (RFP=red fluorescent protein); red=Compound B-HERCEPTIN conjugate.
Figure 27A:
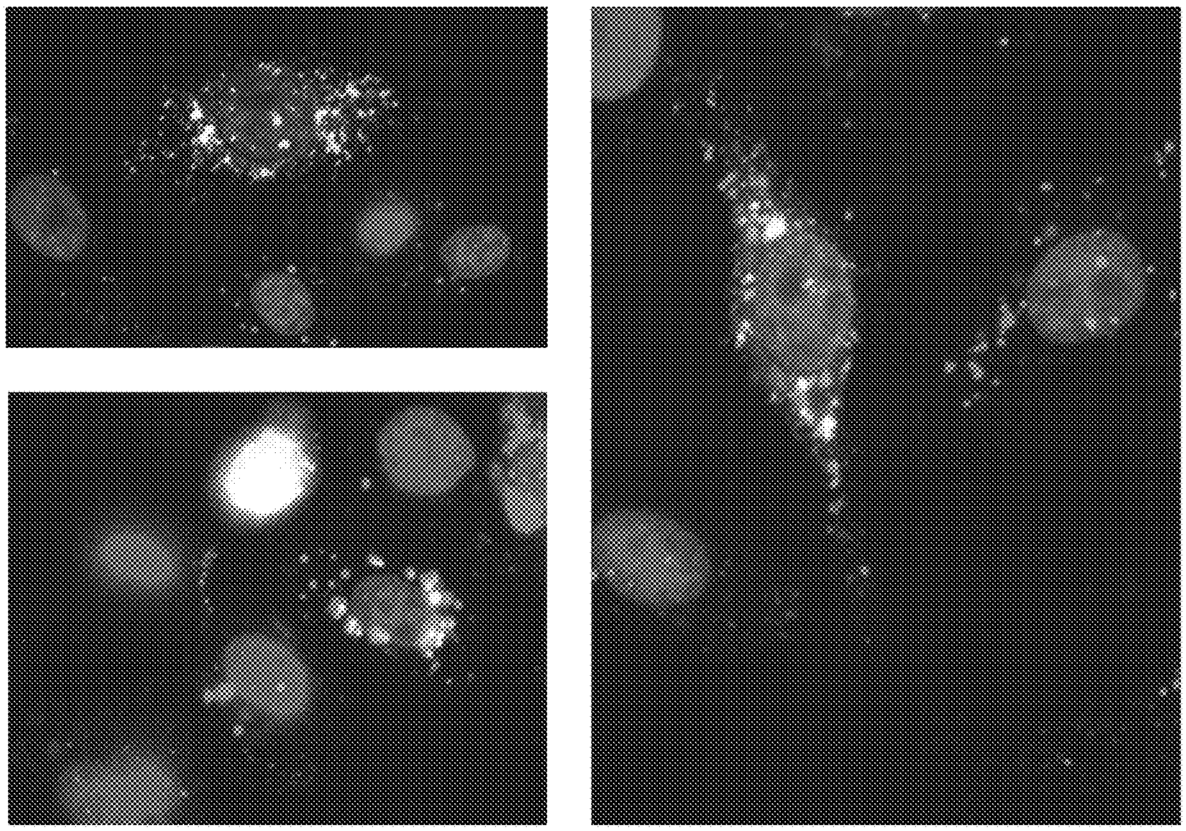
FIGS. 27A and 27B provide co-localization of the Compound B-HERCEPTIN conjugate (DOL 10.2) compared to late endosomes. Blue=Hoechst (nuclear); green=Rab 5a-RFP late endosome; red=Compound B-HERCEPTIN conjugate.
Figure 27B:
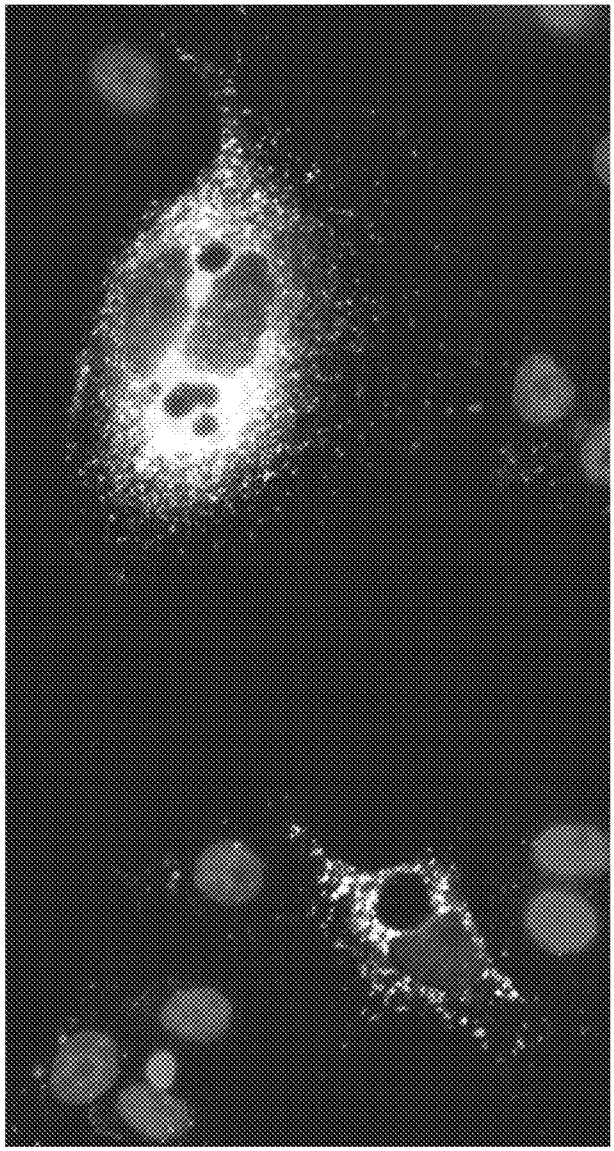
Figure 28A:
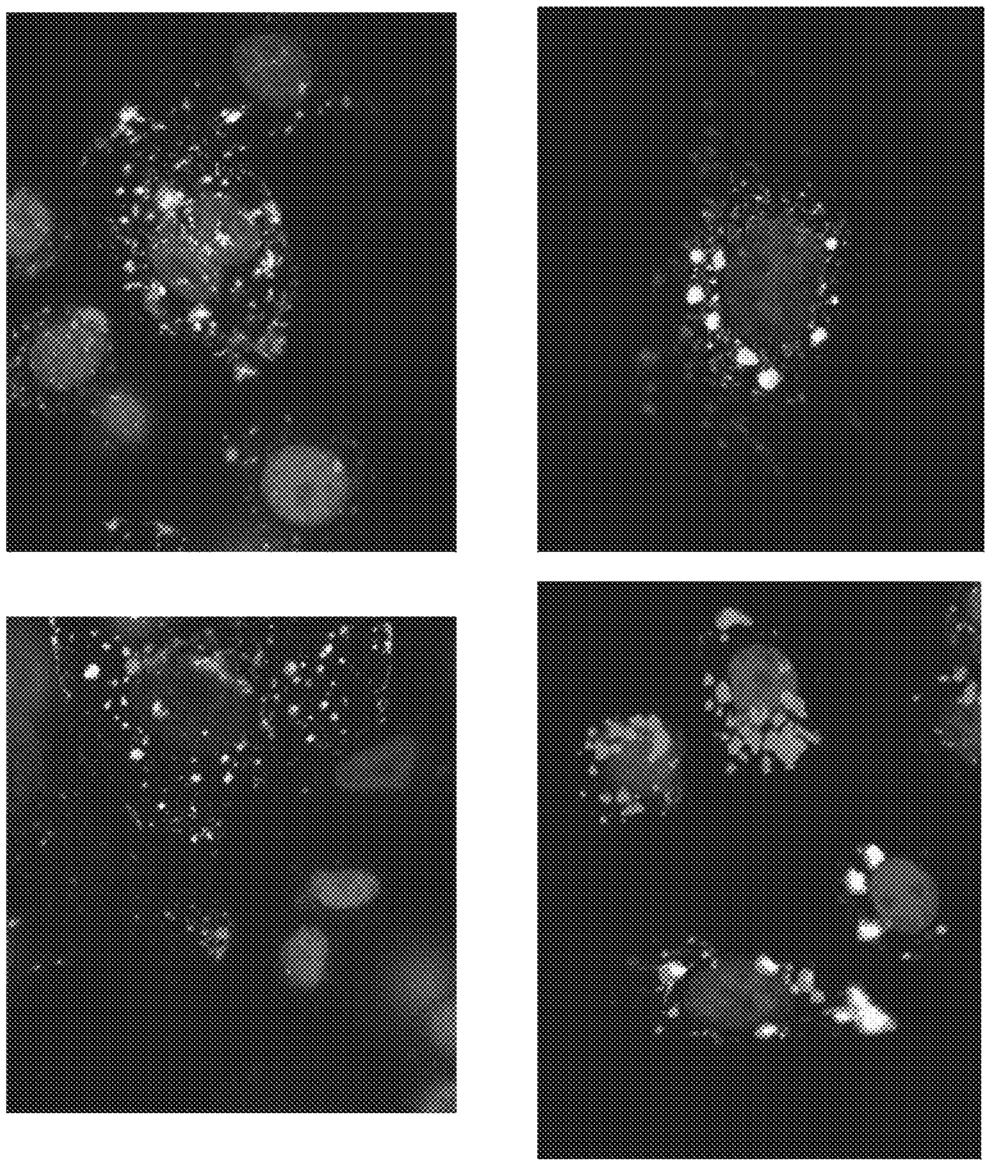
FIGS. 28A and 28B provide co-localization of the Compound B-HERCEPTIN conjugate (DOL 10.2) compared to lysosomes. Blue=Hoechst (nuclear); green=Rab 5a-RFP lysosome; red=Compound B-HERCEPTIN conjugate.
Figure 28B:
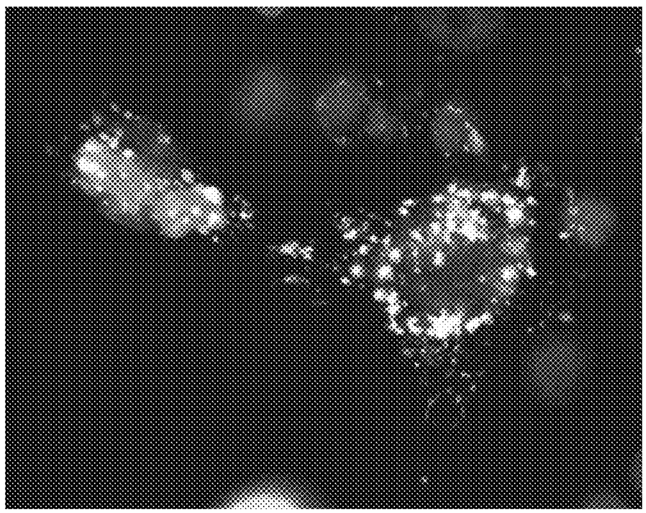

Compound B-HERCEPTIN conjugate: FIG. 26 shows a co-localization study of Compound B-HERCEPTIN conjugate (DOL 10.2) versus early endosomes. The results indicated there was no observable co-localization with early endosomes. FIGS. 27A and 27B shows a co-localization study of Compound B-HERCEPTIN conjugate (DOL 10.2) versus late endosomes. The results indicated there was observable co-localization with late endosomes. FIGS. 28A and 28B shows a co-localization study of Compound B-HERCEPTIN conjugate (DOL 10.2) versus lysosomes. The results indicated there was observable co-localization with lysosomes.

Example 22. Imaging the Endosomal Pathway

General method: SKBR3 cells were plated at 5,000 cells per well in a 96 well plate 48 hours before experiment and washed once with fresh culture medium before adding probe on the day of experiment with the antibody-compound conjugate. At time of plating, cells were treated with either control or the indicated BacMam CELLIGHT reagent to express the indicated fluorescent protein fusion used in colocalization studies. The antibody-compound conjugate was diluted 1:100 into cells with fresh culture medium and any pretreatments overnight in the cell culture incubator. After overnight incubation, samples were stained with Hoechst nuclear dye added from a 10× stock for 30 minutes at 37° C. to facilitate image registry and segmentation in subsequent visualization and quantification. Following removal of the spent media containing probe and nuclear dye, cells were washed 1× in desired physiological buffer or complete medium for imaging. Pseudo-colored GFP and RFP Fluorescent protein images were collected on the EVOS M7000 with corresponding filter cubes (Thermo Fisher Scientific, Waltham, MA), while the conjugate and nuclear channels were imaged using corresponding filter cubes (Thermo Fisher Scientific).

Figure 29:
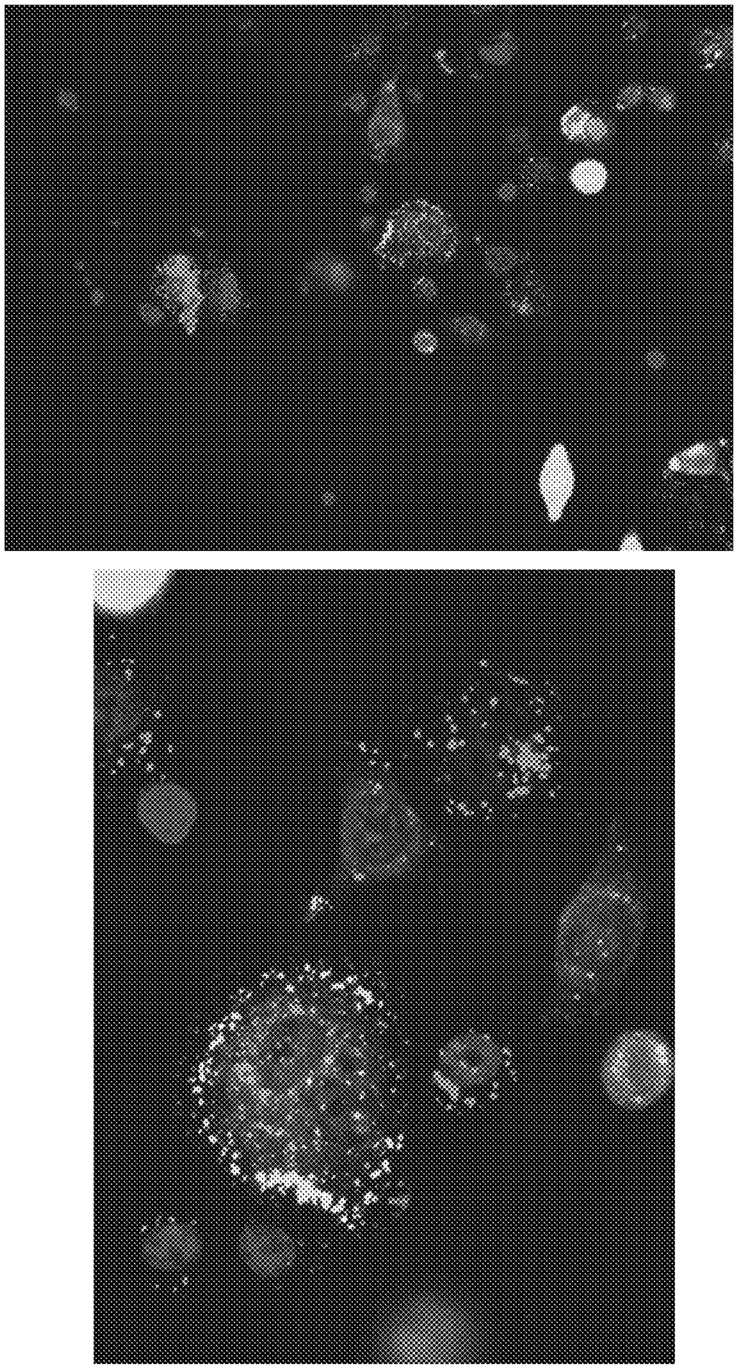
FIG. 29 provides an endosomal pathway study with Compound C-HERCEPTIN conjugate in early endosomes. Blue=NUCBLUE Live nuclear stain (Thermo Fisher Scientific, Waltham, MA); green=CELLLIGHT Early Endosome RFP (Thermo Fisher Scientific, Waltham, MA); magenta=Compound C-HERCEPTIN conjugate.
Figure 30:
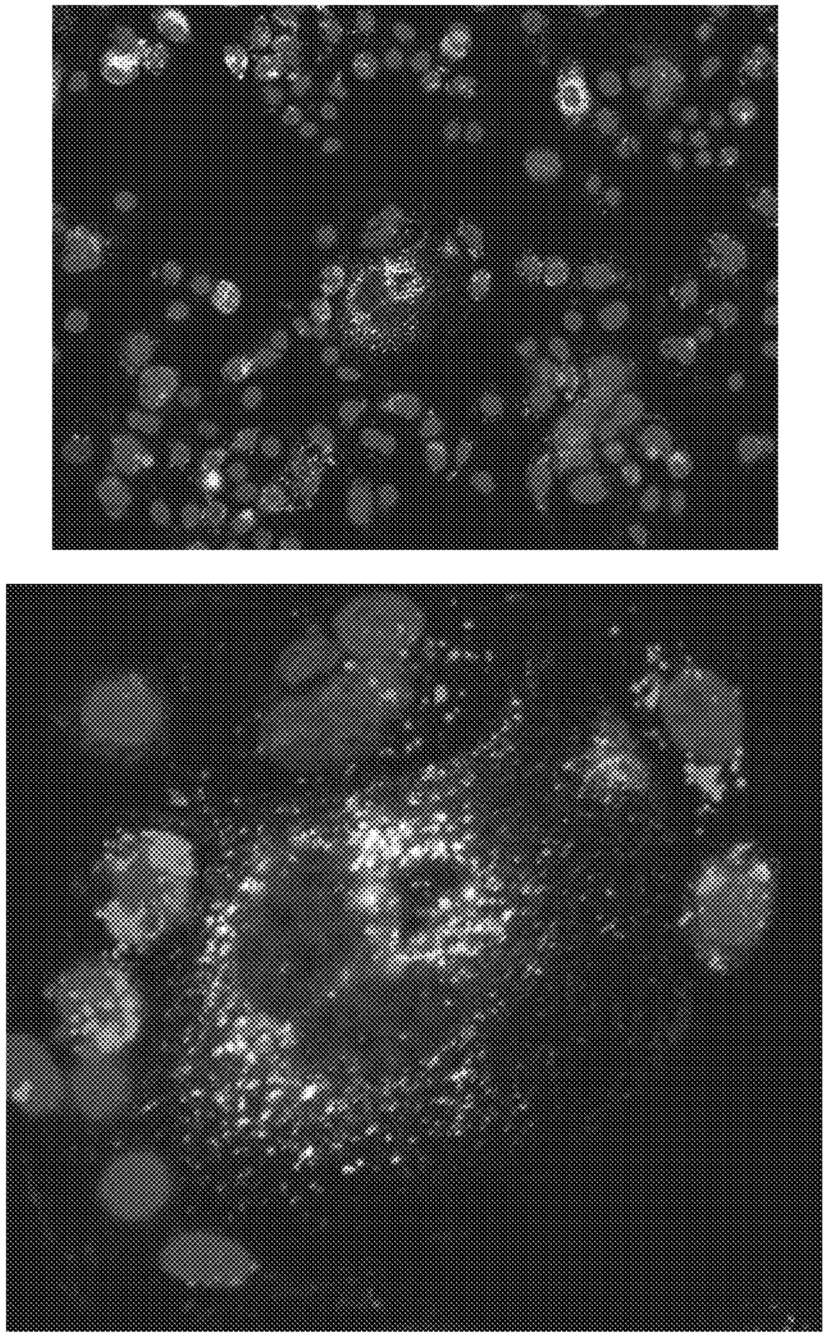
FIG. 30 provides an endosomal pathway study with Compound C-HERCEPTIN conjugate in late endosomes. Blue=NUCBLUE Live nuclear stain; green=CELLLIGHT Late Endosome RFP; magenta=Compound C-HERCEPTIN conjugate.
Figure 31:
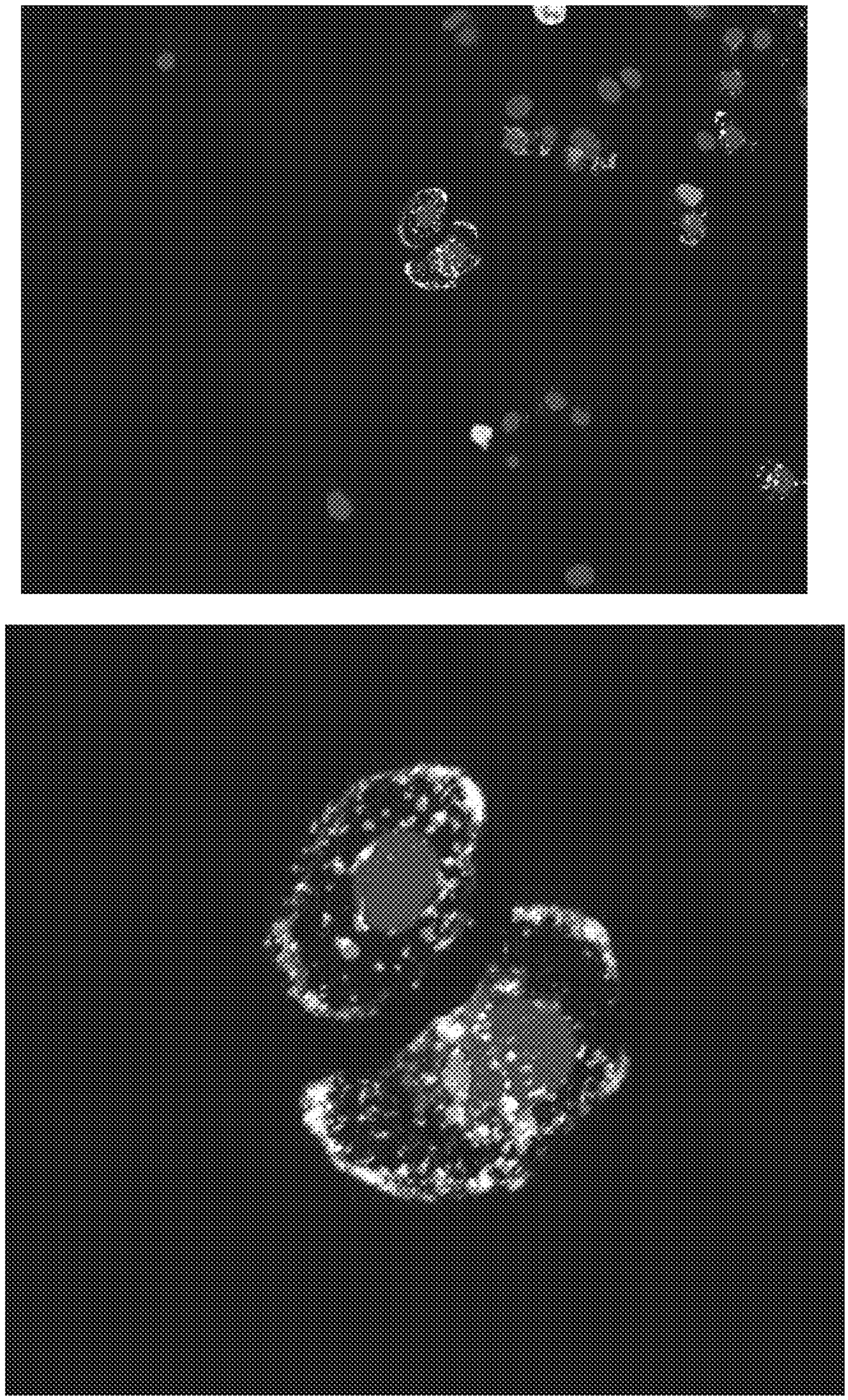
FIG. 31 provides an endosomal pathway study with Compound C-HERCEPTIN conjugate in lysosomes. Blue=NUCBLUE Live nuclear stain; green=CELLLIGHT Lysosome RFP; magenta=Compound C-HERCEPTIN conjugate.

Compound C-HERCEPTIN Conjugate: The results of the study using the Compound C-HERCEPTIN Conjugate are shown in FIGS. 29-31. The results indicate that the Compound C-HERCEPTIN Conjugate did not co-localize with the early endosome marker, Rab-5A, expressed as a fusion protein with RFP and shown in green, using BacMam CELLLIGHT Early Endosome RFP (Thermo Fisher Scientific, Waltham, MA). The absence of signal from these compartments indicates that any conjugate in these early, more alkaline steps in endosomal maturation had not yet been activated by pH below 5.5-6. Early endosomes are typically pH 6.3-6.5.

Figure 32:
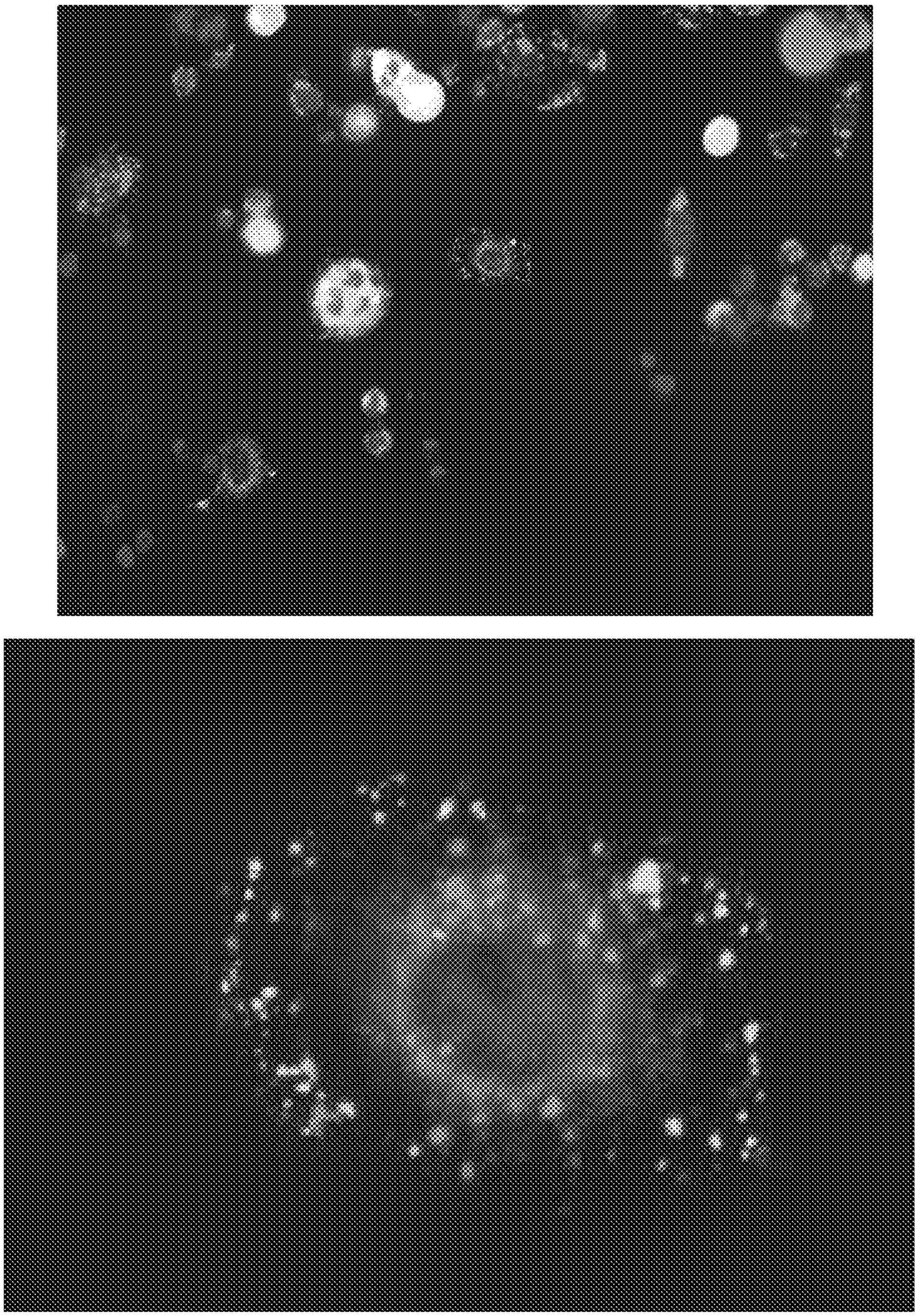
FIG. 32 provides an endosomal pathway study with Compound C1-HERCEPTIN conjugate in early endosomes. Blue=NUCBLUE Live nuclear stain; green=CELLLIGHT Early Endosome RFP (RFP=red fluorescent protein); magenta=Compound C1-HERCEPTIN conjugate.
Figure 33:
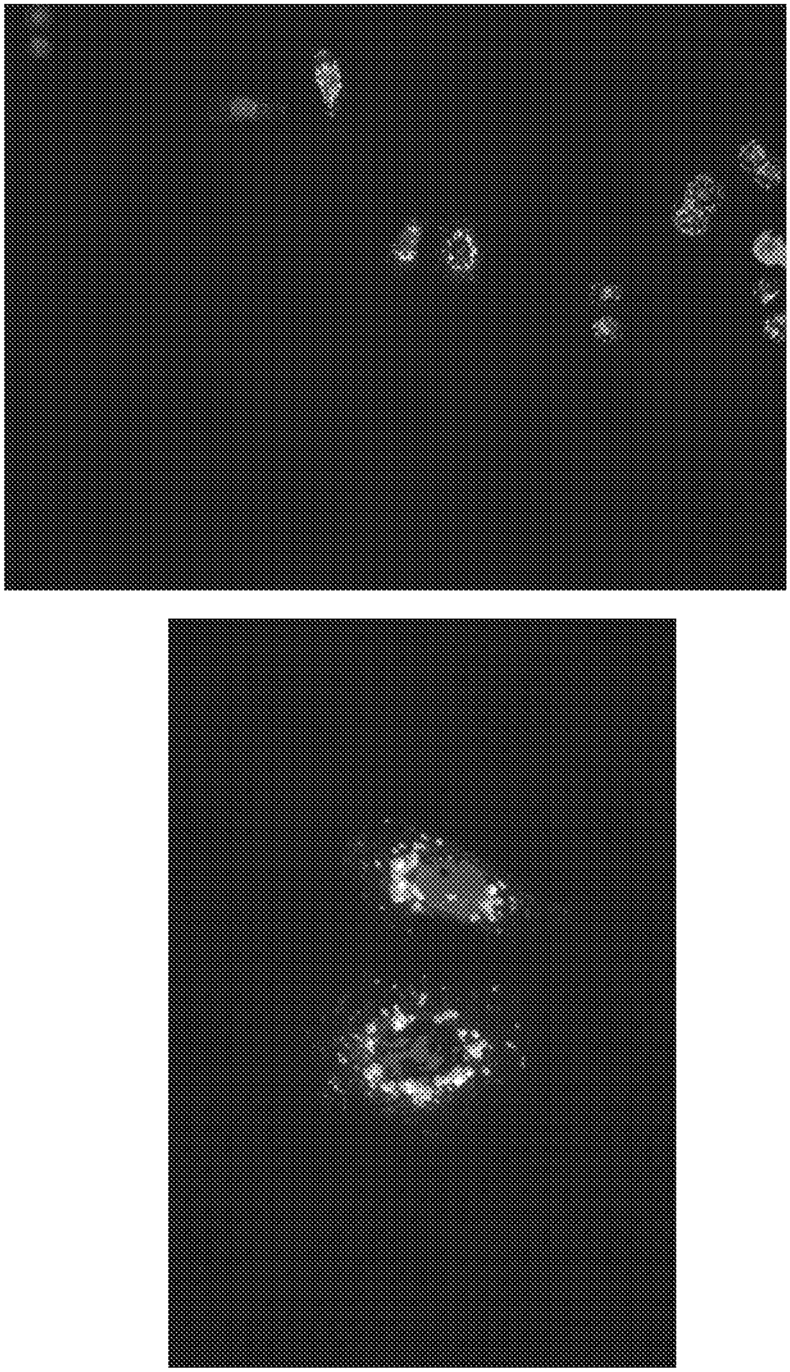
FIG. 33 provides an endosomal pathway study with Compound C1-HERCEPTIN conjugate in late endosomes. Blue=NUCBLUE Live nuclear stain; green=CELLLIGHT™ Late Endosome RFP; magenta=Compound C1-HERCEPTIN conjugate.
Figure 34:
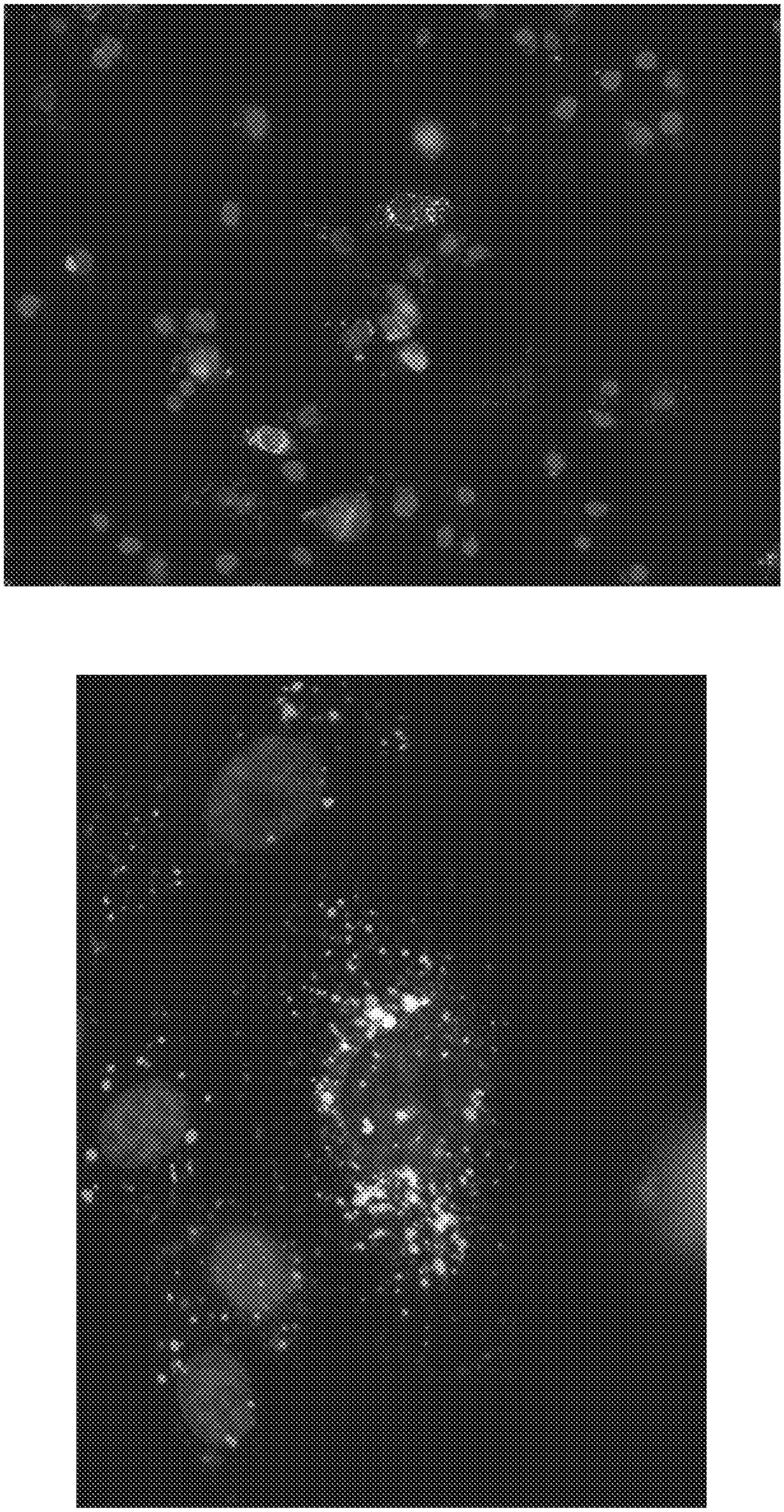
FIG. 34 provides an endosomal pathway study with Compound C1-HERCEPTIN conjugate in lysosomes. Blue=NUCBLUE Live nuclear stain; green=CELLLIGHT Lysosome RFP; magenta=Compound C1-HERCEPTIN conjugate.

Compound C1-HERCEPTIN Conjugate: The results of the study using the Compound C1-HERCEPTIN Conjugate are shown in FIGS. 32-34. As shown, the Compound C1-HERCEPTIN Conjugate did not co-localize with CELLLIGHT Early Endosomes (Rab5) RFP but did co-localize with CELLLIGHT Late Endosomes (Rab7) RFP and CELLLIGHT Lysosomes (LAMP) RFP.

Example 23. Internalization of Compound C-HERCEPTIN Conjugate

Figure 35:
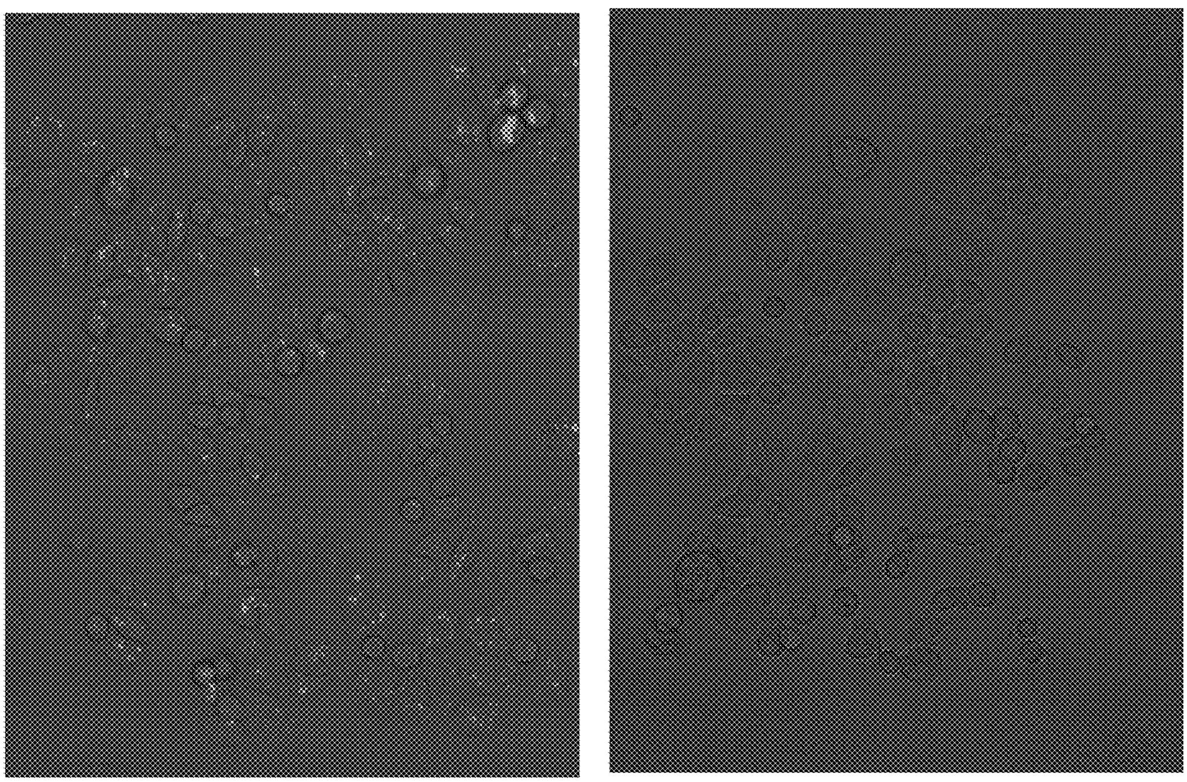
FIG. 35 provides the internalization of Compound C-HERCEPTIN conjugate (Left—pretreated control; Right—pretreated unlabeled HERCEPTIN). Blue=Hoechst nuclear; magenta=Compound C-HERCEPTIN conjugate.

General method: SKBR3 cells were plated at 5,000 cells per well in a 96 well plate 48 hours before experiment and washed once with fresh culture medium before adding probe on the day of experiment with the Compound C-HERCEPTIN conjugate. Any pretreatments to cells in the form of unlabeled HERCEPTIN or control in equal mg/mL BSA were made at the time of this media change. After antibody labeling and purification, the Compound C-HERCEPTIN conjugate was diluted 1:100 into cells with fresh culture medium and any pretreatments overnight in the cell culture incubator. After overnight incubation, samples were stained with Hoechst nuclear dye added from a 10× stock for 30 minutes at 37° C. to facilitate image registry and segmentation in subsequent visualization and quantification. Following removal of the spent media containing the Compound C-HERCEPTIN conjugate and nuclear dye, cells were washed 1× in the desired physiological buffer or complete medium for imaging. Compound C-HERCEPTIN conjugate and nuclear images were collected on the EVOS M7000 with corresponding filter cubes (Thermo Fisher Scientific, Waltham, MA) to indicate the presence of signal with the conjugate in left panel, and it is competitive inhibition when the cells are pretreated with an excess level of unlabeled HERCEPTIN in right panel (see FIG. 35).

Example 24. Phagocytosis Studies

General method: RAW macrophages were used unless otherwise indicated for phagocytosis studies, as well as MMM (J774A.1) and THP-1 cell types. For imaging phagocytosis studies, cells were plated at 10,000 cells per well one day before assay in complete medium. On the day of assay, cells were pretreated with any control or pharmacologic interventions and *E. coli* bioparticle conjugates were added 1:10 from a 1 mg/mL stock for a conjugate concentration of 100 ug/mL. Cultures were either returned to the cell incubator for 2 hours before imaging with an EVOS M7000 light microscope. Hoechst or calcein counterstains were applied 30 minutes prior to image acquisition.

Figure 36:
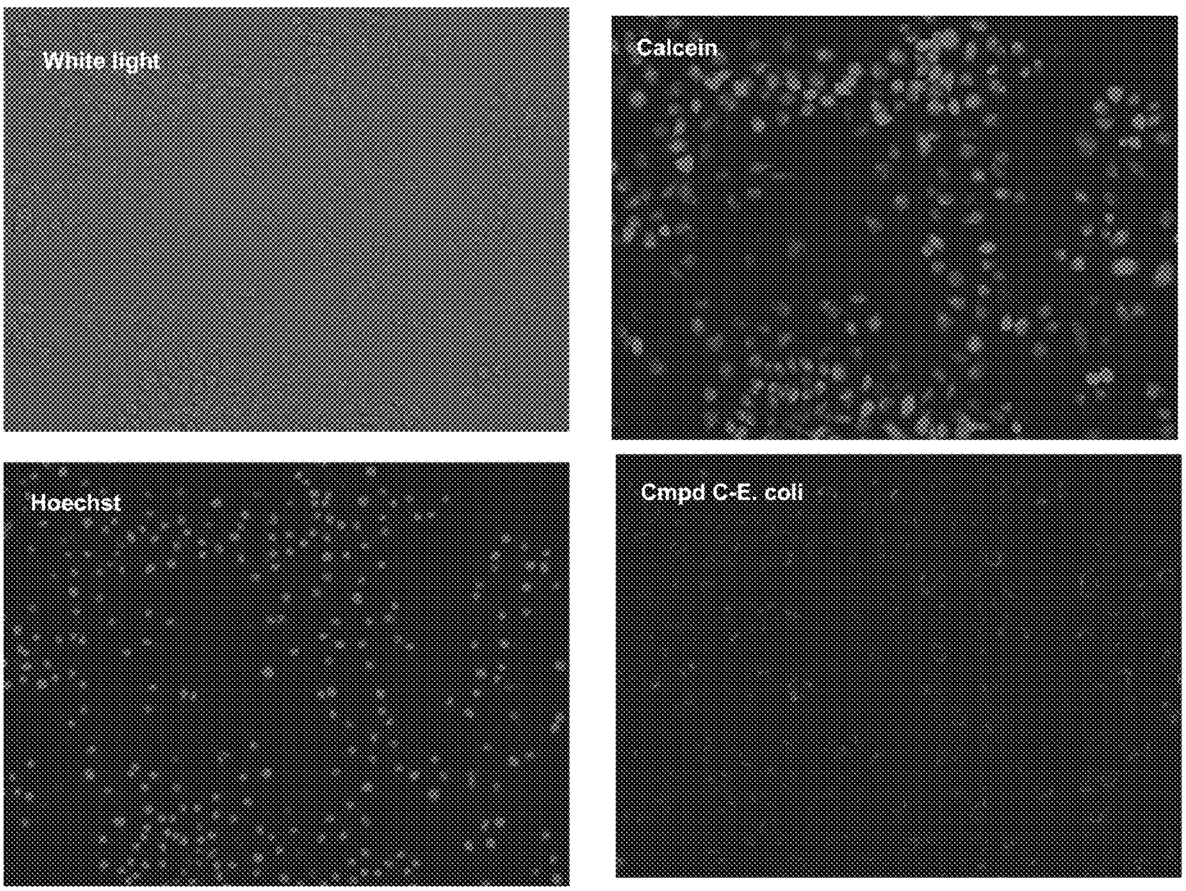
FIG. 36 provides the results of a phagocytosis study of Compound C-*E. coli* bioparticle conjugate. Top left=white light; top right=Calcein; bottom left=Hoechst; bottom right=Compound C-*E. coli* bioparticle conjugate.

Compound C-*E. coli* Conjugate: FIG. 36 shows images of internalized Compound C-*E. coli* bioparticle conjugate on RAW macrophages after two-hour uptake.

Figure 37:
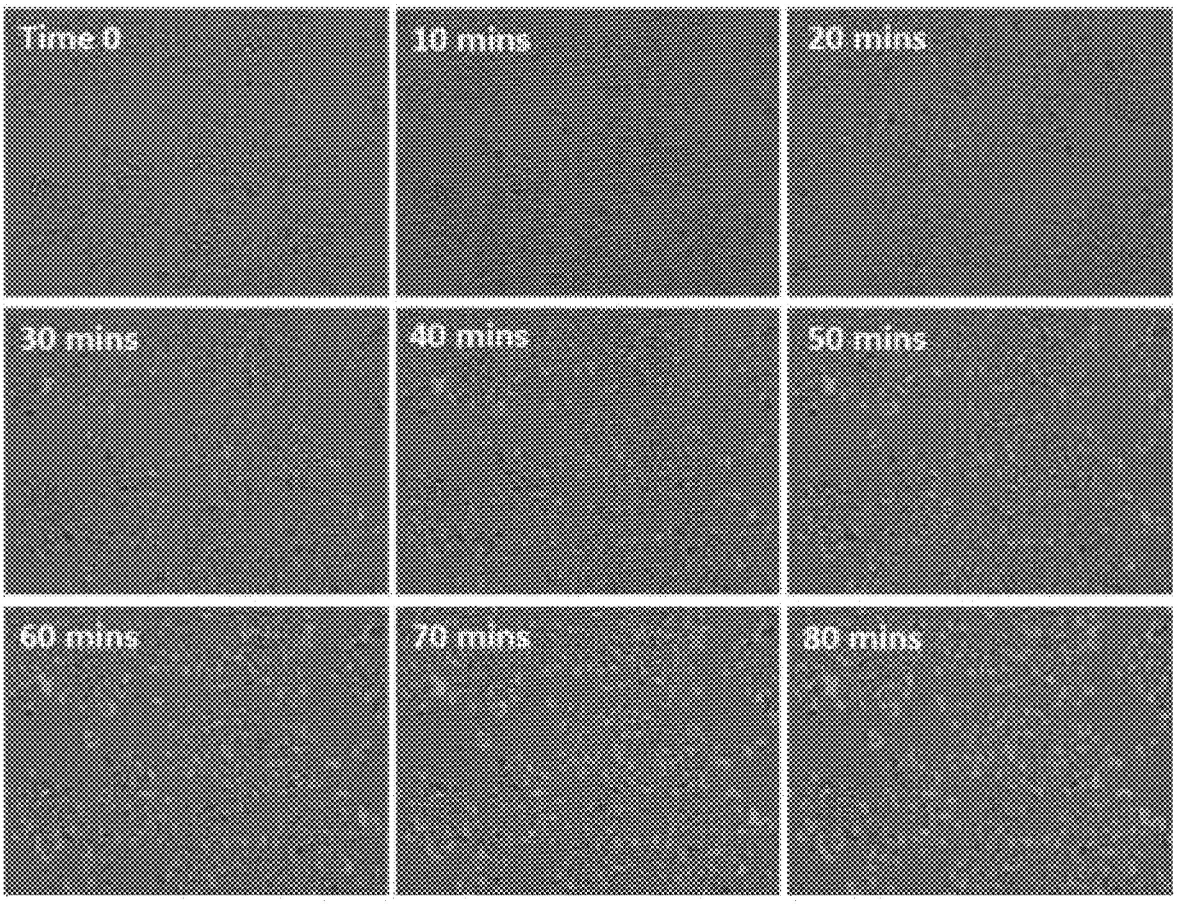
FIG. 37 provides the results of a time-lapse study of Compound C-*E. coli* bioparticle conjugate.

FIG. 37 shows images from a time-lapse study of the Compound C-*E. coli* bioparticle conjugate. For the study, RAW macrophage cells were plated at 10,000 cells per well one day before assay in complete medium. The following day, the Compound C-*E. coli* bioparticle conjugate was added 1:10 from a 1 mg/mL stock for a probe concentration of 100 ug/mL. Cultures were set into the Onstage Incubator live cell imaging unit onboard an EVOS M7000 (Thermo Fisher Scientific, Waltham, MA). As shown in FIG. 37, over time, more Compound C-*E. coli* bioparticle conjugate fluorescence signal was detected indicating more *E. coli* were internalized.

Figure 38A:
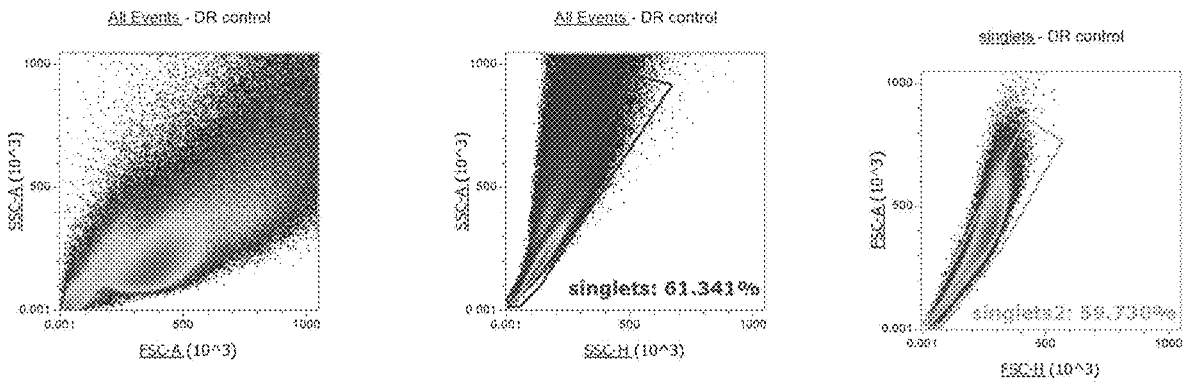
FIGS. 38A and 38B provide the results from Compound C-*E. coli* bioparticle conjugate phagocytosis analyzed by flow cytometry.
Figure 38B:
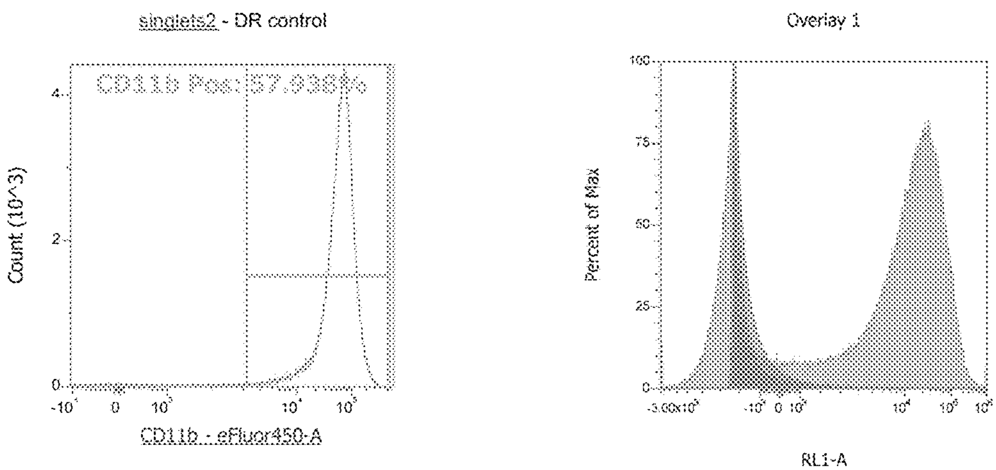

FIGS. 38A and 38B show the results from Compound C-*E. coli* bioparticle conjugate phagocytosis in flow cytometry. In this study, RAW cells were plated at 200,000 cells per well in a 6 well UPCELL NUNC plate for 48 hours before experiment and washed once with fresh culture medium before adding probe on the day of experiment with the Compound C-*E. coli* bioparticle conjugate. After overnight incubation, samples were recovered from the UPCELL NUNC plates by cooling to room temperature and treated with the RAW cell surface marker primary antibody conjugate CD11b-eFluor450 (Thermo Fisher Scientific, Waltham, MA) (FIG. 38B, histogram on the left side). CD11b positive cells were treated with bafilomycin and Cytochalasin prior to recovery for analysis showed several decades' shift in staining index (FIG. 38B, histograms on the right side). Singlets were isolated by gating strategy in first three scatter plots before isolating CD11b positive cells.

Figure 39A:
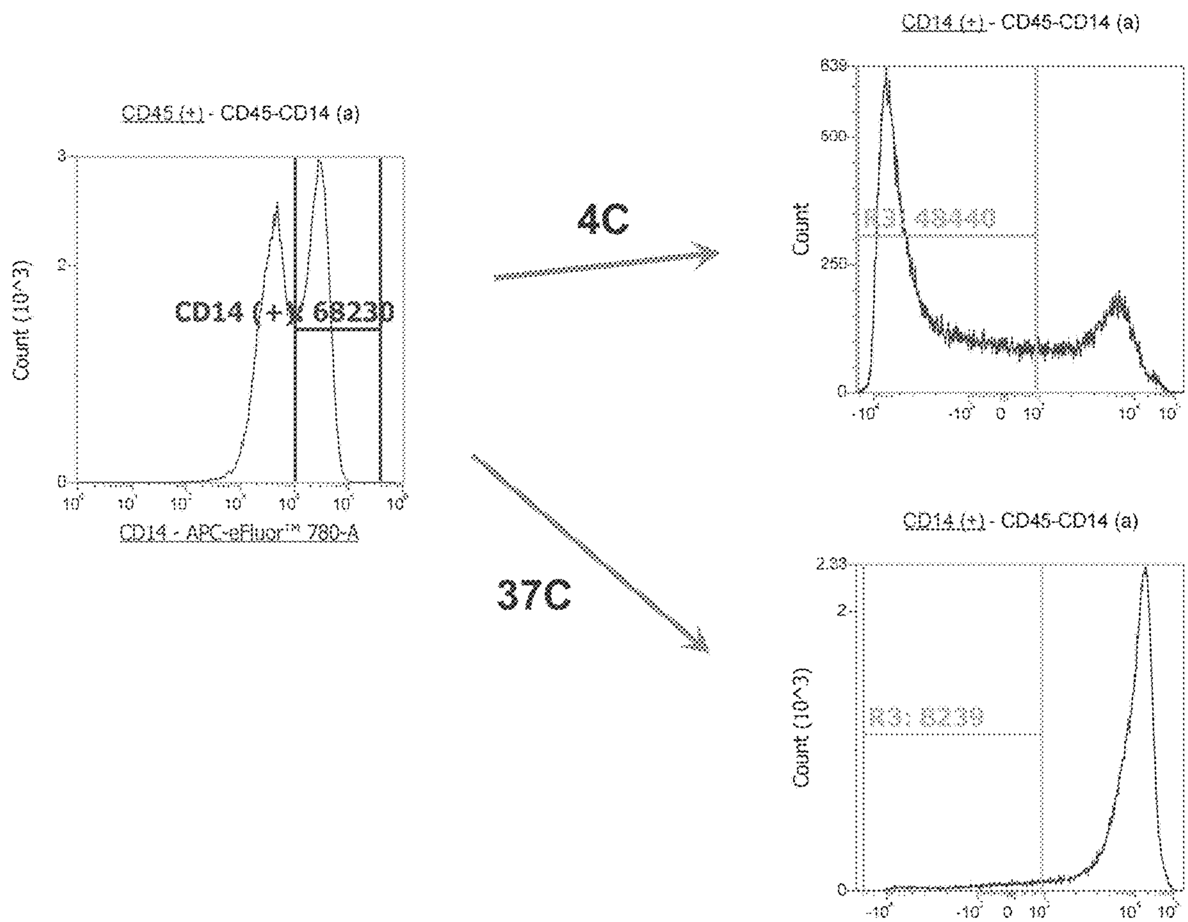
FIGS. 39A and 39B show the gating strategy for Compound C-*E. coli* bioparticle conjugate phagocytosis using whole human blood.
Figure 39B:
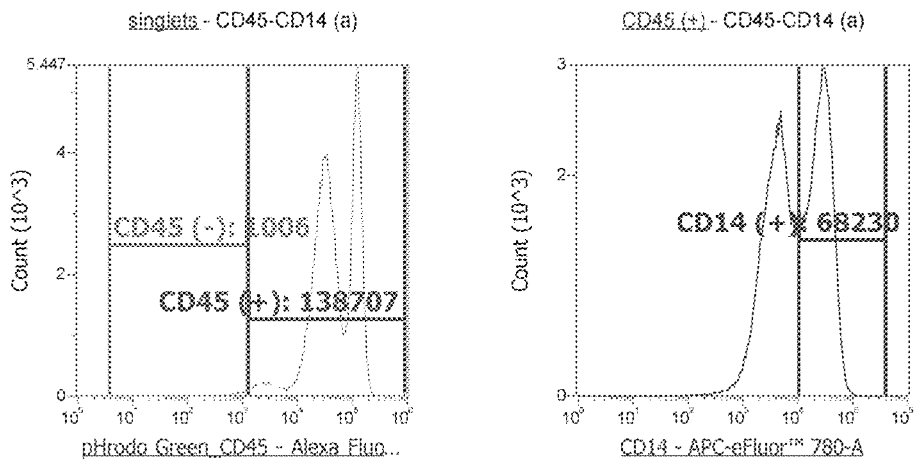

FIGS. 39A and 39B show the gating strategy for Compound C-*E. coli* bioparticle conjugate phagocytosis using whole human blood. In this study, Human Whole Blood was treated with the Compound C-*E. coli* bioparticle conjugate for 15 minutes at either 37° C. for phagocytosis or 4° C. for non-phagocytosis control. After samples were treated with the Compound C-*E. coli* bioparticle conjugate, whole blood was lysed for 5 minutes and then washed to eliminate red blood cells and free-floating Compound C-*E. coli* bioparticle conjugate, respectively. Lysed whole blood Compound C-*E. coli* bioparticle conjugate cells were treated with primary antibody conjugate cocktail containing CD45-FITC and CD14-APC eFluor780 to identify Leukocytes (FIG. 39B, histogram on left) and Granulocytes (FIG. 39B, histogram on right). Singlets were isolated by gating strategy in first two scatter plots before identifying cells of interest (Granulocytes). As shown in FIG. 39A, Human Lysed Whole blood cells treated at 37° C. (FIG. 39A, histogram top right) showed several decades' shift in staining index compared to cells treated at 4° C. (histogram bottom right).

Figure 40A:
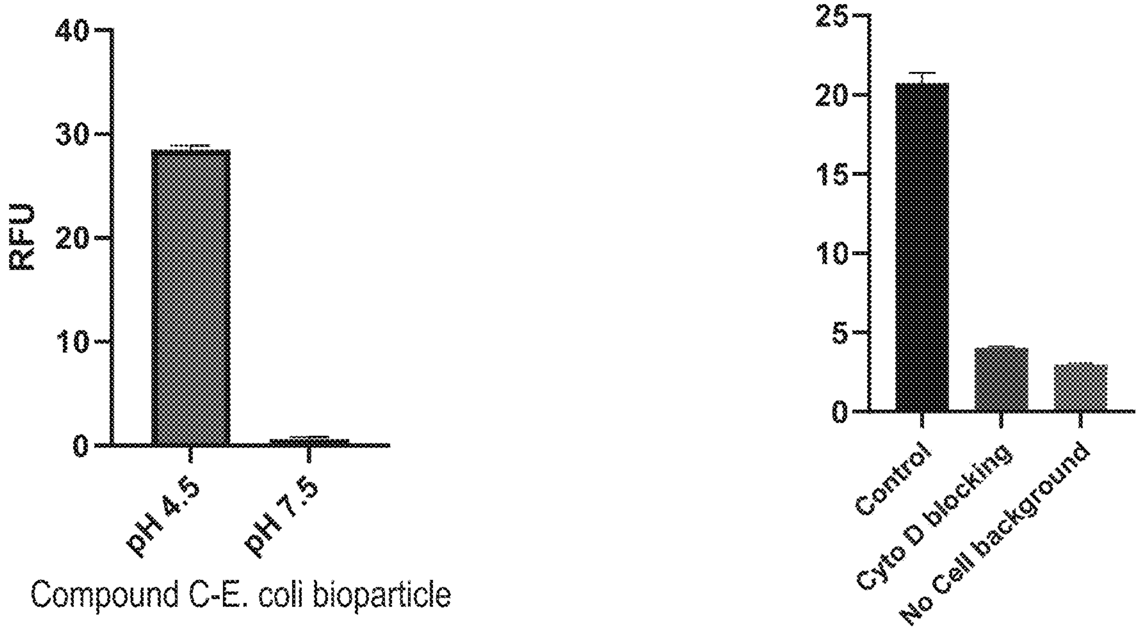
FIGS. 40A and 40B provide the results of HTS phagocytosis assays in a microplate reader with Compound C-*E. coli* bioparticle conjugate. "Cyto D" is cytochalasin D.
Figure 40B:
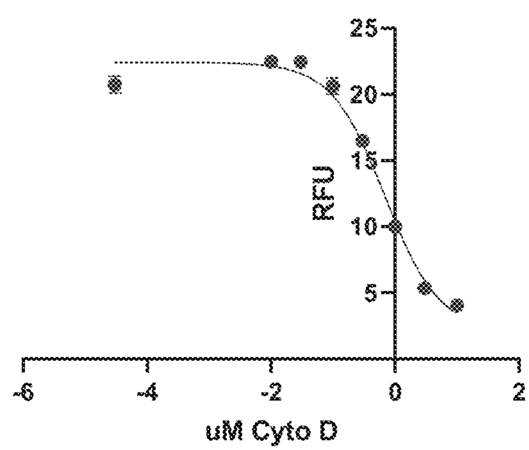

FIGS. 40A and 40B show the HTS phagocytosis assays with the Compound C-*E. coli* bioparticle conjugate. In this study, cells were plated at 100,000 cells per well one day before assay in complete medium. On the day of assay, cells were rinsed 1× with fresh medium and pretreated with any control or pharmacologic interventions. The Compound C-*E. coli* bioparticle conjugate was added 1:1 from a 2 mg/mL stock for a probe concentration of 2 mg/mL. Cultures were returned to the cell incubator for 2 hours before collecting data with the VARIOSKAN Plate Reader (Thermo Fisher Scientific, Waltham, MA). In the FIG. 40A (left side), the Compound C-*E. coli* bioparticle conjugate cells were resuspended at 0.1 mg/mL in reference solutions of pH 4.5 or pH 7.5 to illustrate the fold increase from dye labeled particles in solution alone. FIG. 40A (right side) show the signal from *E. coli* phagocytosis in control conditions, cytochalasin D blocking conditions, and no cell background conditions. In FIG. 40B, cytochalasin D pretreatment was applied to the cultures at the indicated dosage in advance of the Compound C-*E. coli* bioparticle conjugate, and a dose-inhibition curve of the blockage of *E. coli* phagocytosis was generated.

Figure 41:
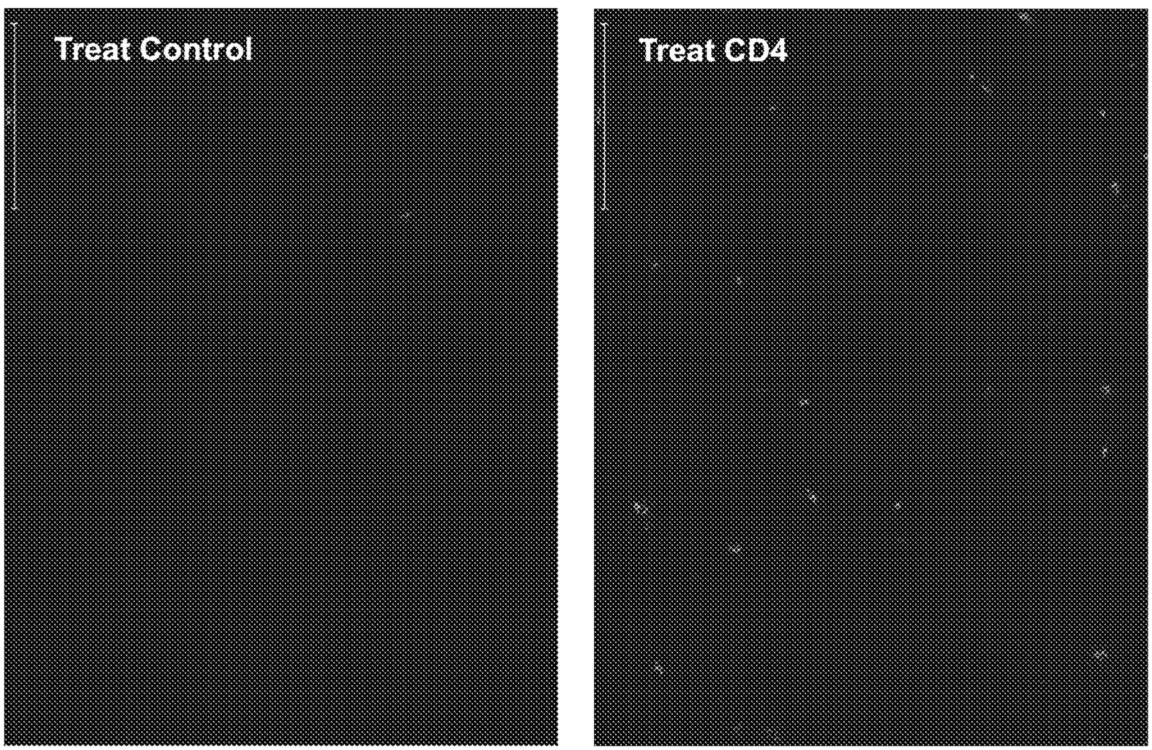
FIG. 41 provides the phagocytosis of CD4 opsonized Jurkat cells labeled with Compound C. Image on the left is the control; image on the right is CD4. Image is 10× live.

Compound C: FIG. 41 shows images of the phagocytosis of CD4 opsonized Jurkat cells labeled with Compound C. In this study, Jurkat cells were grown as normal in complete medium then harvested, counted, washed, labeled, and resuspended per product description in complete culture medium before splitting into control and CD4 antibody treated samples. In brief, the cells were resuspended in PBS and labeled with either BSA control or CD4 antibody at 2 ug/mL for one hour at room temperature before washing 2× in PBS and adding to RAW macrophages. Control or CD4 treated, Compound C labeled Jurkat cells were incubated with RAW macrophages for 1-3 hours before imaging comparisons were made of the cells, shown at high density 10×, with signal preferentially appearing from the CD4 treated samples.

Example 25. Toxicity Studies

Figure 42A:
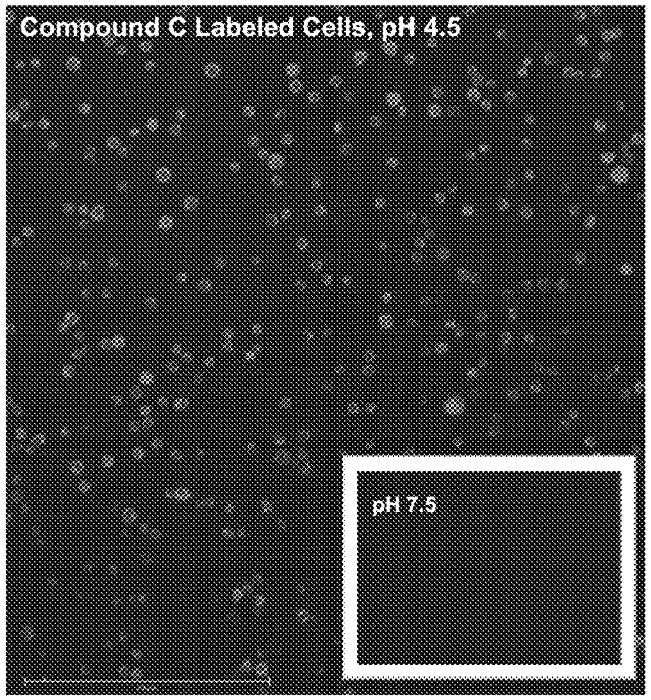
FIGS. 42A and 42B provide toxicity and turn-on response from Jurkat cells labeled with Compound C. "Con" is control; "Cmpd C" is Compound C.
Figure 42B:
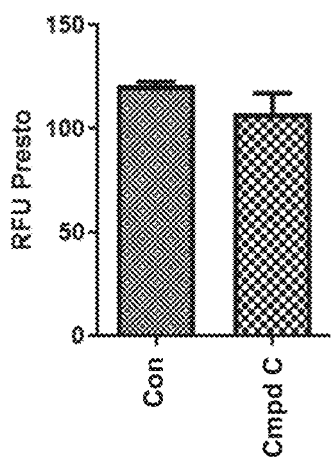

Compound C: FIGS. 42A and 42B show the low toxicity and large fold turn-on response from cells labeled with unconjugated Compound C. In this study, healthy Jurkat cells were grown and harvested in normal cell culture conditions, washed, counted, labeled and resuspended per product description in complete culture medium, and incubated overnight before testing for cell health and number with the PRESTOBLUE Cell Health Assay (Thermo Fisher Scientific, Waltham, MA). Cells with Compound C were, in parallel determinations, resuspended in the external reference pH buffer indicated and imaged on an EVOS M7000 for signal in the Cy5 channel from labeled cells at extracellular pH 4.5 (FIG. 42A, in red) and 7.5 (FIG. 42A, Inset). FIG. 42B is a graph showing control (left side) and compound C (right side). As shown in FIGS. 42A and 42B, Compound C imparted little toxicity to the cells when compared with sham labeled control conditions.

Figure 43A:
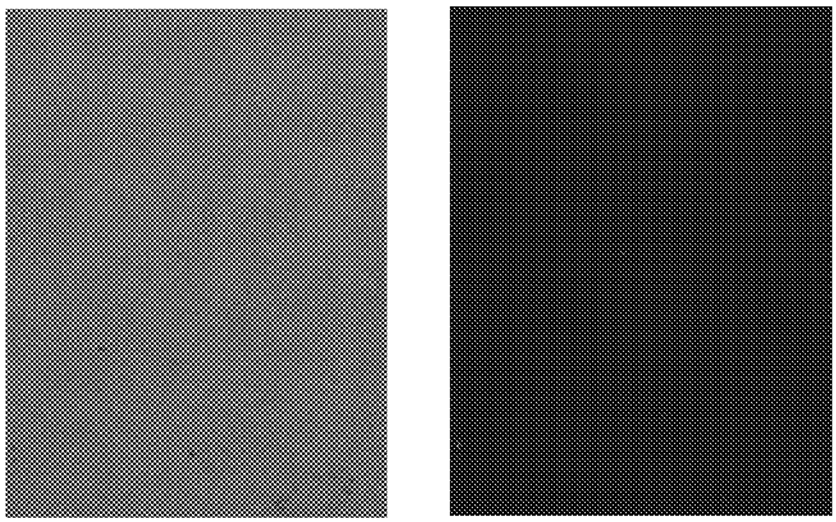
FIGS. 43A and 43B provide efferocytosis visualized from apoptotic cells labeled with Compound C at 4× live cell image. The left panel is a bright field micrograph image and the right panel is a fluorescence micrograph image.
Figure 43B:
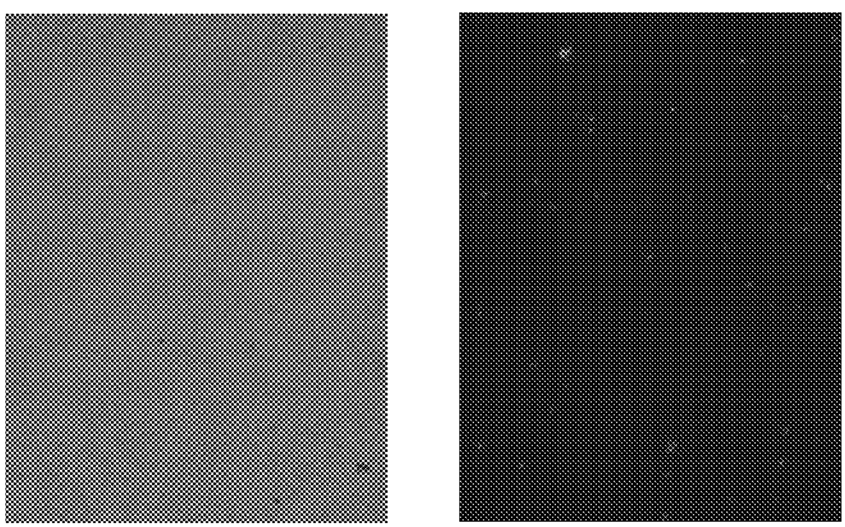
Figure 44A:
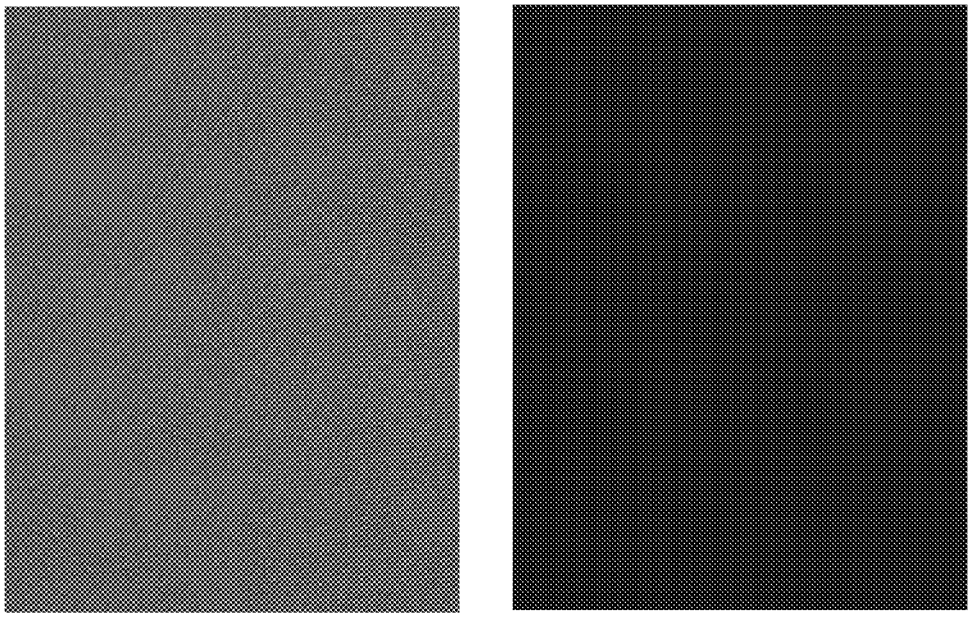
FIGS. 44A and 44B provide efferocytosis visualized from apoptotic cells labeled with Compound C at 10× live cell image. The left panel is a bright field micrograph image and the right panel is a fluorescence micrograph image.
Figure 44B:
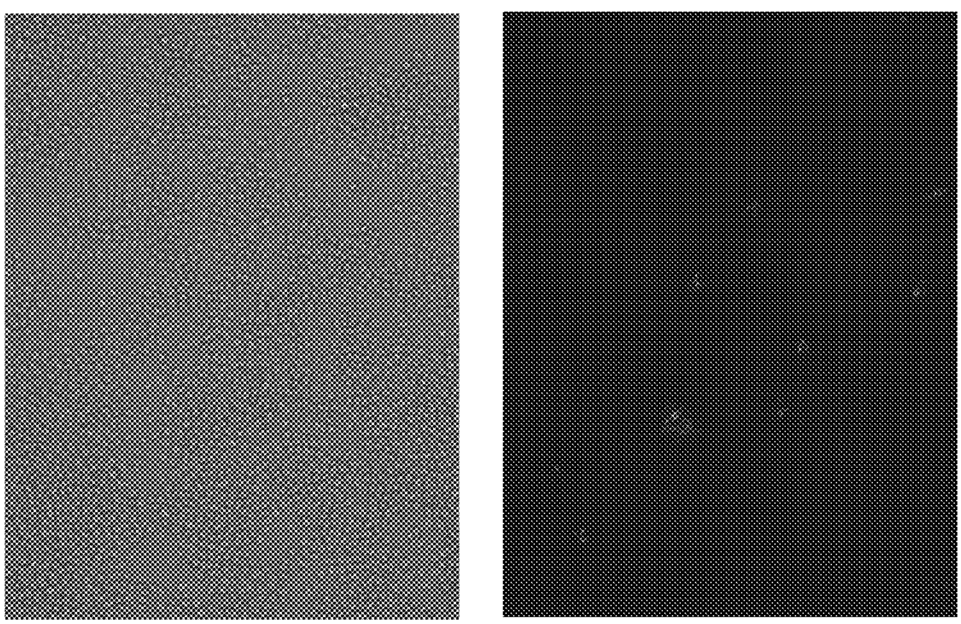

FIGS. 43-44 show the efferocytosis from apoptotic cells with Compound C. In this study, Jurkat cells were grown in 0.1% DMSO control or 2 uM camptothecin overnight in normal cell culture conditions then harvested, counted, washed, labeled and resuspended per product description in complete culture medium at matched density before adding to RAW macrophages for assays of efferocytosis, or the phagocytosis of apoptotic cells. Labeled Jurkat cells were incubated with RAW macrophages for 1-3 hours before imaging comparisons were made of the cells, shown at high density in 4× and lower density at 10×, with signal preferentially appearing from the camptothecin treated samples. FIG. 43A shows control JKT plus RAW macrophages at 4×. FIG. 43B shows camptothecin JKT plus RAW macrophages at 4×. FIG. 44A shows control JKT plus RAW macrophages at 10×. FIG. 44B shows camptothecin JKT plus RAW macrophages at 10×.

Figure 45:
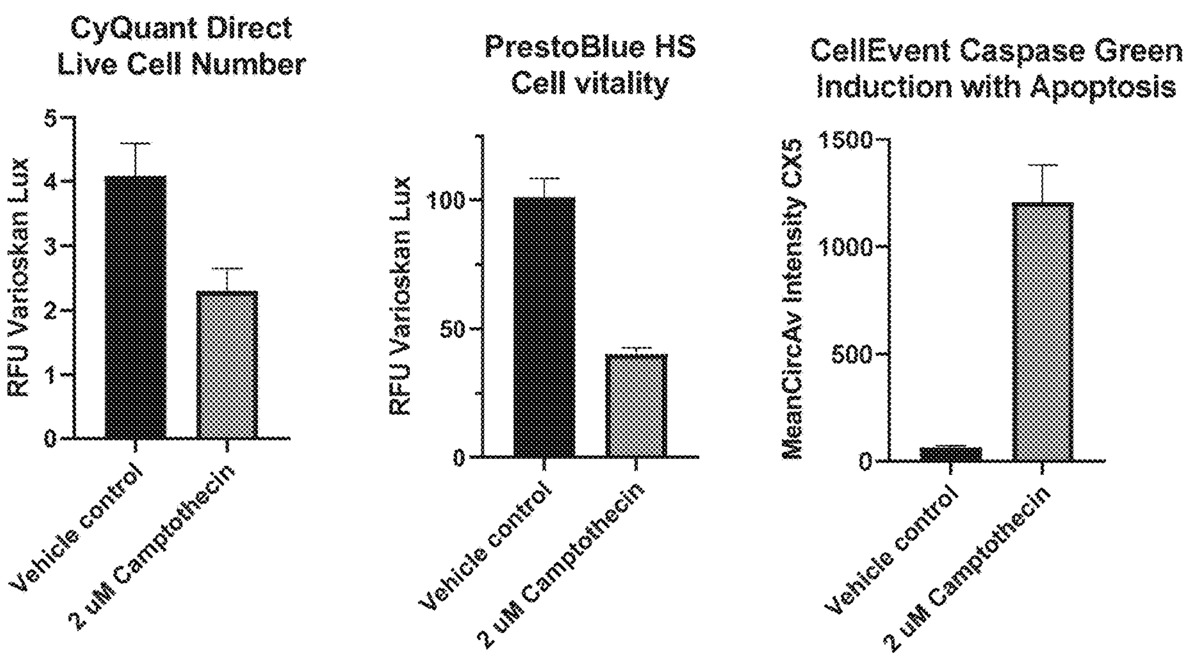
FIG. 45 provides apoptosis control experiments with CELLEVENT Caspase Green (Thermo Fisher Scientific, Waltham, MA) on Jurkat Cells. Left graph shows CYQUANT Direct Live (Thermo Fisher Scientific, Waltham, MA) cell number, middle graph shows PRESTOBLUE HS cell viability (Thermo Fisher Scientific, Waltham, MA), and right graph shows CELLEVENT caspase green induction with apoptosis.

FIG. 45 shows apoptosis control experiments with camptothecin on Jurkat cells to corroborate the efferocytosis data in FIGS. 42-43. In this study, Jurkat cells were grown in 0.1% DMSO vehicle control or 2 uM camptothecin overnight in normal cell culture conditions then harvested, counted, washed, labeled, and resuspended at matched total cell number at $2\times10^6$ cells per mL in complete culture medium and dispensed 100 uL (200,000 cells) per well (n=8 per measurement) before adding the indicated reagents for 1 hour. Microplate and imaging comparisons were made of the cells, with CYQUANT Direct showing fewer live cells among the matched total number with Camptopthecin (FIG. 45, graph on left), while PRESTOBLUE HS (Thermo Fisher Scientific, Waltham, MA) also showed a decrease in overall vitality in (FIG. 45, middle graph) matched total numbers of cells. The apoptosis indicator CELLEVENT Caspase green (Thermo Fisher Scientific, Waltham, MA) was also added to the two samples matched in total cells per mL along with NUCBLUE Live (Thermo Fisher Scientific, Waltham, MA), and cells plated at 100,000 cells per well for HCA quantification on the CELLINSIGHT CX5. Signal units of Caspase activation per cell were quantified between control and camptothecin (FIG. 45, right graph), showing a substantial induction of apoptosis and corresponding intracellular caspase activity with the Camptothecin intervention. The results showed that 2 uM Camptothecin overnight decreases live cell number, cell vitality and potently induces apoptosis via activation of Caspase 3/7.

EQUIVALENTS

The foregoing written specification is considered to be sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

What is claimed is:

1. A compound chosen from a compound of Formula (I):

(I)

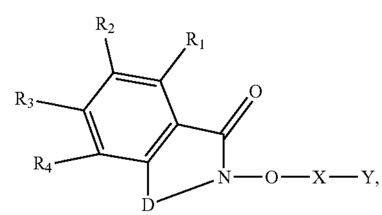

its corresponding compound of Formula (II)

(II)

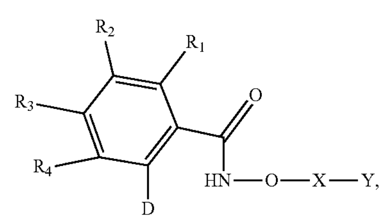

and salts thereof, wherein,

O—X—Y is chosen from
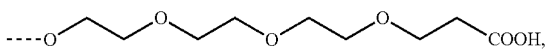
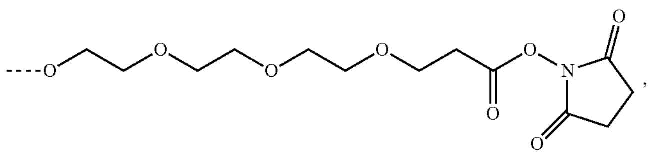
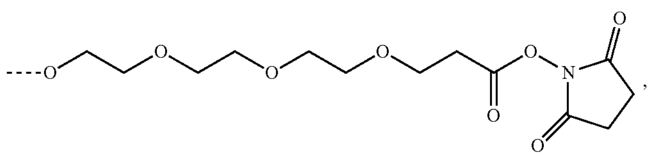
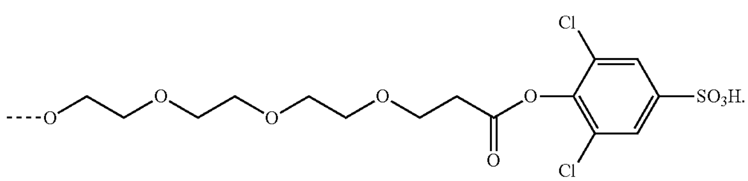
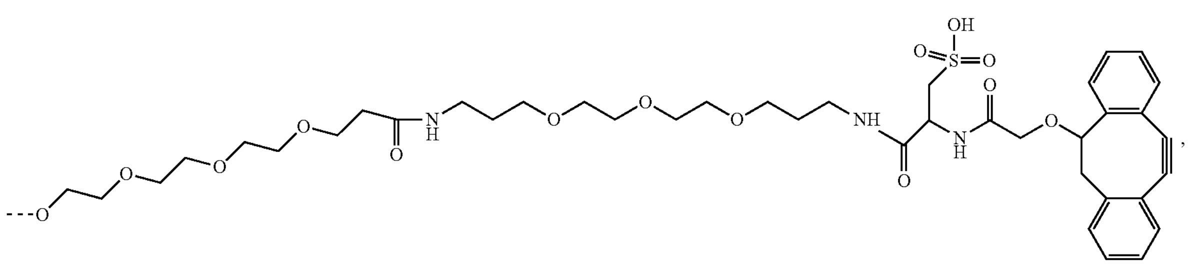
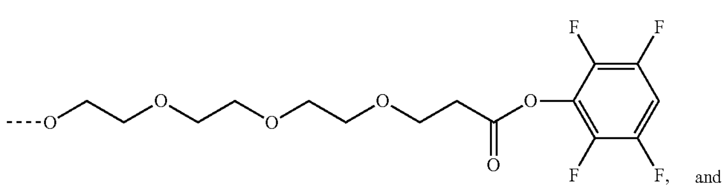
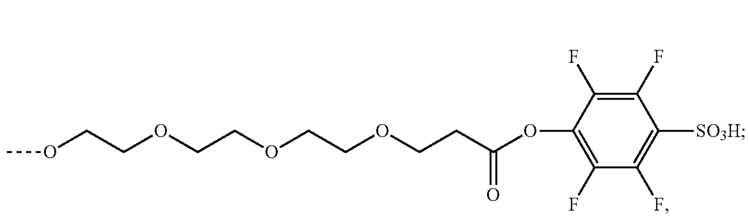

D is

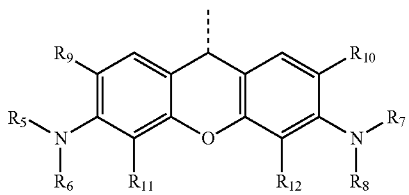

wherein $R_5$, $R_6$, $R_7$ and $R_8$ are each independently chosen from H and alkyl; and $R_9$, $R_{10}$, $R_{11}$ and $R_{12}$ are each independently chosen from H, alkyl, sulfo and sulfonyl; or $R_8$ is taken together with $R_{12}$ and the atoms to which they are attached to form an optionally substituted fused ring;

or $R_9$ is taken together with $R_5$ and the atoms to which they are attached to form an optionally substituted fused ring;

or $R_{10}$ is taken together with $R_7$ and the atoms to which they are attached to form an optionally substituted fused ring;

or $R_{11}$ is taken together with $R_6$ and the atoms to which they are attached to form an optionally substituted fused ring.

2. The compound according to claim 1, wherein the compound of Formula (I) is chosen from

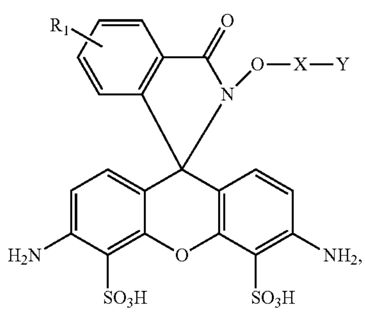

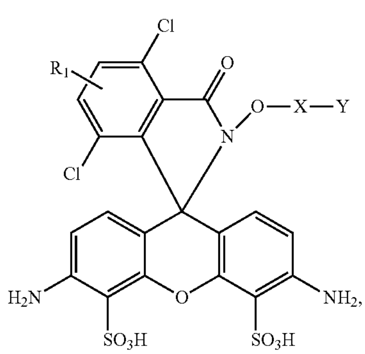

-continued

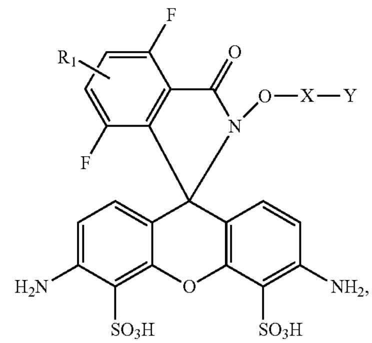

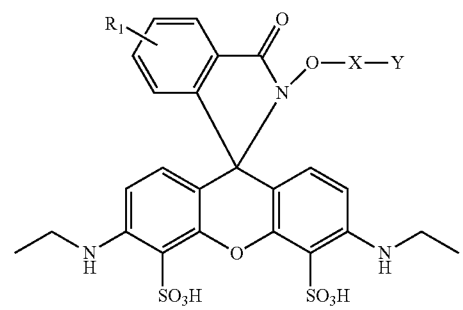

,

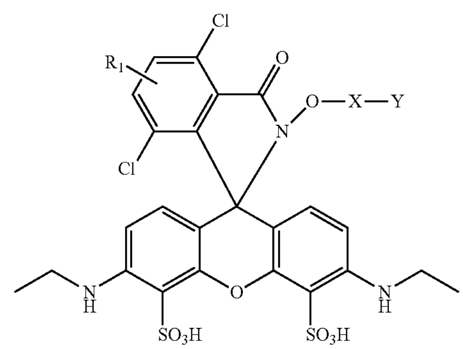

,

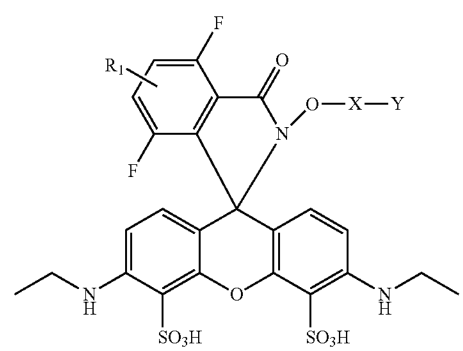

,

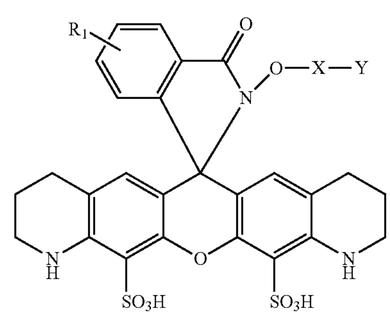

,

-continued
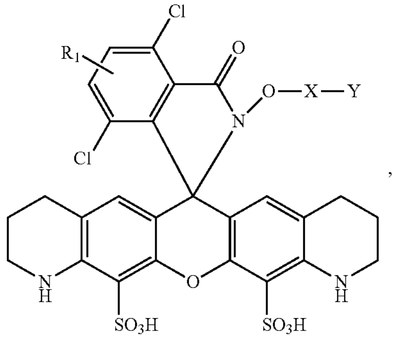
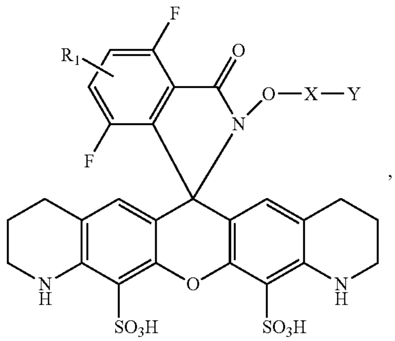
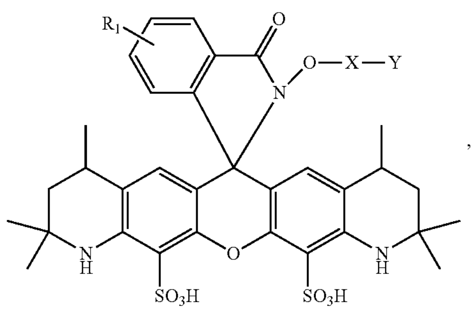
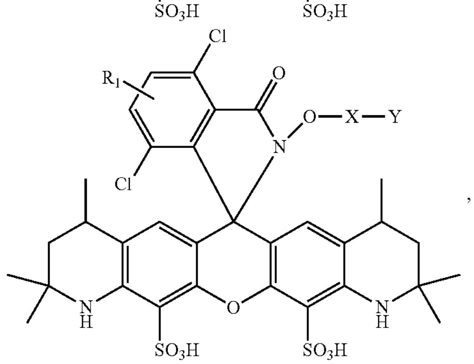
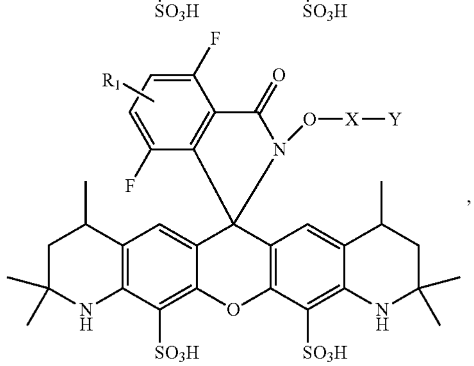
-continued
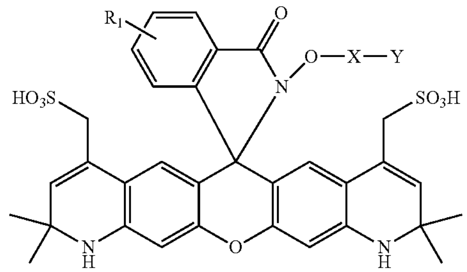
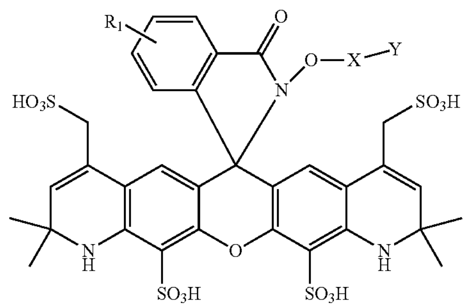
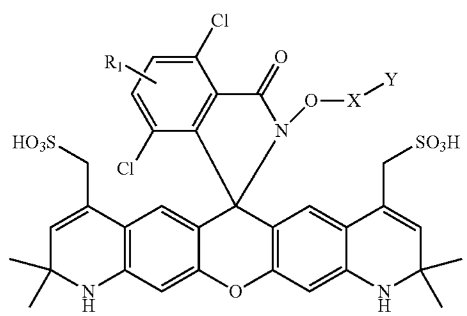
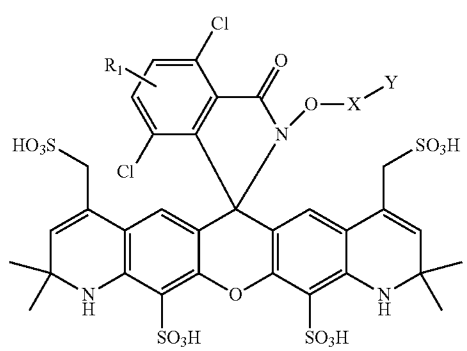
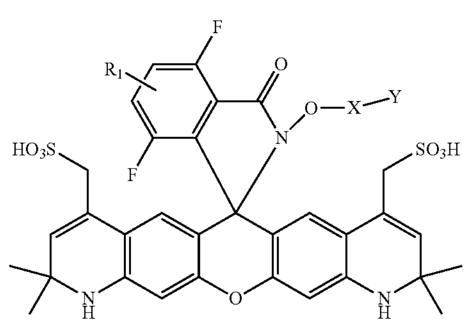

-continued
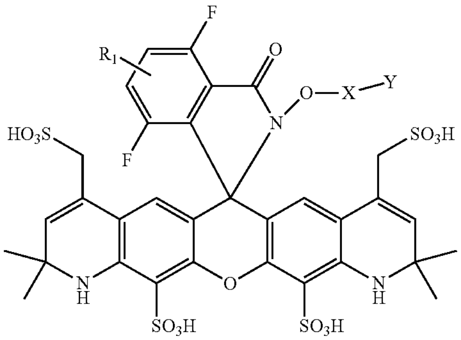
,
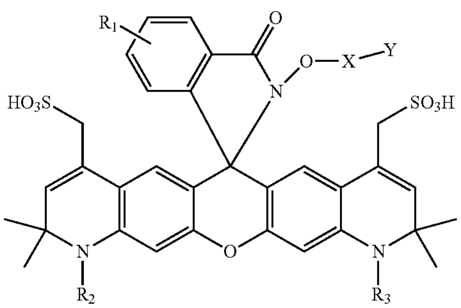
,
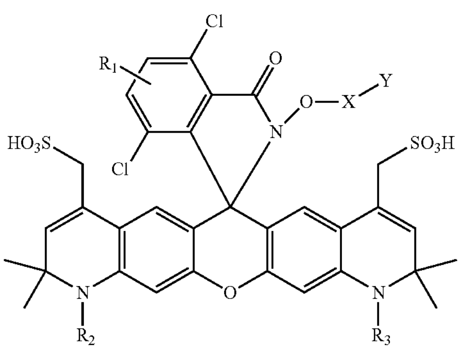
,
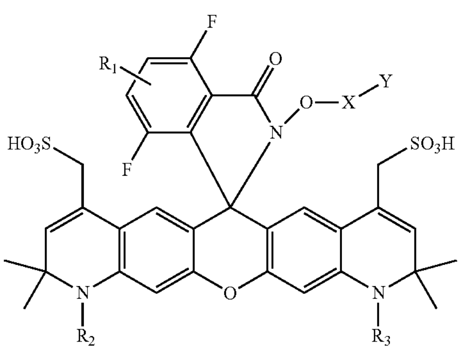
,
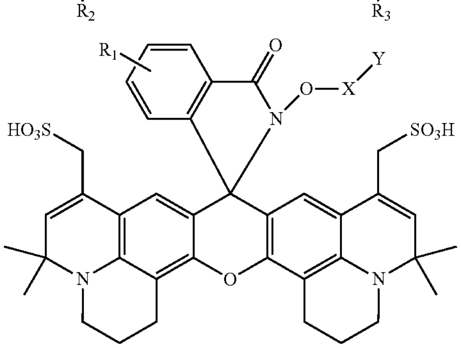
,
-continued
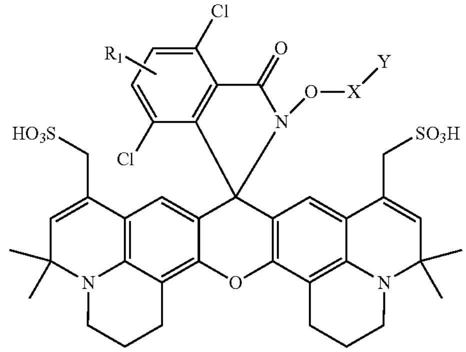
,
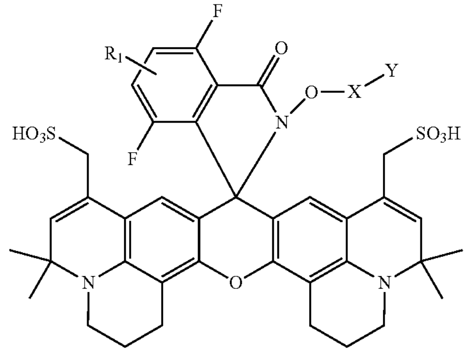
,
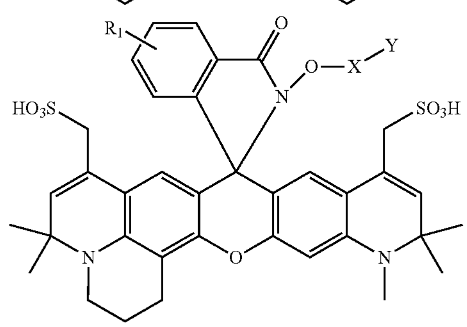
,
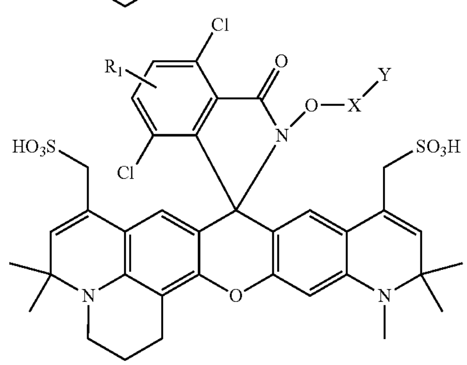
,
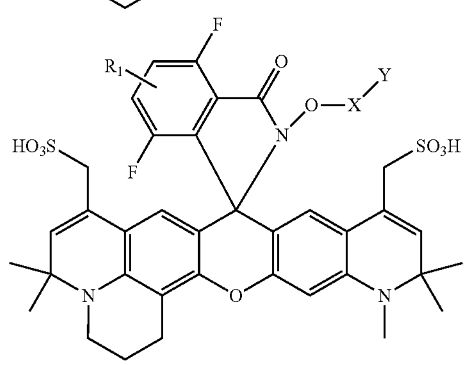
, -continued
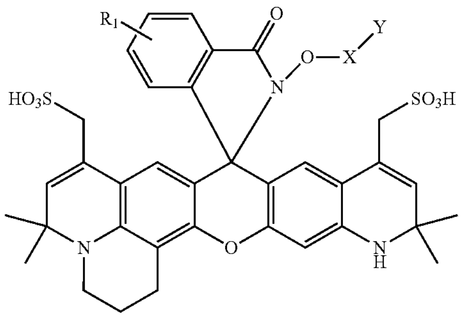
,
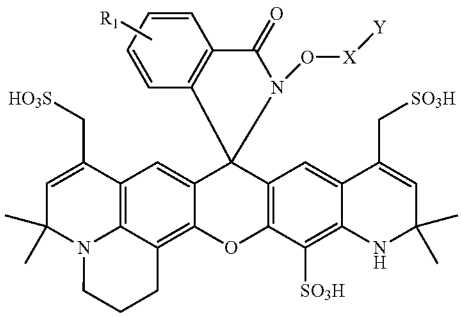
,
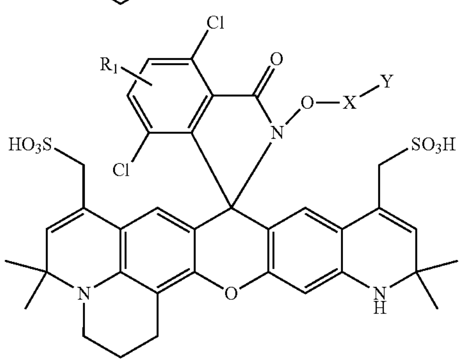
,
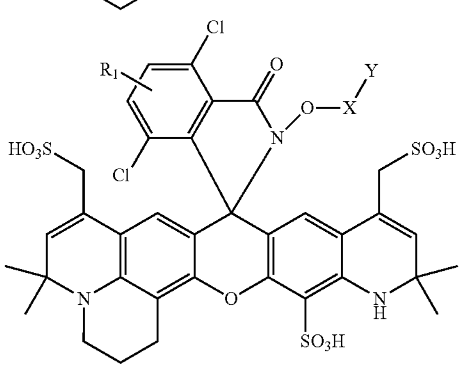
,
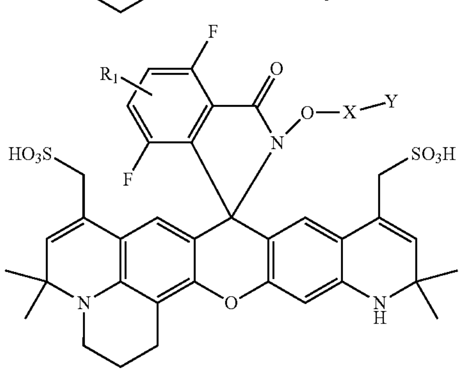
,
-continued
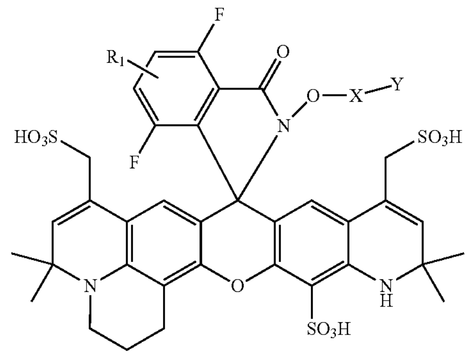
,
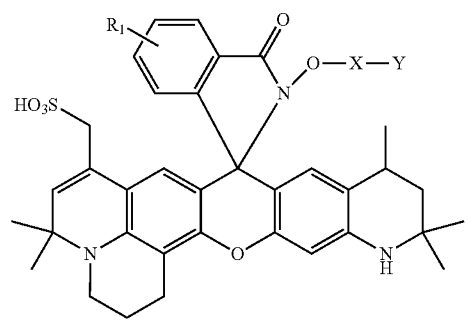
,
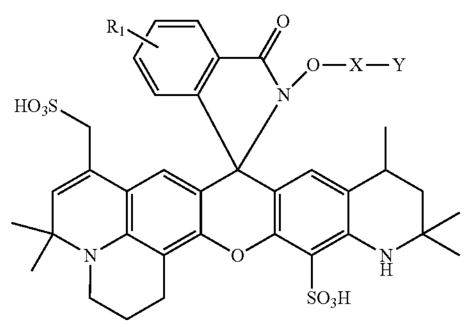
,
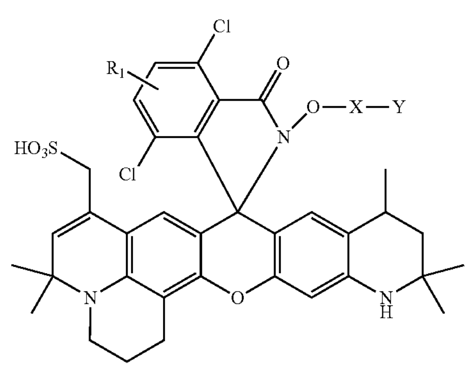
,
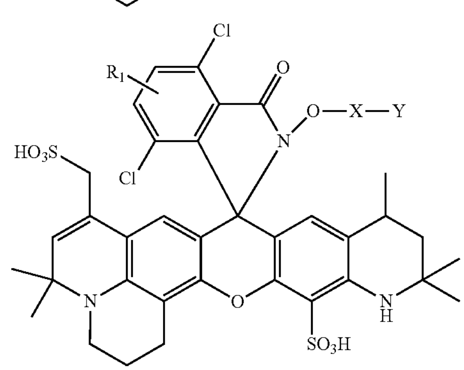
, -continued
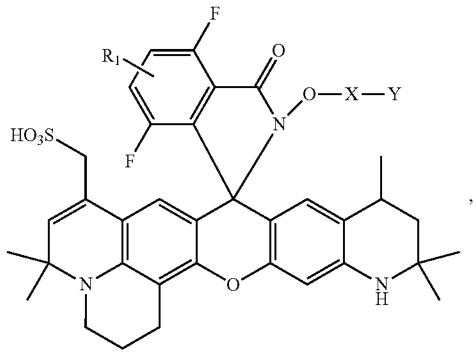
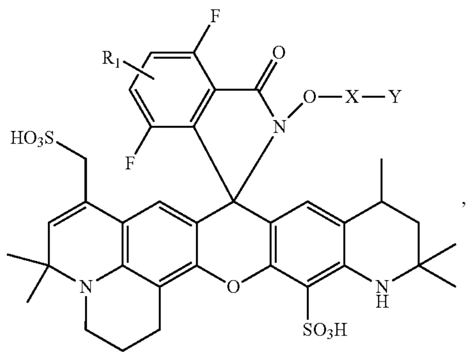
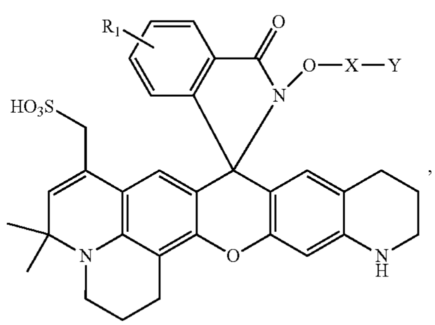
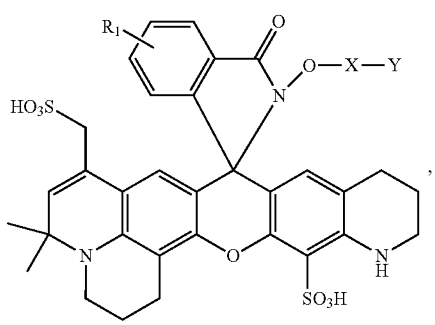
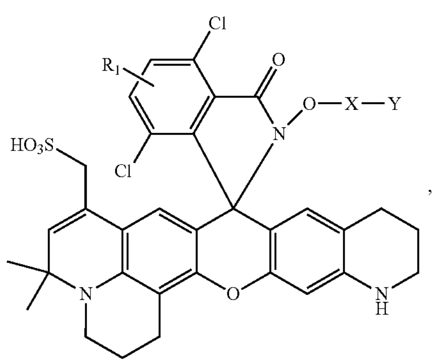
-continued
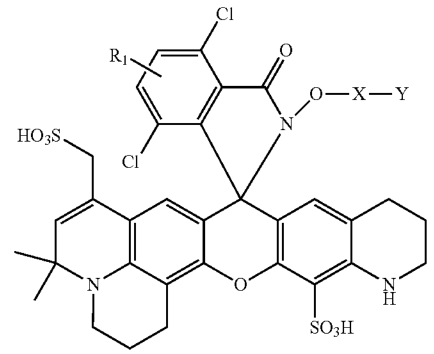
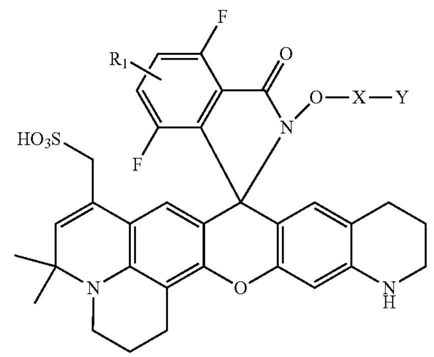
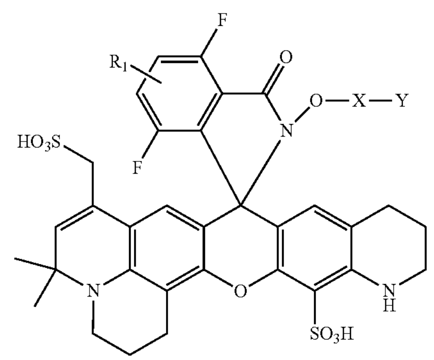
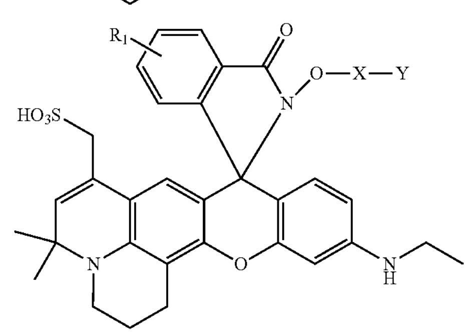
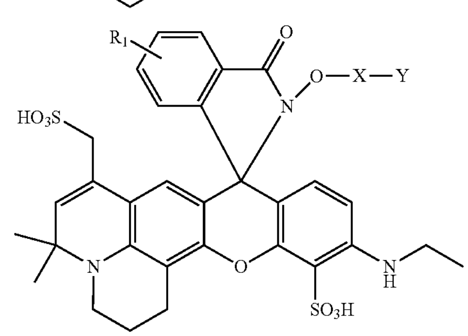

-continued
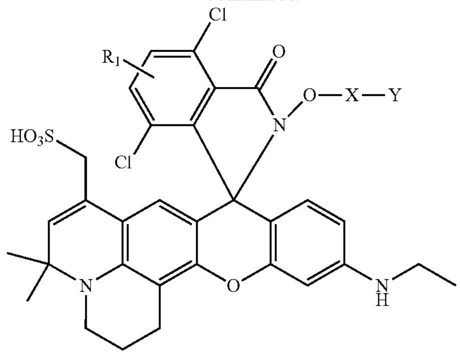
,
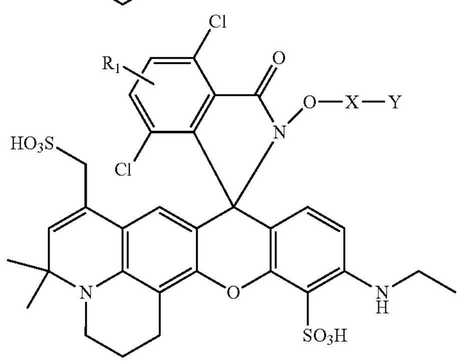
,
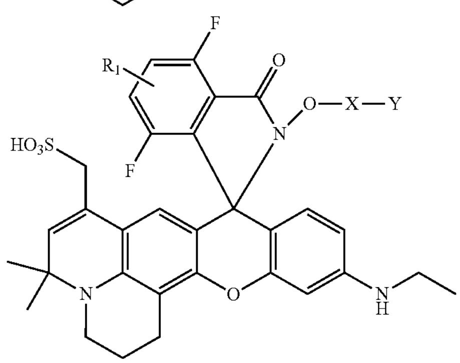
,
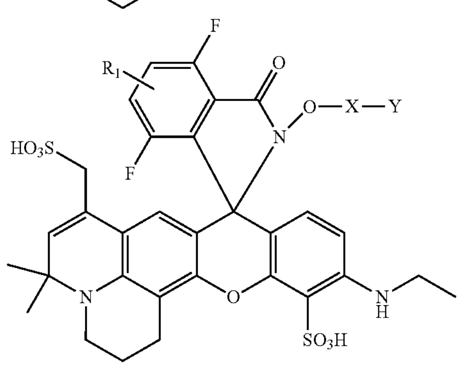
,
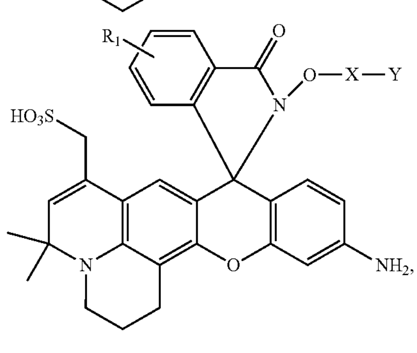
-continued
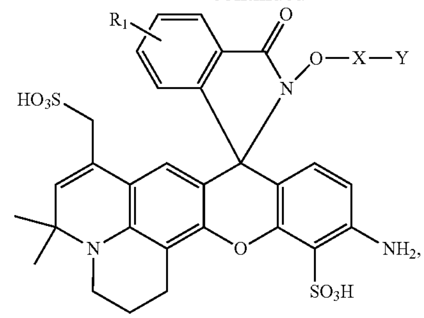
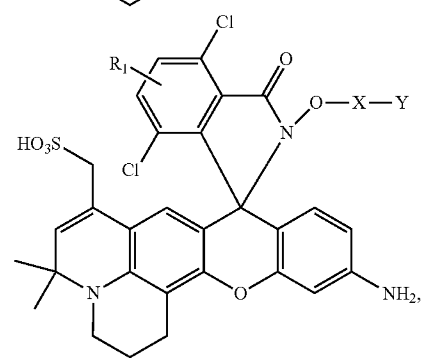
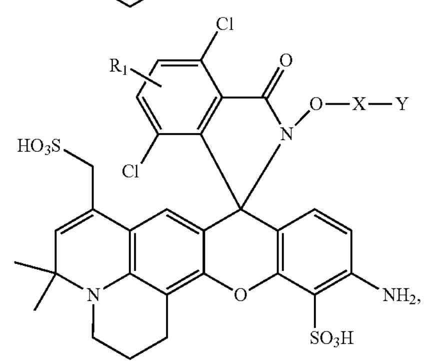
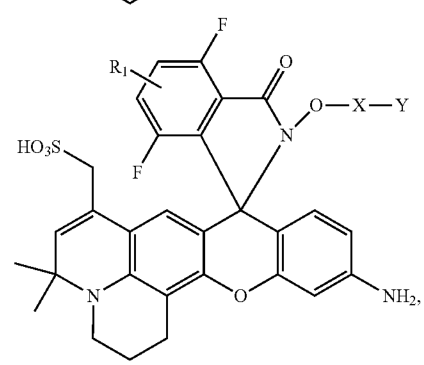
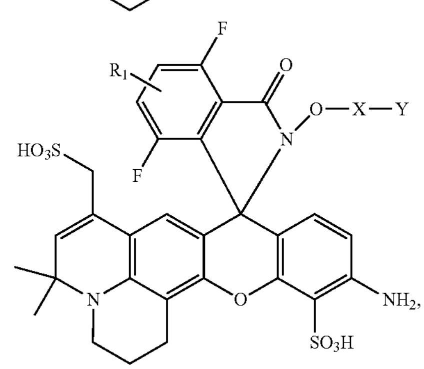

-continued
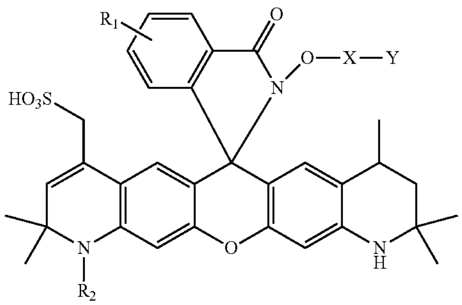
,
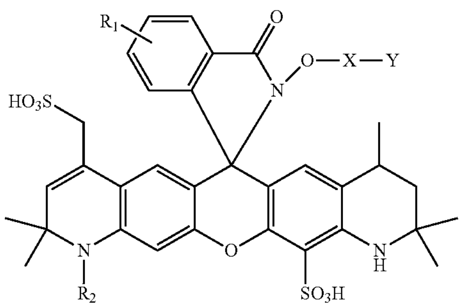
,
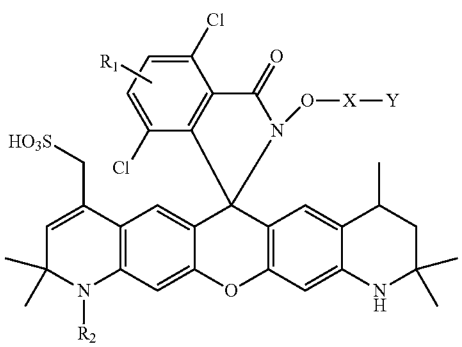
,
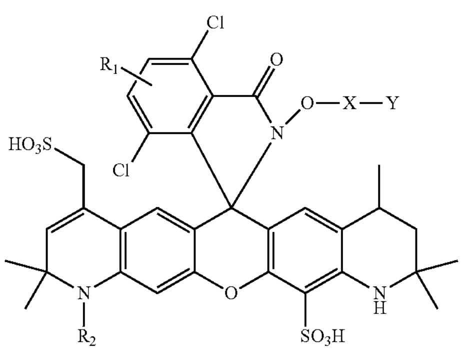
,
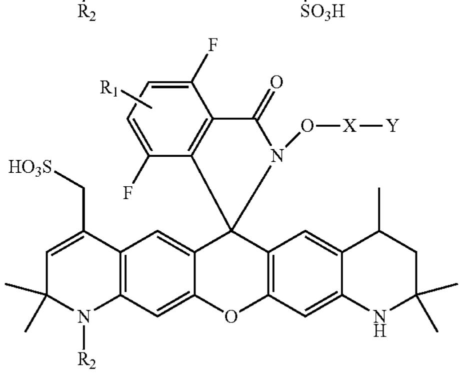
,
-continued
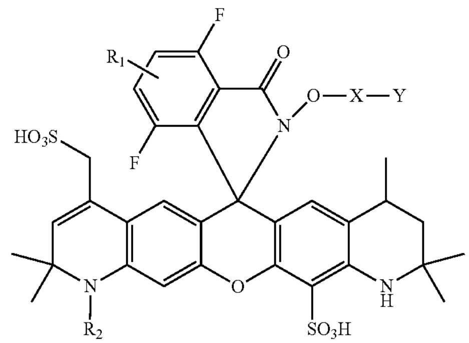
,
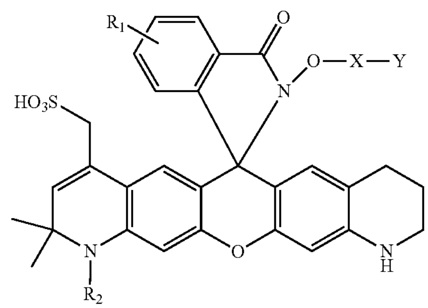
,
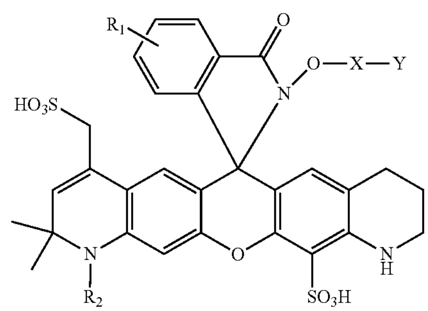
,
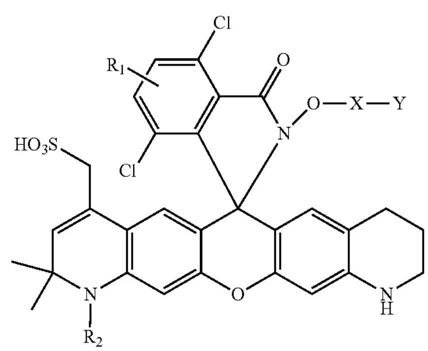
,
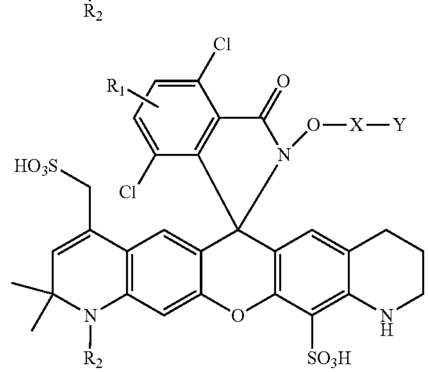
,

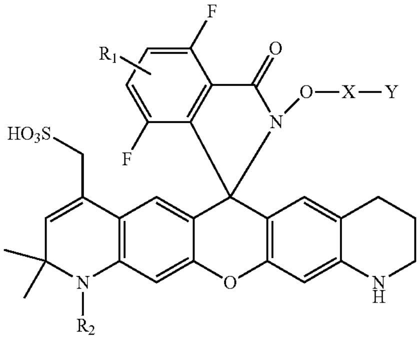
,
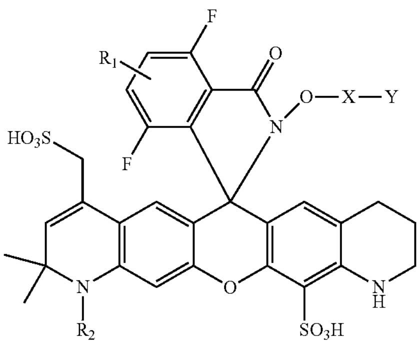
,
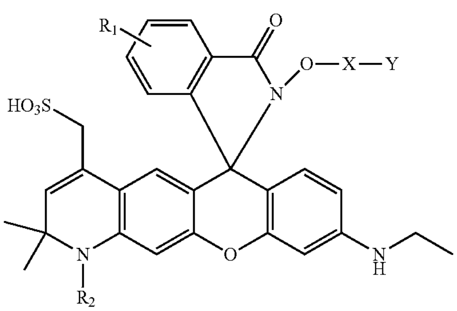
,
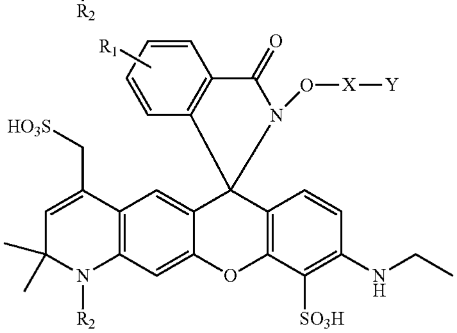
,
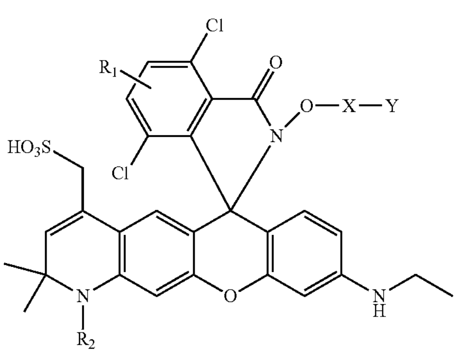
,
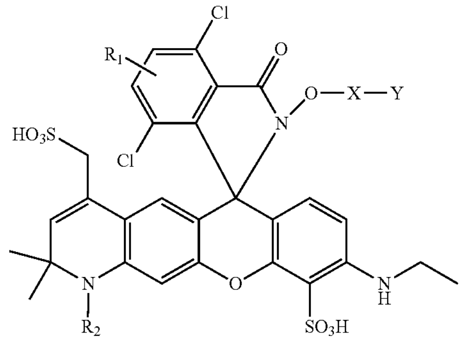
,
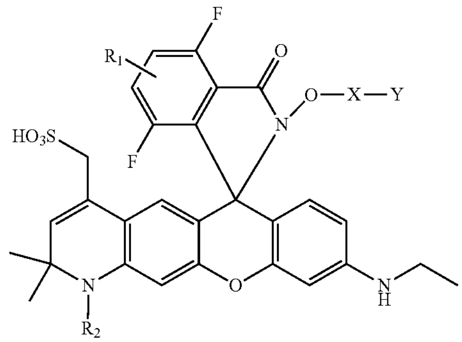
,
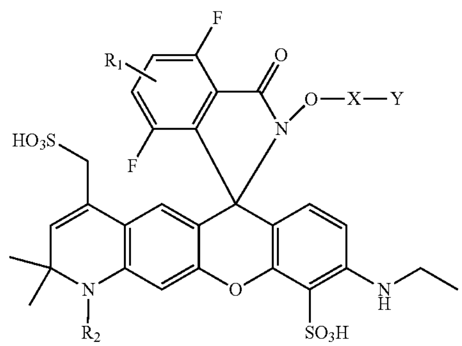
,
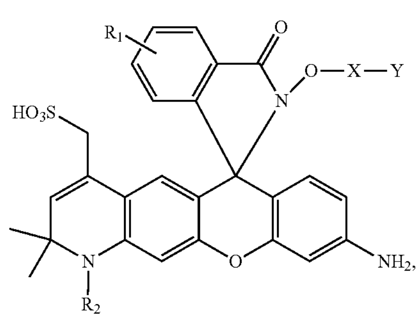
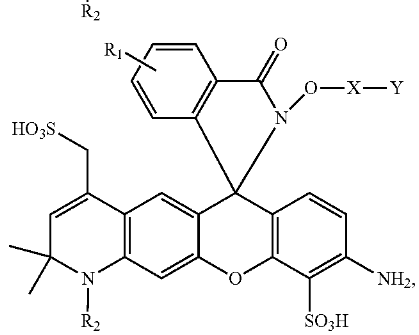

-continued
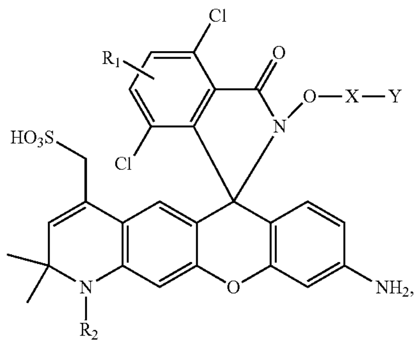
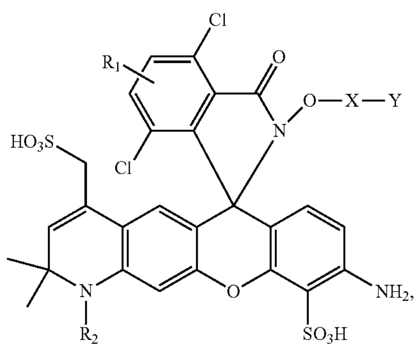
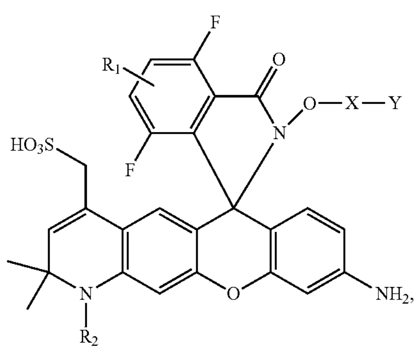
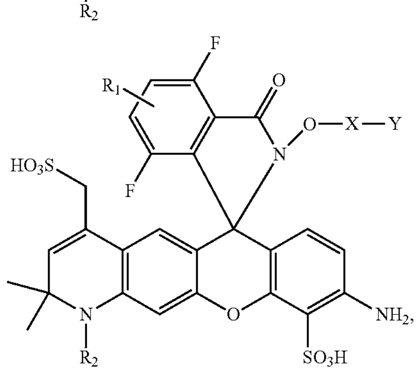
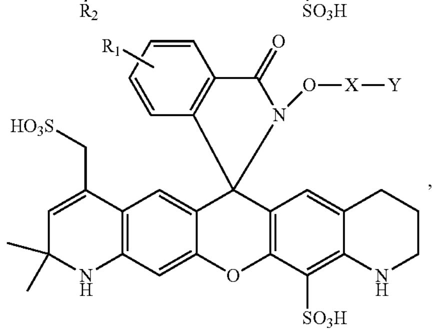
-continued
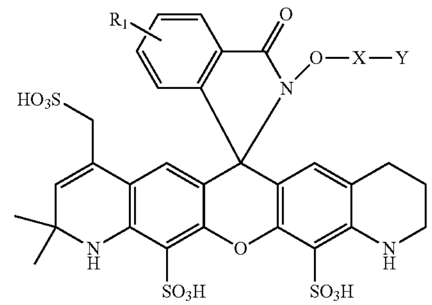
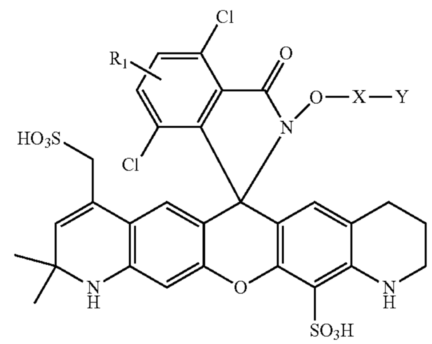
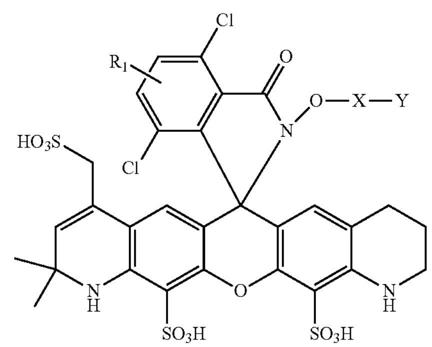
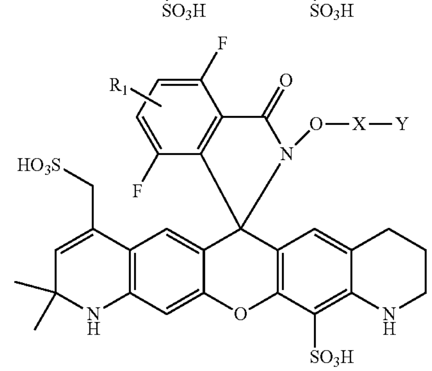
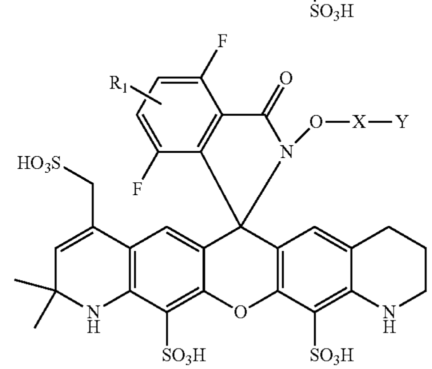

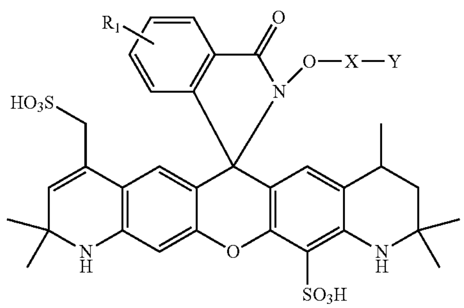
,
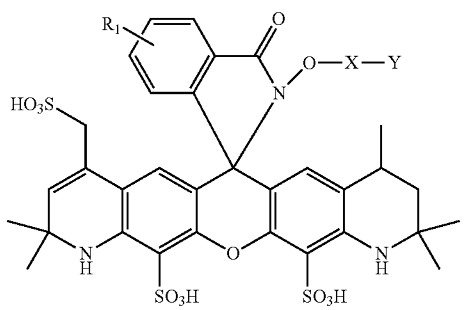
,
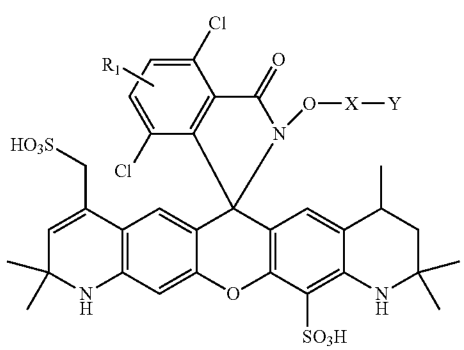
,
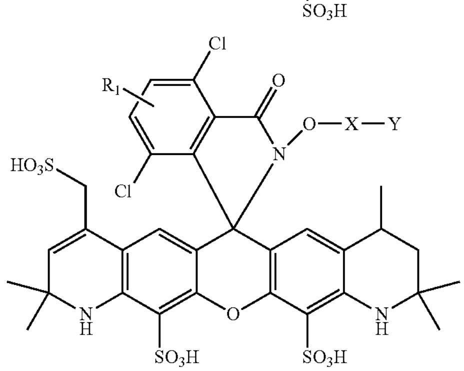
,
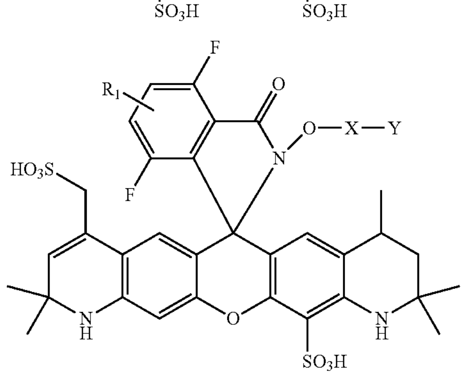
,
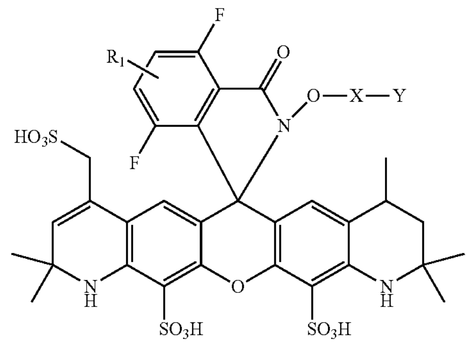
,
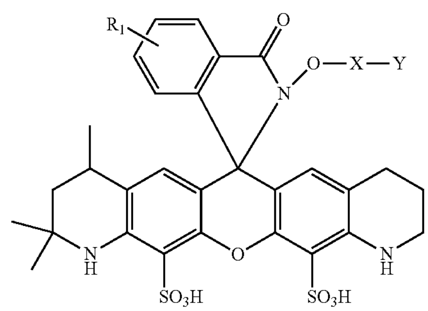
,
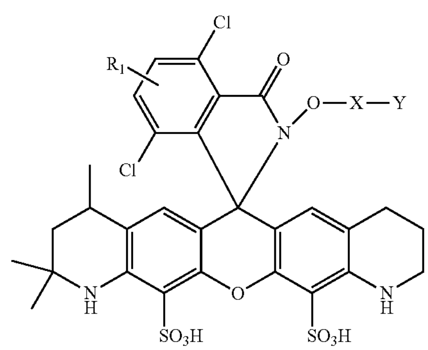
,
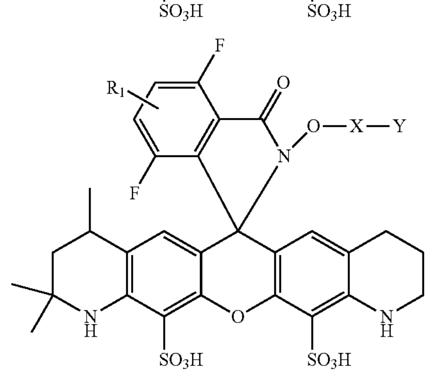
,
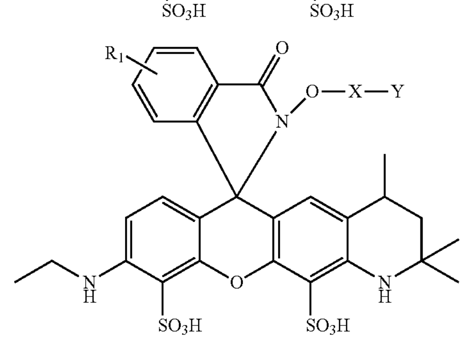
, -continued
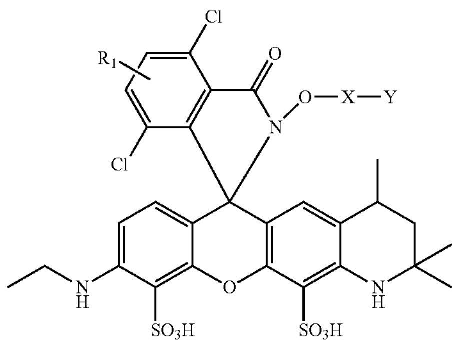
,
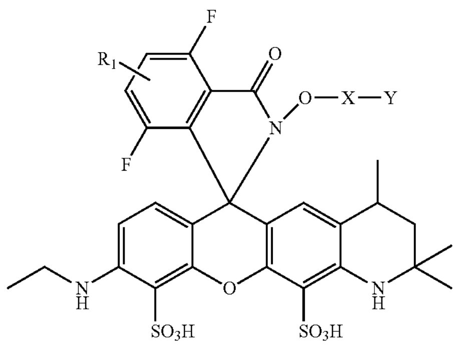
,
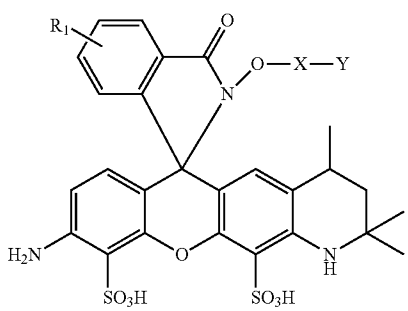
,
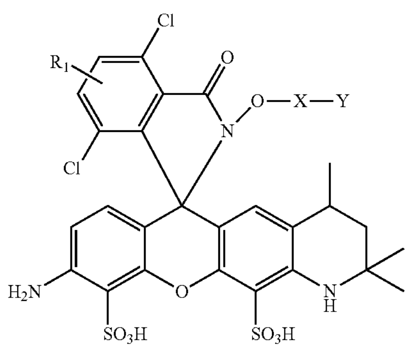
,
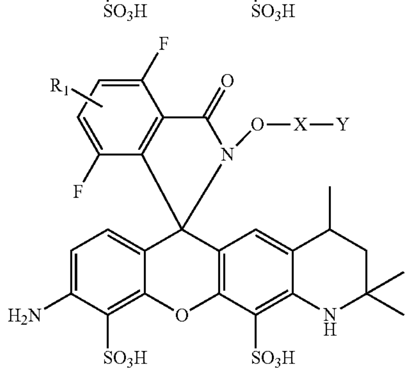
,
-continued
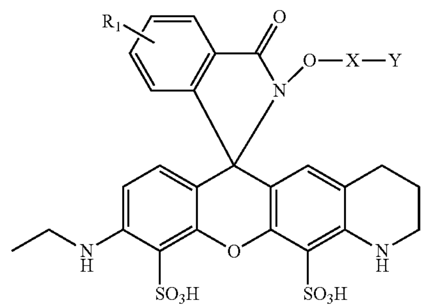
,
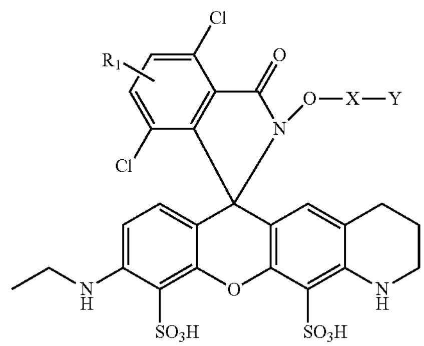
,
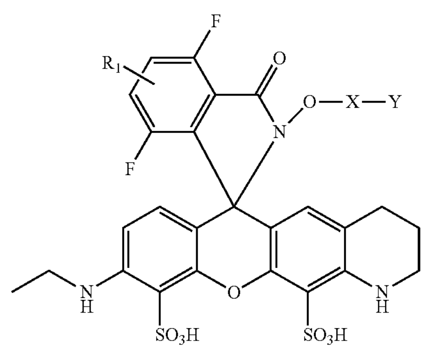
,
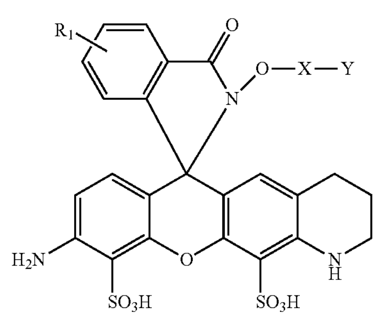
,
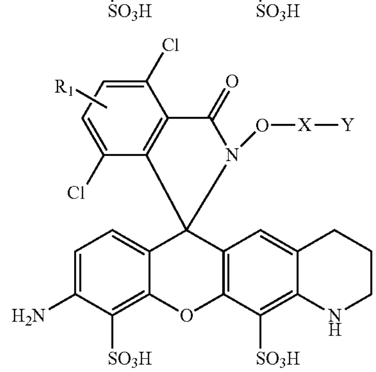
,

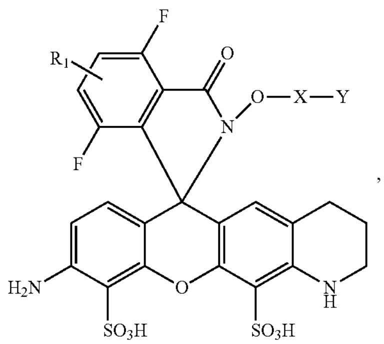
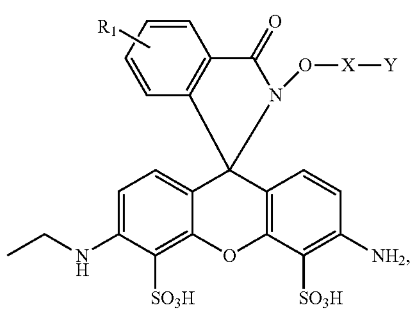
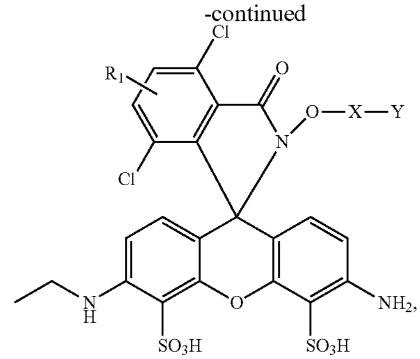
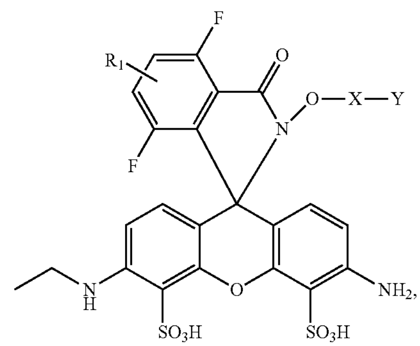
and salts thereof.
3. The compound of claim 1, wherein the compound is chosen from
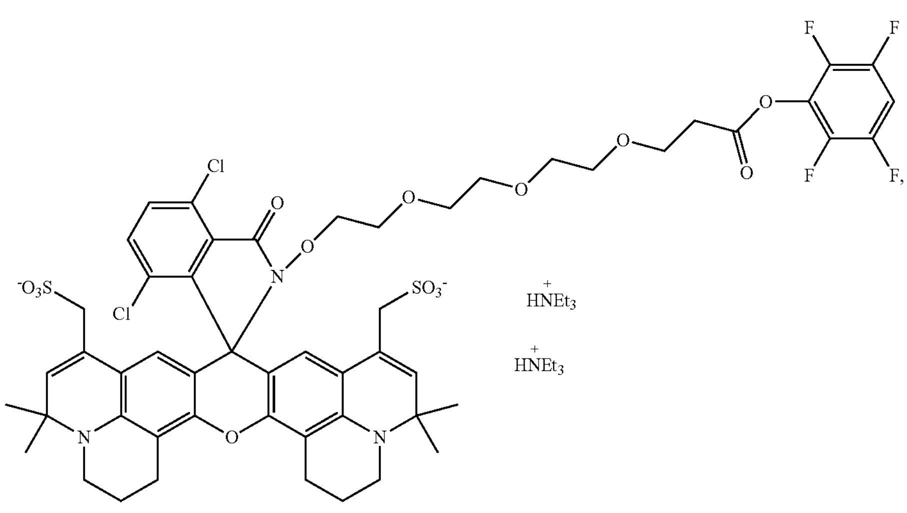

-continued

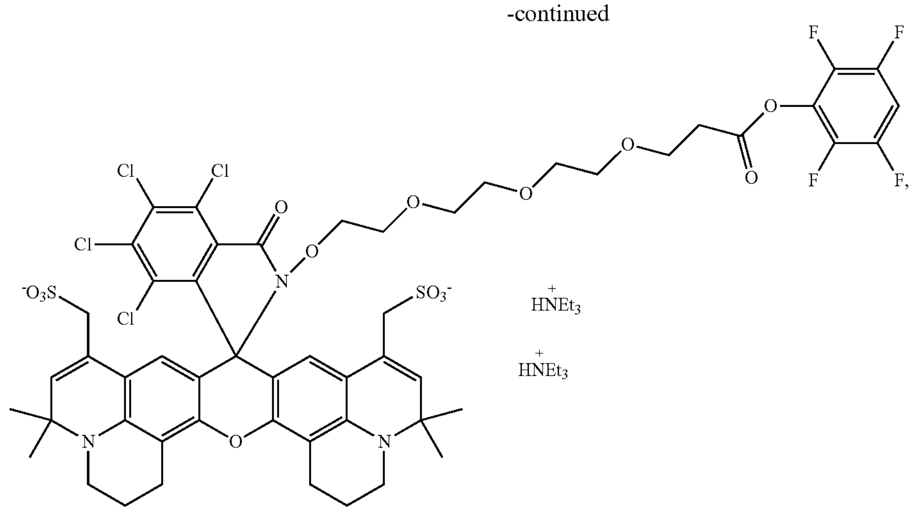

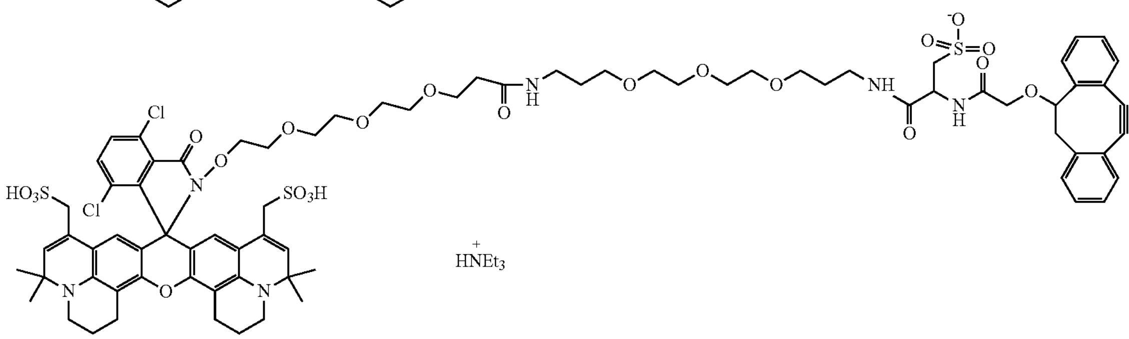

, and

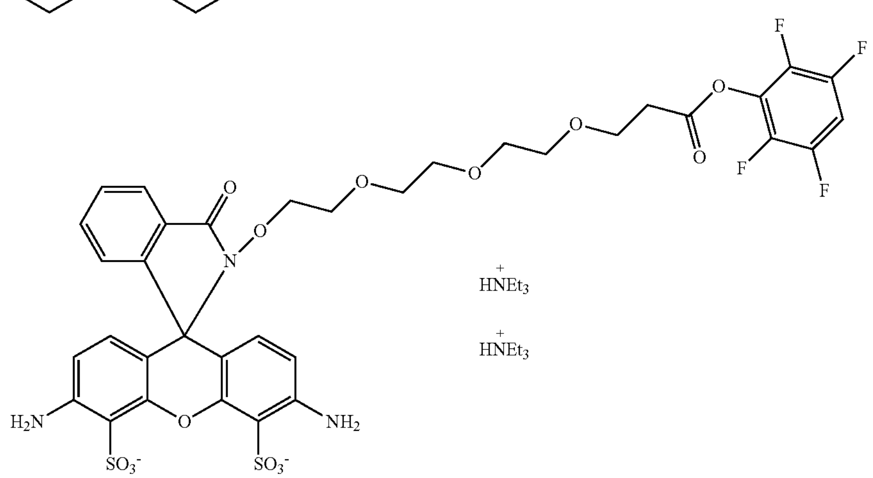

4. A method for detecting phagocytosis of a biomolecule in solution, the method comprising:
conjugating the compound according to claim 1 to a biomolecule to form a biomolecule-compound conjugate;
contacting the biomolecule-compound conjugate with a cell to form a contacted cell;
incubating the contacted cell for a time interval adequate to allow entry of the compound into the cell;
illuminating the contacted cell with an appropriate wavelength of light to form an illuminated cell; and
detecting fluorescent emissions from the illuminated cell;
wherein fluorescent emissions indicate phagocytosis of the biomolecule.

5. The method according to claim 4, wherein the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, and virus-like particle.

6. A method for monitoring internalization of a biomolecule, the method comprising:
conjugating the compound according to claim 1 to a biomolecule to form a biomolecule-compound conjugate;
contacting the biomolecule-compound conjugate with a cell to form a contacted cell;

incubating the contacted cell for a time interval adequate to allow entry of the compound into the cell;

illuminating the contacted cell with an appropriate wavelength of light to form an illuminated cell; and detecting fluorescent emissions from the illuminated cell;

wherein fluorescent emissions indicate internalization of the compound.

7. The method according to claim 6, wherein the biomolecule is chosen from an amino acid, a peptide, a protein, an antibody, an antibody fragment, an enzyme, a receptor, a monosaccharide, a polysaccharide, a carbohydrate, a lectin, an ion-complexing moiety, a nucleotide, an oligonucleotide, a nucleic acid, an aptamer, a hapten, a drug, a toxin, a lipid, a phospholipid, a lipoprotein, a glycoprotein, a hormone, a lipopolysaccharide, a liposome, a lipophilic polymer, a non-biological organic polymer, a polymeric microparticle, a bioparticle, an animal cell, a plant cell, a bacterium, a yeast, virus, and virus-like particle.

8. A method for analyzing kinetics of migration of a biomolecule through a cell or cellular compartment, the method comprising:

conjugating the compound according to claim 1 to a biomolecule to form a biomolecule-compound conjugate;

contacting the biomolecule-compound conjugate with a cell to form a contacted cell;

incubating the contacted cell for a time interval adequate to allow entry of the compound into the cell;

illuminating the contacted cell with an appropriate wavelength of light to form an illuminated cell; and detecting fluorescent emissions from the illuminated cell over a time interval.

9. A composition comprising:

(a) the compound according to claim 1; and (b) a biomolecule.

10. The composition according to claim 9, wherein the biomolecule is chosen from a cell, protein, antibody, antibody fragment, receptor, lipid, virus, virus-like particle, nucleic acid, and an aptamer.

11. A kit comprising:

(a) the compound of claim 1; and (b) instructions for use.

12. The kit according to claim 11, further comprising at least one of the following: a buffering agent, a purification medium, a vial comprising the sample, and an organic solvent.

13. The method according to claim 4, wherein the detecting step is performed using flow cytometry, fluorescence microscopy or fluorometry.

14. The method according to claim 6, wherein the detecting step is performed using flow cytometry, fluorescence microscopy or fluorometry.

15. The method according to claim 8, wherein the detecting step is performed using flow cytometry, fluorescence microscopy or fluorometry.

* * * * *

UNITED STATES PATENT AND TRADEMARK OFFICE

CERTIFICATE OF CORRECTION

PATENT NO. : 11,952,495 B1
APPLICATION NO. : 17/498377
DATED : April 9, 2024
INVENTOR(S) : Yi-Zhen Hu et al.

It is certified that error appears in the above-identified patent and that said Letters Patent is hereby corrected as shown below:

In the Claims

In Columns 189-190, Claim 1, Line 5, delete "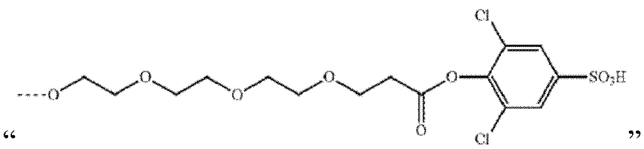"

insert --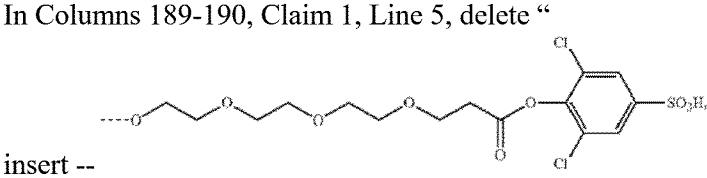--, therefor.

In Columns 189-190, Claim 1, Line 8, delete "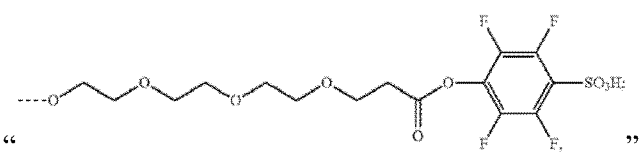"

and insert --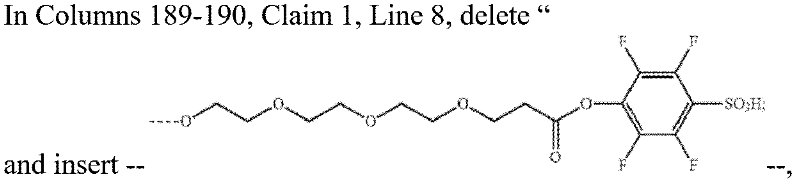--, therefor.

In Column 191, Claim 1, Line 1, insert -- $R_1$, $R_2$, $R_3$, and $R_4$ are each independently chosen from H, and halo; and --, before "D is" as a new subpoint.

In Columns 215-216, Claim 3, Line 3, after structure III, insert -- . --.

Signed and Sealed this
Twenty-second Day of October, 2024

Katherine Kelly Vidal

Katherine Kelly Vidal
*Director of the United States Patent and Trademark Office*